(12) United States Patent
Kohno

(10) Patent No.: US 8,660,206 B2
(45) Date of Patent: Feb. 25, 2014

(54) METHOD OF GENERATING PULSE WAVEFORM

(75) Inventor: Ryuji Kohno, Yokohama (JP)

(73) Assignees: Yokohama TLO Company, Ltd., Yokohama-shi (JP); Ryuji Kohno, Yokohama-shi (JP)

( * ) Notice: Subject to any disclaimer, the term of this patent is extended or adjusted under 35 U.S.C. 154(b) by 1031 days.

(21) Appl. No.: 10/546,630

(22) PCT Filed: Dec. 16, 2003

(86) PCT No.: PCT/JP03/16079
§ 371 (c)(1),
(2), (4) Date: Aug. 23, 2005

(87) PCT Pub. No.: WO2004/077775
PCT Pub. Date: Sep. 10, 2004

(65) Prior Publication Data
US 2006/0140249 A1 Jun. 29, 2006

(30) Foreign Application Priority Data
Feb. 25, 2003 (JP) .................................. 2003-47990

(51) Int. Cl.
*H04K 1/02* (2006.01)
(52) U.S. Cl.
USPC ........... 375/296; 375/130; 375/260; 375/267; 375/295; 375/299; 375/309
(58) Field of Classification Search
USPC .......... 375/130, 295, 257, 260, 296, 299, 309
See application file for complete search history.

(56) References Cited

U.S. PATENT DOCUMENTS

| 5,677,927 A | 10/1997 | Fullerton et al. |
| 5,832,035 A * | 11/1998 | Fullerton ...................... 375/149 |
| 5,920,278 A * | 7/1999 | Tyler et al. ...................... 342/33 |
| 6,233,552 B1 * | 5/2001 | Mustapha et al. ............ 704/209 |
| 6,433,720 B1 | 8/2002 | Libove et al. |

(Continued)

FOREIGN PATENT DOCUMENTS

| EP | 1280308 A2 | 1/2003 |
| JP | 54-116161 | 9/1979 |

(Continued)

OTHER PUBLICATIONS

Ramirez-Mireles "On the Performance of Ultra-Wide Band Signals in Gaussian Noise and Dense Multipath", IEEE, Jan. 2001.*

(Continued)

*Primary Examiner* — Sophia Vlahos
(74) *Attorney, Agent, or Firm* — Westerman, Hattori, Daniels & Adrian, LLP

(57) ABSTRACT

The present invention forms, in UWB communications in which a pulse of short duration is transmitted, a transmission signal with a desired frequency characteristic by adjusting the shape of a pulse signal used in data transmissions. As a result, radio interference with other wireless systems in UWB communications is reduced. As aspects for adjusting the pulse signal, the present invention comprises an aspect for generating a pulse signal having a desired frequency characteristic by adjusting the shape of a single pulse itself, an aspect for generating a pulse signal having a desired frequency characteristic by combining a plurality of pulses, and an aspect for finding a combination of pulse signals from the frequency characteristic of an object transmission signal.

2 Claims, 110 Drawing Sheets

SYSTEM CONCEPTUAL VIEW

(56) References Cited

U.S. PATENT DOCUMENTS

| | | | |
|---|---|---|---|
| 6,505,032 B1* | 1/2003 | McCorkle et al. | 455/41.2 |
| 6,603,818 B1* | 8/2003 | Dress et al. | 375/295 |
| 6,606,350 B2* | 8/2003 | Dress et al. | 375/213 |
| 6,717,992 B2* | 4/2004 | Cowie et al. | 375/316 |
| 6,778,603 B1* | 8/2004 | Fullerton et al. | 375/238 |
| 7,020,177 B2* | 3/2006 | Leeper et al. | 375/130 |
| 7,280,615 B2* | 10/2007 | Roberts | 375/316 |
| 7,489,720 B2* | 2/2009 | Hinton et al. | 375/138 |
| 7,532,564 B2* | 5/2009 | Foerster et al. | 370/208 |
| 7,787,513 B2* | 8/2010 | Siwiak et al. | 375/130 |
| 2003/0161411 A1* | 8/2003 | McCorkle et al. | 375/295 |

FOREIGN PATENT DOCUMENTS

| | | |
|---|---|---|
| JP | 10-508725 | 8/1998 |
| JP | 11-161273 | 6/1999 |
| JP | 11-161273 A | 6/1999 |
| JP | 11-161274 | 6/1999 |
| JP | 2001-237703 | 8/2001 |
| JP | 2003-37638 | 2/2003 |
| JP | 2003-37639 | 2/2003 |
| WO | 01/22672 A1 | 3/2001 |
| WO | WO 01/22672 A1 | 3/2001 |
| WO | 01/93520 A2 | 12/2001 |
| WO | 02/31986 A2 | 4/2002 |
| WO | WO 02/31986 A2 | 4/2002 |
| WO | WO 02/31986 A3 | 4/2002 |

OTHER PUBLICATIONS

Ramirez-Mireles "On the Performance of Ultra-Wide-Band Signals in Gaussian Noise and Dense Multipath", Jan. 2001, IEEE.*

Hamalainen et al. "In-Band Interference Power Caused by Different Kinds of UWB Signals at UMTS/WCDMA Frequency Bands", Aug. 2001, IEEE.*

Taha et al., "A Theoretical Study on the Effects of Interference on UWB Multiple Access Impulse Radio", Nov. 3-6, 2002, IEEE, pp. 728-732.*

Gerrits et al. "Wavelet Generation circuit for UWB impulse radio applications", Dec. 5, 2002, IEE Electronics Letters.*

JPO Office Action dated Dec. 1, 2006, issued in corresponding Japanese Patent Application No. 2004-568782.

Lachlan B. Michael et al., "Multiple Pulse Generator for Ultra-Wideband Communication using Hermite Polynomial Based Orthogonal Pulses", May 21, 2002, pp. 47-51.

Kazuki Eshima et al., "A Study of Performance Analysis of Interference between Dualcycle UWB and SS signals", 2002 The Institute of Electronics, Information and Communication Enginerring Sciences Society Collected Papers, Japan, IEICE, Aug. 20, 2002, A-5-10, p. 106.

Kazuki Eshima et al., "Performance Analysis of Interference between UWB and SS Signals", 2002 IEEE $7^{th}$ International Symposium on Spread-Spectrum Techniques and Applications, IEEE, Sep. 21, 2002, pp. 59-63.

Canadian Office Action dated Jan. 30, 2007, issued in corresponding Canadian Patent Application No. 2,515,513.

European Office Action dated Sep. 7, 2006, issued in corresponding European Patent Application No. 03778952.6.

European Office Action dated Mar. 6, 2008, issued in corresponding European Patent Application No. 03778952.6.

Michael, Lachlan B. et al., "Multiple Pulse Generator for Ultra-Wideband Communication Using Hermite Polynomial Based Orthogonal Pulses," IEEE Conference on Ultra Wideband System and Technologies, Dec. 31, 2002, pp. 47-51.

Li, Haitao, "Analyses on Critical Technology in the Field of UWB Radar," Doctoral Dissertation submitted to the University of Electronic Science and Technology of China, Chengdu, submited Nov. 2000, published Oct. 25, 2002, cover page and p. 65.

Eshima, Kazuki et al., "Performance Analysis of Interference between UWB and SS Signals," IEEE 7th International Symposium on Spread-Spectrum Techniques and Applications, Sep. 5, 2002, pp. 59-63.

Office Action issued on Sep. 26, 2008 in corresponding Chinese Patent Application 2003801098825.

Office Action dated Jan. 18, 2010 issued on corresponding Canadian Patent Application No. 2,515,513.

Communication Pursuant to Article 94(3) EPC dated May 25, 2010, issued in corresponding European Patent Application No. 03 778 952.6.

K. Eshima et al.; "A Study of Performance Analysis of Interference Between Dualcycle UWB and SS Signals", 2002 Nen The Institute of Electronics, Information and Communication Engineers Kiso Kyokai Society Taikai Koen Ronbunshu, Aug. 20, 2002, A-5-10, p. 106. (Cited in the int'l. search report).

K. Eshima et al.; "Performance Analysis of Interference between UWB and SS Signals", 2002 IEEE $7^{th}$ international symposium on Spread-Spectrum Techniques and Applications, Sep. 2, 2002, pp. 59-63. (Cited in the int'l. search report).

L. B. Michael et al.; "Multiple Pulse Generator for Ultra-Wideband Communication using Hermite Polynomial Based Orthogonal Pulses", 2002 IEEE Conference on Ultra Wideband Systems and Technologies, May 21, 2002, pp. 47-51. (Cited in the int'l. search report).

Nikkei Electronics, Guest Viewpoint, pp. 137-144, Aug. 26, 2002.

Nikkei Electronics, pp. 95-121, Feb. 17, 2003.

Ryuji Kohno "Principle and Emotion of Ultra Wideband (UWB) Wireless Communications Based on Impulse Radio", IEICE Tech. Rep. Jul. 2001, pp. 77-84.

T. Matsumura et al.; "Inter-Vehicle Communication and Ranging System Using Ultra Wideband Impulse Radio", IEICE, ITS2002-6, pp. 31-36, May 2002.

T. Sato et al.; "Beamforming Array Antenna with Heterogeneous Signal Distribution for UWB Pulse Transmission", Graduate School of Engineering, Yokohama National Univ., vol. J86-A, No. 12, pp. 1302-1309, Dec. 2003.

G. Marubayashi et al.; "Spread spectrum communication and applications thereof", IEICE, Jan. 2002.

M. Z. Win et al.; "Ultra-Wide Bandwidth Time-Hopping Spread-Spectrum Impulse Radio for Wireless Multiple-Access Communications", IEEE Transactions on Communications, vol. 48, No. 4, Apr. 2000, pp. 679-691.

Y. Tomizawa et al.; "Chirp signal pulse compression subsurface radar using a Delay Correlator", IEICE, Journal, vol. J83-B, No. 1, pp. 113-120, 2001-1.

James D. Taylor, Ultra-Wideband Radar Technology, CRC Press, pp. 45-75, Sep. 2000.

Takashi Yoshida, "Revised radar technology", IEICE Society, Oct. 1996.

Matsuo Sekine, Radar signal processing technology, IEICE Society, Jan. 2002.

2000 Time Domain Corporation, The Pulse of the Future "Time Modulated Ultra-Wideband for Wireless Applications", May 2000.

M. Ghavami et al.; "Hermite Function Based Orthogonal Pulses for Ultra Wideband Communications", Proc. Wireless Personal Multimedia, Conference 2001, Aalborg, Denmark, Sep. 2001, pp. 437-440.

L. B. Michael et al.; "Effect of Timing Jitter on Hermite Function Based Orthogonal Pulses for Ultra Wideband Communication", Proc. Wireless Personal Multimedia, Conference 2001, Aalborg, Denmark, Sep. 2001, pp. 441-444.

L. B. Michael et al.; "Multiple Pulse Generator for Ultra-Wideband Communication using Hermite Polynomial Based Orthogonal Pulses", 2002 IEEE Conference on Ultra, Wideband Systems and Technologies, May 2002.

K. Eshima et al.; M-ary impulse radio (UWB) with interference canceller for multi-user environment, IEICE Tech. Rep., Apr. 2001, pp. 41-48.

T. Soto, "A Study on array antenna using element antenna with different frequency characteristics for Ultra Wide Band wireless communication" Div. of Elec. and Comp. Eng., Yokohama Nat. Univ. 2001, pp. 1-44. (Graduation thesis), Mar. 2002.

S. Tachikawa et al.; Spectral efficiency of M-Ary/Spread Spectrum Multiple Access Communication System, IEICE Journal 1990/10, vol. J73-A, No. 10, pp. 1678-1687.

(56) References Cited

OTHER PUBLICATIONS

R. A. Scholtz et al.; "UWB Radio Deployment Challenges", Univ. of Southern CA, Aug. 2002.

M. Luo et al.; "Testing and Research on Interference to GPS from UWB Transmitters", Standford University, Jan. 2002.

K. Werbach, "Radio Revolution—The Coming Age of Unlicensed Wireless", New America Foundation, pp. 1-52, Dec. 2003.

L. Cohen, "Time-frequency analysis", Asakura Syoten, Jan. 1998.

R. A. Scholtz et al.; "Impulse Radio", Wireless Communications TDMA versus CDMA, Aug. 1997.

K. Eshima et al.; "M-ary UWB System Using Walsh Codes, IEEE Conference on Ultra Wideband Systems and TEchonologies", Aug. 2002.

K. Eshima et al.; "Performance Analysis of Interference between UWB and SS Signals", IEEE Int'l. Symp. on Spread Spectrum Techniques and Application, 2002, pp. 59-63, Dec. 2002.

K. Eshima et al.; "A study on M-ary UWB Impulse Radio and an Effect of It's Time Jitters", IEICE General Conferences SB-3-3, 2001, pp. 569-570, Dec. 2001.

K. Eshima et al.; "Comparison Ultra-Wideband (UWB) Impulse Radio with DS-CDMA and FH-CDMA", The 24$^{th}$ Symmposium on Information Theory and Its Applications, (SITA2001), Dec. 4-7, 2001, pp. 803-806.

K. Eshima et al.; "A Study of Performance Analysis of Interference between UWB and SS Signals", IEICE, Technical Report, Mar. 2002, pp. 15-20.

K. Eshima et la.; "Effect of Interference between UWB System and Other Radio Systems", IEICE General Conference, Mar. 2002, pp. 200.

K. Eshima et al.; "A Study of Performance Analysis of Interference between Dualcycle UWB and SS Signals", IEICE General Conf. A-5-10 Mar. 2002, pp. 106.

E. Homier, "Ultra-Wideband Impulse Radio Interference With the Global Positioning System", Mar. 22, 2000. (Unavailable).

The FCC's Part 15 Rules and Regulationand 802.11B emissions. (Unavailable), Jan. 2002.

Chinese Office Action dated Apr. 13, 2012, issued in corresponding Chinese Patent Application No. 2003801098825. Partial English translation.

Canadian Office Action issued Nov. 30, 2010 in related Canadian patent application 2,646,794.

Canadian Office Action issued Sep. 1, 2011 in related Canadian patent application 2,646,794.

Canadian Office Action issued Nov. 30, 2010 in related Canadian patent application 2,658,961.

Canadian Office Action issued Sep. 1, 2011 in related Canadian patent application 2,658,961.

Canadian Office Action issued Jan. 18, 2010 in corresponding Canadian patent application 2,515,513.

Canadian Office Action issued Jun. 15, 2011 in corresponding Canadian patent application 2,515,513.

\* cited by examiner

GAUSSIAN WAVEFORM (TRANSMISSION WAVEFORM)

FREQUENCY DISTRIBUTION OF GAUSSIAN WAVEFORM
(WAVEFORM IN TRANSMITTER)

WAVEFORM DURING SPACE PROPAGATION

FREQUENCY DISTRIBUTION OF WAVEFORM DURING SPACE PROPAGATION

WAVEFORM IN RECEIVER

FREQUENCY DISTRIBUTION OF WAVEFORM IN RECEIVER

SYSTEM CONSTITUTION OF TRANSMISSION SIDE
OF UWB WIRELESS COMMUNICATION SYSTEM

SYSTEM CONSTITUTION OF RECEPTION SIDE
OF UWB WIRELESS COMMUNICATION SYSTEM

WAVEFORM $\nu(t)$ USED AS TEMPLATE SIGNAL $|W_{rec}(\omega)|^2$: Power spectrum of $w_{rec}(t)$

RANGING PRINCIPLE DIAGRAM

SYSTEM DIAGRAM OF UWB-IR SYSTEM

TIME HOPPING MODULATION

CROSS-CORRELATION OUTPUT OF UWB-IR DESIRED WAVE AND REPLICA

Fig.17 MODEL DIAGRAM OF UWB INTERVEHICULAR RANGING

FREQUENCY TRANSITION DIAGRAM OF CHIRP WAVEFORM

WAVEFORM FOLLOWING PULSE COMPRESSION

MONOCYCLE WAVEFORM AND AUTOCORRELATION THEREOF

Fig.21 CHIRP WAVEFORM AND AUTOCORRELATION THEREOF

CHIRP WAVEFORM OF DIFFERENT INTERVAL

VARIATION IN PEAK VALUE OF CROSS-CORRELATION OUTPUT WHEN
DIFFERENCE IN INTERVALS OF TWO CHIRP WAVEFORMS IS CHANGED

CHIRP WAVEFORMS WITH DIFFERENT OCCUPIED BANDS

VARIATION IN PEAK VALUE OF CROSS-CORRELATION OUTPUT WHEN OCCUPIED
BAND OF TWO CHIRP WAVEFORMS IS CHANGED

Fig.26 UWB-CHIRP RANGING SYSTEM BLOCK DIAGRAM

RESPECTIVE CHIRP WAVEFORMS AFTER BAND DIVISION

CROSS-CORRELATION OUTPUT OF DESIRED WAVES OF PROPOSED UWB-CHIRP SYSTEM AND REPLICA

TRANSMISSION WAVEFORMS FOR EACH USER OF UWB-IR SYSTEM AND PROPOSED UWB-CHIRP SYSTEM

RANGING ERROR RATE WHEN THERE IS ONE USER

RANGING ERROR RATE OF OTHER VEHICLE 9

RANGING ERROR RATE WHEN NUMBER OF USERS IS CHANGED

RANGING ERROR RATE WHEN INTERFERENCE POWER CHANGES

SPECTRUM WHEN DURATION IS REPLACED

METHOD OF TEMPORALLY ENDING OUTPUT

WAVEFORM RENDERED BY CHANGING ENVELOPE FUNCTION

CASE WHERE WAVEFORM IS ENDED AT A MIDWAY POINT

SPECTRAL OUTPUT OF CHIRP WAVEFORM

CHIRP WAVEFORM MULTIPLIED BY PN SEQUENCE

SPECTRAL OUTPUT AFTER MULTIPLICATION BY PN WAVEFORM $w_2(t)$ : Dualcycle waveform with $\tau=1.0$ ns $w_3(t)$ : Dualcycle waveform with $\tau=1.0$ ns $|W_2(\omega)|^2$ : Power spectrum of dualcycle $|W_3(\omega)|^2$ : Power spectrum of dualcycle Waveform of monocycles and new waveform which is composed of monocycles with different time duration. In this example, we use $\tau_{m0} = 0.2156$, $\omega_1 = 31.42 (= 5.0\,[GHz])$, $\omega_2 = 15.08 (= 2.4\,[GHz])$. $\tau_{m1}$ and $\tau_{m2}$ are inversely proportional to $\omega_1$ and $\omega_2$ Frequency characteristics of $w_{\tau_{m0}}(t)$, $w_{\tau_{m1}}(t)$, $w_{\tau_{m2}}(t)$ and $w_{d2}(t)$.

Power spectrum of $w_{d2}(t)$

Waveform of each generated for making pulse $w_x(t)$. In this example, we use $\tau_m = 0.2877$, $\alpha = 10.0$, $\omega_1 = 31.42(= 5.0[GHz])$ and $\omega_2 = 15.08(= 2.4[GHz])$ Waveform of the new pulse $w_x(t)$ by using the pulses of Figure 13.

Frequency characteristics of $w_{rec}(t)$, $w_{\omega_1}(t)$ and $w_{\omega_2}(t)$.

Frequency characteristic of $w_x(t)$.

$|W_x(\omega)|^2$ : Power spectrum of $w_x(t)$

A spectrum musk and the power spectrum of $w_x(t)$ in which $\tau_m = 0.2877$, $\alpha = 10.0$, $\omega_1 = 6.03 (= 0.96 GHz)$, $d = \pi (= 0.5 GHz)$ and $k = 5$ The waveform $w_x(t)$ in which $\tau_m = 0.2877$, $\alpha = 10.0$, $\omega_1 = 6.03 (= 0.96 GHz)$, $d = \pi (= 0.5 GHz)$ and $k = 5$ A spectrum mask and the power spectrum of $w_x(t)$ in which $\tau_m = 0.2$, $\alpha = 14.385$, $\omega_1 = 6.03 (= 0.96 GHz)$, $d = \pi (= 0.5 GHz)$ and $k = 5$ The waveform $w_x(t)$ in which $\tau_m = 0.2$, $\alpha = 14.385$, $\omega_1 = 6.03 (= 0.96GHz)$, $d = \pi (= 0.5GHz)$ and $k = 5$ Simulation result and theoretical analysis of the BER of SS system with a co-existing UWB system.

Theoretical analysis of the BER of SS system when UWB system co-exist. The DIR is 0 - 40 dB.

Theoretical analysis of the BER of SS system when a dualcycle UWB system co-exists.

Theoretical analysis of the BER of SS system when the system described in Section 3.2 co-exists.

Theoretical analysis of the BER of SS system when the system described in Section 3.3 co-exists.

Simulation results and theoretical analysis comparison

Theoretical analysis of the BER of SS system when UWB system co-exist. The DIR is 0 - 40 dB.

Theoretical analysis of the BER of SS system when dualcycle UWB system co-exist.

Theoretical analysis of the BER of SS system when the system described by section 3.2 co-exist.

Theoretical analysis of the BER of SS system when the system described by section 3.3 co-exist.

SYSTEM CONSTITUTION OF TRANSMISSION-SIDE OF M-ary UWB SYSTEM

SYSTEM CONSTITUTION OF RECEPTION SIDE OF M-ARY UWB SYSTEM

MODIFIED HERMITE WAVEFORM (ORDERS 0 TO 3)

MODIFIED HERMITE WAVEFORM (ORDERS 4 TO 7)

FREQUENCY CHARACTERISTIC OF MODIFIED HERMITE WAVEFORM (ORDERS 0 TO 3)

FREQUENCY CHARACTERISTIC OF MODIFIED HERMITE WAVEFORM (ORDERS 4 TO 7)

MHP WAVEFORM IN RECEIVER (ORDERS 0 TO 3)

MHP WAVEFORM IN RECEIVER (ORDERS 4 TO 7)

FREQUENCY CHARACTERISTIC OF MHP WAVEFORM IN RECEIVER (ORDERS 0 TO 3)

FREQUENCY CHARACTERISTIC OF MHP WAVEFORM IN RECEIVER (ORDERS 4 TO 7)

Fig.77 SYSTEM CONSTITUTION OF TRANSMISSION SIDE OF MULTIVALUED TRANSMISSION SYSTEM EMPLOYING MHP WAVEFORM

SYSTEM CONSTITUTION OF RECEPTION SIDE OF MULTIVALUED
TRANSMISSION SYSTEM EMPLOYING MHP WAVEFORM

INTERFERENCE REDUCTION SYSTEM OF SYSTEM FOR REDUCING
INTERFERENCE WITH OTHER STATION EMPLOYING MHP WAVEFORM

RESULTS OF COMPARISON SIMULATION OF PROPOSED SYSTEM
(ASYNCHRONOUS MULTIPLE ACCESS)

RESULTS OF COMPARISON SIMULATION
WITH CONVENTIONAL SYSTEM AND M-ary/UWB SYSTEM
(ASYNCHRONOUS MULTIPLE ACCESS)

AUTOCORRELATION FUNCTION
OF RECEPTION MHP WAVEFORM

CHANGE IN BER CAUSED BY EFFECTS OF
SYNCHRONIZATION SHIFT OF PROPOSED SYSTEM

CHANGE IN BER CAUSED BY EFFECTS OF
SYNCHRONIZATION SHIFT OF M-ary/UWB SYSTEM

TRANSMISSION WAVEFORM IN UWB

UWB TRANSMITTER CONSTITUTION

RECEPTION WAVEFORM

FREQUENCY CHARACTERISTIC OF RECEPTION WAVEFORM

UWB RECEIVER CONSTITUTION

CORRELATION WAVEFORM

FCC'S UWB OUTPUT RESTRICTIONS

FCC'S SPECTRAL MASK

RECEPTION WAVEFORM
WHEN TRANSMISSION WAVEFORM IS THAT IN FIG. 92

SYSTEM CONCEPTUAL VIEW

PULSE PRODUCTION APPARATUS OF PROPOSED SYSTEM

PULSE OF PROPOSED SYSTEM (WIDTH 3 ns)

FREQUENCY CHARACTERISTIC (WIDTH 3 ns) OF PROPOSED SYSTEM

PULSE OF PROPOSED SYSTEM (WIDTH 10 ns)

FREQUENCY CHARACTERISTIC (WIDTH 10 ns) OF PROPOSED SYSTEM

BPF CONSTITUTION

MONOCYCLE WAVEFORM FREQUENCY CHARACTERISTIC
AFTER BPF TRANSMISSION

CROSS-CORRELATION CHARACTERISTIC OF
RECEPTION SIGNAL WHEN $\delta$ IS CHANGED AND CORRELATION WAVEFORM

CROSS-CORRELATION CHARACTERISTIC OF
MONOCYCLE WAVEFORM AND CORRELATION WAVEFORM

CROSS-CORRELATION CHARACTERISTIC OF
PROPOSED PULSE AND PROPOSED CORRELATION WAVEFORM

COMPARISON OF PROPOSED SYSTEM AND CONVENTIONAL SYSTEM
DURING MULTI-USER ACCESS

COMPARISON OF FREQUENCY CHARACTERISTICS
OF MONOCYCLE WAVEFORMS RELATIVE TO $t_m$

COMPARISON OF PROPOSED SYSTEM AND CONVENTIONAL SYSTEM IN
WHICH POWER IS ARRANGED IN ACCORDANCE WITH UWB POWER RESTRICTIONS

METHOD OF GENERATING PULSE WAVEFORM

TECHNICAL FIELD

The present invention relates to a method of generating a pulse waveform and, more particularly, to a method of generating a pulse waveform that is suitable for UWB communications.

BACKGROUND ART

UWB (Ultra Wide Band) wireless communication is a method of making communications by using a pulse of a very short duration of no more than one nanosecond ($10^{-9}$) without using a carrier waveform and the bandwidth is a wide bandwidth spanning several GHz. In a UWB system, a plurality of pulses of no more than 1 ns is transmitted without carrier wave modulation such as cosine wave modulation. Hence, the occupied band is very wide and the spectrum power density is very small. Therefore, there is the characteristic that the effect on other narrowband communications is small and call privacy and secrecy are superior as in the case of a normal spread spectrum communication system.

A UWB signal is known as UWB on account of having an Ultra Wide Band (a bandwidth of several GHz) in comparison with not only a modulated signal such as a BPSK signal but also a normal spread spectrum signal (a bandwidth of several tens of MHz in a 2.4 GHz-band wireless LAN). In comparison with that of a spread spectrum signal (10 milliwatts: 10 mW/MHz or less in a 2.4 GHz-band wireless LAN), the power spectrum density of a UWB signal is markedly low (typically 10 nanowatts for one MHz: not more than 10 nW/MHz), which means that is the UWB signal not subject to interference even when another system coexists, and there is also the advantage that the UWB signal is resistant to interference from the other systems. These advantages are the emphasized features of the conventional spread spectrum signal In UWB transmission procedure, first a pulse waveform is produced by synchronizing with a frame clock, and second the pulse is time-hopped corresponding to a spreading code, where each user's transmitted signal can be distinguished each other by using orthogonality of spreading codes, that is CDMA or code division multiple access. In addition, a pulse train that is subjected to time hopping in accordance with an input data signal is shifted and not shifted through time d to generate a signal waveform for datum 0 and 1, respectively.

Further, UWB reception makes a correlation between a signal waveform that is received by an RF portion and a pulse train that is formed by means of the same processing as on the transmission side. The peak of the correlation value is used to distinguish data and noise.

UWB pulse transmission includes Documents 1 and 2, for example.

Further, documents related to UWB ranging that uses chirp waveforms include Documents 3 to 11, for example.

Moreover, documents related to multivalued UWB-CDMA that uses modified Hermite waveforms include Documents 3 and 12 to 18, for example.

Further, documents related to transmission power restrictions include Documents 3, 6, and 19 to 22, for example.

Moreover, documents related to the reduction of interference between UWB and an existing signal include Documents 3, 13, 17, and 23 to 32, for example.

Document 1: Nikkei Electronics; pages 137 to 144, Aug. 26, 2002;

Document 2: Nikkei Electronics; pages 95 to 121, Feb. 17, 2003;

Document 3: Ryuji Kohno: "Foundation and development of Impulse Radio UltraWideband (UWB) wireless communications" IEICE Tech. Rep. July 2001; DSP2001-80, SST2001-40 pp 77 to 84;

Document 4: Takeshi Matsumura, Kazuki Eshima, Ryuji Kohno: "Study on TTS intervehicular ranging system using Ultra Wide Band wireless Impulse Radio" ITS2002-6;

Document 5: Tadatomo Sato, Kazuki Eshima, Giuseppe ABREU, Ryuji Kohno: "Study on array antenna using electronic antenna with different frequency characteristic suitable for Ultra Wide Bandwireless communications" IEICE Wireless Communication System Research Academy, May 2002;

Document 6: Gen Marubayashi, Masao Nakagawa, Ryuji Kohno: "Spread spectrum communication and applications thereof"; IEICE;

Document 7: Moe Z. Win, Robert A. Scholtz: "Ultra-Wide BandwidthTime-Hopping Spread-Spectrum Impulse Radio for Wireless Multiple-Access Communications" IEEE TRANSACTION ON COMMUNICATIONS, VOL. 48, NO. 4, APRIL 2000, PP 679 to 691;

Document 8: Yoshiyuki Tomizawa, Ikuo Arai: "Chirp signal pulse compression sublayer radar employing delay correlator" IEICE Journal, pages 113 to 120, 2000-1;

Document 9: James D. Taylor "ULTRA-WIDEBAND RADAR TECHNOLOGY" CRCPRESS;

Document 10: Takashi Yoshida: "Revised radar technology" IEICE Society;

Document 11: Matsuo Sekine: "Radar signal processing technology" IEICE Society;

Document 12: Time Domain Corporation: "Time Modulated Ultra-Wideband for Wireless Applications" http://www.time-domain.com Document 13: M. Ghavami, L. B. Michael and R. Kohno: "Hermite Function based Orthogonal Pulses for UWB Communications" Proc. Wireless Personal Multimedia. Conference 2001, Aalborg, Denmark, September 2001, pp. 437-440;

Document 14: L. B. Michael, M. Ghavami and R. Kohno: "Effect of Timing. Jitter on Hermite Function Based Orthogonal Pulses for Ultra. Wideband Communication" Proc. Wireless Personal Multimedia Conference 2001, Aalborg, Denmark, September 2001, pp. 441-444;

Document 15: L. B. Michael, M. Ghavami and R. Kohno: "Multiple Pulse Generator for Ultra-Wideband Communication using Hermite Polynomial Based Orthogonal Pulses" Proc. 2002 IEEE Conference on Ultra, Wideband Systems and Technologies, Maryland, USA, May 21-23, 2002;

Document 16: Kazuki Eshima, Kenta Umebayashi, Katsuya Mizutani, Ryuji Kohno, "Study on Impulse Radio Multivalued and multi-user interference removal system", IEICE Tech. Rep., SS2001-16, CS2001-16, pp. 41-48, April 2001;

Document 17: Tadatomo Sato: "A study on array antenna using electronic antenna with different frequency characteristic suitable for Ultra Wide Band wireless communications" graduation thesis 2001;

Document 18: Shinichi Tachikawa, Gen Marubayashi, "M-arySSMA frequency usage efficiency" IEICE Journal 1990/10 Vol. J73-A No. 10, pages 1678 to 1687;

Document 19: Erick Homier, "Ultra-Wideband Impulse Radio Interference with the Global Positioning System", Mar. 22, 2000;

Document 20: Ming Luo, Dennis Akos, Michael Koenig, Guttorm Opshang, Sam Pullen and Per Enge, "Testing and Research on Interference to GPS from UWB Transmitters", Stanford University;

Document 21: The FCC's Part 15 Rules and Regulation and 802.11b emissions http://obelix.umb.es/web/jgomsi/wireless/fcc;

Document 22: L. Cohen, (translated by Yoshikawa et al.) "Time-frequency analysis", Asakura Syoten, 1998;

Document 23: Robert A. Sclioltz, Moe Z. Winl: "IMPULSE RADIO" Wireless Communications TDMA versus CDMA Document 24: Ryuji KOHNO: "Principle and Emotion of Ultra Wideband (UWB) Wireless Communications Based on Impulse Radio" TECHNICAL REPORT OF IEICE DSP 2001-80 SST 2001-40(2001-7)

Document 25: Kazuki Eshima, Yoshihiro Hase, Shingo Oomori, Fujinobu Takahashi, Ryuji Kohno, "M-ary UWB System Using Walsh Codes," IEEE Conference on Ultra Wideband Systems and Technologies 2002 (UWBST2002), Wyndham Baltimore Inner Harbor (USA), (2002-5)

Document 26: Kazuki Eshima, Yoshihiro Hase, Shingo Oomori, Fujinobu Takahashi, Ryuji Kohno, "Performance Analysis of Interference between UWB and SS Signal," 2002 IEEE Seventh International Symposium on Spread Spectrum Techniques and Applications (ISSSTA2002), Prague, (Czech Republic), (2002-9)

Document 27: Kazuki Eshima, Katsuya Mizutani, Ryuji Kohno, Yoshihiro Hase, Shingo Oomori, Fujinobu Takahashi, "A Study on M-ary UWB Impulse Radio and An Effect of It's Time Jitters," IEICE General Conferences SB-3-3, pp. 569-570 (2001-9)

Document 28: Kazuki Eshimna, Katsuya Mizutani, Ryuji Kohno, Yoshihiro Hase, Shingo Oomori, Fujinobu Takahashi, "Comparison Ultra-Wideband (UWB) Impulse Radio with DS-CDMA and FH-CDMA "The 24th Symposium on Information Theory and Its Applications (SITA2001). pp. 803-806 (2001-12);

Document 29: Kazuki Eshimna, Yoshihiro Hase, Shingo Oomori, Fujinobu Takahashi, Ryuji Kohno, "A Study of Performance Analysis of Interference between UWB and SS signals" Technical Report of IEICE RCS 2001-246 pp. 15-20(2002-03)

Document 30: Kazuki Eshima, Yoshihiro Hase, Shingo Oomori, Fujinobu Takahashi, Ryuji Kohno, "Effect of Interference between UWB System and Other Radio Systems" IEICE General Conference, A-5-18, pp. 200 (2002-3)

Document 31: Kazuki Eshima, Yoshihiro Hase, Shingo Oomori, Fujinobu Takahashi, Ryuji Kohno, "A Study of Performance Analysis of Interference between Dualcycle UWB and SS signals" IEICE General Conference, A-5-10, pp 106 (2002-9)

Document 32: Kazuki Eshima, Yoshihiro Hase, Shingo Oomori, Fujinobu Takahashi, Ryuji Kohno, "A Study on Performance Analysis of Interference between Dualcycle UWB and SS Signals" The 25th Symposium on Information Theory and Its Applications (SITA2002), pp 295-298 (2002-12)

Document 2 proposes, for technological problems that UWB possesses, a reduction of radio interference with other wireless systems, conformity with the radio wave regulations in respective countries, the suppression of transmission errors of reflected waves from walls and objects and so forth (multipath countermeasure), the uninterrupted implementation of communications between a plurality of devices (multi-access), a reduction of mounting costs of a UWB wireless circuit portion and so forth.

Among such proposed measures, the problem of radio interference is an important matter in cases where UWB is applied to consumer electronics and so forth. For such radio interference, the U.S. FCC (Federal Communication Committee), for example, regulates UWB transmission outputs.

Therefore, the present invention solves the earlier-mentioned conventional problems, an object thereof being to reduce radio interference with other wireless systems in UWB communication and to form a transmission signal with a desired frequency characteristic.

DISCLOSURE OF THE INVENTION

The present invention forms, in UWB communications in which a pulse of short duration is transmitted, a transmission signal with a desired frequency characteristic by adjusting the shape of a pulse signal used in data transmissions, whereby radio interference with other wireless systems in UWB communications is reduced.

As aspects for adjusting the pulse signal, the present invention comprises a first aspect for generating a pulse signal having a desired frequency characteristic by adjusting the shape of a single pulse itself, a second aspect for generating a pulse signal having a desired frequency characteristic by combining a plurality of pulses, and a third aspect for finding a combination of pulse signals from the frequency characteristic of an object transmission signal.

The first and second aspects correspond with methods for generating a pulse by means of a combination and the third aspect corresponds with a method for generating a pulse through expansion of a pulse.

The first aspect generates a time pulse shape that satisfies a desired frequency characteristic by adjusting a parameter on a time axis of a single pulse in UWB communications in which a pulse of short duration is transmitted. The single pulse can be expressed by a desired function on a time axis and generates a time pulse shape that satisfies the desired frequency characteristic by changing the parameter contained in the function.

The first embodiment of the first aspect forms a single pulse by means of a waveform that is expressed by $w(t)=\cos \omega_0 t \cdot \exp(-2\pi \cdot t^2/(\alpha \tau m)^2)$ and generates a time pulse shape that satisfies the desired frequency characteristic by adjusting a parameter $\alpha \tau m$ that establishes a pulse duration and/or a peak frequency $\omega_0$ of a power spectrum.

Further, the second embodiment of the first aspect forms a single pulse by means of a chirp waveform and generates a time pulse shape that satisfies the desired frequency characteristic by temporally setting the size of the output of the chirp waveform.

The second aspect of the present invention generates a time pulse shape that satisfies a desired frequency characteristic by setting a plurality of single pulses on a time axis.

The second aspect of the present invention includes a method of forming a dualcycle signal by setting the same two single pulses on a time axis as a first embodiment, a method that superposes a plurality of single pulses with different pulse widths as a second embodiment, and a method that superposes a plurality of single pulses with different pulse widths and waveforms as a third embodiment. A time pulse shape satisfying the desired frequency characteristic is generated by adjusting the gap between two single pulses of a dualcycle, the respective pulse widths of a plurality of single pulses, and the respective pulse widths and waveforms of a plurality of single pulses.

Further, according to each of these embodiments, a latch portion can be formed in an optional frequency.

Furthermore, in a fourth embodiment, a plurality of pulses of different orders are generated by using a modified Hermite polynomial.

The third aspect of the present invention expands the desired frequency characteristic in a frequency region in UWB communications in which pulses of short duration are transmitted and, by combining a plurality of time pulses selected from among time pulses that form a component of the expanded frequency region, a time pulse shape satisfying the desired frequency characteristic is generated.

As a further embodiment of the third aspect of the present invention, in UWB communications in which pulses of short duration are transmitted, the desired frequency characteristic or approximate frequency characteristic is subjected to an inverse Fourier transform and, by combining a plurality of time waveforms selected from among the time waveforms that are obtained in the inverse Fourier transform, a time pulse shape satisfying the desired frequency characteristic is generated.

BEST MODE FOR CARRYING OUT THE INVENTION

Embodiments of the present invention will be described in detail hereinbelow with reference to the drawings.

First, a UWB wireless communication system (Impulse Radio UWB wireless communications). A system with a receiver and transmission and reception waveforms of the UWB-IR system will be described. Here, a case of a Pulse Position. Modulation (PPM) system will be described as a representative example of a UWB data modulation system.

The principles of the UWB-IR system will be described. Because the transmitter of a transmission/reception signal waveform UWB-IR is unable to create an ideal impulse signal, a Gaussian waveform (Equation 1) having a duration of a certain degree is formed.

$$f(t) = -\frac{\tau_m^2}{4\pi} e^{-2\pi \left(\frac{t}{\tau_m}\right)^2} \tag{1}$$

Thereafter, when the frequency distribution of the Gaussian waveform is found by means of a Fourier transform, Equation (2) results.

$$|F(w)| = \left| \int_{-\infty}^{+\infty} f(t) e^{-jwt} dt \right| = \frac{\tau_m^3}{8\pi} e^{-\frac{1}{2\pi}\left(\frac{\tau_m w}{2}\right)^2} \tag{2}$$

Figure 1:
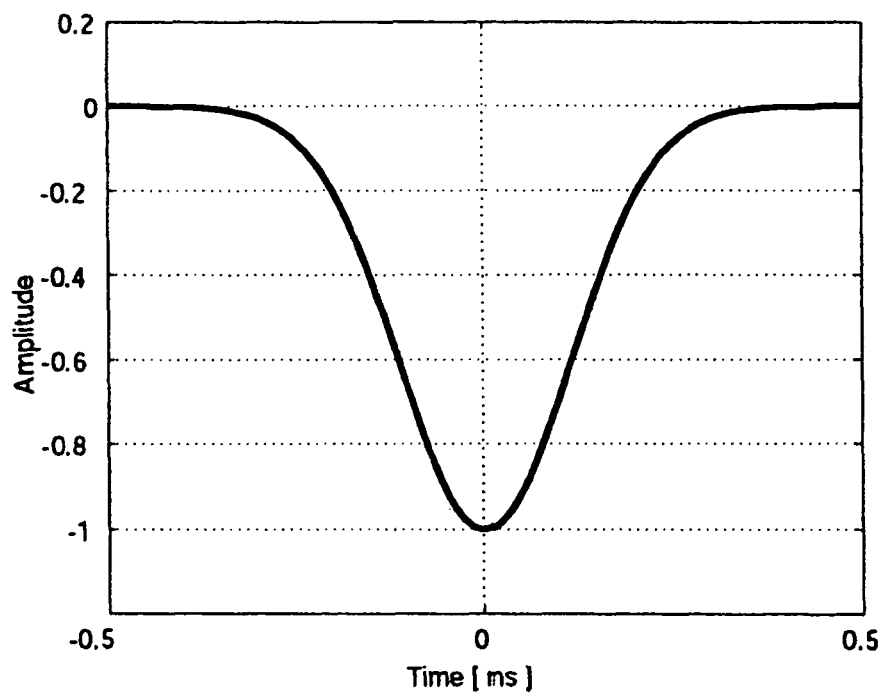
FIG. 1 is a Gaussian waveform example of a transmission waveform.
Figure 2:
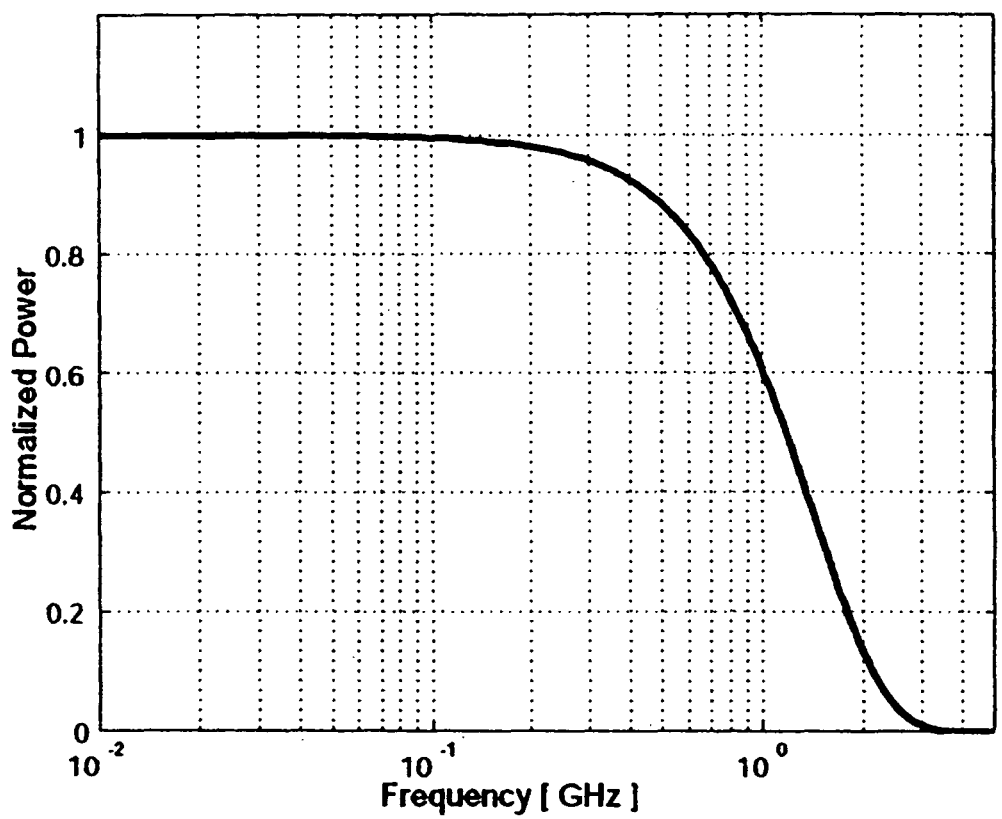
FIG. 2 is a frequency distribution of a Gaussian waveform example of a transmission waveform.

The Gaussian waveform and frequency distribution for a pulse duration tm=0.4[ns] are illustrated in FIGS. 1 and 2 as an example.

The fact that the power of the Gaussian waveform deviates toward a low frequency band can be seen from FIG. 2. Further, it is clear from Equation (2) that the smaller the pulse width time τm, the higher the frequency band of the frequency and the smaller the variance of the signal power.

In the UWB-IR system, a Gaussian waveform created without being superposed on a carrier wave is outputted directly by an antenna. Here, when a signal is inputted to or outputted from the antenna, the fact that there is a step time differential relationship must be considered.

Supposing that the signal in the transmitter is $w_{tx}(t)$, the signal during space propagation is $w_{space}(t)$, and the signal in the receiver is $w_{rx}(t)$, a relation such as the following Equation (3) results.

$$w_{rx}(t) = \frac{d}{dt} w_{space}(t) = \frac{d^2}{dt^2} w_{tx}(t) \quad (3)$$

Figure 3:
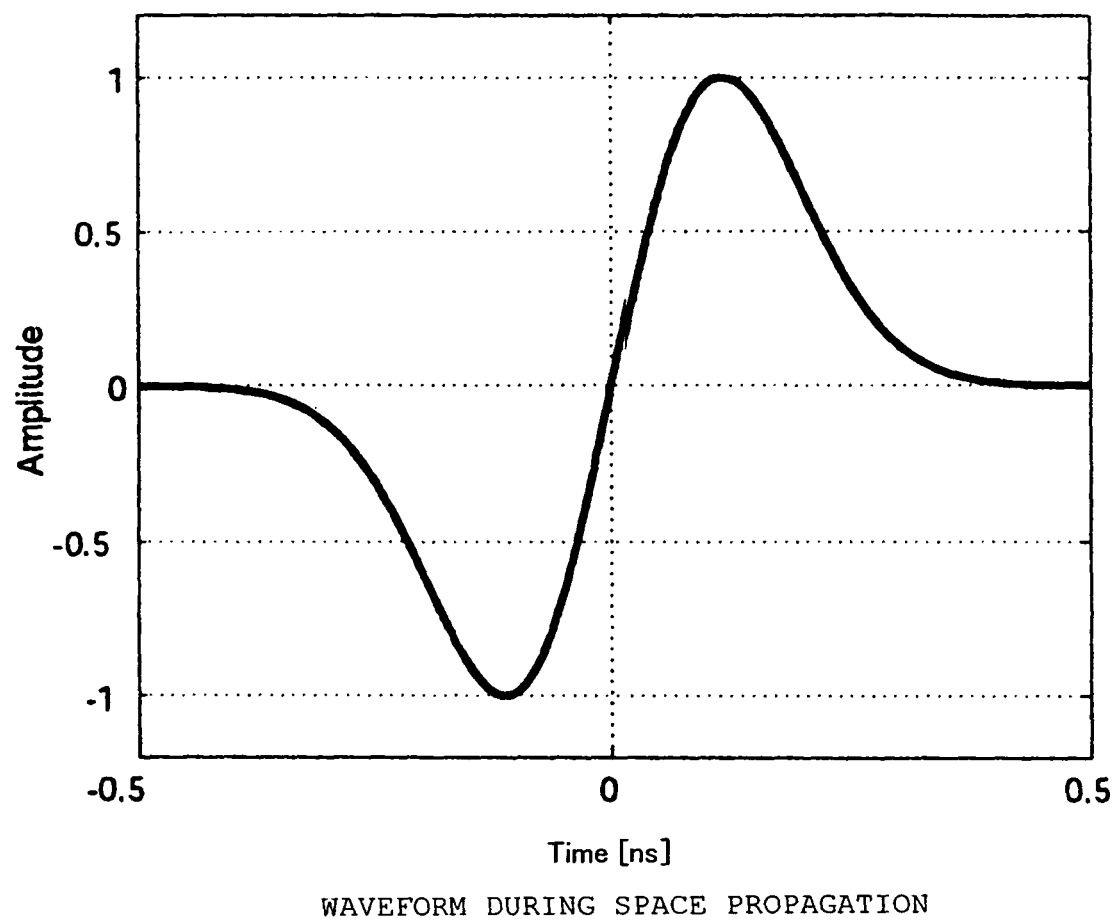
FIG. 3 is an example of a waveform undergoing space propagation.
Figure 4:
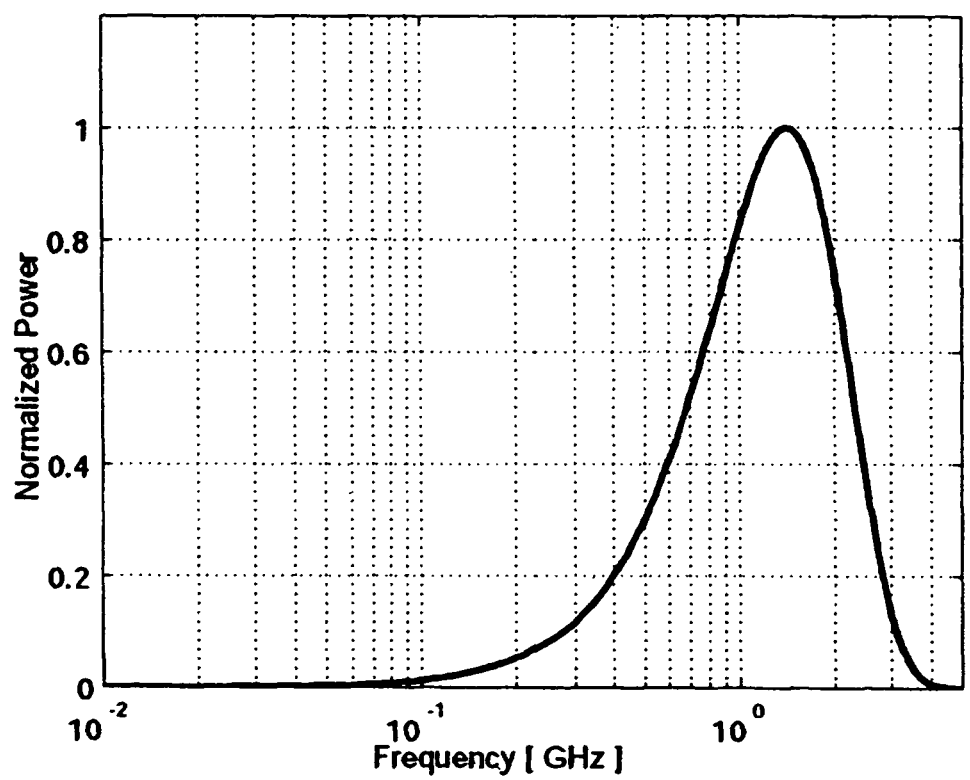
FIG. 4 is a frequency distribution of a waveform undergoing space propagation.

Further, FIG. 3 shows the waveform during space propagation and FIG. 4 shows the frequency distribution of the waveform during space propagation.

A system that performs communication by using a sine wave carrier wave such as Spread Spectrum: SS and ordinary narrow bandwidth communications such as AM or FM only performs a sine wave differential and, consequently, the phase only changes. However, when the Gaussian waveform that is used in UWB communications undergoes differentiated, the waveform changes and the frequency distribution also changes. This phenomenon is a characteristic of UWB communications in which a carrier wave is not employed. Accordingly, the waveform undergoing space propagation is shown by first-order differential of a Gaussian waveform.

$$w_{space}(t) = t e^{-2\pi \left(\frac{t}{\tau_m}\right)^2} \quad (4)$$

Figure 5:
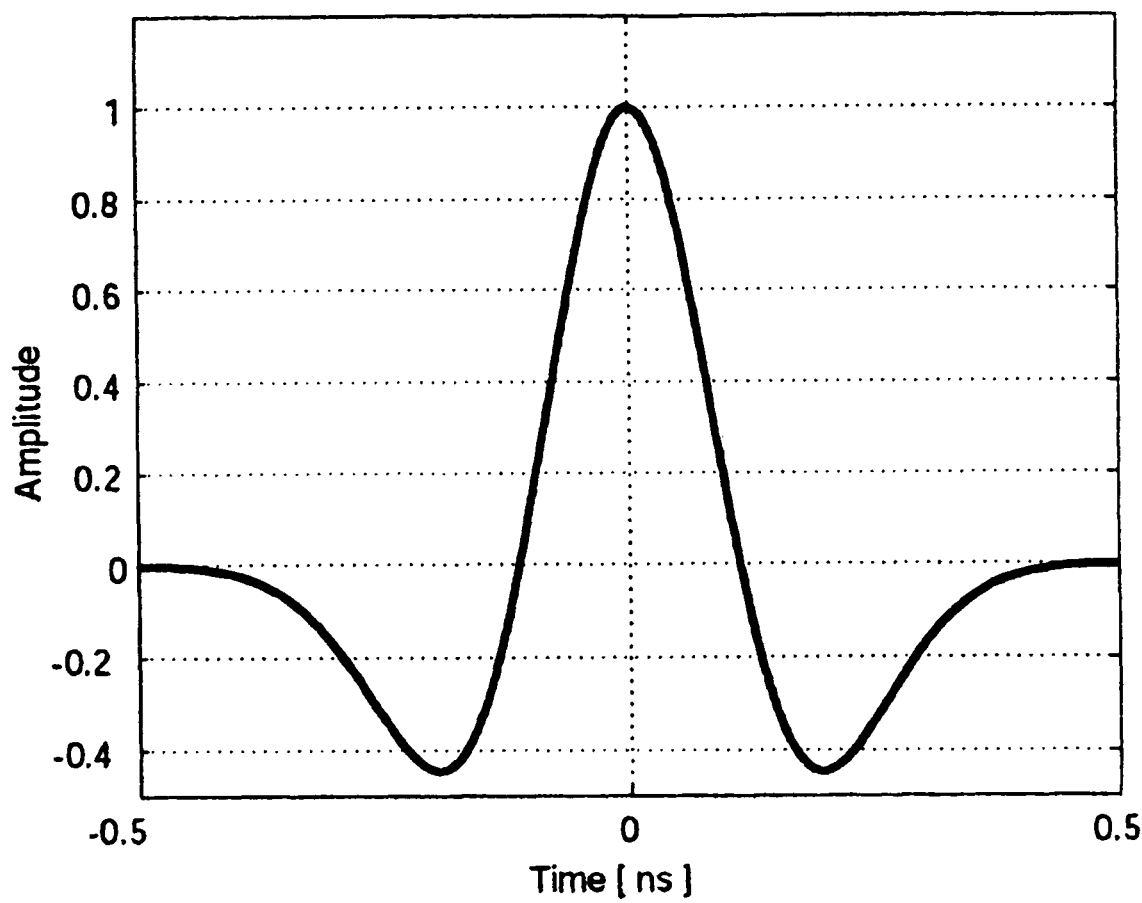
FIG. 5 is an example of a waveform in a receiver.
Figure 6:
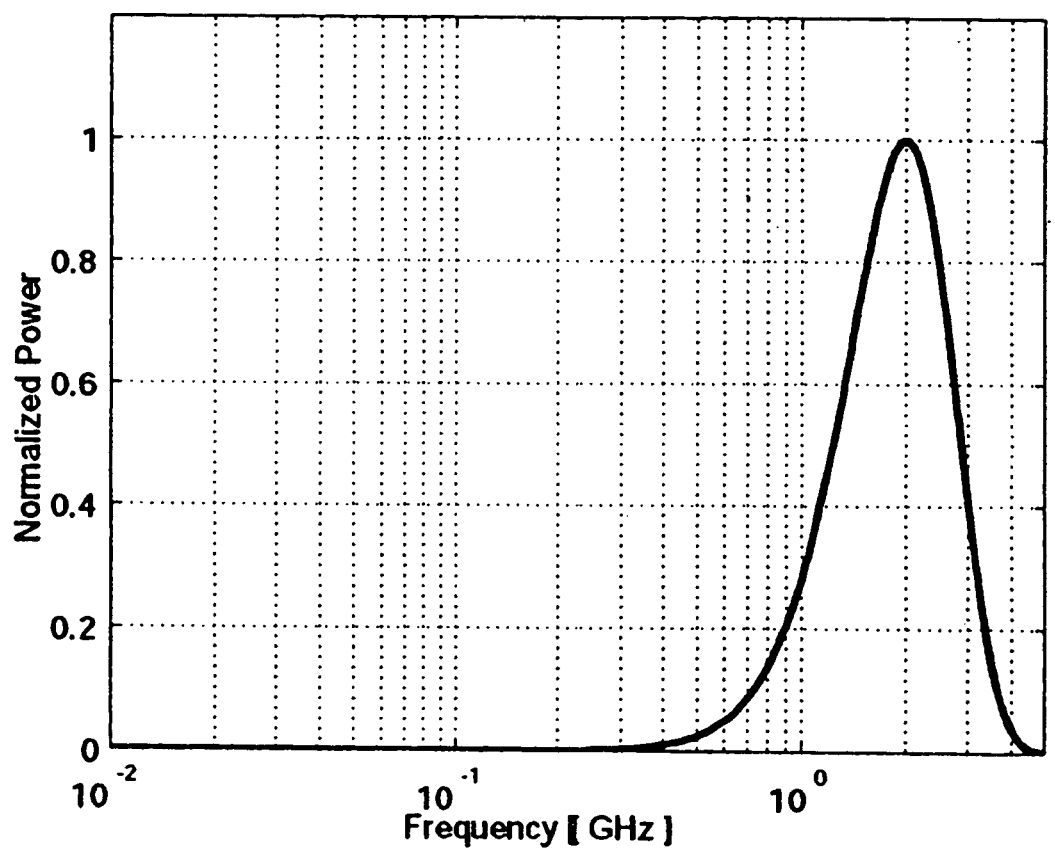
FIG. 6 is a frequency distribution of a waveform in a receiver.

The waveform in the receiver is expressed by a second-order differential of a Gaussian waveform. Normally, this waveform is expressed by a monocycle waveform and call equation (5) in UWB communication, and FIG. 5 shows the waveform in a receiver and FIG. 6 shows a frequency distribution of the waveform in the receiver.

$$w_{rec}(t) = \left(1 - 4\pi \left(\frac{t}{\tau_m}\right)^2\right) e^{-2\pi \left(\frac{t}{\tau_m}\right)^2} \quad (5)$$

A transmitter and receiver system will be described next. Here, the transmission and reception system of PPM (Pulse Position Modulation), which is a modulation system representative of the UWB-IR system will be described.

Figure 7:
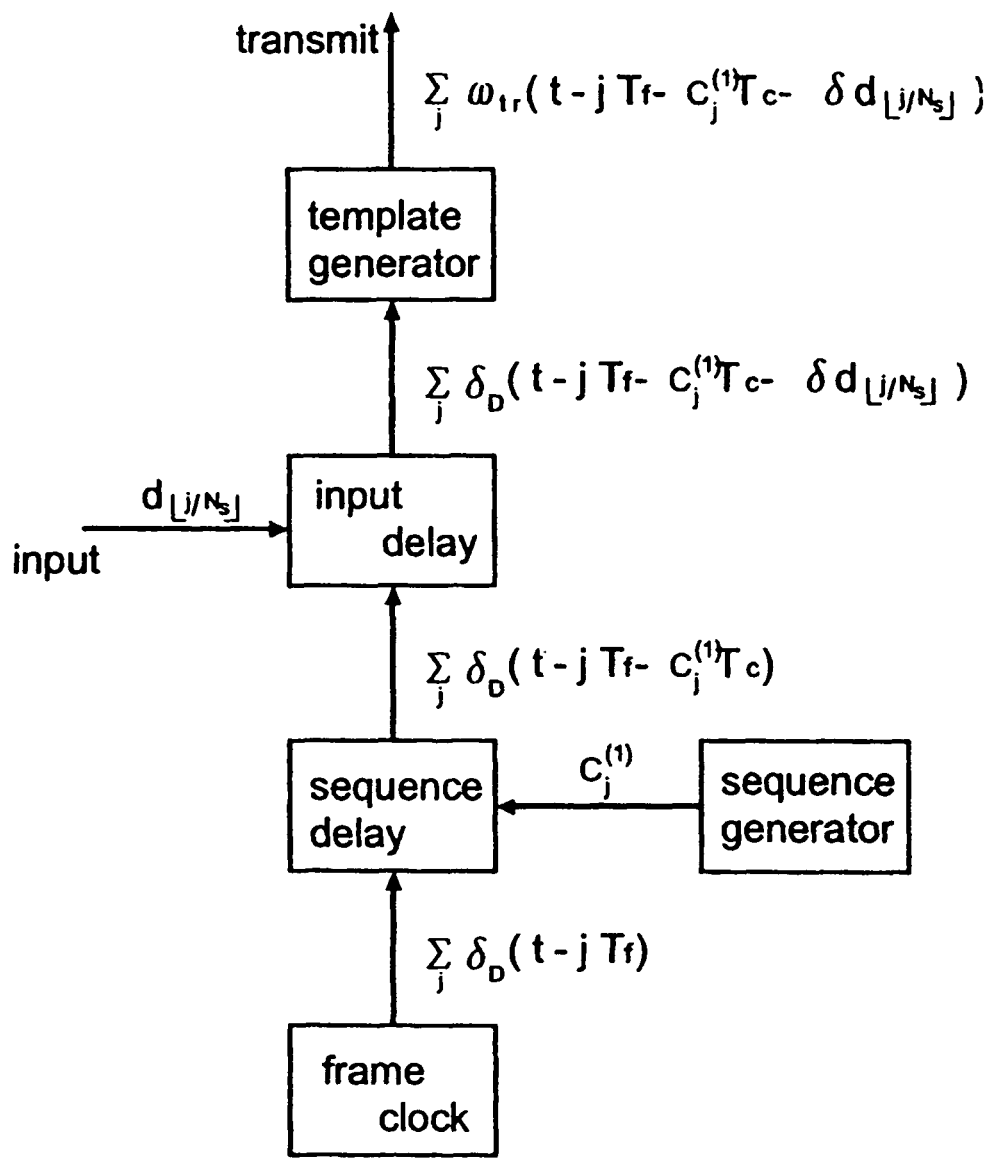
FIG. 7 shows the transmission-side system constitution of a UWB wireless communication system.

FIG. 7 shows the transmission-side system constitution of a UWB wireless communication system.

The transmission signal $s_{tr}$ of users that can be counted a kth time is expressed by the following Equation (6).

$$s_{tr}^{(k)}(t(k)) = \sum_{j=-\infty}^{\infty} w_{tr}\left(t^{(k)} - jT_f - c_j^{(k)}T_c - \delta d_{\lfloor j/N_s \rfloor}^{(k)}\right) \quad (6)$$

where t(k) is the clock time of the transmitter, Tf is the pulse repetition time, Tc is the timing hopping (TH) chip length, $c_j^{(k)}$ is the jth TH sequence of the kth user, $d_j^{(k)}$ is the information sequence of the jth hop of the kth user, and $w_{tr}(t)$ is the transmitted Gaussian waveform.

In the kth transmitter, transmission of the jth pulse starts at the time $jTf+c_j^{(k)} T_c+dd_{[j/Ns]}^{(k)}$.

Here, the constitutions of each of the shift times will be proposed next.

(1) Pulse train of fixed time duration: pulse train expressed by Sωtr(t(k)−jTf) is constituted by a train of a Gaussian waveform with a Tf-second duration. Thus, because a gap that is sufficiently wider than the width of the pulse is prepared between pulses, the multipath resolution rises.

(2) A pseudorandom TH: a TH sequence $\{c_j^{(k)}\}$ that is different for each user is supplied so that there is no collision by all the pulses as per (1) in multiple access. The hopping sequence $\{c_j^{(k)}\}$ is a pseudorandom sequence of a sequence length Np, where each element satisfies $0=c_j^{(k)}<$Nh and Nh is established so that NhTc=Tf. The TH sequence is time-shifted with c(k) jTc seconds added by adding each pulse in case (1) to (1).

(3) Information sequence: assuming that the data symbols start from j=0, the order of the data symbols is expressed as [j/Ns] by using the hopping frequency j (here 'x' expresses the integer part of x). In a PPM system, when the data symbol is 0, a time shift is not added in case (2) and the time shift $dd_{[J/Ns]}^{(k)}$ is added when the data symbol is 1.

The reception-side system will be described next.

The reception signal r(t) when user Nu exists is expressed by the following equation when multiple access is performed in an AWGN (White Gaussian Noise) environment without multipaths.

$$r(t) = \sum_{k=1}^{N_u} A_k s_{rec}^{(k)}(t - \tau_k) + n(t) \quad (7)$$

Here, Ak expresses a value indicating to what extent signal $S_{rec}^{(k)}$ (t−τk) from the transmitter of the kth user is attenuated in the receiver. Further, τk expresses the value of asynchronization of the receiver clock and the transmitter clock of the kth user, and n(t) expresses the component of the White Gaussian Noise excluding interference with other users.

In an ideal channel and antenna system, the transmission waveform wtr is changed to $w_{rec}$ at the output of the antenna of the receiver. In an ideal model, the reception waveform $w_{rec}$ is expressed as per FIG. 5. In order to simplify the analysis, the reception waveform $w_{rec}$ is already known and a case where reception is performed by using a matched filter is shown.

Figure 8:
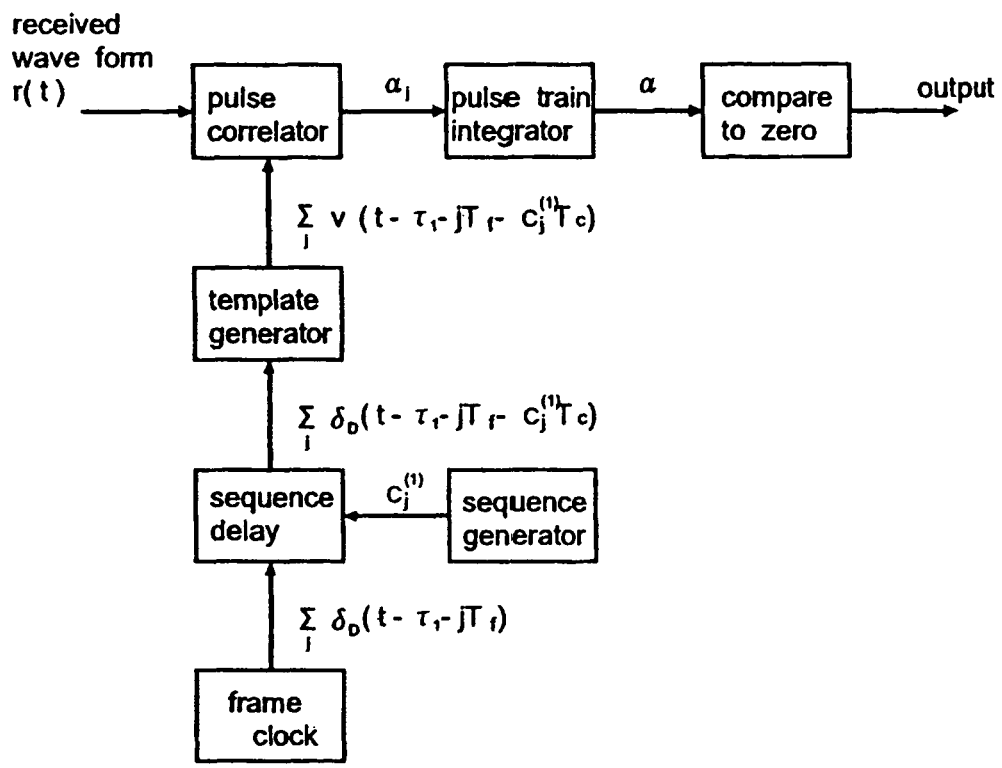
FIG. 8 is a block diagram showing a reception-side system constitution of a UWB wireless communication system.

Suppose that synchronization of the UWB receiver is complete. Further, in making explanation, the demodulation of data transmitted by the (k=1)th user is illustrated here. FIG. 8 is a block diagram showing the system constitution of the reception side of a UWB wireless communication system.

The UWB receiver must observe the reception signal r(t) over the duration Ts=NsTf to determine $d_{[j/Ns]}^{(1)}$=0 or 1. That is, d=0 or 1 must be judged for the reception signal $$r(t) = A_1 \sum_{j=0}^{N_s-1} w_{rec}(t - \tau_1 - jT_f - c_j^{(1)}T_c - \delta d) + n_{tot}(t) \quad (8)$$

when the transmission information is d. Combining the component of interference with other channels and the reception noise component is described below.

$$n_{tot}(t) = \underbrace{\sum_{k=2}^{N_u} A_k s_{rec}^{(k)}(t - \tau_k)}_{\text{Interference with other stations}} + \underbrace{n(t)}_{\text{reception noise}} \quad (9)$$

The following equations (10) and (11) indicate the correlator output value when $d^{(1)}_{[j/N_s]}=0$, and $d^{(1)}_{[j/N_s]}=1$ respectively.

$$d^{(1)}_{[j/N_s]} = 0 \Leftrightarrow \sum_{j=0}^{N_s-1} \overbrace{\int_{\tau_1+jT_f}^{\tau_1+(j+1)T_f} r(t)v(t-\tau_1-jT_f-c_j^{(1)}T_c)dt}^{\text{output of pulse correlator} \triangleq \alpha_j} > 0 \quad (10)$$

$$d^{(1)}_{[j/N_s]} = 1 \Leftrightarrow \sum_{j=0}^{N_s-1} \overbrace{\int_{\tau_1+jT_f}^{\tau_1+(j+1)T_f} r(t)v(t-\tau_1-jT_f-c_j^{(1)}T_c)dt}^{\text{output of pulse correlator} \triangleq \alpha_j} < 0 \quad (11)$$

Figure 9:
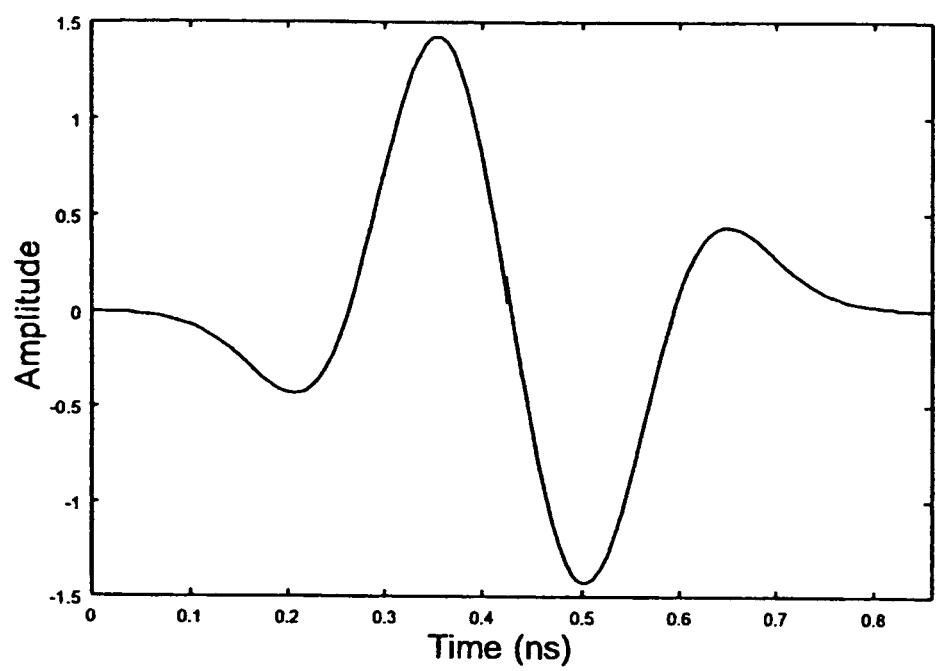
FIG. 9 is a waveform that is used as a template signal.

Because $w_{rec}(t)$ is not 0 in the period [0, Tm], v(t) is not 0 at [0, Tm+δ]. α in Equations (10) and (11) is the total value of the correlation values of the respective pulses found by using a correlation waveform v(t) that has been subjected to time hopping in accordance with the reception signal r(t). The waveform v(t) that is used as a template signal in the correlator obtained by using the monocycle waveform in FIG. 5 is shown in FIG. 9.

The number of multiple accesses increases and, as reception by multiple users becomes impossible, the effect of interference with other users approaches a Gaussian distribution. In such a state, $n_{tot}(t)$ is regarded as White Gaussian noise and Equations (10) and (11) are optimum.

a can be substituted for $$\alpha = m + n_d \quad (12)$$

and the correlator output m (when $d_{[j/N_s]}^{(1)}=1$) of the desired signal and the correlator output nd of an interference and a reception noise component are given by Equations (13) and (14) respectively.

$$m = \sum_{j=0}^{N_s-1} \int_{\tau_1+jT_f}^{\tau_1+(j+1)T_f} \left[ A_1 \sum_{i=0}^{N_s-1} \omega_{rec}(t-\tau_1-iT_f-c_i^{(1)}T_c-\delta) \right] \times \quad (13)$$

$$v(t-\tau_1-jT_f-c_j^{(1)}T_c)dt$$

$$n_d = \sum_{j=0}^{N_s-1} \int_{\tau_1+jT_f}^{\tau_1+(j+1)T_f} n_{tot}(t)v(t-\tau_1-jT_f-c_j^{(1)}T_c)dt \quad (14)$$

where m is expressed by means of Equation (15) in accordance with appendix A.

$$m = N_a A_1 m_p \quad (15)$$

Furthermore, mp is also expressed in appendix A.

Equation (14) is also expressed simply in appendix B $$n_d = \sum_{k=2}^{N_a} A_k n^{(k)} + n_{rec} \quad (16)$$

where n(k) represents interference with other channels from the kth user and $n_{rec}$ expresses the noise other than that originating from monocycles. A more mathematical rendering is shown in an equation with the appendix B.

In summary of the above, in a receiver of the PPM system in UWB-IR communications, a reception signal that is synchronized with a correlator having the waveform of FIG. 9 is inputted and a positive output or negative output is outputted in accordance with transmission data and data is judged with 0 as the threshold value.

The SNR and bit error rate of the UWB receiver will now be described. The signal component versus noise component power ratio SNR of the correlation filter output in the receiver of the UWB-IR system is expressed by Equation (17).

$$SNR_{out}(N_u) \triangleq \frac{m^2}{\mathbb{E}\{|n_d|^2\}} \quad (17)$$

The numerator of this equation is expressed by Equation (15). As indicated by appendix C, the average n(k) is 0. nd, which is shown by Equation (16), is a random number with an independent average of 0. Therefore, the variance value IE $\{|nd|^2\}$ of nd is expressed by Equation (18).

$$\mathbb{E}\{|n_d|^2\} = \sigma_{rec}^2 + N_s \sigma_a^2 \sum_{k=2}^{N_u} A_k^2 \quad (18)$$

$s_{rec}^2$ is the reception noise component and $s_a^2$ is defined in the appendix C.

As mentioned earlier, when multiple access increases and reception by multiple users becomes impossible, interference with other users approaches a Gaussian distribution. Equation (17) is a theoretical equation employing this approximation and, therefore, the SNR of multiple access to an extent where reception by multiple users is possible does not arise as per Equation (17).

The SNR when only a desired user's signal exists, that is, when there is no multiple access at $N_u=1$, is expressed as Equation (19).

$$SNR_{out}(1) = \frac{(N_s A_1 m_p)^2}{\sigma_{rec}^2} \quad (19)$$

Furthermore, the $SNR_{out}(N_u)$ when there is multiple access by user Nu is expressed as Equation (20).

$$SNR_{out}(N_u) = \frac{(N_s A_1 m_p)^2}{\sigma_{rec}^2 + N_s \sigma_a^2 \sum_{k=2}^{N_u} A_k^2} \quad (20)$$

Further, the bit error rate of a PPM system in UWB-IR communications is expressed by Equation (21) by using Equation (20).

$$BER = \frac{1}{2}\text{erfc}\left(\sqrt{\frac{SNR_{out}(N_u)}{2}}\right) \quad (21)$$

The first aspect of the present invention will be described next. The first aspect generates a time pulse shape that satisfies the desired frequency characteristic by adjusting the parameter on the time axis of a single pulse in UWB communications in which a pulse of short duration is transmitted. The single pulse can be represented by a predetermined function on the time axis and a time pulse shape satisfying the desired frequency characteristic is generated by changing the parameter contained in the function.

Figure 10:
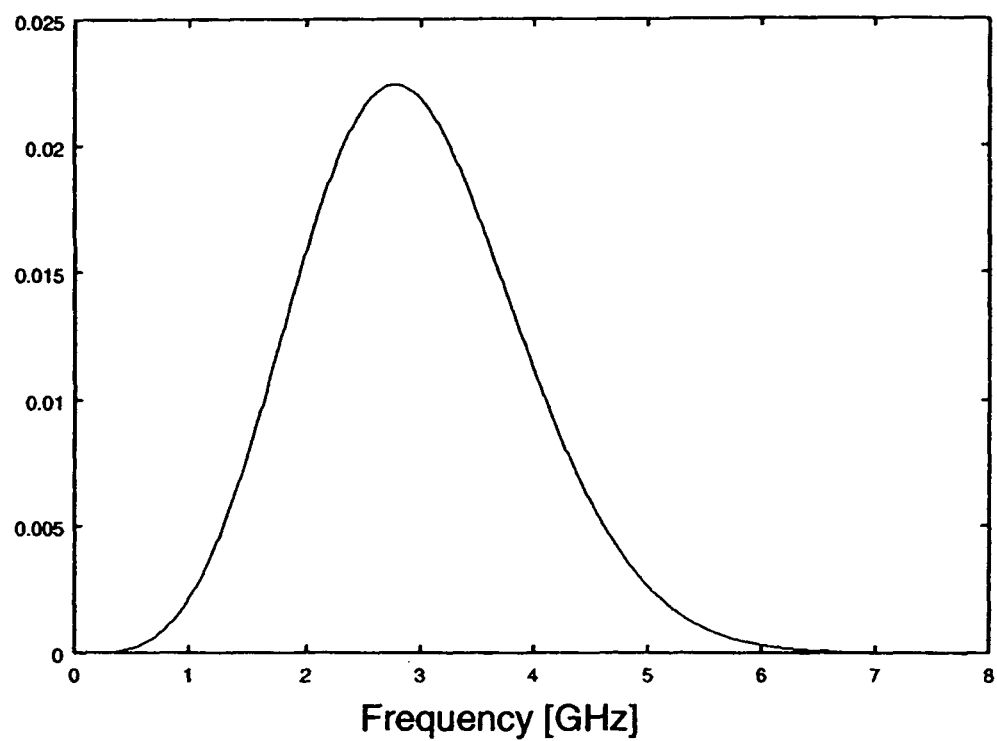
FIG. 10 is a frequency characteristic of a power spectrum.

The monocycle waveform is expressed by Equation (5) and the $w_{rec}(\omega)$ of the frequency region is expressed by Equation (22). FIG. 10 shows the frequency characteristic of the power spectrum.

$$W(\omega) = A \frac{\sqrt{2}\, \tau_m^3}{8\pi} \omega^2 \exp\left(-\frac{\tau_m^2}{8\pi}\omega^2\right) \quad (22)$$

Here, the frequency characteristic can be adjusted by adjusting the parameter $\tau W$ in Equation (22) and a time pulse shape that satisfies the desired frequency characteristic can be generated by adjusting the parameter on the time axis of the single pulse.

An example in which a chirp waveform is employed as an example of the first aspect of the present invention will be described next. In this example, a single pulse is formed by a chirp wave form and a time pulse shape that satisfies the desired frequency characteristic is generated by temporally setting the size of the output of the chirp waveform.

As an example employing a chirp waveform, a UWB ranging method that uses a chirp waveform will be described by way of example.

ITS (Intelligent Transport System), which implements a stable and efficient transport environment by using information communication technology to establish a network of people, roads, and vehicles, has attracted attention. The prevention of traffic accidents has been proposed as one object of ITS. Elemental technology for preventing traffic accidents includes ranging between vehicles and roads, grasping road conditions, and drive control. Here, the focus will be on intervehicular ranging in particular. Four systems are currently standardized as vehicle-mounted radars. Representative vehicle-mounted radars include Spread Spectrum (SS) and FM-CW (Frequency Modulated Continuous Wave). Meanwhile, a UWB-IR (Ultra Wide Band-Impulse Radio) system, which is a communication and ranging technology that employs a very wideband signal has been the focus of attention. Measurable distance, distance resolution, anti-interference and so forth have been suggested as conditions required by a vehicle-mounted radar and the UWB-IR system is able to satisfy such conditions.

A problem with the UWB-IR system is that when the transmission power is raised in order to increase the measurable distance, the increase in the instantaneous peak power cannot be disregarded. Use of a temporally long signal in order to increase the transmission power without increasing the instantaneous peak power may be considered. Therefore, in these writings, a chirp waveform with characteristics such that there is equality between the peaks of the monocycle waveform and autocorrelation and having a duration that is at least as many as ten times longer the monocycle waveform that is employed in the UWB-IR system is used in the UWB ranging system. When the chirp waveform is used as a UWB signal, the duration of the waveform is long in comparison with the monocycle waveform and the merits of using time-hopping to distinguish users are not exploited. For this reason, a method of producing a transmission wave by dividing the bandwidth into several usage bands, preparing respective frequency segments in the quantity resulting from the division of the chirp waveform constituting the bandwidth and rendering the transmission wave by arranging the waveform differently for each user on the basis of a PN sequence is employed as a method for distinguishing users. Usage of this method makes it possible to implement distance resolution that is equal to that of the UWB-IR system while suppressing transmission instantaneous peak power.

A comparison between the ranging performance of the method of the present invention and a conventional UWB-IR method will be made hereinbelow by using a processor simulation, a ranging error rate that is equal to that of a UWB-IR method for a single user will be implemented and the enhancement of the ranging error rate over that of the UWB-IR method in a multi-user environment is shown.

First, the UWB-IR ranging method will be described.

Figure 11:
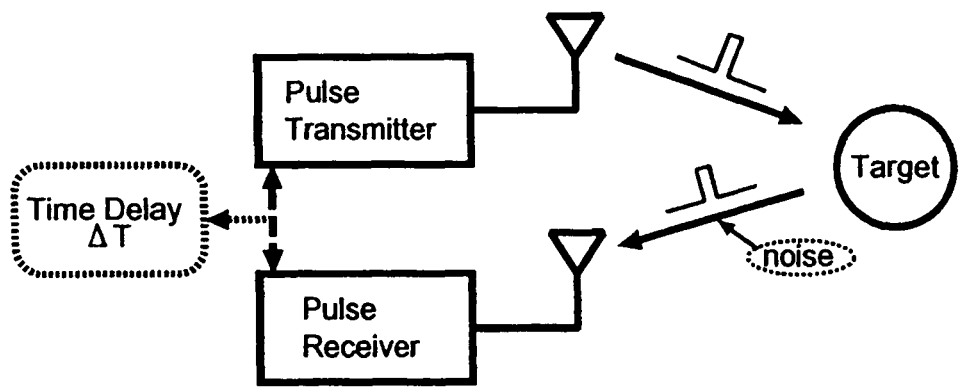
FIG. 11 shows a ranging theoretical diagram.

FIG. 11 shows a ranging theoretical diagram. Radio waves are transmitted toward the target, the time taken for the radio waves to return after being reflected by the target is measured, and the distance from the target is calculated from the time delay. Ranging is thus performed. Supposing that the transmission wave is s(t) and the reception wave is r(t), r(t) is a signal r(t)=s(t−ΔT) that is delayed by ΔT [s] from s(t). ΔT[s] is the propagation delay time of the radio waves. Therefore, the delay time ΔT is detected by synchronizing the reception wave and correlation wave and distance X [m] can be found from Equation (23).

$$X = \frac{c\Delta T}{2}[m] \quad (23)$$

where $c(=3\times10^8 \,[m/s])$ is the speed of light.

A theoretical equation for radar performance will be described next.

The minimum distance at which the radar recognizes a target at a different distance in the same direction is known as the distance resolution. The distance resolution d(m) is provided by Equation (24).

$$d = \frac{c\tau}{2} \quad (24)$$

Figure 12:
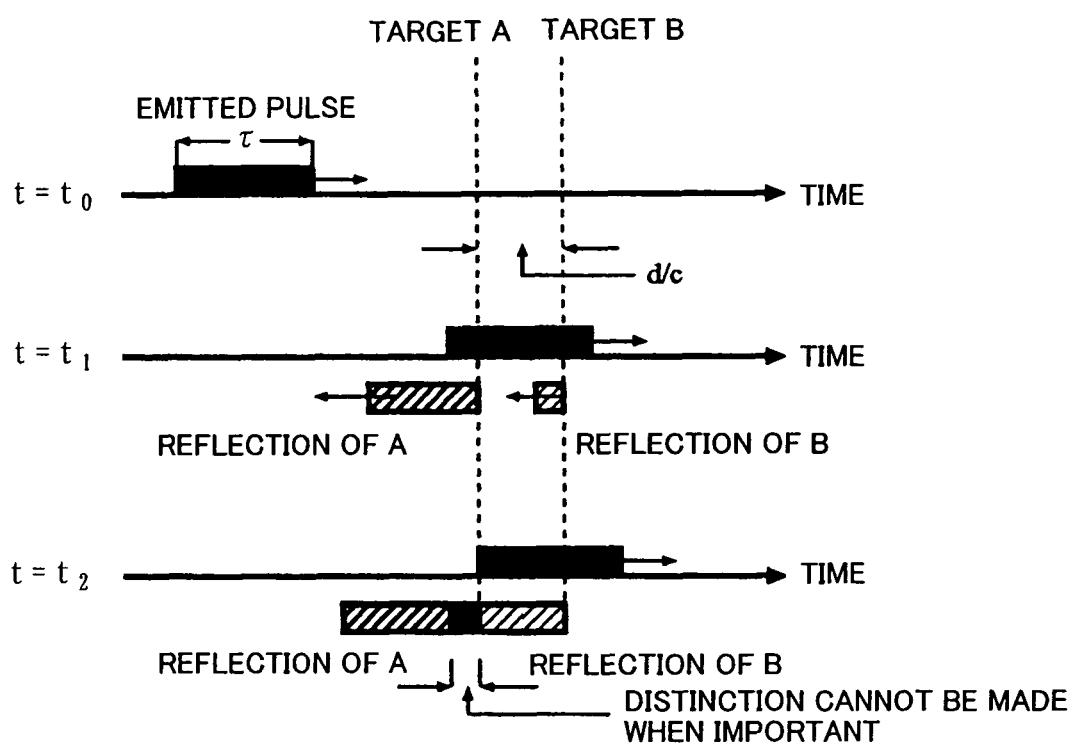
FIG. 12 shows a state in which distance analysis is impossible.

Here, c is the speed of light and $\tau$ is the pulse width. A condition in which distance analysis becomes impossible is shown in FIG. 12.

The receiver is no longer able to detect a signal when the reception signal power is small. Therefore, the maximum detection distance exists by considering attenuation caused by the distance for an origin with a fixed transmission power. In addition, when the time taken for a signal to return after being reflected is longer than the time duration over which a ranging signal is sent repeatedly, there is the problem of a second-order echo, which results in the target distance being misread as close. As a result, a maximum detection distance R(m) at which second-order echo barely occurs exists for an origin with a fixed signal cycle. Supposing that the cycle is T, the maximum detection distance R is provided by Equation (25).

$$R = cT/2 \qquad (25)$$

The UWB system employs signals with an ultrawide bandwidth and possesses a high ranging performance that makes it possible to implement a high transmission rate. When the speed of light is c, the relationship d=c/2ΔFs exists between the distance resolution d of the radar and the bandwidth ΔF of the radar signal. As a result, a radar using UWB signals obtains a high distance resolution.

Further, because the spectrum power density of the signal is uniformly low over a wide bandwidth, the signal is hidden by noise and there is concealment to the extent where it is not known that communications are being made. Further, even when it is known that communications are being made, signals are modulated by means of a user-identification PN sequence. There is therefore concealment to the point where, when the used PN sequence cannot be estimated, the content of the communication is unknown.

Further, the UWB system is able to perform communication and ranging by means of the same system and it may be said that this is technology that is suited to ITS intervehicular communication ranging that requires such technology.

Figure 13:
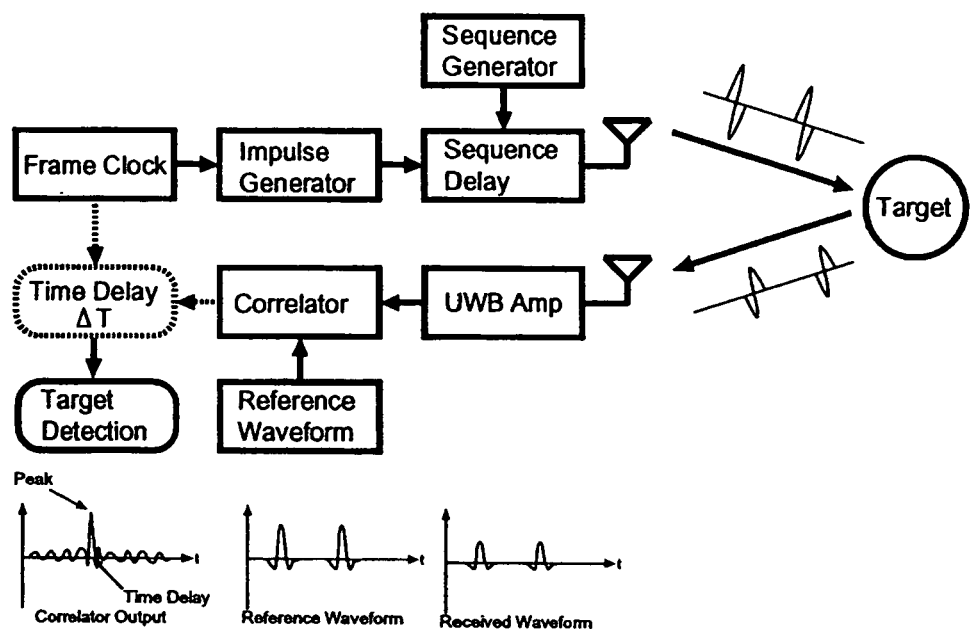
FIG. 13 is a system diagram of the UWB-IR system.

The UWB-IR system possesses the characteristic of modulating an emitted impulse signal train by means of time hopping. FIG. 13 shows a system diagram for the UWB-IR system.

A transmitter will now be described.

(1) Only one impulse signal can be inputted in each time frame. As a result, an impulse generator produces an impulse d(t) for each duration of the time frame $T_f$. The jth impulse is $d(t-_jT_f)$. Further, the number of emitted pulses is $N_s$.

$$f(t) = \sum_{j=0}^{N_s-1} (\delta(t - jT_f)) \qquad (26)$$

(2) The impulse that is created for each time frame delays the pulse by the time slot of the impulse in accordance with the TH sequence $c_j$ created by the pseudorandom sequence. $c_j$ is the jth TH sequence. $T_c$ is the time slot width and the maximum delay width does not exceed the time frame.

$$f(t) = \sum_{j=0}^{N_s-1} (\delta(t - jT_f - c_j T_c)) \qquad (27)$$

Figure 14:
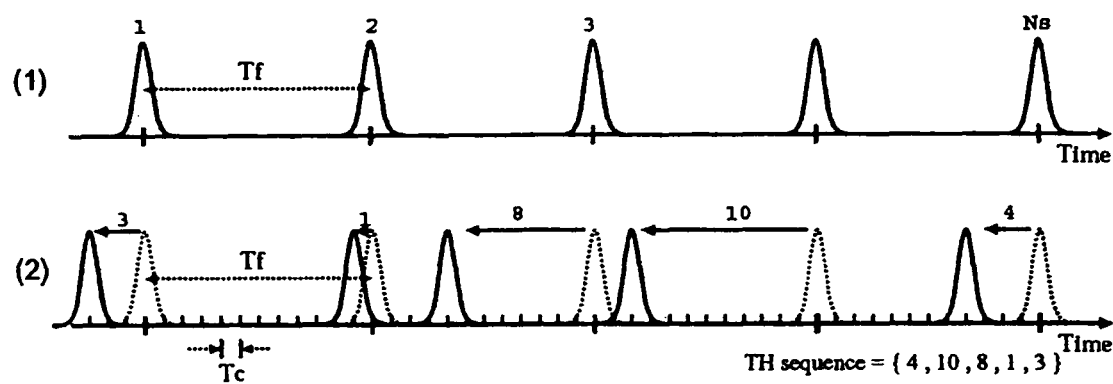
FIG. 14 serves to illustrate time hopping modulation.
Figure 15:
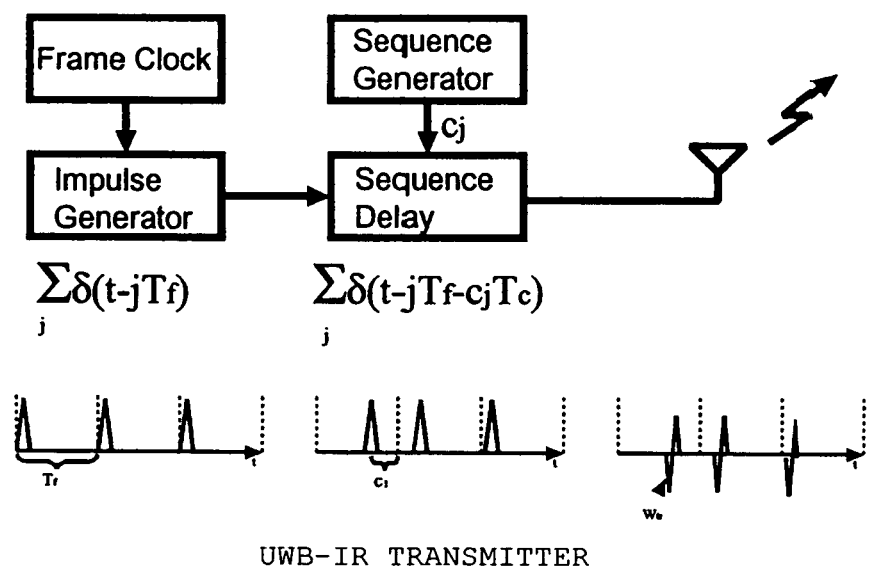
FIG. 15 serves to illustrate a UWB-IR transmitter.

The above flow is shown in FIGS. 14 and 15. Collision with other users is avoided by time-hopping a plurality of pulses in this manner, thereby permitting identification. The number of times a pulse is repeated is $N_s$.

The receiver will now be described. The receiver basically performs an operation that is the reverse of the operation performed by the transmitter. The impulse generated by the transmitter is actually a Gaussian waveform with a duration. The Gaussian waveform is differentiated when passing through the transmission antenna and receiving antenna and the receiver has a shape affording the Gaussian waveform a second-order differential. The waveform is normally known as a monocycle waveform in a UWB system. A monocycle waveform is expressed by w(t).

(3) On the receiver side, because the TH sequence of the received signal $f_{rec}(t)$ is already known, operations (1) and (2) performed by the transmitter are executed and the replica $f_{rec}(t)$ of the transmission signal train is created.

$$f_{rep}(t) = \sum_{i=0}^{N_s-1} (w(t - iT_f - c_i T_c)) \qquad (28)$$

(4) In order to establish synchronization with the sent transmission signal train, a cross-correlation of $f_{rec}(t)$ that is prepared by the receiver with the received signal $f_{rec}(t)$ is taken.

$$R(\tau) = \int f_{rec}(t) f_{rep}(t+\tau) dt \qquad (29)$$

Figure 16:
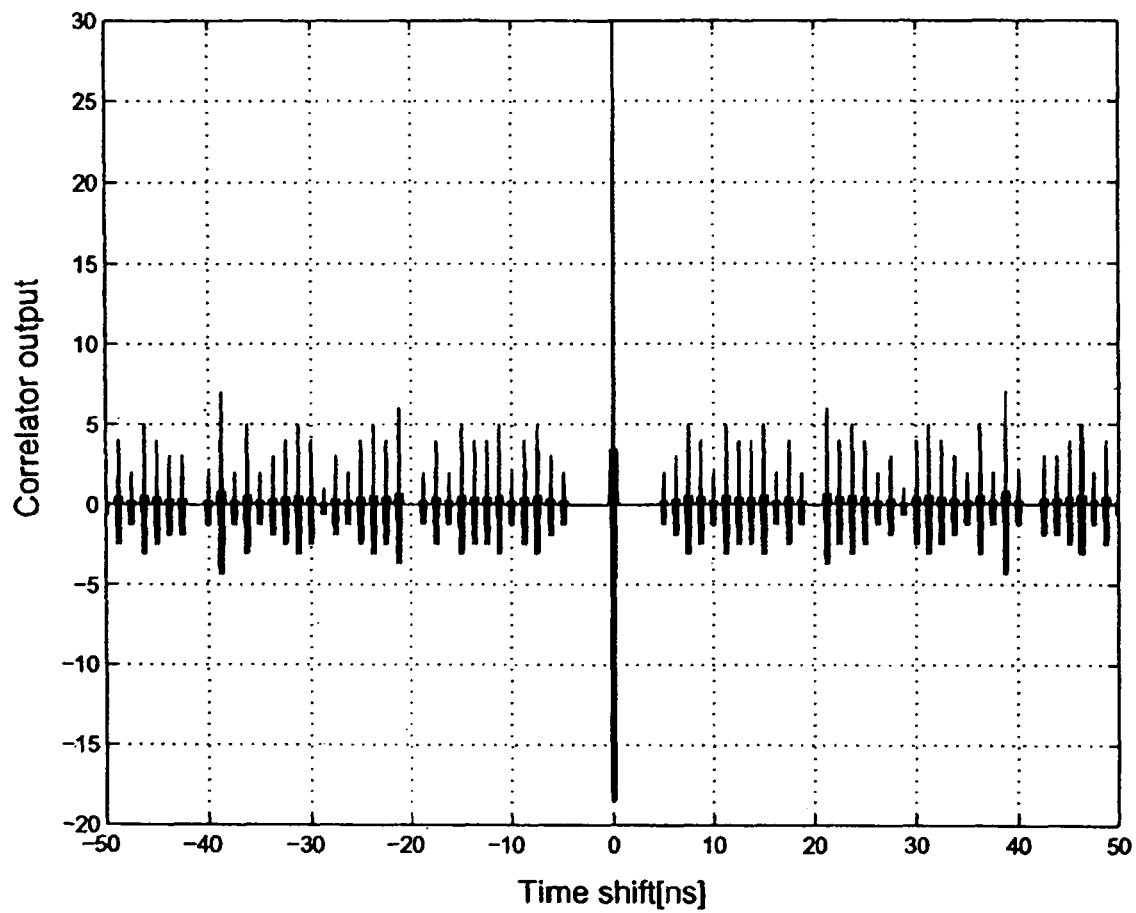
FIG. 16 serves to illustrate the relationship between the desired UWB-IR wave and a replica cross-correlation output.

The cross-correlation output at this time is as shown in FIG. 16.

(5) The peak of the cross-correlation output is detected and the distance from the target is calculated from the time delay τ.

Ranging by the UWB-IR system is performed by the process flow above.

In ranging, the shorter the pulse width, the more accurately the time can be measured, whereby the distance resolution can be increased. The most well-known radar is the pulse radar. The pulse radar transmits one pulse wave to find the distance from the time taken for the pulse to come back.

Meanwhile, the UWB-IR system possesses a high distance resolution because the pulse itself that is used has a minute width of 1 ns or less. In addition, user differentiation is possible because a plurality of pulses are transmitted and a plurality of pulse durations are determined from a time-hopping sequence that is different for each user.

The target conditions for an automobile radar will now be described. The target conditions for an automobile radar depend on the intended usage. However, the detection distance, measurement accuracy, and so forth in the present road-traffic conditions may be cited as basic conditions. The target performances shown in Table 1 below are established as the target conditions of an intervehicular automobile radar.

| Target performance of automobile radar in intervehicular ranging | |
| --- | --- |
| Item | Target performance |
| Distance detection range | ~50[m] |
| Distance detection accuracy | Lower limit ± 1[m] |

Further, in the case of an automobile radar, the travel of radio waves over distances that are equal to or more than those of the target conditions is undesirable on account of being attributable to an increase in error information alone. On roads that are congested in addition to not permitting specification of the usage location and usage time, the probability that there will be a multiplicity of vehicles close together is high, and an excessive radio-wave range is undesirable.

Figure 17:
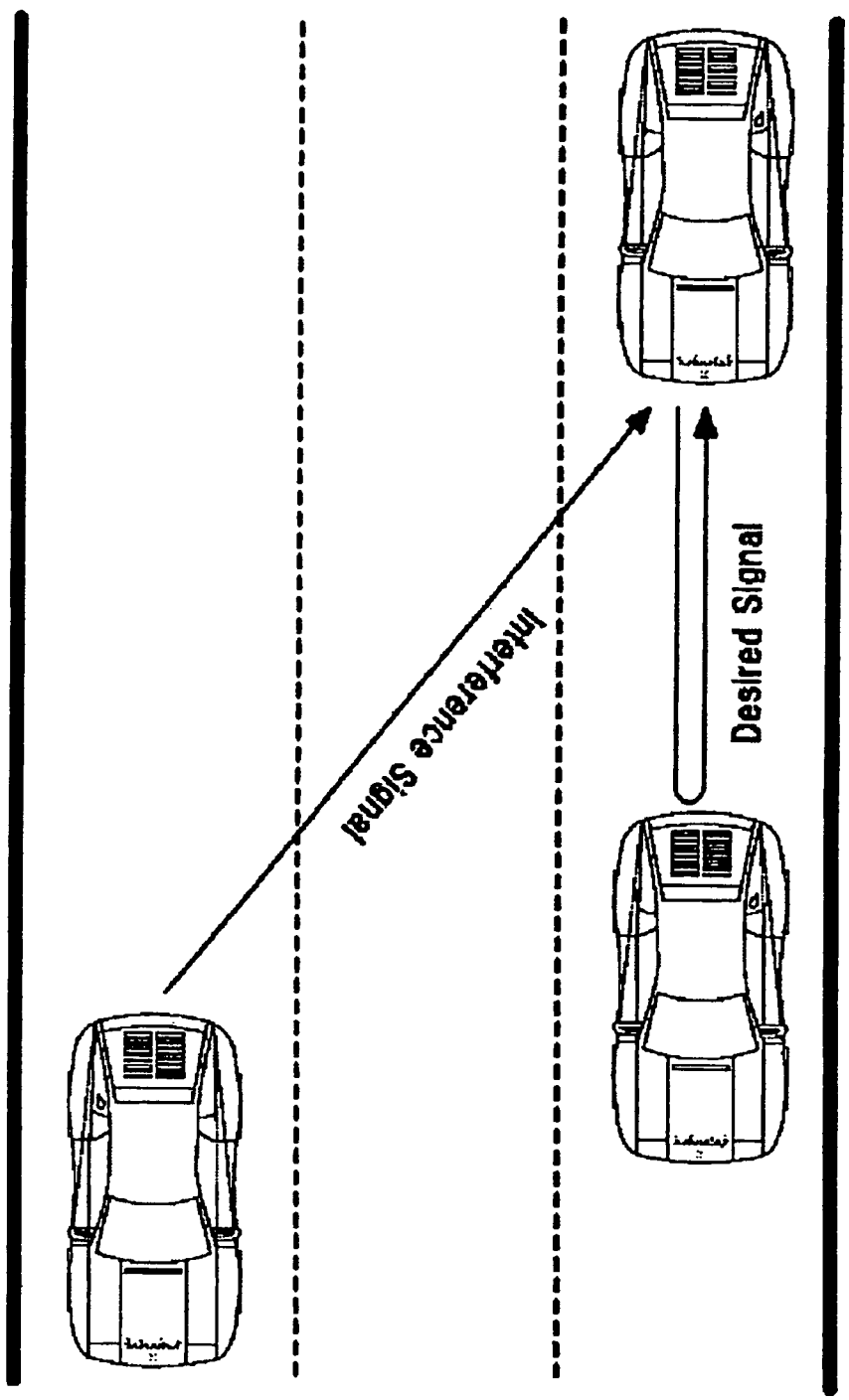
FIG. 17 is a UWB intervehicular ranging model.

FIG. 17 shows a constitutional view of an intervehicular ranging system. A ranging system targets one other vehicle that is traveling on the same track as the vehicle (measuring party) as shown in FIG. 17. The reception side receives $f_{rec}(t)$, which is a wave that comes back after the transmission pulse train f(t) is reflected by the target, adopts synchronization and detects the distance. A matched filter is used for the synchronization capture. When the time when the matched filter output is maximum is the synchronization time.

A UWB ranging system that uses a chirp waveform will now be described. The UWB ranging system is implemented by substituting a monocycle waveform in the UWB ranging system that uses a monocycle with a chirp waveform.

The principle behind ranging with a chirp wave will now be described. First, pulse compression will be described. A technology that actually narrows the pulse width on the reception side by using a transmission pulse with a wide width is known as pulse compression. In a general classification, pulse compression includes the linear FM system and coding system.

Figure 18:
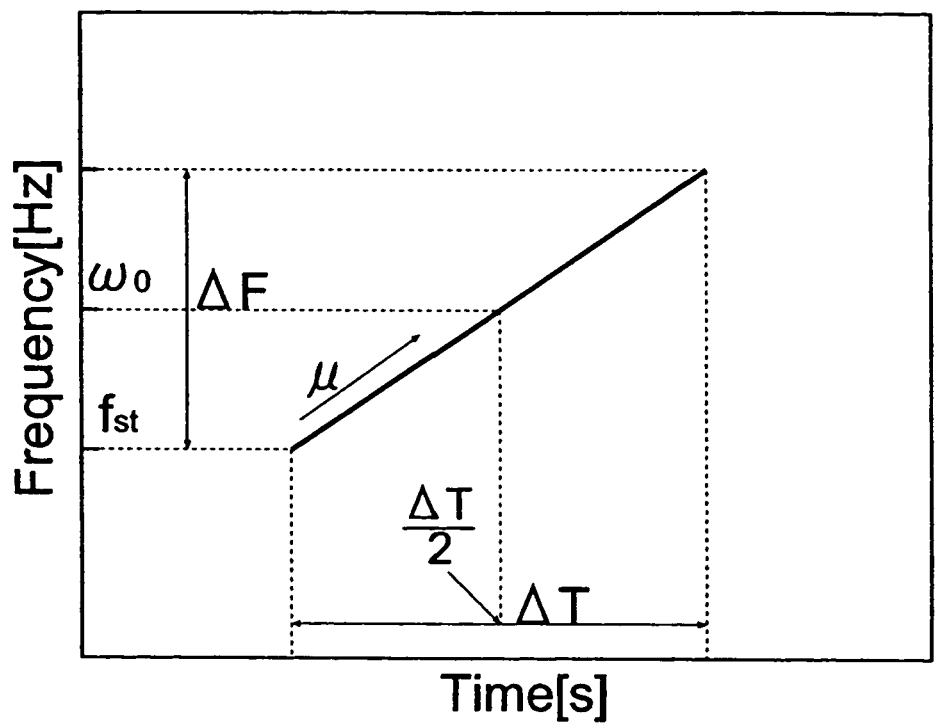
FIG. 18 is a frequency transition diagram of a chirp waveform.
Figure 19:
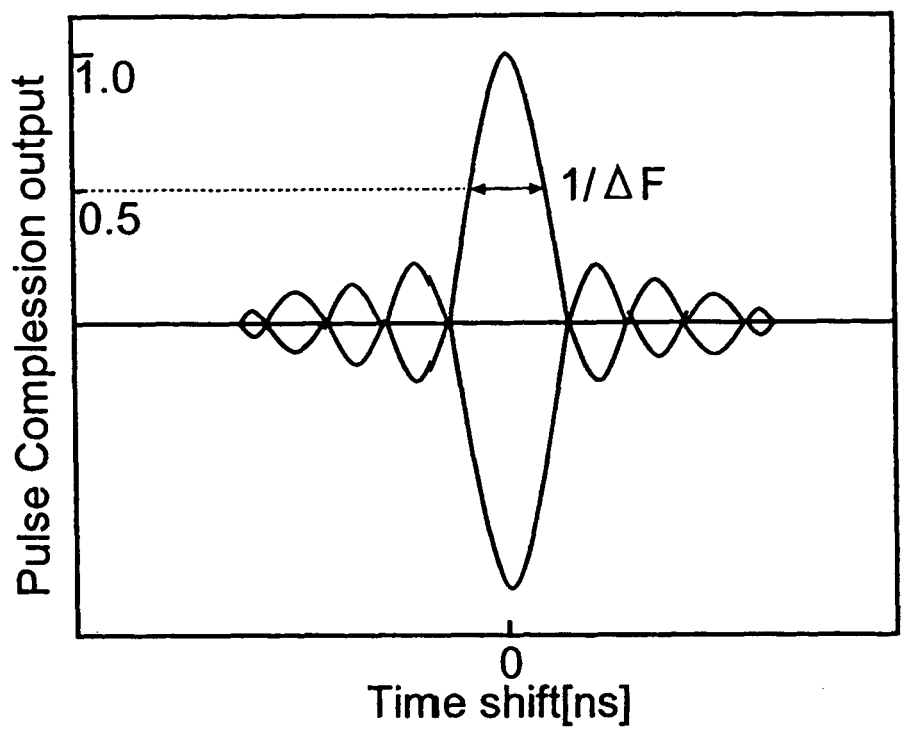
FIG. 19 is waveform after pulse compression.

The linear FM system FM-modulates and transmits a carrier in a pulse with a long duration T by means of a frequency width Δf as shown in FIG. 18. On the reception side, the carrier passes through a pulse compression filter having a delay time that corresponds with the frequency with the opposite inclination from the direction in which the transmission frequency increases (decreases). As a result, the output signal shown in FIG. 19 is obtained. The pulse width is compressed to 1/Δf and the amplitude is an output that increases by the multiple √(TΔf). The pulse compression filter can be easily implemented by means of an element such as a surface acoustic wave filter in which the delay time changes in proportion to frequency. Thus, a method that increases the resolution without causing degradation of the SN ratio in the distance direction is pulse compression.

Pulse compression of a chirp waveform will be described next. A waveform that is used in the pulse compression of a linear FM system is known as a chirp waveform. This waveform is generally expressed as follows.

$$s(t) = \begin{cases} \sin\left(\omega_0 t + \frac{1}{2}\mu t^2\right) & |t| \le \frac{T}{2} \\ 0 & \text{otherwise} \end{cases} \quad (30)$$

Here, μ is the angular frequency sweep rate, ω0 is the center frequency, and T is the time duration of the chirp signal. Further, supposing that Δω(=2πΔf) is the angular frequency sweep rate, the relationship μ=Δω/T is then valid.

Pulse compression is possible by allowing the chirp waveform to pass through the pulse compression filter. The pulse compression filter can be implemented by means of a matched filter.

The waveform following pulse compression is $$g(t) = s(t) * h_m(t) = \begin{cases} \sqrt{T\Delta f} \dfrac{\sin\left(\frac{\mu T}{2}|T| - \frac{1}{2}\mu t^2\right)}{\frac{\mu T}{2}|T|} \cos(\omega_0 t) & |t| \le T \\ 0 & \text{otherwise} \end{cases} \quad (31)$$

It can be confirmed from Equation (31) that the output waveform following pulse compression is a signal with a peak value √(TΔf) and a pulse width 1/Δf in comparison with the pre-compression waveform. Further, the S/N ratio is enhanced by the compression ratio TΔf through compression.

As a result, the resolution that is obtained by subjecting the chirp waveform to pulse compression processing is the same as that of the pulse signal with a pulse width 1/Δf. That is, on the reception side, an output that is the same as when the monocycle waveform is received by a matched filter is obtained. The ability to suppress the peak power during transmission and send a waveform with a long pulse duration is characteristic. Further, the sharpness of the peak is dependent on the bandwidth of the chirp waveform alone and is not affected by the duration.

Figure 20:
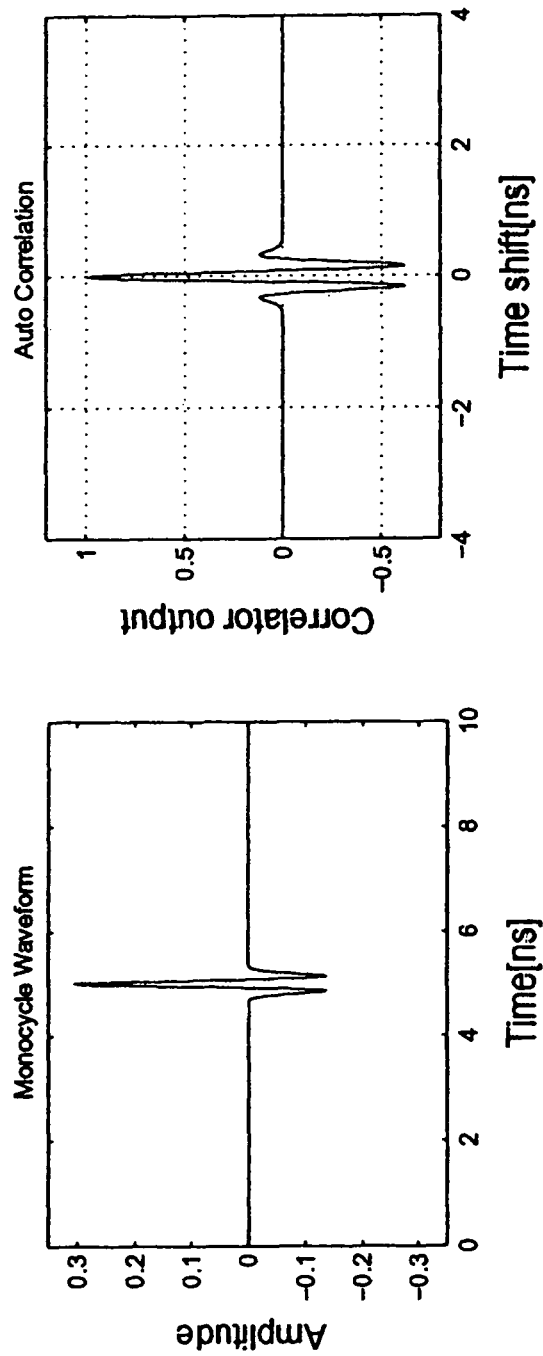
FIG. 20 serves to illustrate a monocycle wave and autocorrelation.
Figure 21:
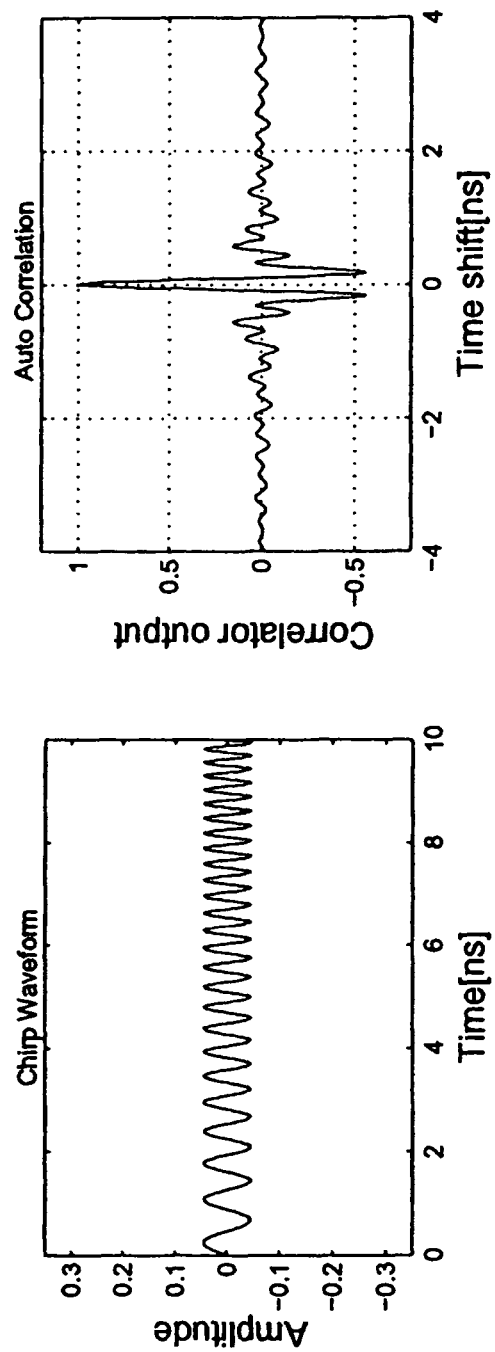
FIG. 21 serves to illustrate a chirp wave and autocorrelation.

An auto correlation-output comparison will now be described. Here, a monocycle wave and autocorrelation output are shown in FIG. 20 and a chirp wave and autocorrelation output are shown in FIG. 21. The waveform bandwidths are both 3 GHz and the power is normalized in both cases. It can be seen that although the amplitudes of the transmission waveforms differ greatly, the autocorrelation outputs are outputs with the same sharpness.

The correlation characteristics of chirp waveforms with different parameters will now be described. As long as the chirp waveforms are waveforms with the same frequency sweep rate and the same modulation start frequency, a sharp cross-correlation output can be obtained. When the frequency sweep rate and modulation start frequency are different, the cross-correlation output is an output without a peak.

The correlation characteristics of chirp waveforms of different durations will now be described. Here, a change in the peak value of the cross-correlation output of two waves when the frequency sweep rate is changed by making the modulation start frequency and bandwidth fixed, that is, when the difference in the durations of the two chirp waveforms is changed by making the bandwidth fixed is observed.

Figure 22:
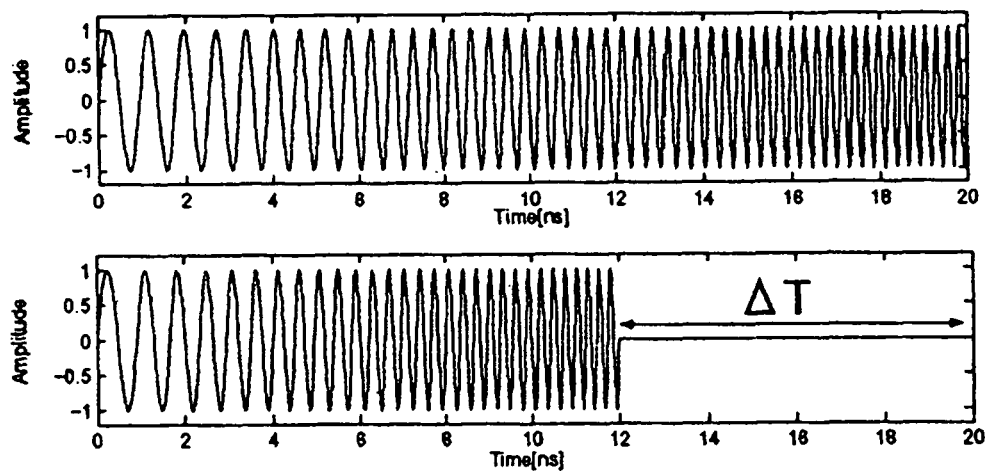
FIG. 22 is a chirp waveform with a different time duration.

The relationship between the two chirp waves with different durations is shown in FIG. 22. Here, ΔT is the difference between the durations of two waves. The peak value of the cross-correlation output of two chirp waves with a time difference ΔT are found and the relationship between the size of ΔT and the size of the peak value of the cross-correlation output is shown in FIG. 23.

Figure 23:
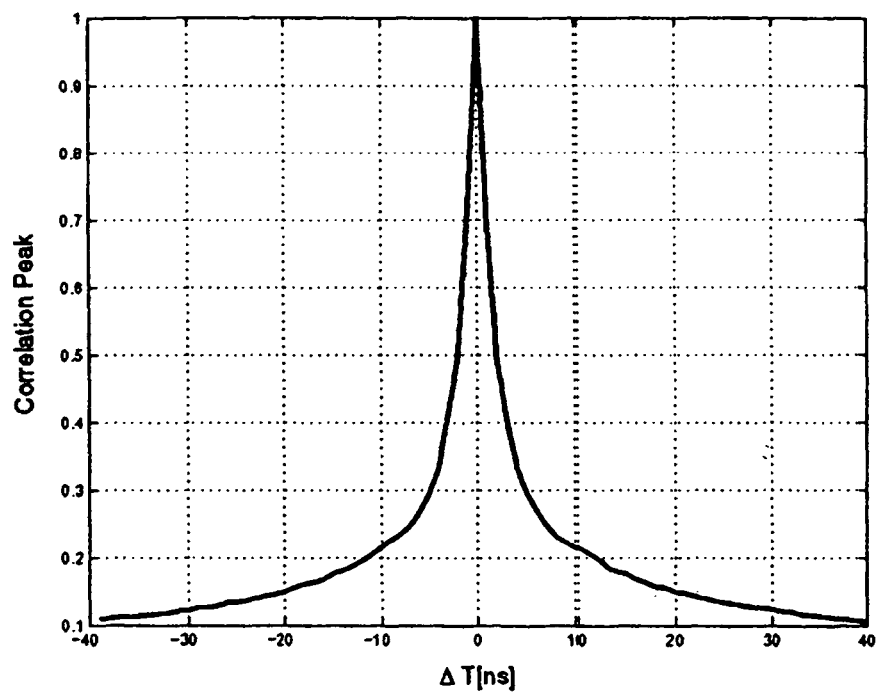
FIG. 23 shows the change in the peak value of the cross-correlation output when the time duration of two chirp waveforms is changed.

When FIG. 23 is observed, it can be seen that as the absolute value of ΔT increases, that is, as the difference between the durations of the two chirp waves increases, the cross-correlation output is an output without a peak.

Even when the usage bands are equal, when the duration is changed, the cross-correlation output is kept low.

The correlation characteristics of chirp waveforms with different occupied bands will now be described. Thereafter, the change in the peak value of the cross-correlation output of two waves when the modulation start frequency is changed by making the duration and frequency sweep rate of the chirp waveforms fixed, that is, when the two chirp waveforms occupy different bands by making the duration fixed is observed.

Figure 24:
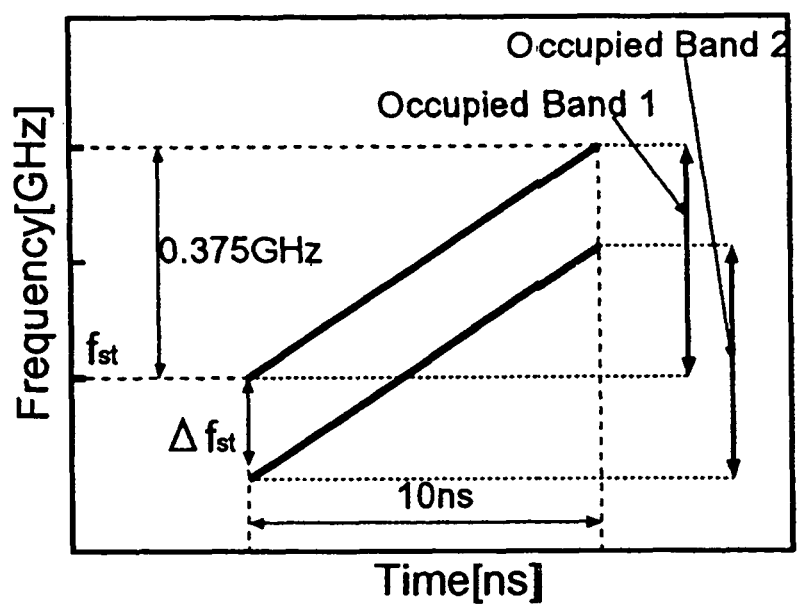
FIG. 24 is a chirp waveform with different occupied bands.

The relationship between two chirp waves with different occupied bands is shown in FIG. 24 by using a frequency transition diagram. Here, Δfst is the difference in the modulation start frequency of two waves.

Figure 25:
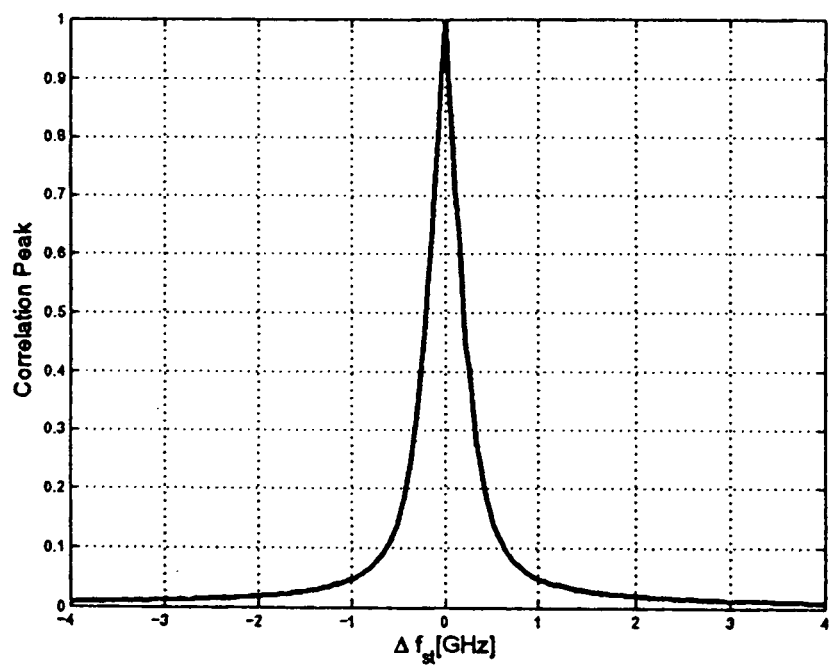
FIG. 25 shows the change in the peak value of the cross-correlation output when the occupied band of two chirp waveforms is changed.

The peak value of the cross-correlation output of two chirp waves with the modulation start frequency difference Δfst is found and the relationship between the size of Δfst and the size of the peak value of the cross-correlation output is shown in FIG. 25.

When FIG. 25 is observed, it can be seen that as the absolute value of Δfst increases, that is, as the occupied bands of two chirp waves differ, the cross-correlation output is an output without a peak. Thus, it can be seen that even when the durations are equal and the occupied band is different, the cross-correlation output of the chirp waveform is kept low. This is because the waveforms are orthogonal with respect to frequency when the occupied bands differ.

Figure 26:
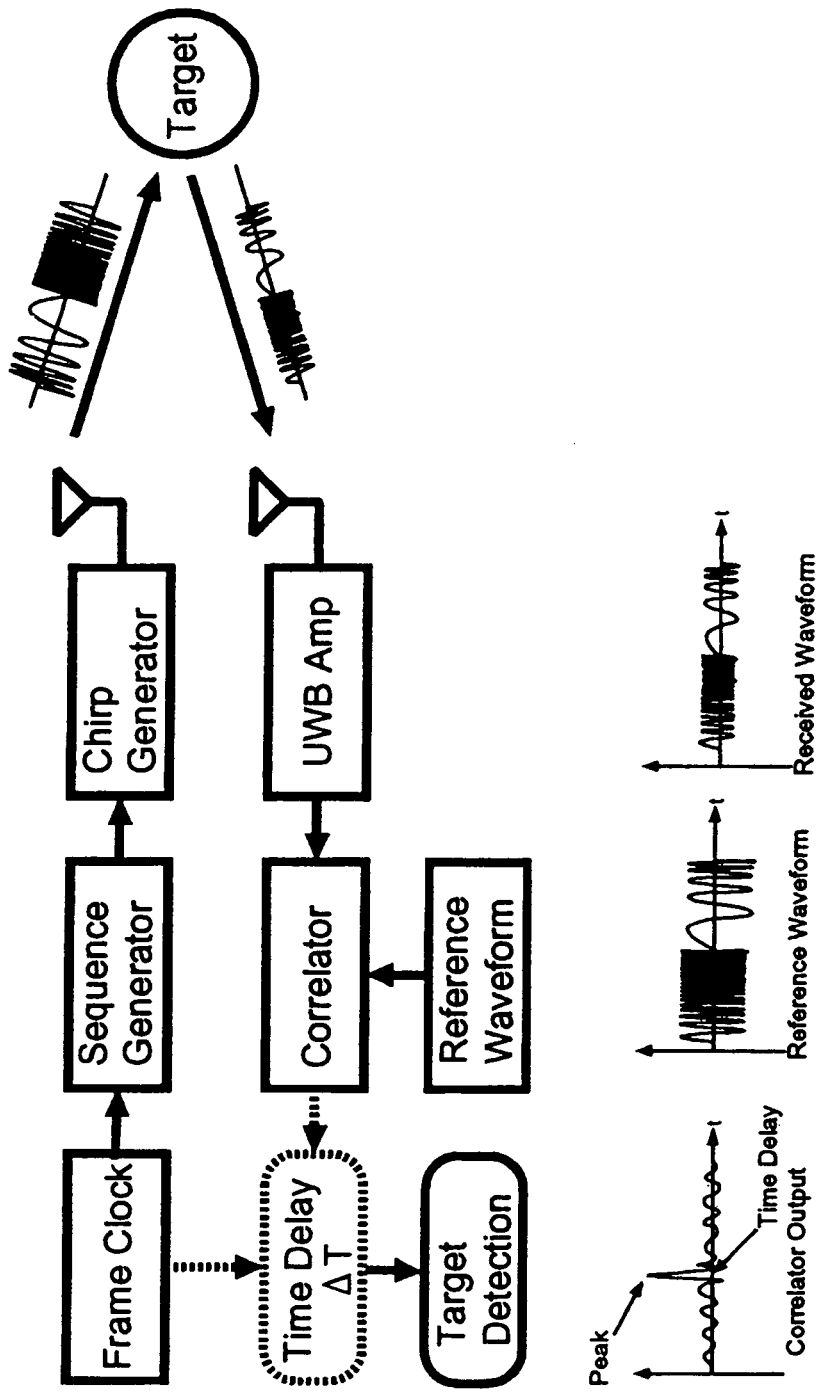
FIG. 26 is a block diagram of the UWB-chirp ranging.

The constitution of the UWB-CHIRP system of the present invention will now be described. A block diagram for the constitution of the UWB-CHIRP system of the present invention is shown in FIG. 26. In the case of the UWB-IR system, user identification is performed by time-hopping a pulse by using a sequence Tπ that is different for each user.

On the other hand, in the case of the UWB-CHIRP system of the present invention, user identification is performed by preparing a different waveform pattern for each user instead of performing time-hopping.

The user identification method will now be described. When users are identified by means of a waveform, required conditions that the waveform cross-correlation value should be low, that the length of one waveform should not exceed the time frame length, and that the bandwidth should not exceed the usage band may be cited.

Methods for preparing waveforms with mutually low cross-correlation values satisfying such conditions that may be cited include:

(1) Fixing the bandwidth of the chirp waveform and preparing a plurality of chirp waveforms of different durations; and (2) Fixing the duration of the chirp waveform, dividing the usage band and preparing a plurality of chirp waveforms that occupy the individual bandwidths. Of these methods, in the case of (1), in order to prepare chirp waveforms with a low cross-correlation value, the durations must be afforded a certain difference. Further, when a plurality of chirp waveforms with a low cross-correlation value are to be prepared, an even larger time difference must be secured. Therefore, in the current case in which the maximum of the time duration of the chirp waveform is limited to the time frame length $T_f$, it is considered impossible to prepare an adequate number of waveforms.

On the other hand, in case (2), the duration of the chirp waveform is fixed and the usage band is divided into the number of waveforms to be prepared and it is considered possible to allocate the usage band to each of the chirp waveforms.

Therefore, method (2) is used here. In method (2), the respective waveforms are orthogonal with respect to frequency.

The creation of usage waveforms will now be described. The usage waveforms are created according to the following conditions.

(1) The duration of the waveform is the same as the time frame length of the UWB;

(2) The bandwidth per wave is the width produced by dividing the usable bandwidth into N parts;

(3) The number of waveform patterns is the same as the number of slots of the UWB-IR for the sake of a comparison with UWB-IR.

Based on these conditions, supposing that the bandwidth per wave is Δfn, the usable bandwidth is F, and the number of prepared waveforms is N, $$\Delta fn = F/N \qquad (32).$$

For example, in cases where the usage band is 3 GHz and eight waves are prepared, the bandwidth per wave Δfn is $$\Delta fn = \tfrac{3}{8} \text{ [GHz]} = 0.375 \text{ [GHz]} \qquad (33).$$

Figure 27:
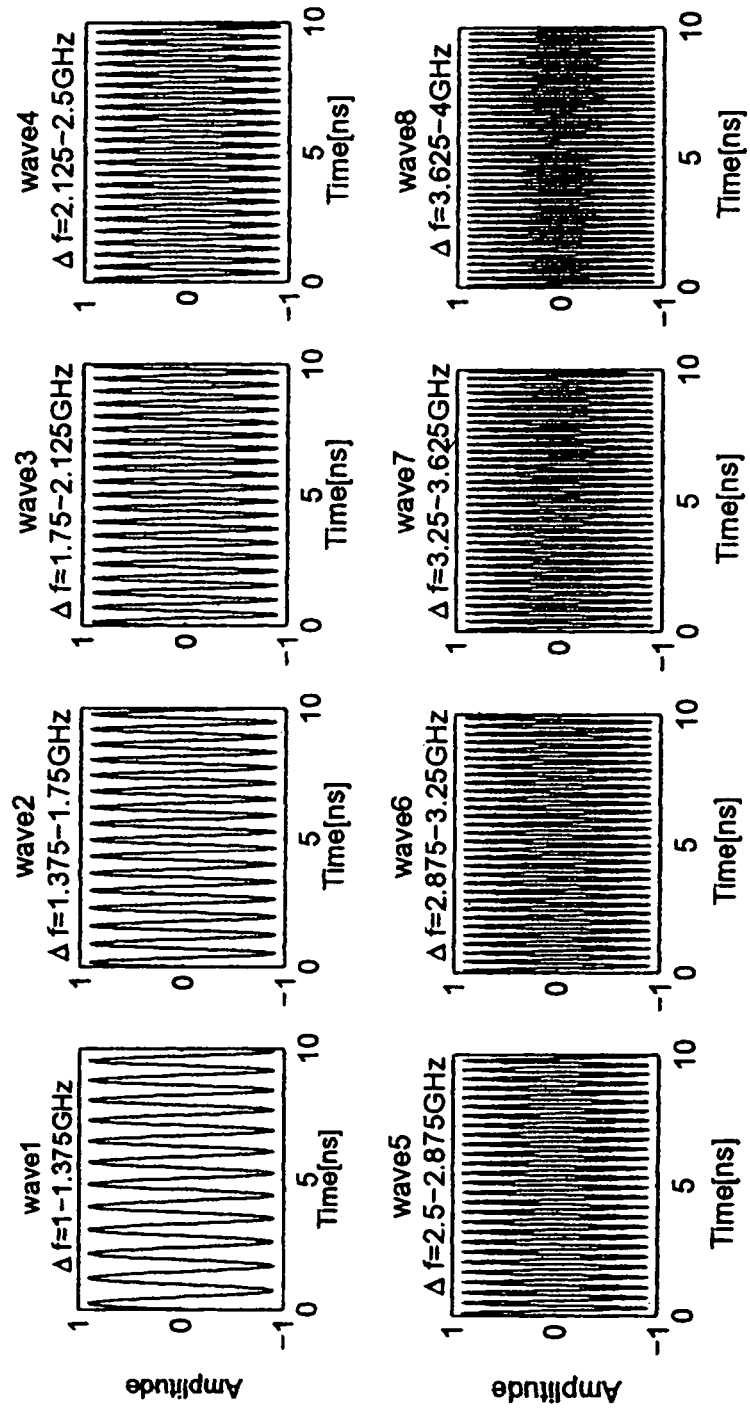
FIG. 27 shows the respective chirp waveforms after band division.

The eight waves at this time are shown in FIG. 27. A transmission waveform is rendered by combining the waveforms in patterns that are different for each user.

The transmitter will now be described.

(1) A signal from a frame clock is sent to each time frame $T_f$. In the jth time frame, the signal is $\delta(t-jT_f)$. The number of repetitions of the time frame is $N_s$.

$$f(t) = \sum_{j=0}^{N_s-1} (t - jT_f) \qquad (34)$$

(2) A chirp waveform corresponding with a user-identification pseudorandom sequence $c_j$ is outputted for each time frame. $c_j$ is the jth pseudorandom sequence.

$$f(t) = \sum_{j=0}^{N_s-1} s_{c_j}(t - jT_f) \qquad (35)$$

where $s_{c_j}(t)$ is the chirp waveform of the duration Tf and the center frequency $w_{c_j}$ is allocated a different value for each $c_j$. Further, because the bandwidth of transition over one time frame Tf is fixed irrespective of the chirp waveform, the frequency sweep rate μ is fixed.

$$s_{c_j}(t) = \sin\left\{\omega_{c_j}\left(t - \frac{T_f}{2}\right) + \frac{1}{2}\mu\left(t - \frac{T_f}{2}\right)^2\right\} \qquad (36)$$

The process flow above generates the transmission wave of the UWB-CHIRP system of the present invention.

The receiver will now be described. The receiver is the same as that in the UWB-IR-system and performs an operation that is the reverse of the operation performed by the transmitter.

(3) On the receiver side, because the pseudorandom sequence of the received signal $f_{rec}(t)$ is already known, operations (1) and (2) executed by the transmitter are performed and the replica $f_{rec}(t)$ of the transmission signal train is created.

$$f(t) = \sum_{i=0}^{N_s-1} s_{c_i}(t - iT_f) \qquad (37)$$

(4) Across-correlation of the received $f_{rec}(t)$ and the $f_{rec}(t)$ prepared by the receiver is taken in order to establish synchronization with the transmission signal train that is sent.

$$R(\tau) = \int f_{rec}(t) f_{rep}(t+\tau) dt \qquad (38)$$

Figure 28:
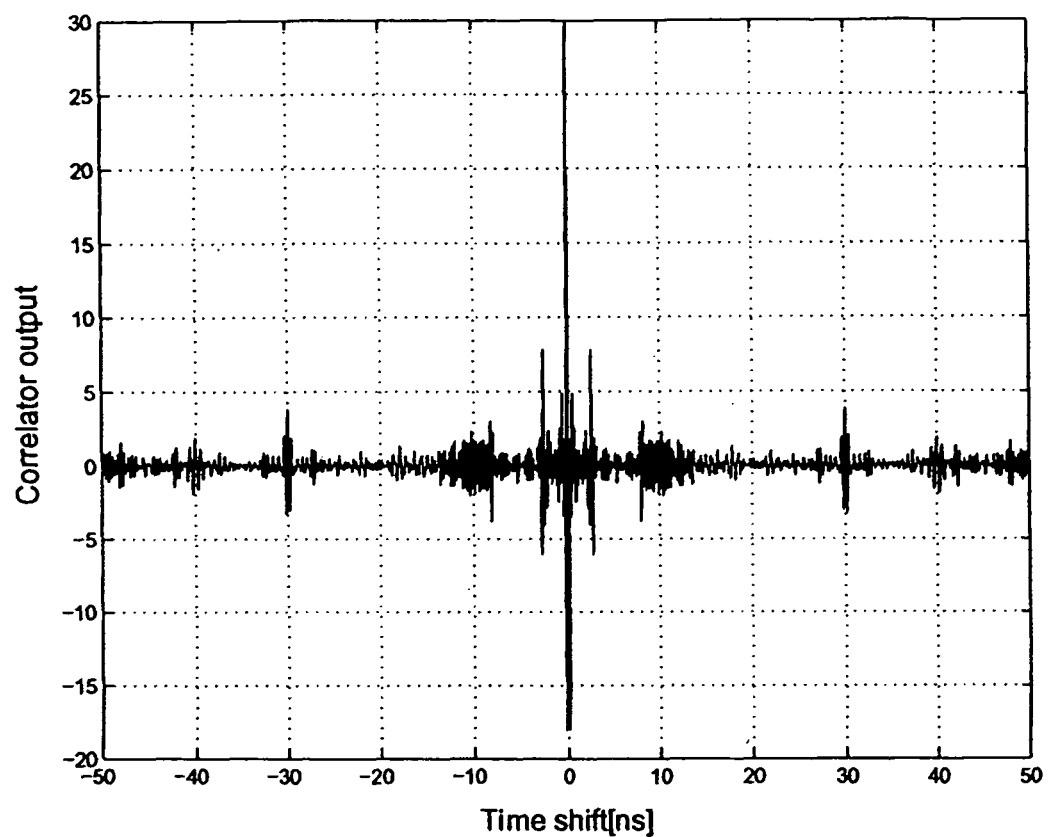
FIG. 28 serves to illustrate the relationship between the desired wave of the UWB chirp system of the present invention and a replica cross-correlation output.

The cross-correlation output at this time is as per FIG. 28.

(5) The peak of the cross-correlation output is detected and the distance from the time delay X to the target is calculated.

The UWB-CHIRP system of the present invention is performed according to the process flow detailed above.

A comparison of the transmission waveforms between the UWB-IR system and the UWB-CHIRP system of the present invention will now be described.

Here, a comparison of the transmission waveforms of the respective users between the UWB-IR system and the UWB-CHIRP system of the present invention will now be made.

Figure 29:
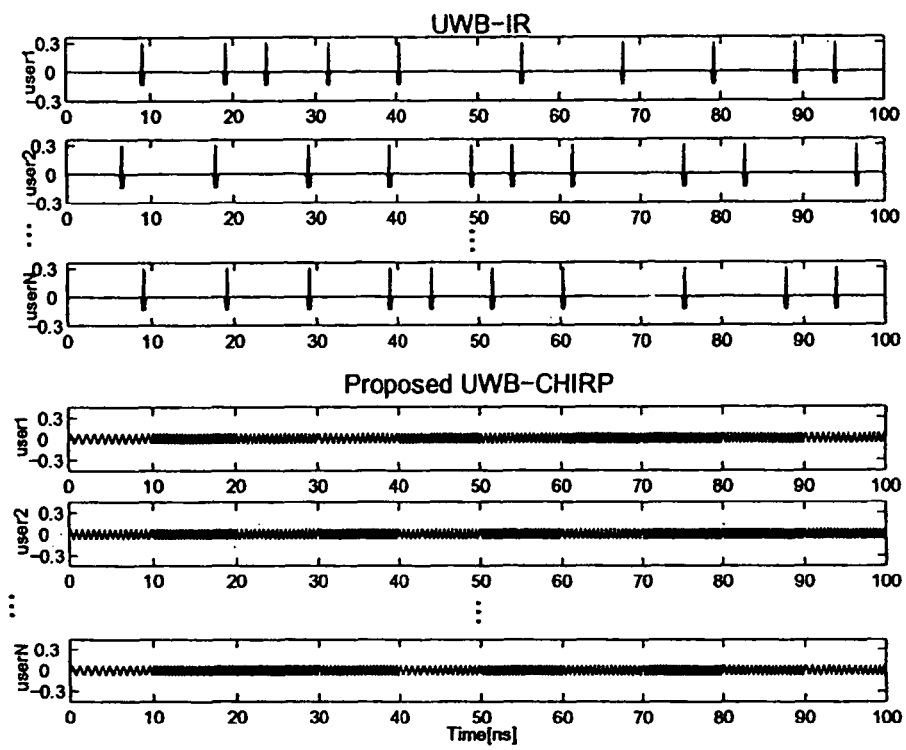
FIG. 29 serves to illustrate a conventional UWB chirp and the transmission waveforms of each user of the UWB chirp of the present invention.

The transmission waveforms of the respective users in the case of multiple users between the UWB-IR system and the proposed UWB-CHIRP system is shown in FIG. 29.

Thus, the methods of user differentiation of these two systems are different. Further, when the transmission power per cycle is made uniform, the peak value of the transmission waveform of the UWB-CHIRP system of the present invention is kept low in comparison with that of the UWB-IR system.

The performance evaluation of the UWB-CHIRP ranging system of the present invention will now be described. An evaluation of the ranging performance of the proposed system is performed by using a processor simulation and a comparison between the UWB-IR system and the UWB-CHIRP system of the present invention is made.

Simulation parameters are shown in Table 2 below.

| Simulation parameters | |
|---|---|
| Number of tests | 10000 |
| Sampling duration | 0.01 ns |
| Time frame length Tf | 10 ns |
| SNR | 0 dB to 25 dB |
| Number of users | 10 |
| Bandwidth | 3 GHz(1 GHz to 4 GHz) |
| Number of time frame repetitions Ns | 10 20 |
| Communication path | AWGN |

Suppose that the bandwidth of the monocycle waveform used in the UWB-IR system and the bandwidth of the chirp waveform used by the present invention are 3 GHz for equality between the two systems. Cases where the number of repetitions $N_s$ of the time frame is 10 and 20 are tested. When the number of time-frame repetitions is increased, the number of waveforms for identifying the users increases, which is thought to produce a difference in the user differentiation performance when there are multiple users.

In ranging, the ranging error rate when distance is detected is defined by the following equation (Equation 39).

Ranging error rate=number of distance detection errors/number of total distance detections (39).

Here, a distance detection error occurs when the error from the target value is equal to or more than 30 cm.

The user identification method will now be described. The UWB-IR system and the system of the present invention employ different user identification methods. The difference between the user identification methods of the two systems depends on the difference in the method of placing the waveforms in one time frame. The method of placing the waveforms in one time frame of the UWB-IR system and the placement method of the present invention are shown in Table 3 below.

| User identification method |
|---|
| UWB-IR |
| Placement of monocycles in eight positions in one frame by means of TimeHopping |
| Proposed UWB-CHIRP |
| Provision of bandwidths produced by dividing 3 GHz into 8 equal parts and placement of eight chirp waveforms |

Figure 30:
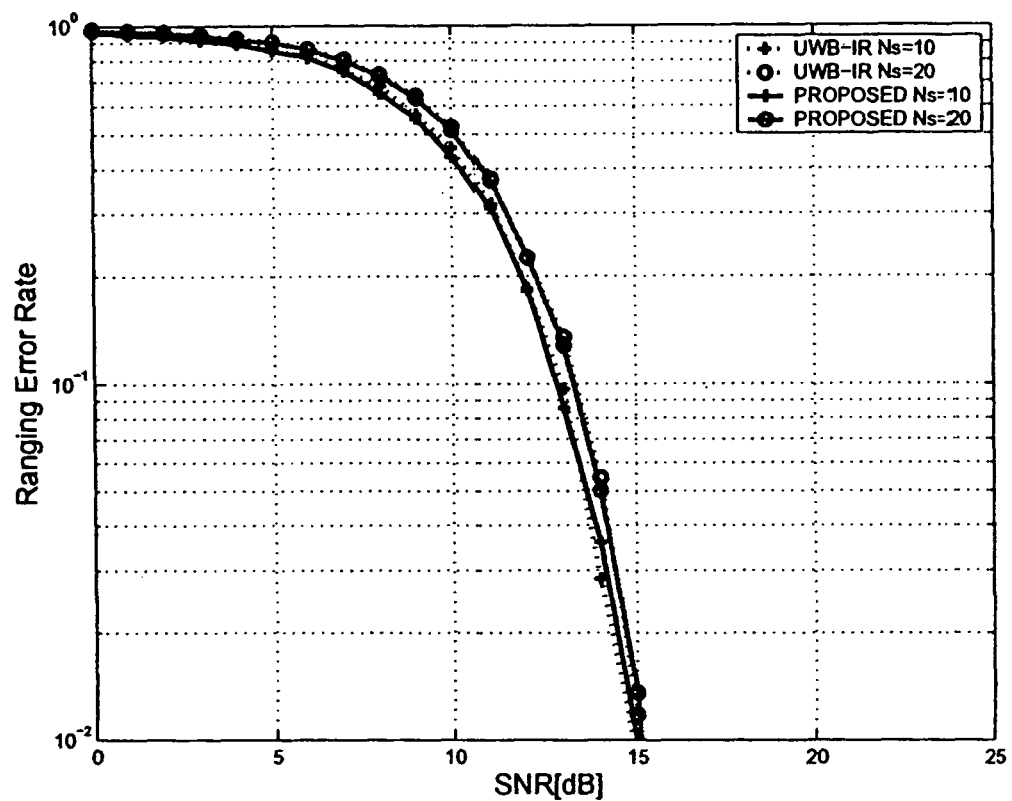
FIG. 30 shows the ranging error rate when there is one user.

A comparison for when there is a single user is performed. The ranging error rate of the two systems when no other vehicles are present is shown in FIG. 30. The SNR (signal power versus noise power ratio) changes from 0 dB to 25 dB.

Looking now at FIG. 30, it can be seen that when the number of time-frame repetitions $N_s$ is the same when there is one user, no difference is observed between the UWB-IR system and the system of the present invention. Based on this fact it can be said that the ranging performance of the UWB-IR system and that of the system of the present invention when other vehicles are not present are equal.

This is thought to be because the used bandwidths are the same and the distance resolution of the waveforms are equal in the two systems.

When the number of time frame repetitions is 10 and 20, the ranging error rate is slightly worse when there are 20 time frame repetitions. This means that, to the extent where the number of time frame repetitions increases, the duration of the transmission wave used in one range increases and the maximum distance permitting ranging is extended. As a result, because the maximum distance for error detection increases, in a comparison of the ranging error rate, it is thought that the results are worse when there are 20 time frame repetitions.

A comparison when there are multiple users will now be described.

Figure 31:
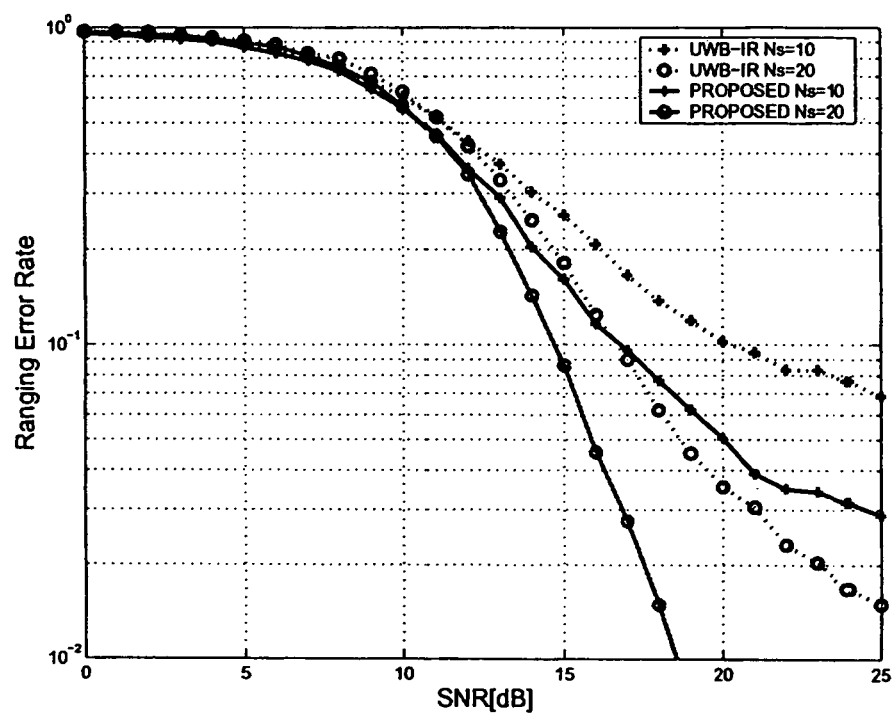
FIG. 31 shows the ranging error rate when there are nine other vehicles.

Thereafter, the ranging error rate of the UWB-IR system and that of the system of the present invention when there are multiple users are determined and shown in FIG. 31. Suppose that the number of other vehicles is 9 and the SNR changes from 0 dB to 25 dB. Further, suppose that the SIR (signal power versus interference power ratio) is 0 dB.

As a result, when other vehicles are present, it can be seen that the system of the present invention is able to improve the ranging error rate relative to that of the UWB-IR system when the number of time frame repetitions is 10 and 20. This is because, when a chirp wave is used, eight waveforms are orthogonal with respect to frequency. It is therefore thought that the peak does not readily rise in the wrong position in comparison with a case where a monocycle wave is used.

Because the user differentiation performance rises when the number of time frame repetitions is 20, the ranging error rate is better than when the number of time frame repetitions is 10 for both the UWB-IR system and the system of the present invention.

A comparison of a case where the D/I ratio is changed will now be described. As mentioned earlier, it is known that the system of the present invention is able to improve the ranging error rate in a multi-user environment. Here, the ranging error rates of the UWB-IR system and the system of the present invention when the number of interference waves and the power are changed by changing the D/I ratio (desired signal versus interference signal ratio) are compared.

Figure 32:
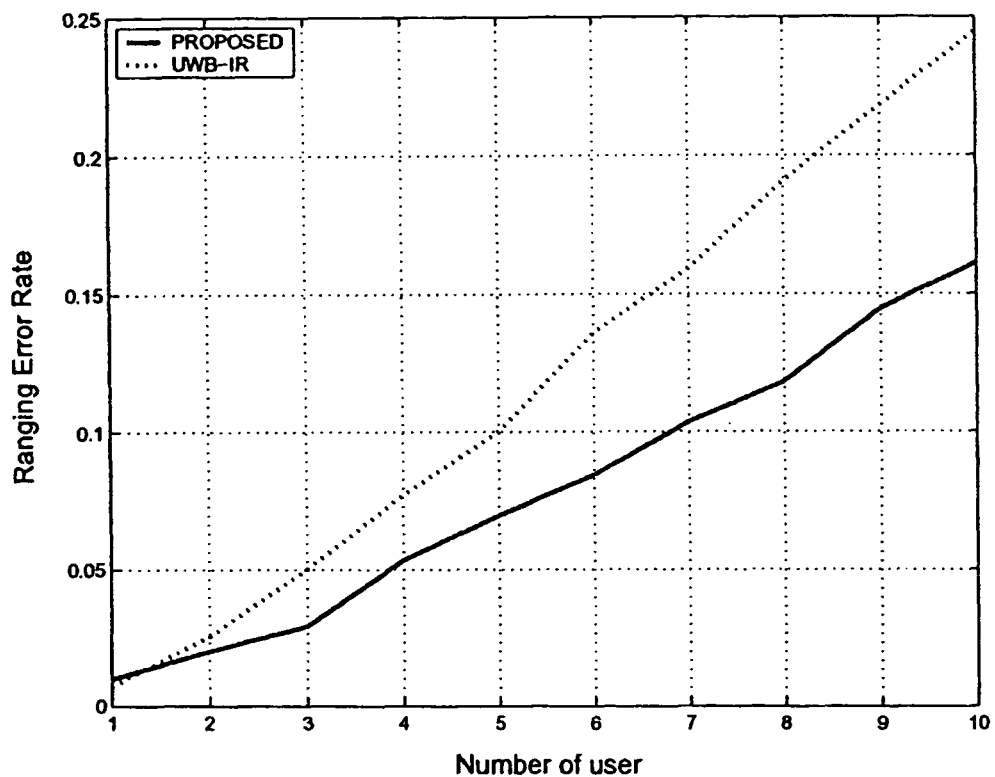
FIG. 32 shows the ranging error rate when the number of users is changed.

A comparison when the number of users changes will now be described. The ranging error rate when the number of users is changed is shown in FIG. 32. The SNR is fixed at 15 dB, the SIR is fixed at 0 dB, and the number of users is changed from 1 to 10. As a result, as the number of users increases, a difference arises in the ranging error rate of the system of the present invention and the UWB-IR system and it can be seen that the improvement in the ranging error rate of the system of the present invention is considerable. It is thought that orthogonality with respect to frequency of the chirp waveforms used by the system of the present invention is related to an improvement in characteristics.

Figure 33:
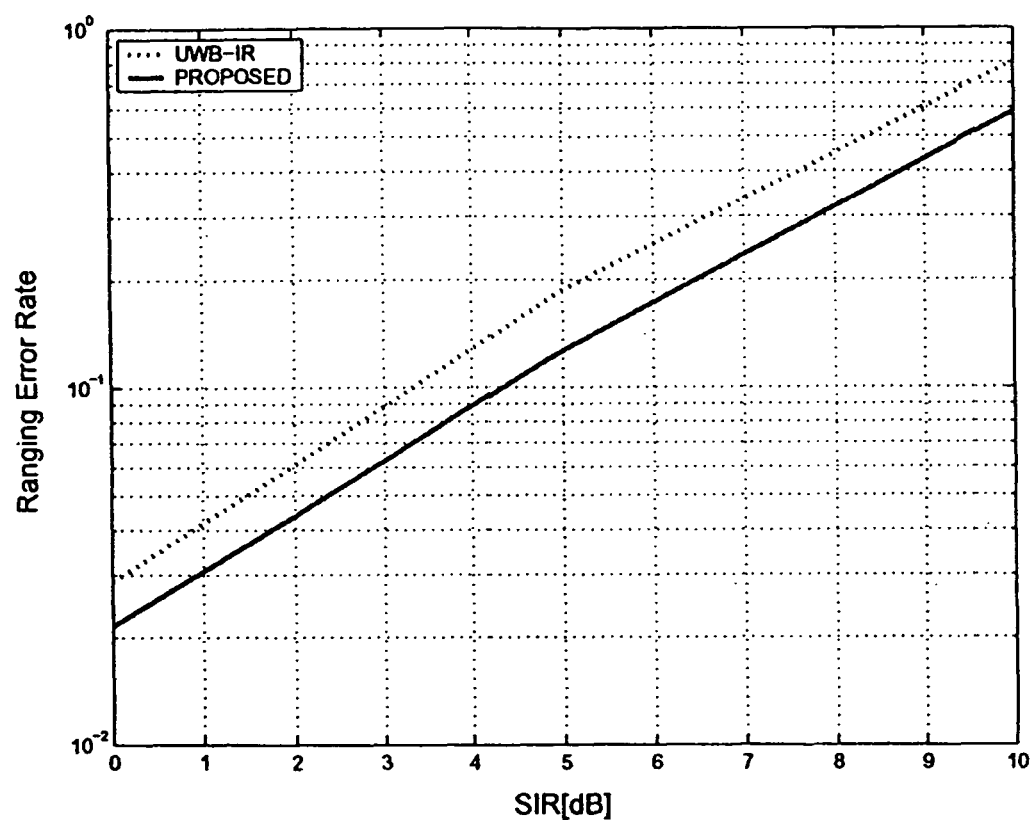
FIG. 33 shows the ranging error rate when the interference wave power changes.

A case where the interference power changes will now be described. The ranging error rate when the interference power is changed is shown in FIG. 33. The SNR is fixed at 15 dB, the number of other users is fixed at 1, and the SIR is changed from 0 dB to 10 dB.

As a result, although the system of the present invention is able to improve the ranging error rate because of a state where other vehicles are present, there is no change in the difference in the ranging error rate from that of the UWB-IR system as a result of the change in the SIR. As a result, the system of the present invention affords no exceptional advantage with respect to a change in the power of other users.

Therefore, by making the chirp waveform the usage waveform instead of an impulse in an intervehicular UWB ranging system, the ranging performance that is the same as that with an impulse is obtained while suppressing the peak power during transmission. Further, when there are multiple users, the ranging error rate can be improved over that obtained with an impulse and the improvement in the ranging error rate becomes more considerable as the number of other users increases.

An aspect in which a time pulse shape that satisfies the desired frequency characteristic is generated by adjusting the parameters on the time axis of a single pulse by using a chirp waveform will now be described.

It is thought that spectrum modification of a chirp waveform is performed by increasing the number of waves in 1 ns or extending the duration.

Figure 34:
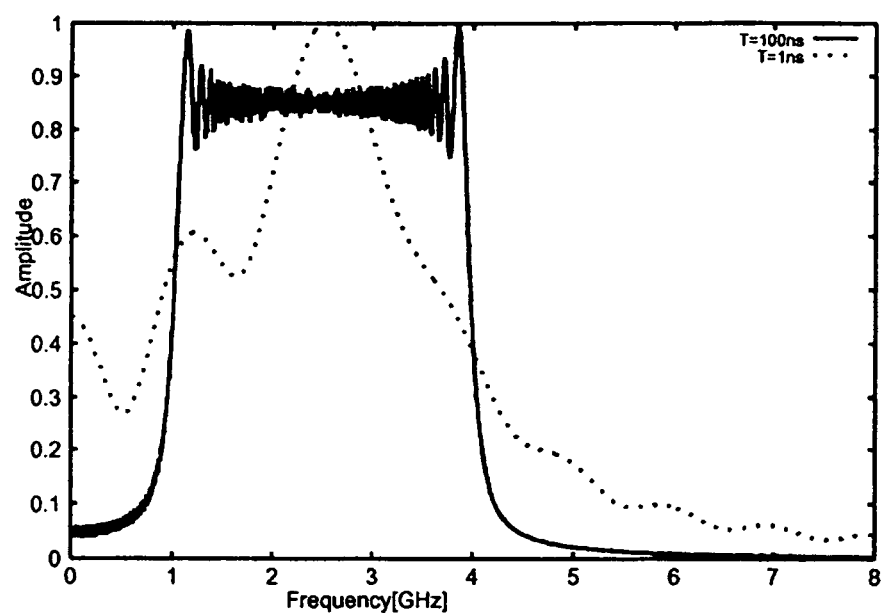
FIG. 34 shows a spectrum diagram when the duration is changed.

FIG. 34 is an example in which the duration is extended to 100 ns. As shown in FIG. 34, modification in which the spectrum is enlarged uniformly can be performed over 1 to 4 GHz.

Figure 35:
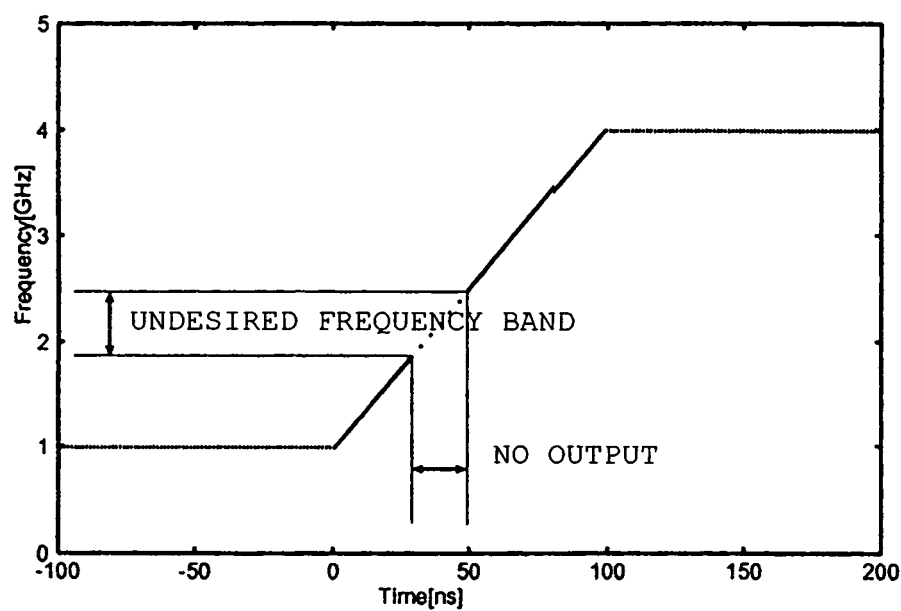
FIG. 35 serves to illustrate a method for temporarily ending the output.

Further, the spectra of unwanted frequency bands can be suppressed by temporally suppressing the size of the output of the chirp signal. FIG. 35 illustrates a method for temporally stopping the output. In FIG. 35, the frequency bandwidth from 1.6 GHz to 2.5 GHz is suppressed on the frequency axis by stopping the output in the part t=30 ns to 50 ns. As a result, a notch appears in the frequency at 1.8 GHz to 2.5 GHz.

Further, as another method for spectrum modification of a chirp waveform, a method that changes the envelope function of the chirp waveform will now be described.

The phase modulation function of the chirp waveform is $$\theta(t) = 2(\mu t^2/2 + f_0 t)$$

and the transmission waveform s(t) is $$s(t) = a(t)\sin(\theta(t)) \quad (0 < t < T).$$

a(t) is the envelope function.

A function that reflects the window function in the envelope function is used. Here, a function that reflects a Hanning window between t=30 ns and 50 ns is used. The envelope function of the transmission waveform s(t) is changed from a(t)=1 T=20

$$a(t) = 1 - (1 + \cos \pi t/T)/2 \quad (0 < t < T).$$

Figure 36:
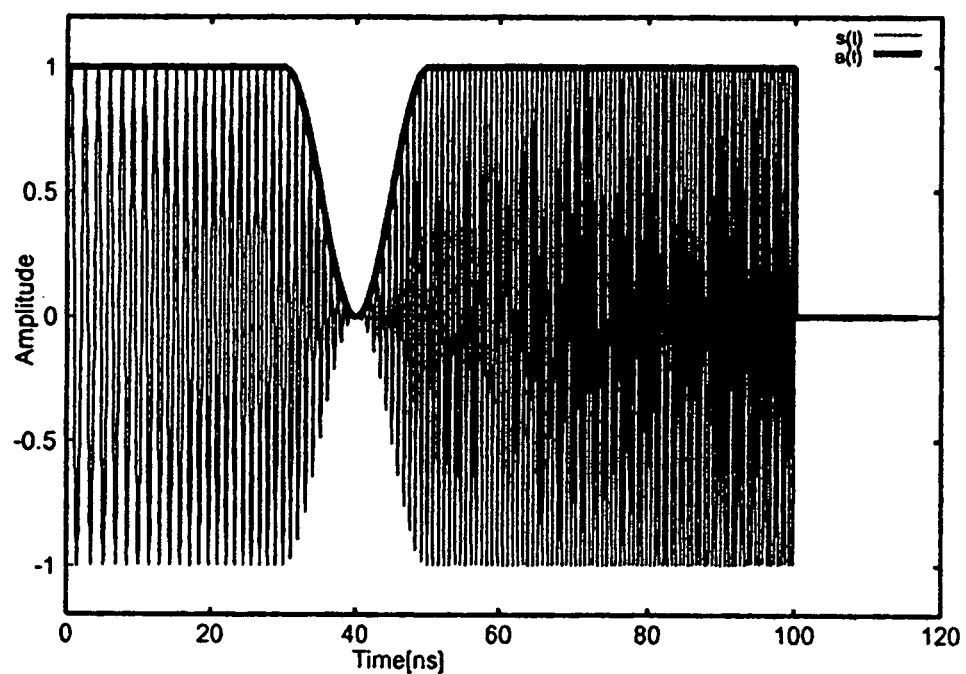
FIG. 36 shows a waveform that changes the envelope function.
Figure 37:
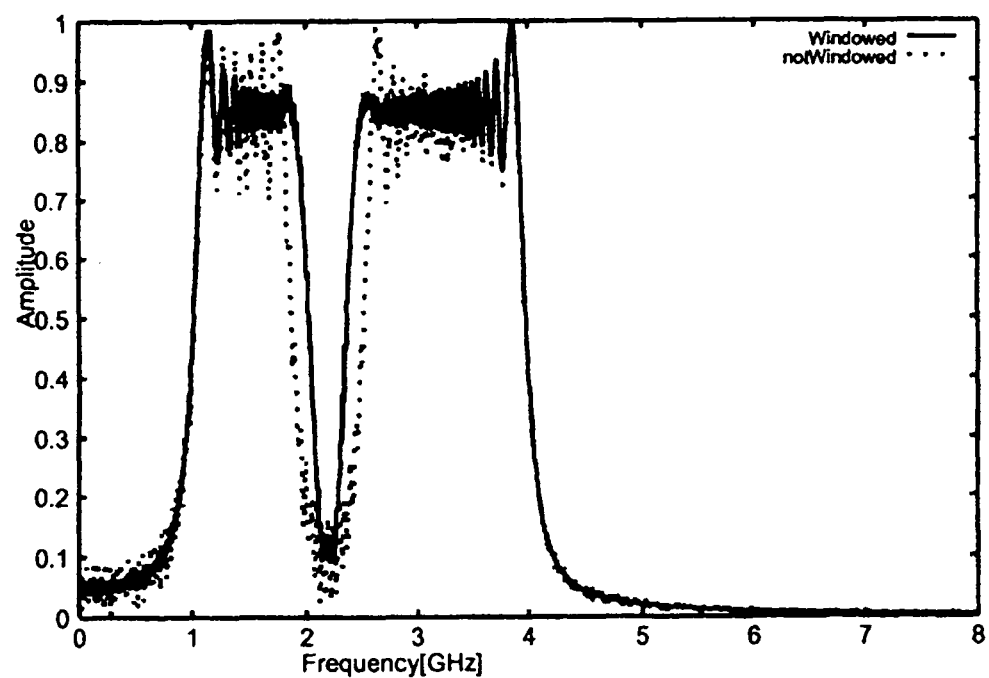
FIG. 37 is a spectrum diagram for a case where a chirp waveform is ended at a midway point.

The waveform s(t) and envelope function a(t) at this time are shown in FIG. 36 and the output is shown in FIG. 37.

As described above, the spectrum can be changed by temporally changing the waveform output for the chirp waveform. There is an advantage with the chirp waveform that the spectrum can be changed by means of a weighting of the amplitude in the temporal region.

Further, linear cycle modulation, which linearly modulates the cycle, may also be considered. Accordingly, the frequency can be reduced while being inversely proportional to the inverse of the time instead of moving linearly.

Further, spectrum modification of the chirp waveform can be performed by multiplying the chirp waveform by a PN sequence.

Figure 38:
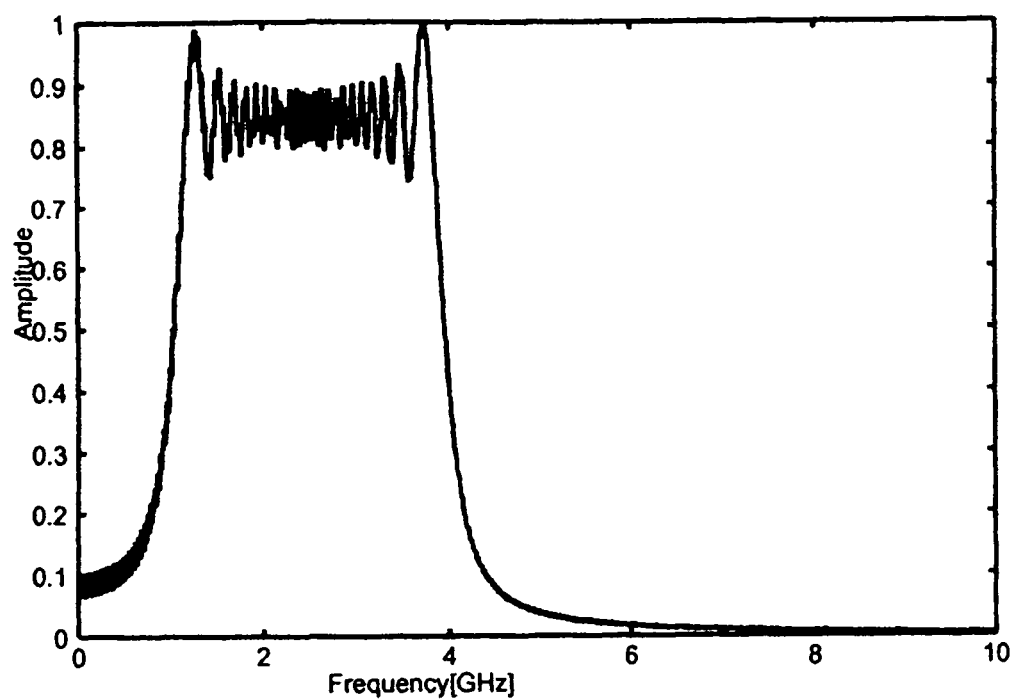
FIG. 38 shows a spectrum output of a chirp waveform.
Figure 39:
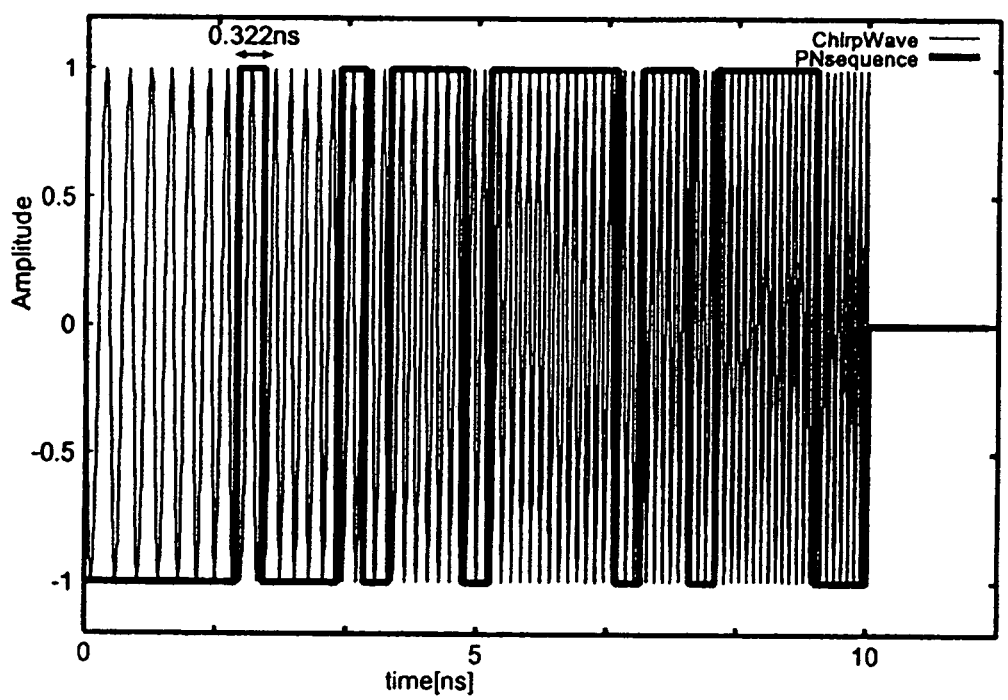
FIG. 39 shows a chirp waveform multiplied by a PN sequence.

FIG. 38 is the spectrum output of the chirp waveform. Multiplication of the chirp waveform by the PN sequence results in FIG. 39. The spectrum output of the chirp waveform multiplied by the PN sequence results in FIG. 40.

Figure 40:
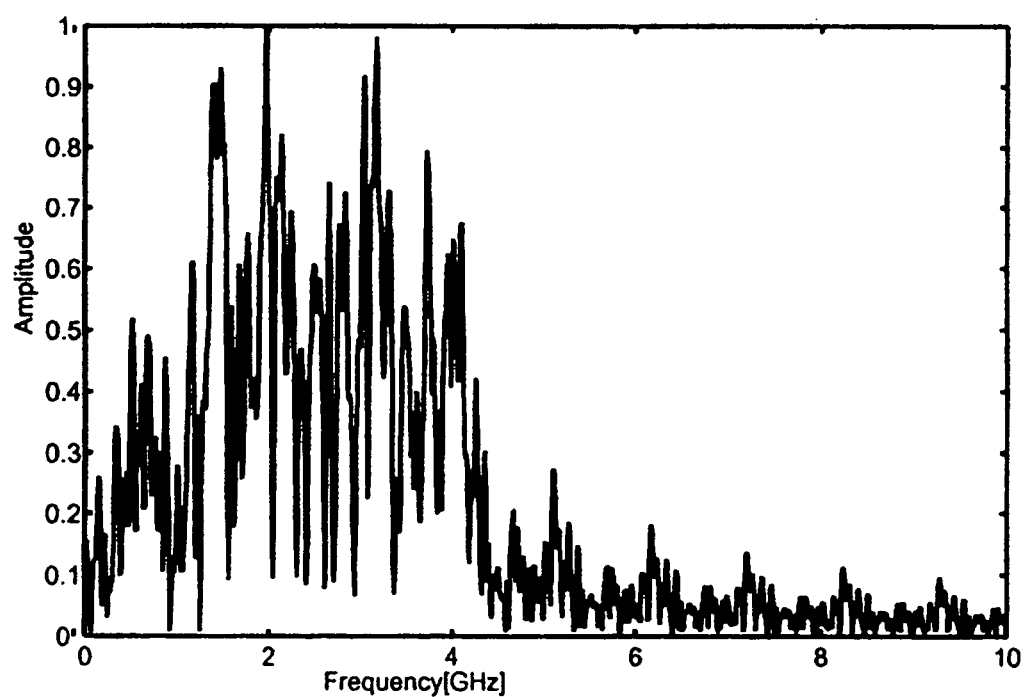
FIG. 40 shows a spectrum output following multiplication by a PN sequence.

When the chirp waveform is simply multiplied by the PN sequence, as shown in FIG. 40, an increase in the bandwidth and an increase in the sidelobe occur, and the problem of interference with other users arises. Methods of suppressing this problem include, for example, a method of specifying a certain position of the interference pulse by continuously taking a correlation of one bit's worth of time before transmitting an own-user signal or a method of delaying an own-user signal so that same does not hit an interference pulse (or has a small number of hits).

A second aspect in which a pulse signal with a desired frequency characteristic is generated by combining a plurality of pulses will be described next.

The second aspect of the present invention generates a time pulse shape that satisfies the desired frequency characteristic by setting a plurality of single pulses on the time axis.

The second aspect of the present invention includes a method of forming a dualcycle signal by setting the same two single pulses on the time axis as a first embodiment, a method of superposing a plurality of single pulses with different pulse widths as a second embodiment and a method of superposing a plurality of single pulses with different pulse widths and waveforms as a third embodiment. A time pulse shape that satisfies the desired frequency characteristic is generated by adjusting the gap between the two single pulses, the respective pulse widths of the plurality of single pulses, and the respective pulse widths and waveforms of the plurality of single pulses. According to each of these embodiments, a notch can be formed at an optional frequency.

Further, in a fourth embodiment, a plurality of pulses of different orders are generated by using a modified Hermite polynomial.

First, a first embodiment in which a dualcycle signal is formed by setting the same two single pulses on the time axis will be described.

Figure 41:
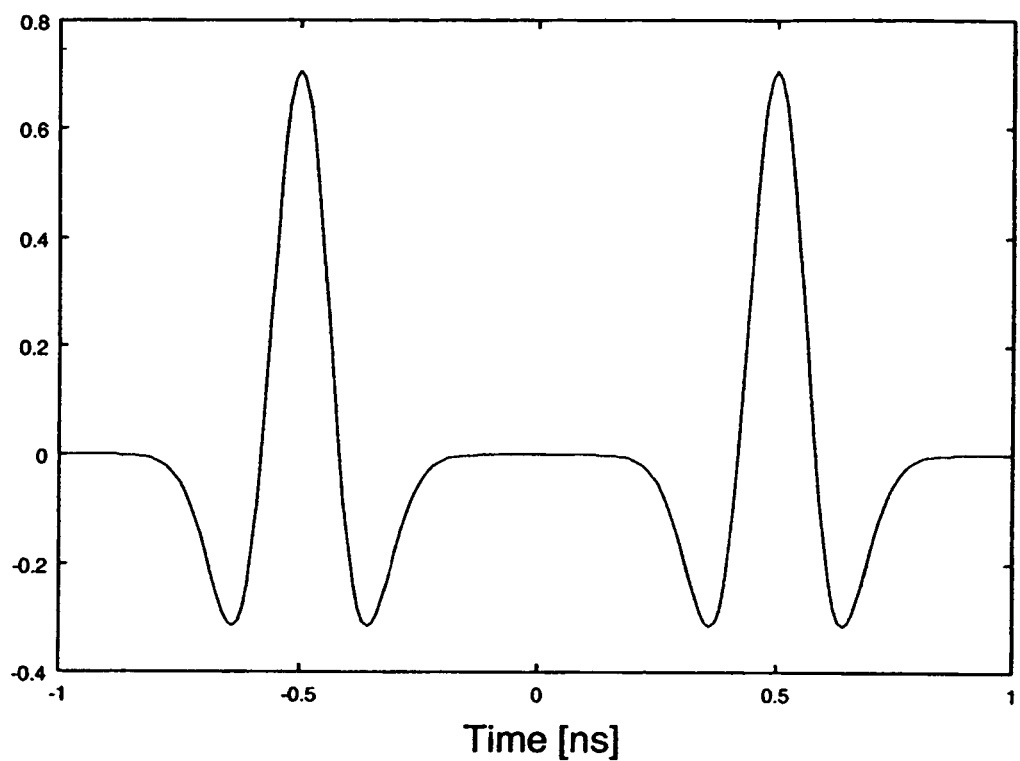
FIG. 41 shows a dualcycle waveform.
Figure 42:
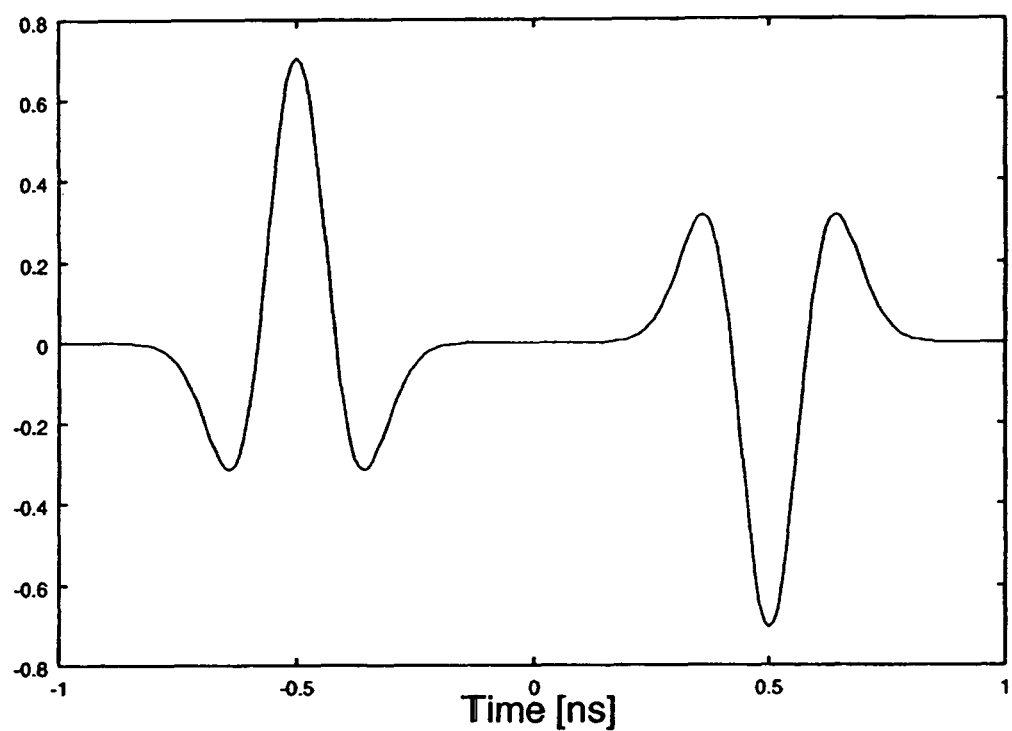
FIG. 42 shows a dualcycle waveform.

According to the first embodiment, a dualcycle that is a set of two monocycles is used. The dualcycle is expressed by Equations (39) and (40) and shown in FIGS. 41 and 42.

$$w_2(t) = \frac{1}{\sqrt{2}}(w_{rec}(t + \tau/2) + w_{rec}(t - \tau/2)) \quad (39)$$

$$w_3(t) = \frac{1}{\sqrt{2}}(w_{rec}(t + \tau/2) - w_{rec}(t - \tau/2)) \quad (40)$$

where τ is the time duration between monocycles.

Figure 43:
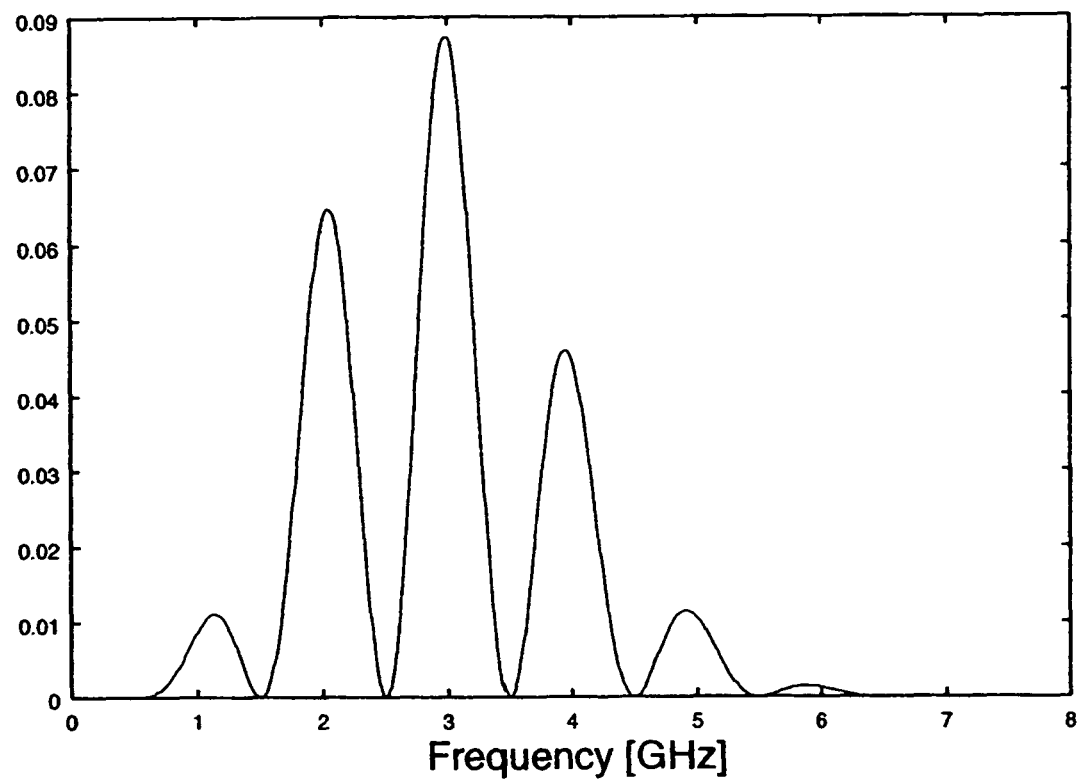
FIG. 43 shows a dualcycle power spectrum output.
Figure 44:
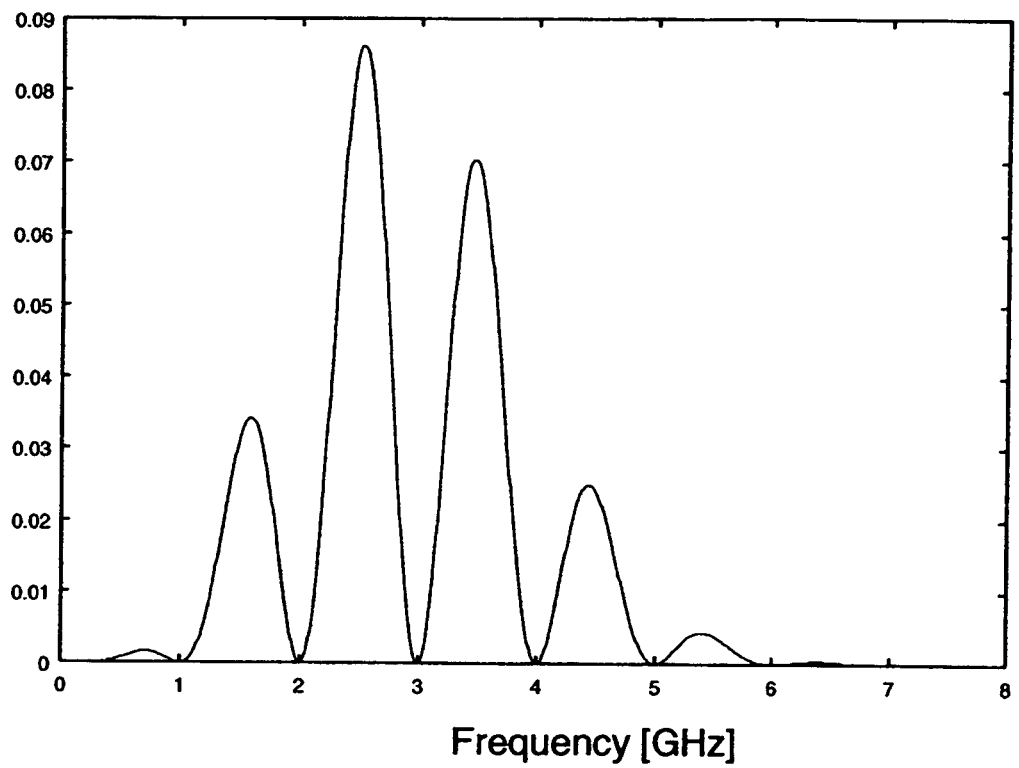
FIG. 44 shows a dualcycle power spectrum output.

Further, in the frequency region, the dualcycles are expressed by Equations (41) and (42) and by FIGS. 43 and 44.

$$W_2(\omega) = \frac{1}{\sqrt{2}}\left(\exp\left(\frac{j\omega\tau}{2}\right) + \exp\left(-\frac{j\omega\tau}{2}\right)\right)W_{rec}(\omega) \quad (41)$$

$$= \frac{2}{\sqrt{2}}\cos\frac{\omega\tau}{2}W_{rec}(\omega)$$

$$W_2(\omega) = \frac{1}{\sqrt{2}}\left(\exp\left(\frac{j\omega\tau}{2}\right) - \exp\left(-\frac{j\omega\tau}{2}\right)\right)W_{rec}(\omega) \quad (42)$$

$$= \frac{2}{\sqrt{2}}\sin\frac{\omega\tau}{2}W_{rec}(\omega)$$

Thus, a time pulse shape that satisfies the desired frequency characteristic can be generated by forming a dualcycle signal by setting monocycles (single pulses) on a time line.

Here, Equation (39) is dualcycle 1 and Equation (40) is dualcycle 2. Based on Equations (39) and (40), the attenuation depends on the duration between two monocycles. Assuming that the center frequency of an existing wireless system is in the attenuation region, the interference can be reduced. When dualcycle 1 is used, attenuation arises when $\omega=(2n+1)\pi/\tau$ (n is an integer) and when dualcycle 2 is used, attenuation occurs when $\omega=2n\pi/\tau$ (n is an integer) is used.

Here, supposing that $\omega 0$ is the center frequency of a coexisting wireless system, the interference decreases when dualcycle 1 satisfies $\tau=(2n+1)\pi/\omega 0$ and dualcycle 2 satisfies $\tau=2n\pi/\omega 0$.

Based on the above equations, if $\tau$ is large, the bandwidth of the attenuation is reduced. When there is a multiplicity of coexisting wireless systems, the above conditions must be satisfied for the center frequency of all the coexisting wireless systems, $\tau$ is large and the bandwidth of the attenuation narrows.

According to the method for forming a dualcycle signal by setting the monocycles (single pulses) on the time axis, the addition of a new constitution to an existing system can be freely constituted and the hardware can be simply constituted.

The second embodiment that superposes a plurality of single pulses of different pulse widths will be described next.

In the second embodiment, according to Equation (22) in the frequency region of the monocycle, the peak frequency $\omega p$ of the power spectrum is $\omega p=\sqrt{(8\pi)}/\tau m$ and the peak amplitude Ap is $Ap=\sqrt{2}\cdot\exp(-1)A\tau m$. Therefore, $\omega p$ is proportional to $\tau m$, and Ap is inversely proportional to $\tau m$. Further, the time duration of the monocycle is proportional to $\tau m$.

That is, $\omega p$ and Ap can be controlled by $\tau m$. Therefore, attenuation can be adjusted by controlling $\omega p$ and Ap in the power spectrum.

Thus, a time pulse shape that satisfies the desired frequency characteristic can be generated by overlapping monocycles of different time durations.

The reduction of interference that employs monocycles of different time durations will be described next. Suppose that the monocycles when $\tau m=\tau m0$ are $W_{\tau m0}(t)$, $W_{\tau m0(\omega)}$ and that the frequency of the peak of the power spectrum is $\omega po$ and that the size is Apo.

Further, when the center frequency of a coexisting system is $\omega 1$, a pulse with a spectrum that is attenuated at $\omega 1$ is formed.

First, a monocycle $\omega \tau m1(t)$ in which the power spectrum peak is frequency $\omega 1$ and the size of which is $W_{\tau m0}(\omega 1)$ is formed. Here, $\tau m1=\sqrt{(8\pi)}/\omega 1$.

Here, a new waveform $w_{d1}(t)$ is formed.

$$w_{d1}(t) = w_{\tau m0}(t) - \frac{|W_{\tau m0}(\omega_1)|}{|W_{\tau m1}(\omega_1)|} w_{\tau m1}(t) \qquad (43)$$

The power spectrum $|W_{d1}(\omega)|^2$ is attenuated at $\omega 1$.

Further, when the center frequency of another coexisting system is $\omega 2$, a pulse with a spectrum that is attenuated at $\omega 2$ is formed.

A monocycle $W_{\tau m2}(t)$ in which the power spectrum peak is the frequency $\omega 2$ and the size of which is $W_{\tau m0}(\omega 2)$ is formed.

$$w_{d2}(t) = w_{d1}(t) - \frac{|W_{d1}(\omega_2)|}{|W_{\tau m2}(\omega_2)|} w_{\tau m2}(t) \qquad (44)$$

Further, the following conditions are satisfied:

$\omega 2 < \omega 1$ $W2(\omega 1) \approx 0$

Figure 45:
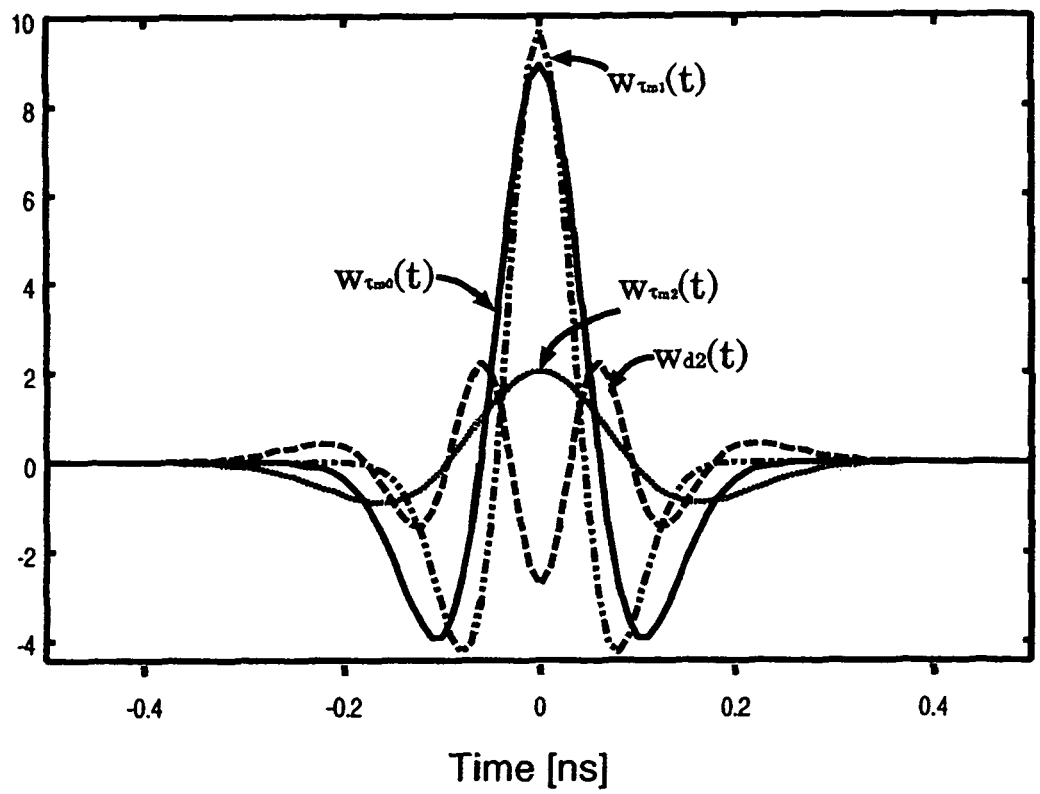
FIG. 45 shows a waveform composed of monocycles with different time duration.
Figure 46:
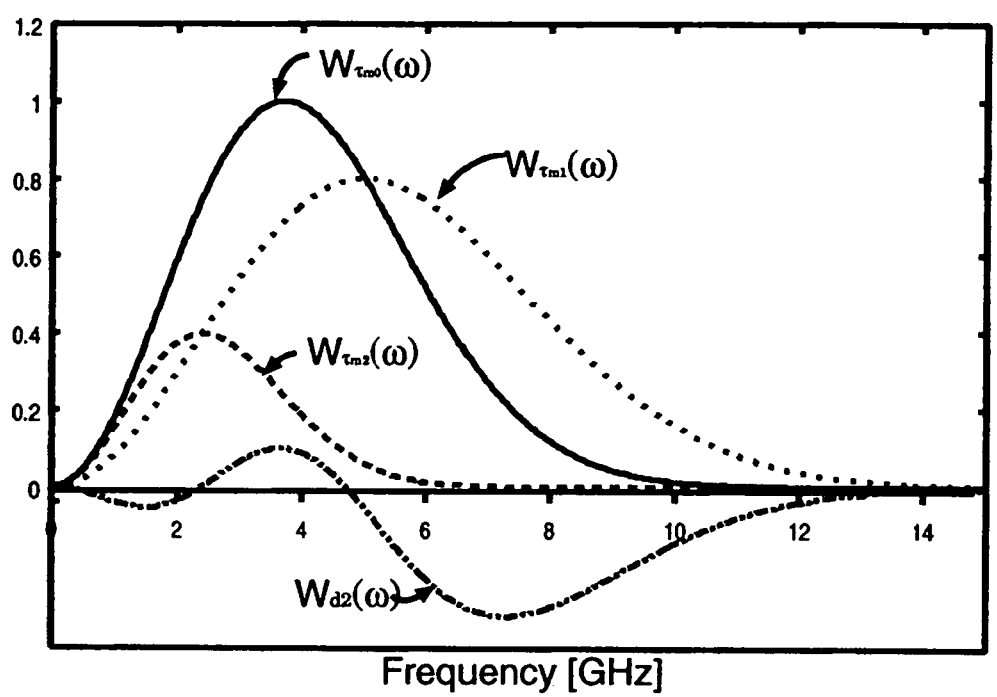
FIG. 46 shows the frequency characteristic of a monocycle waveform.
Figure 47:
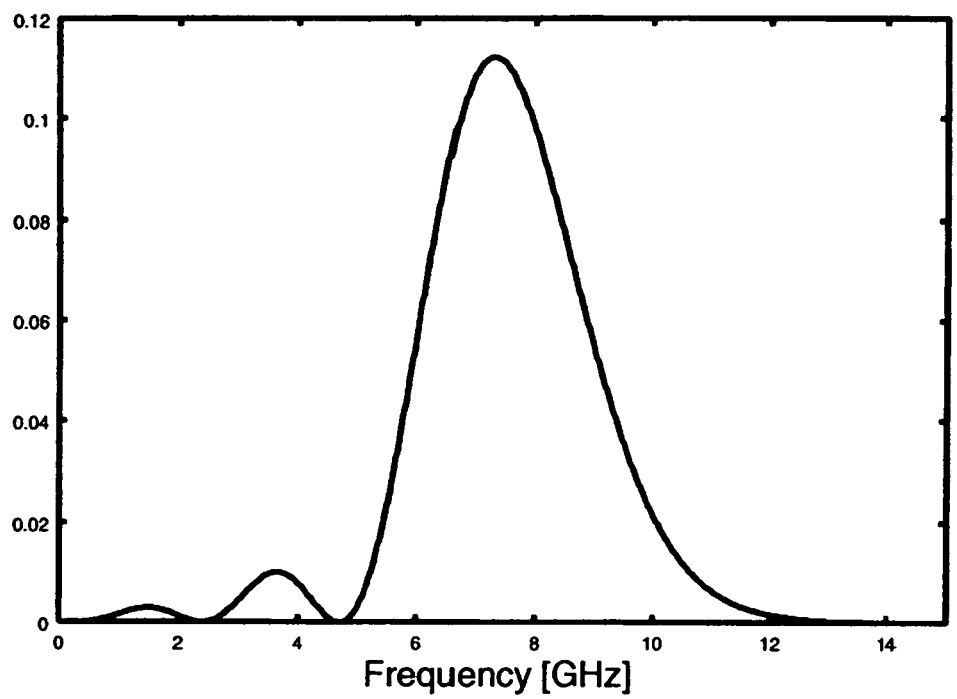
FIG. 47 shows the power spectrum of the monocycle waveform.
Figure 48:
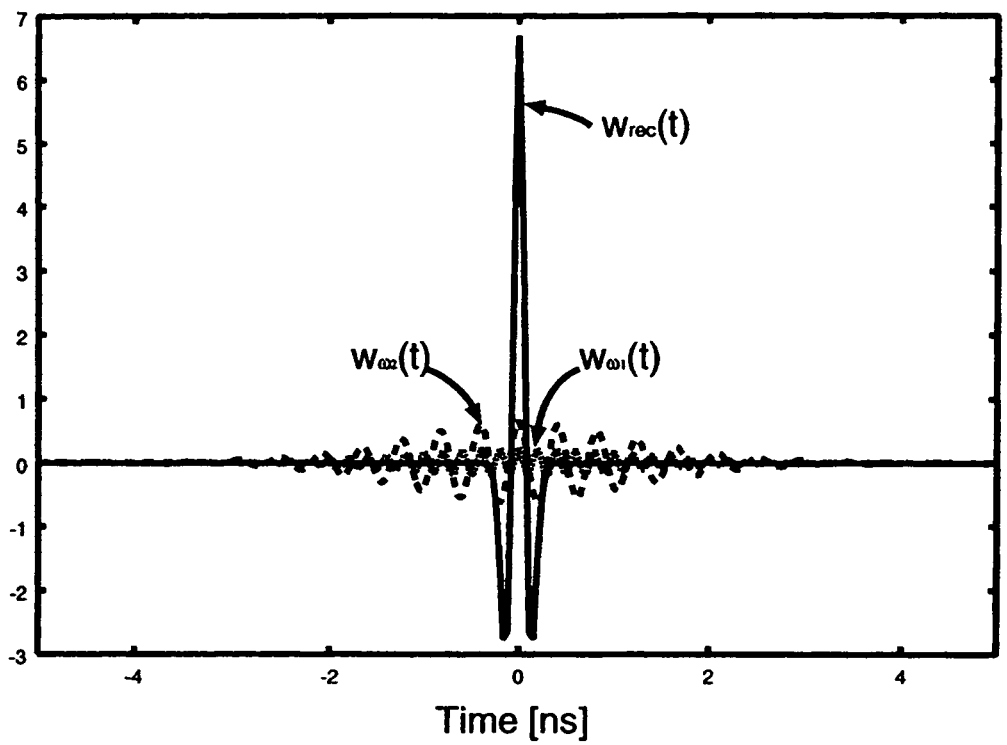
FIG. 48 shows the waveform for making pulse.
Figure 49:
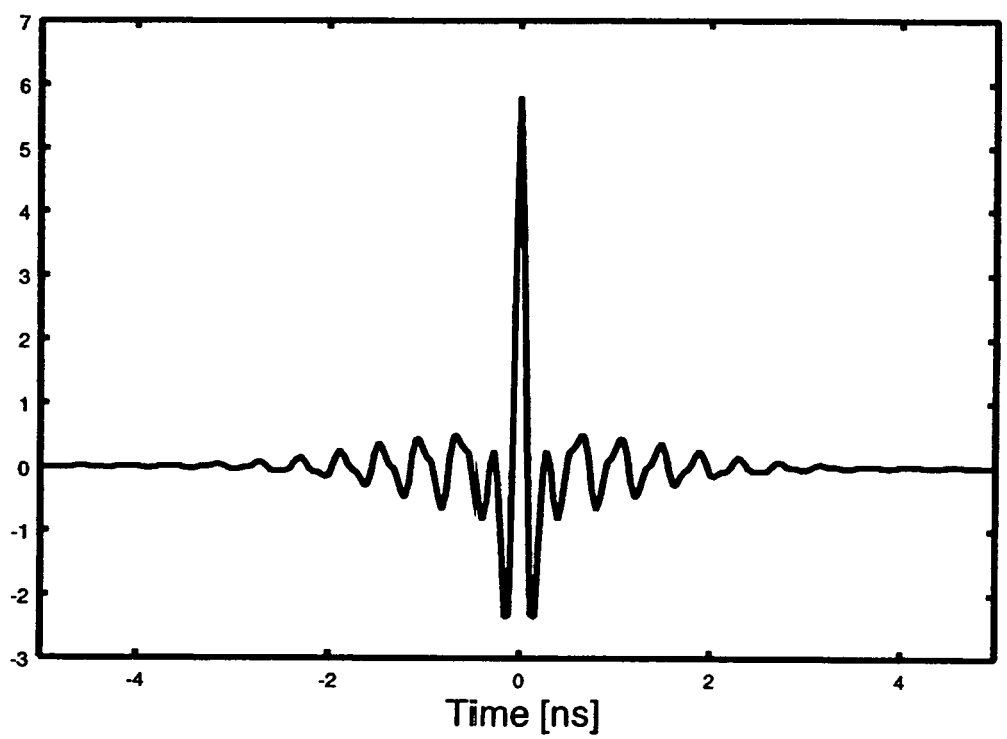
FIG. 49 shows the pulse waveform thus formed.
Figure 50:
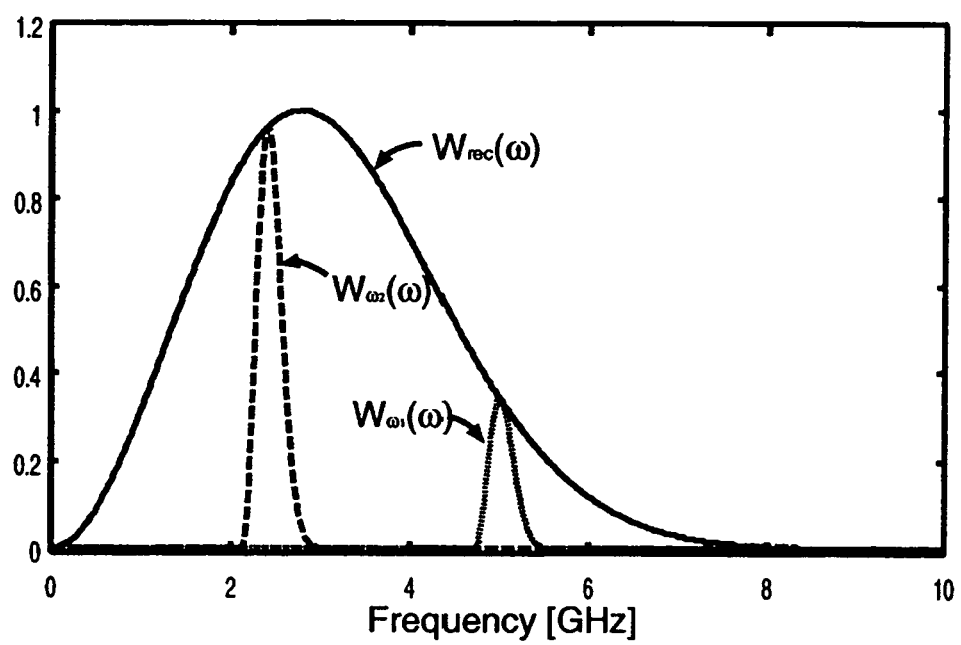
FIG. 50 shows the frequency characteristics of $w_{rec}$, $w_\omega 1$, $w_{\omega 2}$.
Figure 51:
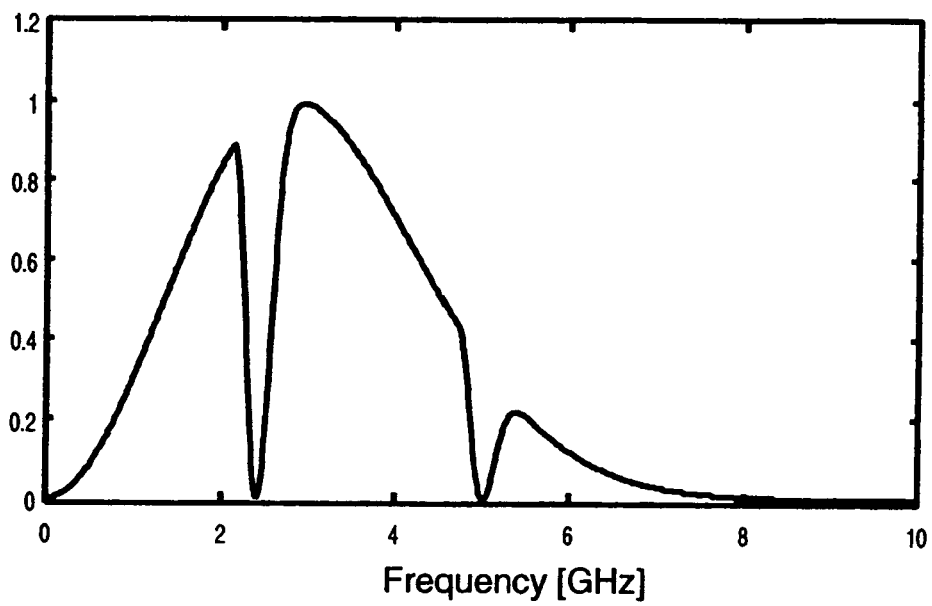
FIG. 51 shows the frequency characteristic of $w_x$.

FIGS. 45 to 47 show a 2.4 GHz and 5.0 GHz attenuation example. In FIG. 47, the 2.4 GHz and 5.0 GHz attenuation is substantially 0. If this waveform is used, the interference of the system with a center frequency can be suppressed to 2.4 GHz and 5.0 GHz. If the conditions are satisfied, more preferable attenuation can be obtained.

The third embodiment, in which a plurality of single pulses of different pulse widths and waveforms are superposed, will be described next.

In the third embodiment, a pulse signal with the desired frequency characteristic is generated by superposing a plurality of single pulses with different pulse widths and waveforms.

Here, the waveform $w_{\omega 0}(t)t$ and frequency characteristic $W_{\omega 0}(\omega 0)$ are used.

$$w_{\omega_0}(t) = \cos\omega_0 t \exp\left(-2\pi \frac{t^2}{(\alpha\tau_m)^2}\right) \qquad (45)$$

$$W_{\omega_0}(\omega) = \frac{\alpha\tau_m}{\sqrt{2}}\left(\exp\left(-\frac{(\omega-\omega_0)^2(\alpha\tau_m)^2}{8\pi}\right) - \exp\left(-\frac{(\omega+\omega_0)^2(\alpha\tau_m)^2}{8\pi}\right)\right) \qquad (46)$$

$\alpha\tau m$ is a parameter that specifies a pulse duration. Based on Equation (46), the peak frequency of the power spectrum is $\omega 0$ and attenuation at $\omega 0$ can be performed by using this equation.

Where the pulses that are expressed by these equations are concerned, the waveform can be modified with $\alpha\tau m$ and/or $\omega 0$ serving as the parameters and a time pulse shape that satisfies the desired frequency characteristic can be generated. The waveform generation can involve a single pulse or the combination of a plurality of pulses and, by adjusting the parameters and superposing a plurality of single pulses of different pulse widths and waveforms, a time pulse shape that satisfies the desired frequency characteristic can be generated.

Here, when a wireless system in which center frequencies $\omega 1$ and $\omega 2$ coexist is assumed, the waveforms and frequency characteristics in which attenuation is produced at $\omega 1$ and $\omega 2$ are as follows.

$$w_x(t) = w_{rec}(t) - \frac{|W_{rec}(\omega_1)|}{|W_{\omega_1}(\omega_1)|} w_{\omega_1}(t) - \frac{|W_{rec}(\omega_2)|}{|W_{\omega_2}(\omega_2)|} w_{\omega_2}(t) \qquad (47)$$

$$W_x(t) = W_{rec}(t) - \frac{|W_{rec}(\omega_1)|}{|W_{\omega_1}(\omega_1)|} W_{\omega_1}(t) - \frac{|W_{rec}(\omega_2)|}{|W_{\omega_2}(\omega_2)|} W_{\omega_2}(\omega) \qquad (48)$$

Figure 52:
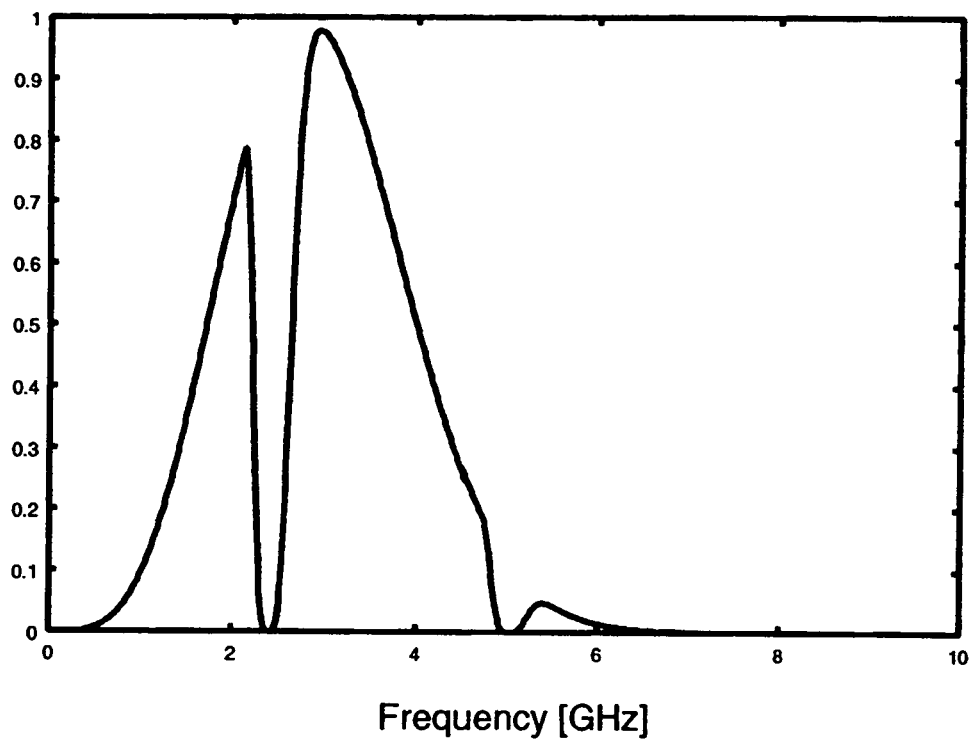
FIG. 52 shows the power spectrum of $w_x$.

FIGS. 48 to 52 shows a 2.4 GHz and 5.0 GHz attenuation example. In FIG. 52, the attenuation of 2.4 GHz and 5.0 GHz is substantially 0. If this waveform is used, the interference of a system with a center frequency can be suppressed to 2.4 GHz and 5.0 GHz. If the conditions are satisfied, more preferable attenuation can be obtained.

The formation of a waveform that satisfies the spectrum mask will be described next.

For example, the U.S. FCC illustrates guidelines for regulating UWB with respect to the transmission power and illustrates a spectrum mask for restricting UWB radiation.

Therefore, in UWB communications, there is a need to form a waveform that satisfies the spectrum mask.

The waveform formation method can be applied to the formation of a waveform that satisfies the spectrum mask.

With the spectrum mask, there are strict restrictions to 0.96 GHz to 3.1 GHz. Here, in the above method, supposing that α=10.0 and τm=0.2877, the bandwidth of $W_{\omega 0}(\omega 0)$ is substantially 1 GHz.

Here, by forming attenuation at durations of 0.5 GHz between 0.96 GHz and 3.1 GHz, the power of 0.96 GHz to 3.1 GHz can be suppressed. This method is represented by the following Equation (49).

$$w_x(t) = w_{rec}(t) - \sum_{n=0}^{k} w_{\omega_1 + nd}(t) \quad (49)$$

Here, d is the pulse duration, ω1 is the start frequency of the power restrictions, and k is the number of pulses forming the monocycle.

By establishing τm, d, ω1 and so forth as parameters, it is possible to match the spectrum mask that regulates the frequency characteristic of the pulse waveform.

Figure 53:
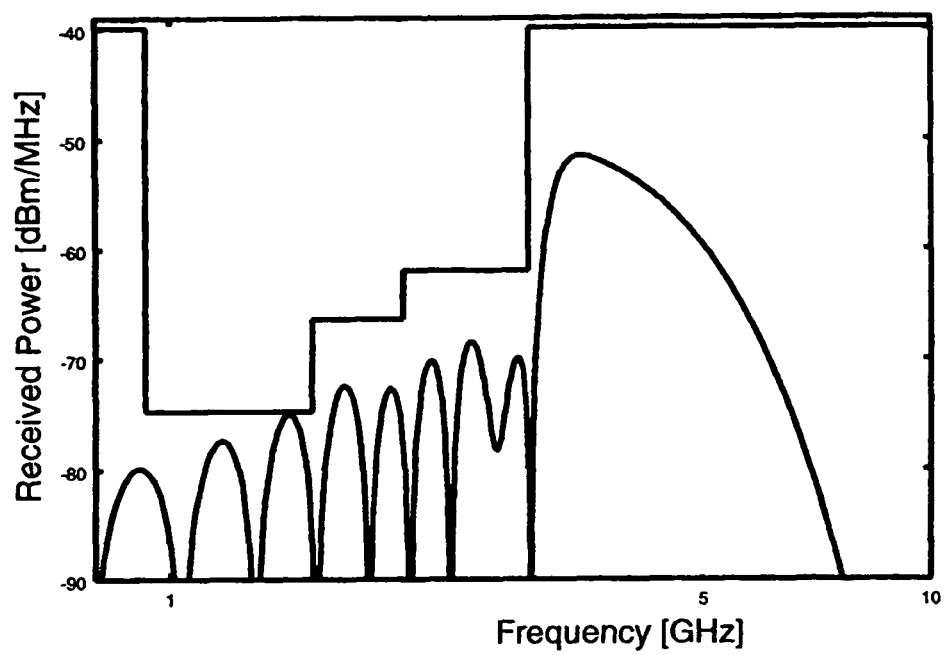
FIG. 53 shows a spectrum mask and the power spectrum of $w_x$.
Figure 54:
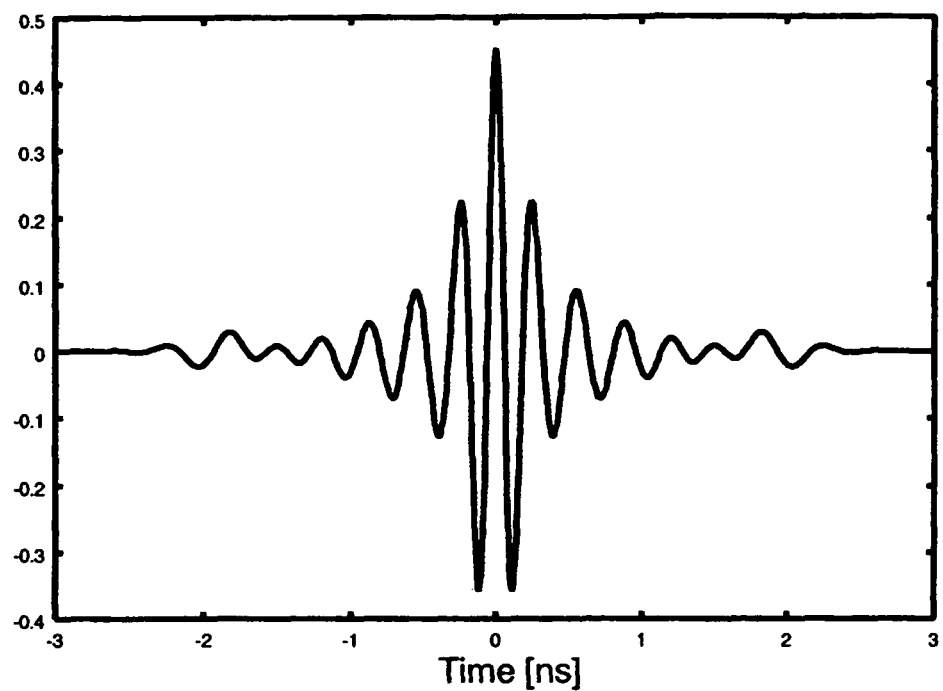
FIG. 54 shows the waveform of $w_x$.
Figure 55:
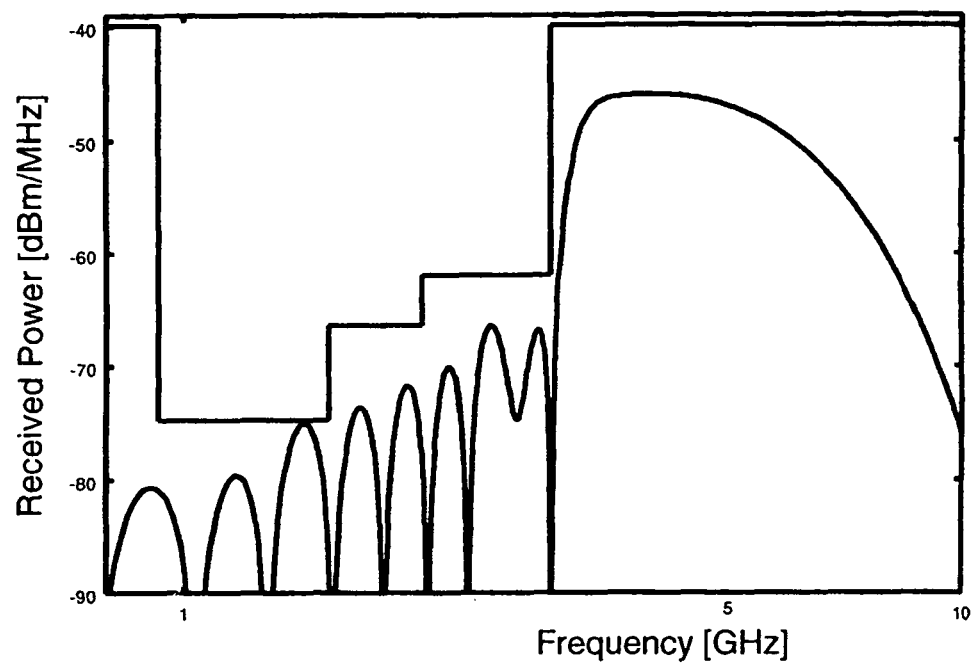
FIG. 55 shows the spectrum mask and the power spectrum of $w_x$.
Figure 56:
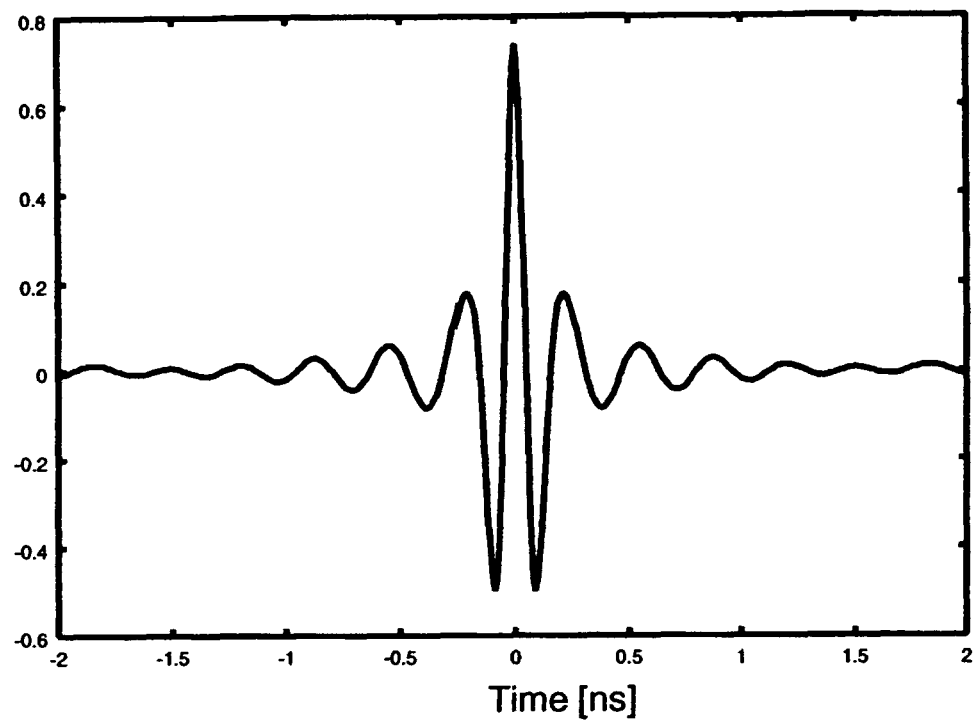
FIG. 56 shows the waveform of $w_x$.

FIGS. 53 to 56 are an example of this. FIGS. 53 and 54 are a spectrum mask, power spectrum and a pulse waveform. FIGS. 55 and 56 are an example of a power spectrum and spectrum mask with other parameters.

A case where the UWB signal and known SS signal coexist will be described.

First, the effect that a UWB signal exerts on an existing SS signal will be described.

A monocycle case will now be described. The amount of interference $dI^2$ supplied by a pulse of a UWB signal 1 to an SS receiver is expressed by the following Equation (50).

$$\sigma_I^2 = \frac{1}{T} \int_0^T \left\{ \int_0^T A w_{rec}(t-\tau) c(t) \cos \omega_c t \, dt \right\}^2 d\tau \quad (50)$$

$$\approx \frac{N}{2T} \int_0^{T_c} \left[ \left\{ \int_\tau^{\tau+T_m} A w_{rec}(t-\tau) c_0(t) \cos w_c t \, dt \right\}^2 + \left\{ \int_\tau^{\tau+T_m} A w_{rec}(t-\tau) c_1(t) \cos \omega_c t \, dt \right\}^2 \right] d\tau$$

$$c_0(t) = \begin{cases} 1 & (0 \leq t < T_c) \\ 1 & (T_c \leq t < T_c + T_m) \end{cases}$$

$$c_1(t) = \begin{cases} 1 & (0 \leq t < T_c) \\ -1 & (T_c \leq t < T_c + T_m) \end{cases}$$

Here, T denotes the 1-bit duration of an SS signal, A denotes the amplitude of the reception pulse, c(t) denotes an SS spreading code sequence, cos $\omega_c t$ denotes the sinusoidal carrier wave, N represents the number of chips per SS1 bit, $T_c$ is the duration of the SS chip, Tm represents the duration of the UWB1 pulse. The BER characteristic of SS when a UWB signal has been added can be calculated by adding the interference amount of the above equation in the number of pulses per bit to the noise power of the SNR of the SS signal.

Here, the SNR of the SS signal is expressed by Equation (51).

$$SNR = \frac{\frac{1}{2}T}{\frac{N_0}{4}T + \frac{T}{T_f}\sigma_I^2} \quad (51)$$

Tf is the UWB width and the BER of SS is expressed by Equation (52).

$$BER = \frac{1}{2} \text{erfc}\left(\sqrt{\frac{SNR}{2}}\right) \quad (52)$$

Further, DIR, PUWB, and Pss is expressed by Equations (53), (54), and (55).

$$P_{UWB} = \frac{T}{T_f} \int_0^{T_m} (A w_{rec}(t))^2 dt \quad (54)$$

$$P_{SS} = \int_0^T \cos^2 \omega_c t \, dt \quad (55)$$

Table 4 below shows the simulation conditions.

| performance parameters | |
|---|---|
| Data rate: UWB | 3.2 Mbps |
| Data rate: SS | 384 kbps |
| 3 dB bandwidth: UWB | 3.2 GHz |
| 3 dB bandwidth: SS | 3.4 MHz |
| SS chip rate($1/T_c$) | 2.64 Mcps |
| SS carrier frequency($w_c$) | 2 GHz |
| UWB pulse time duration | 0.7 ns |
| Number of Impulses per Symbol($N_8$) | 31 |
| Frame time($T_f$) | 10 ns |
| DIR | −29 dB |

Figure 57:
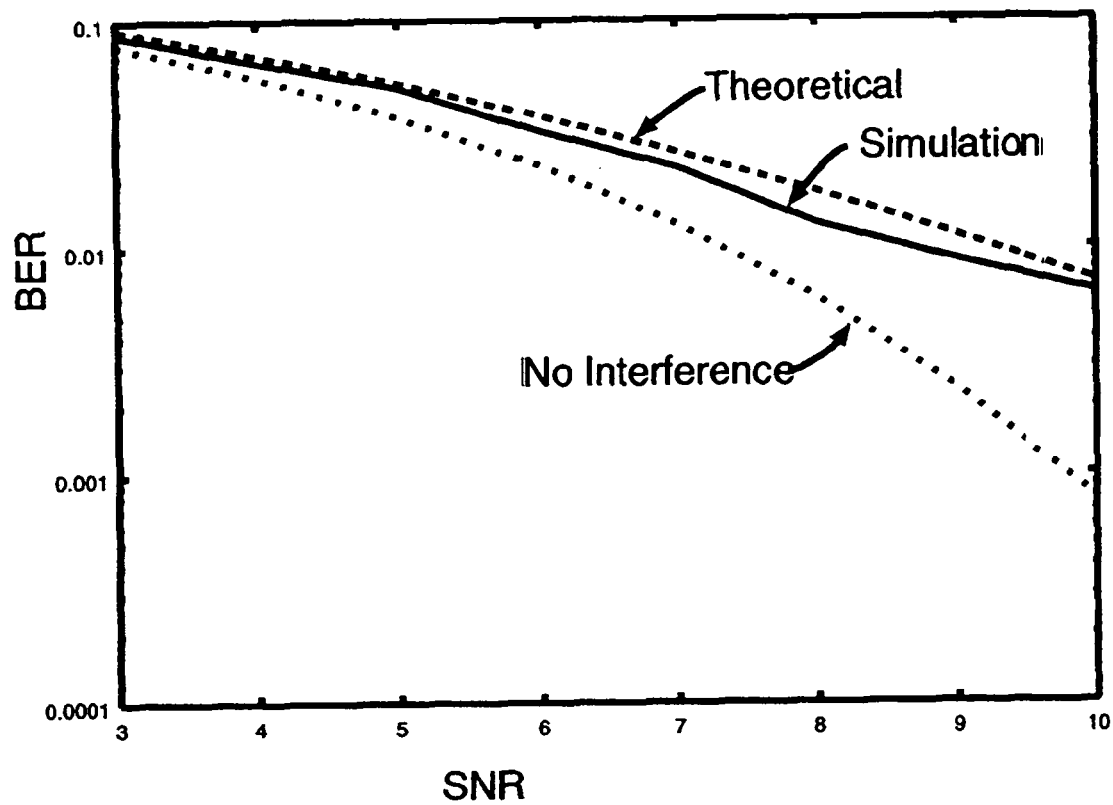
FIG. 57 shows the simulation result and a theoretical analysis of the BER of an SS system with a co-existing UWB system.
Figure 58:
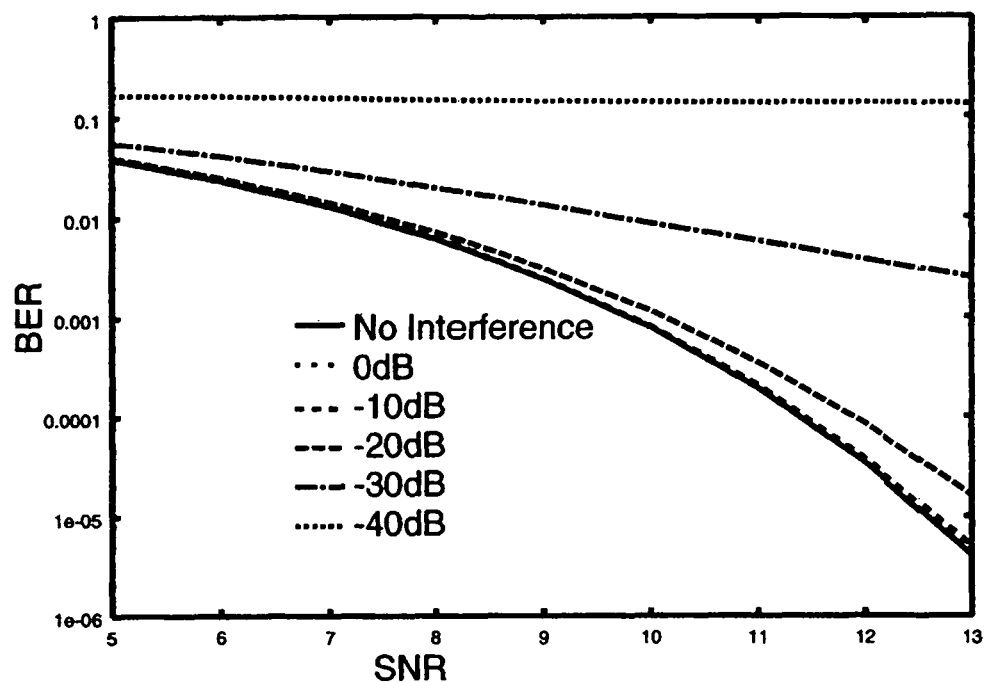
FIG. 58 shows a theoretical analysis of the BER of an SS system with a co-existing UWB system.

FIGS. 57 and 58 show the simulation results for the effect of a UWB signal on an existing SS signal.

Similarly, in a dualcycle case, the effects of a UWB signal on an existing SS signal can be simulated.

Table 5 below shows the simulation conditions.

| Performance Parameters | |
|---|---|
| Data rate: UWB | 3.2 Mbps |
| Data rate: SS | 384 kbps |
| 3 dB bandwidth: UWB | 3.2 GHz |
| 3 dB bandwidth: SS | 3.4–102 MHz |
| SS chip rate($1/T_c$) | 2.64–158.4 Mcps |
| SS carrier frequency($w_c$) | 2.5 GHz |
| UWB pulse time duration | 0.7 ns |
| dualcycle time space | 1.0 ns |
| Number of dualcycle per Symbol($N_8$) | 31 |
| Frame time($T_f$) | 10 ns |
| DIR | −29 dB |

Figure 59:
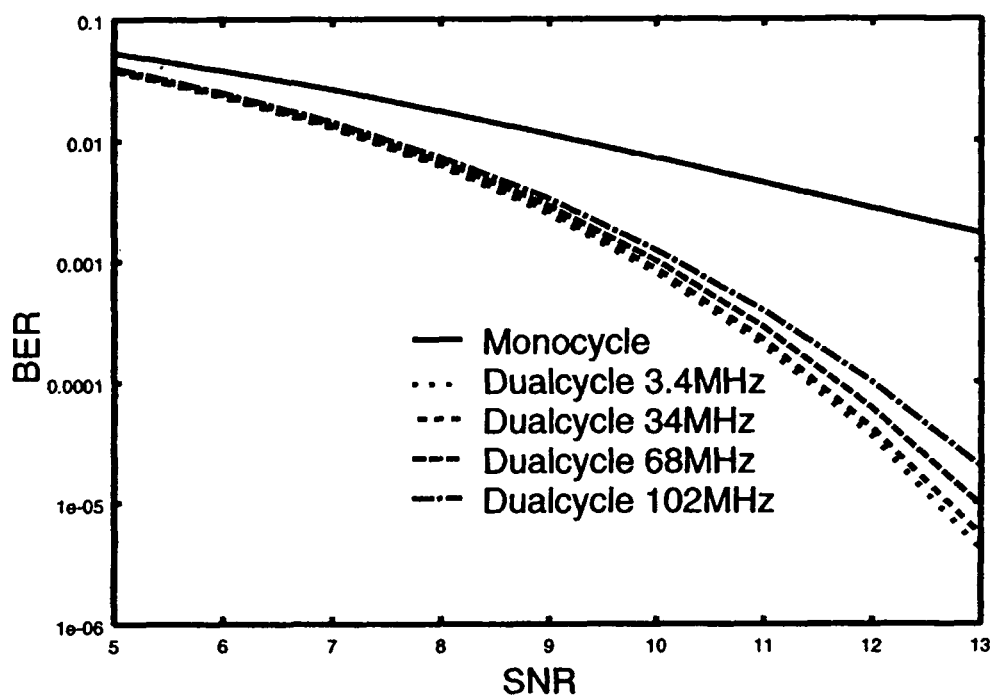
FIG. 59 shows a theoretical analysis of the BER of an SS system with a co-existing dualcycle UWB system.

FIG. 59 shows the simulation results for the effects of a UWB signal on an existing SS signal.

Further, similarly, in the case where a plurality of single pulses of different pulse widths are superposed, the effects of a UWB signal on an existing SS signal can be simulated.

Figure 60:
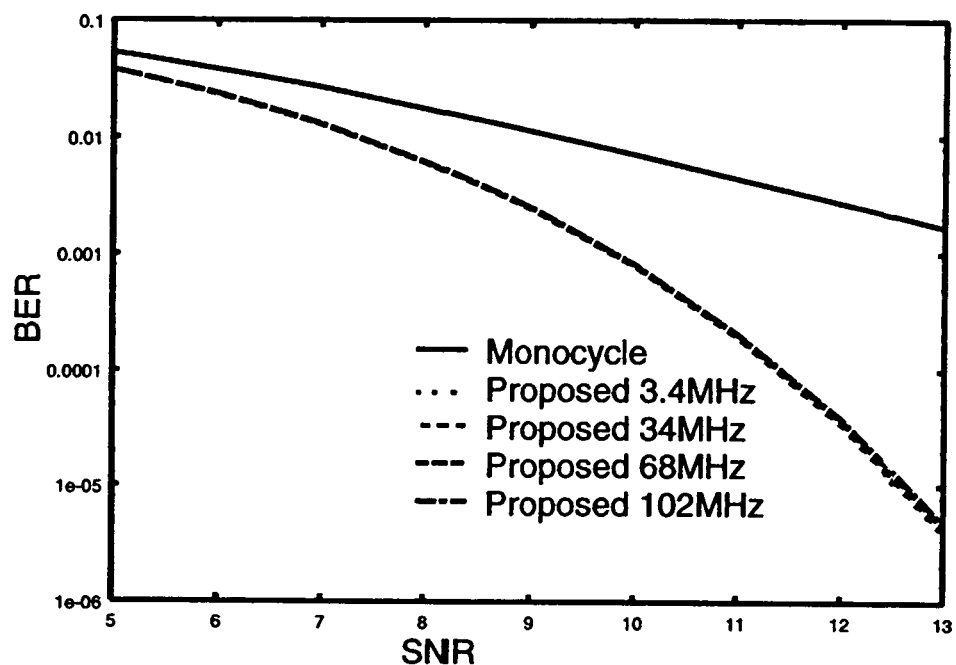
FIG. 60 shows a theoretical analysis of the BER of an SS system.

FIG. 60 shows the simulation results for the effects of a UWB signal on an existing SS signal which uses the simulation conditions of Table 5.

Further, similarly, in the case where a plurality of single pulses of a different pulse width and waveform are superposed, the effects of a UWB signal on an existing SS signal can be simulated.

Figure 61:
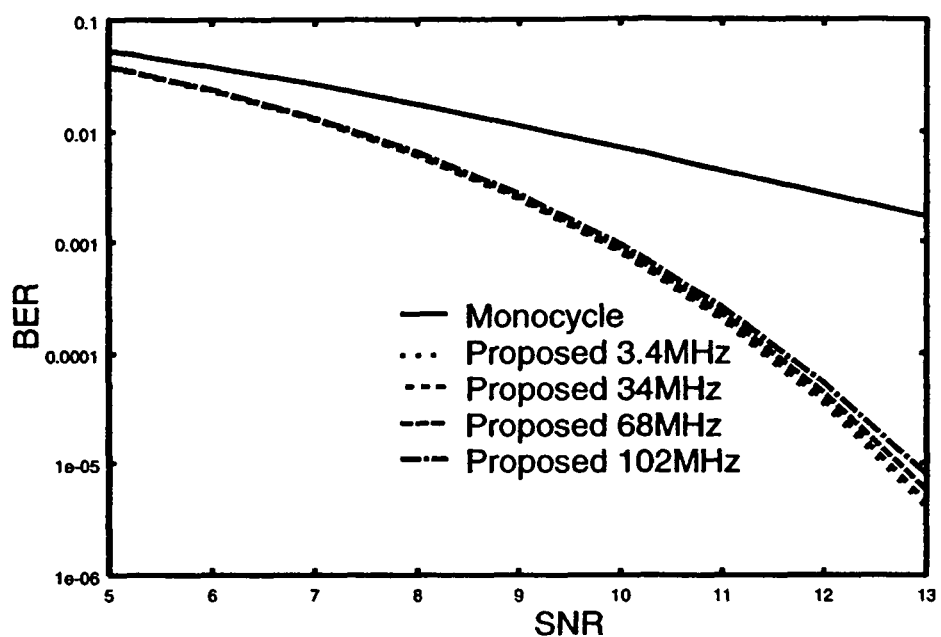
FIG. 61 shows a theoretical analysis of the BER of an SS system.

FIG. 61 shows the simulation results for the effects of a UWB signal on an existing SS signal which uses the simulation conditions of Table 5.

The effects on an UWB signal from an existing SS signal will be described next.

A monocycle case will be described next. The interference amount $\sigma I^2$ that the pulse of the UWB signal 1 receives from an SS receiver is expressed by the following Equation (56).

$$\sigma_i^2 = \frac{1}{T}\int_0^T \left\{ \int_0^T Ac(t-\tau)\cos\omega_c(t-\tau)v(t)dt \right\}^2 d\tau \quad (56)$$

$$\approx \frac{N}{2T}\int_0^{T_c} \left[ \left\{ \int_0^{T_m+\delta} AC_0(t-\tau)\cos\omega_c(t-\tau)dt \right\}^2 + \right.$$

$$\left. \left\{ \int_0^{T_m+\delta} AC_1(t-\tau)\cos\omega_c(t-\tau)dt \right\}^2 \right] d\tau$$

$$C_0(t) = \begin{cases} 1 & (t \geq 0) \\ 1 & (t < 0) \end{cases}$$

$$C_1(t) = \begin{cases} 1 & (t \geq 0) \\ -1 & (t < 0) \end{cases}$$

Here, T denotes a 1-bit duration of an SS signal, A denotes the amplitude of the reception pulse, c(t) denotes an SS spreading code sequence, cos $\omega_c$t denotes the sinusoidal carrier wave, N represents the number of chips per SS1 bit, $T_c$ is the duration of the SS chip, Tm+d represents the duration of the UWB correlator. The BER characteristic of UWB when interference caused by the SS signal is added can be calculated by adding the interference amount of the above equation in the number of reception pulses to the noise power of the SNR of the UWB signal.

Here, the SNR of the UWB signal is expressed by Equation (57).

$$SNR = \frac{(N_s m_p)^2}{\sigma_{rec}^2 + N_s \sigma_i^2} \quad (57)$$

BER is expressed by Equation (58).

$$BER = \frac{1}{2}\text{erfc}\left(\sqrt{\frac{SNR}{2}}\right) \quad (58)$$

Further, DIR, PUWB, and Pss are expressed by Equations (59), (60), and (61).

$$P_{UWB} = N_s \int_0^{T_m} (w_{rec}(t))^2 dt \quad (60)$$

$$P_{SS} = \frac{N_s T_f}{T}\int_0^T (A\cos\omega_c t)^2 dt \quad (61)$$

Table 6 below shows the simulation conditions.

| performance parameters | |
|---|---|
| Data rate: UWB | 3.2 Mbps |
| Data rate: SS | 384 kbps |
| 3 dB bandwidth: UWB | 3.2 GHz |
| 3 dB bandwidth: SS | 3.4 MHz |
| SS chip rate(1/$T_c$) | 2.64 Mcps |
| SS carrier frequency($w_c$) | 2 GHz |
| UWB pulse time duration | 0.7 ns |
| Number of Impulses per Symbol($N_S$) | 31 |
| Frame time($T_f$) | 10 ns |
| DIR | −16.66 dB |

Figure 62:
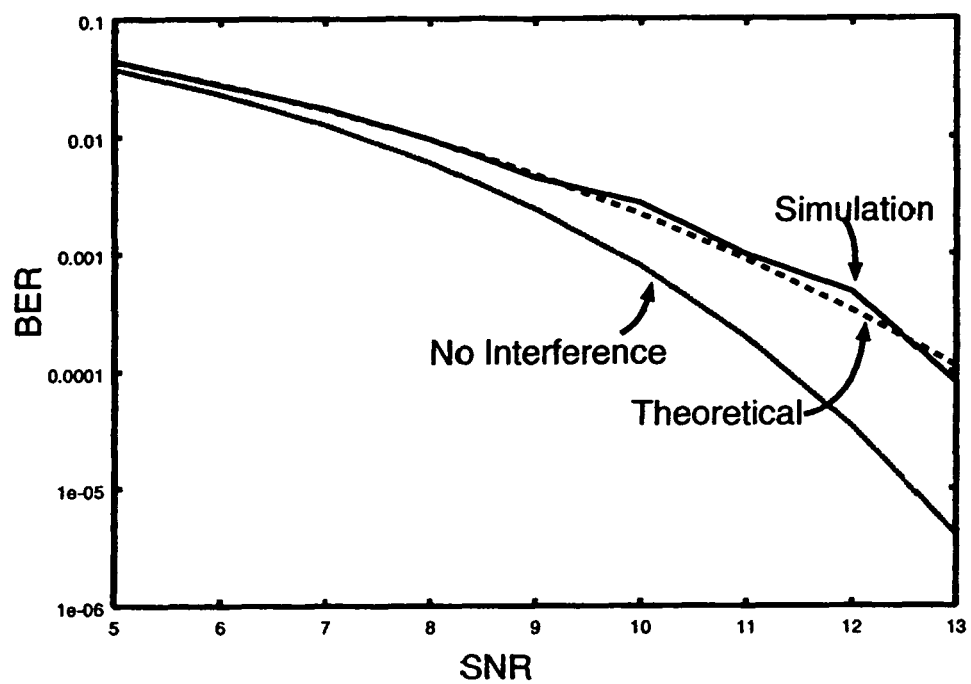
FIG. 62 shows a comparison between the theoretical analysis and simulation results.
Figure 63:
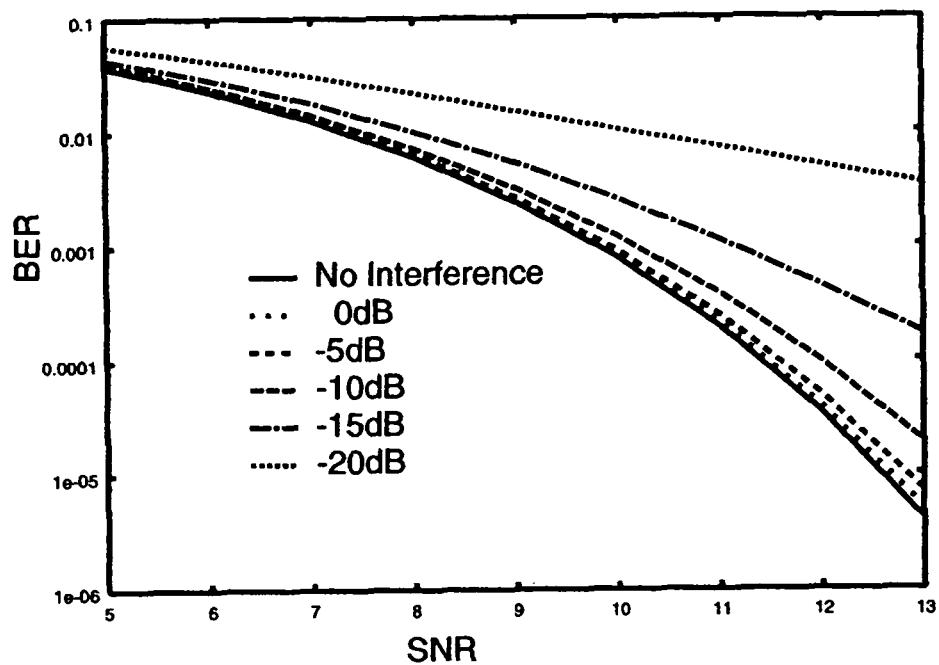
FIG. 63 shows a theoretical analysis of the BER of an SS system with a co-existing UWB system.

FIGS. 62 and 63 show the simulation results for the effect of a UWB signal on an existing SS signal.

Similarly, in a dualcycle case, the effects of a UWB signal on an existing SS signal can be simulated.

Table 7 below shows the simulation conditions.

| performance parameters | |
|---|---|
| Data rate: UWB | 3.2 Mbps |
| Data rate: SS | 384 kbps |
| 3 dB bandwidth: UWB | 3.2 GHz |
| 3 dB bandwidth: SS | 3.4–102 MHz |
| SS chip rate(1/$T_c$) | 2.64–158.4 Mcps |
| SS carrier frequency($w_c$) | 2.5 GHz |
| UWB pulse time duration | 0.7 ns |
| dualcycle time space | 1.0 ns |
| Number of dualcycle per Symbol($N_S$) | 31 |
| Frame time($T_f$) | 10 ns |
| DIR | −16.66 dB |

Figure 64:
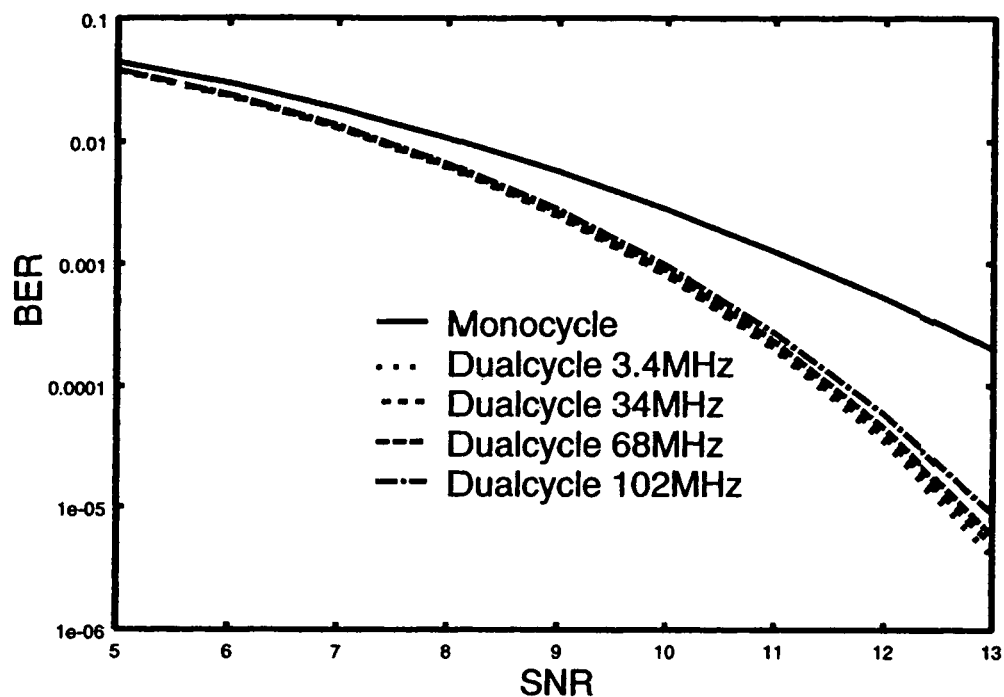
FIG. 64 shows the theoretical analysis of the BER of an SS system when a dualcycle UWB system coexists.

FIG. 64 shows the simulation results for the effect of a UWB signal on an existing SS signal.

Further, similarly, in the case where a plurality of single pulses of different pulse widths are superposed, the effects of a UWB signal on an existing SS signal can be simulated.

Figure 65:
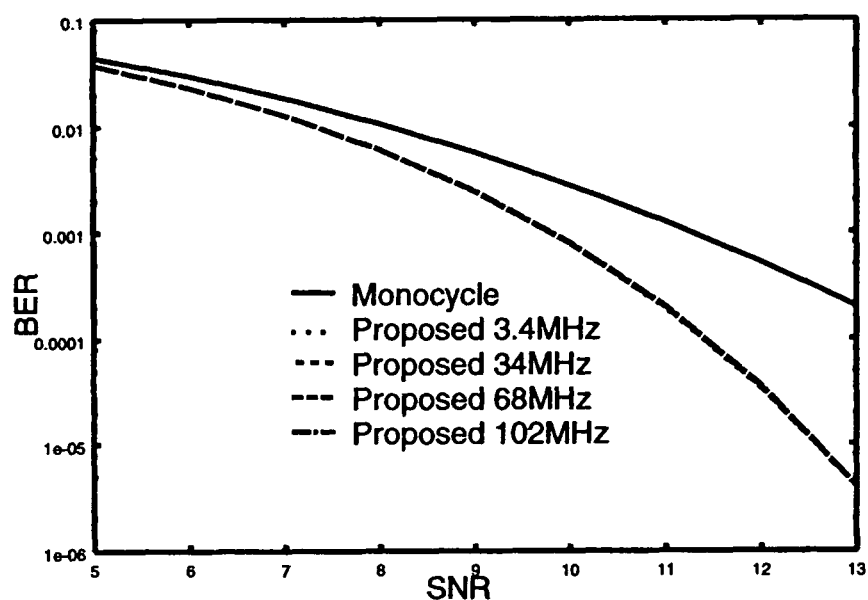
FIG. 65 shows a theoretical analysis of the BER of an SS system.

FIG. 65 shows the simulation results for the effect of a UWB signal on an existing SS signal that employs the simulation conditions of Table 7.

Further, similarly, in the case where a plurality of single pulses of different pulse widths and waveforms are superposed, the effects that a UWB signal receives from an existing SS signal can be simulated.

Figure 66:
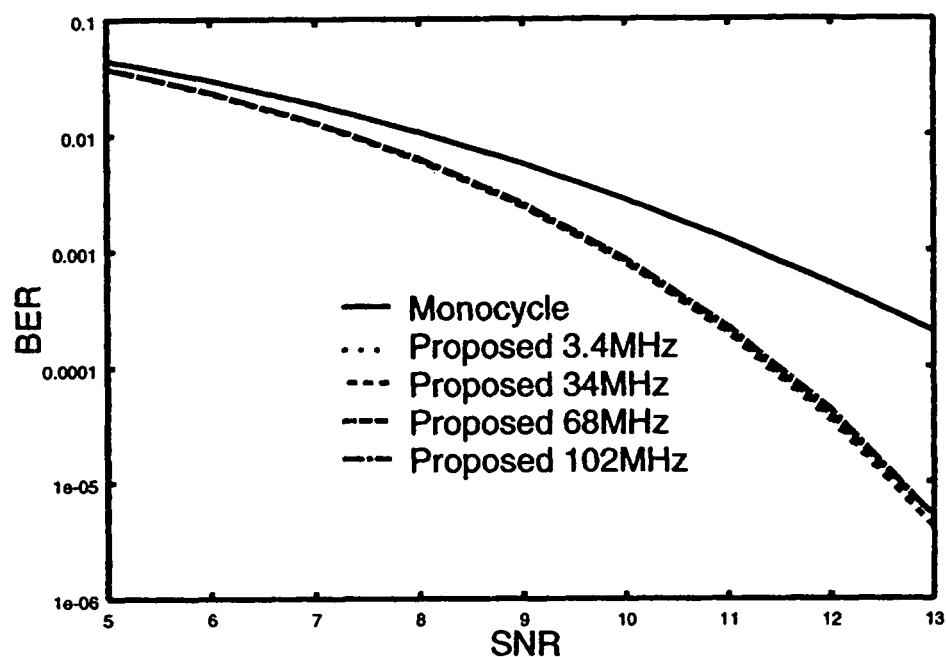
FIG. 66 shows the theoretical analysis of the BER of an SS system.

FIG. 66 shows the simulation results for the effects that a UWB signal receives from an existing SS signal which uses the simulation conditions of Table 7.

A fourth embodiment that generates a plurality of pulses of different orders by using a modified hermite polynomial will be described next.

In the binary PPM (Pulse Position Modulation) system, which is one modulation system of the UWB-IR system, a method for rendering one bit by time-shifting all of the plurality of pulses has been considered. However, with the objective of raising the transmission speed or achieving a favorable error rate, research on multivalued transmission methods that render a plurality of bits by means of the same plurality of pulse trains also advancers in the UWB field. For example, a multivalued transmission system such as the M-ary UWB system has been proposed by Document 16. In this system, each of the pulses transmit separate information by time-shifting one pulse at a time in accordance with an orthogonal sequence and information of a plurality of bits is transmitted by one symbol. As a result of this method, with the M-ary UWB system, because the probability of collision with the pulse of another user when there are multiple users is lower than that of a conventional system according to conditions governing the conventional system and transmission speed, the bit error rate (BER) can be reduced below that of a conventional system.

Meanwhile, research relating to the formation of elemental waveforms used in UWB communications has also been conducted actively with the objective of avoiding interference with other systems and removing interference between users. One of the UWB communication waveforms that has been considered thus far is an orthogonal waveform based on Modified Hermite Polynomials (MHP): Document 13, for example.

This is a waveform that is created under the governance of the Hermite polynomial so that different orders are orthogonal to one another and includes the orthogonal Pulse Modulation (OPM) system as a system that uses this waveform in UWB communications: Document 16, for example.

In this system, by allocating waveforms of different orders to each of the users in order to use MHP orthogonality, it is thought that, as long as a state of synchronization between the users is established, the effects of the pulses of other users can be completely removed during reception by completely transmitting the pulses of each of the users at the same time. However, when the waveform time differential caused by the effects of the input/output of the antenna that actually occur is considered, there is no orthogonality of the MHP waveform at all and it is difficult to completely eradicate the interference of other users with an unmodified system.

Therefore, a few systems that use an MHP waveform corresponding with the communication environment after consideration of the waveform during reception are shown as interference removal systems in a multi-user environment of UWB wireless communications. The object of these systems is to reduce the bit error rate in an asynchronous multiple access environment to a level below that of the prior art and, in order to achieve this object, two systems are shown that reduce interference with other users in a multi-user environment by changing the allocation of the MHP waveform in accordance with the number of users and that reduce the BER at the same transmission speed by establishing multiple values in the same way as the M-ary UWB system respectively. Of these two systems, the "multivalued UWB transmission system" shows that the BER characteristic is favorable during asynchronous multiple access and is formally the system of the present invention.

In the OPM shown earlier, the MHP waveform is used only in user identification but, in the system of the present invention, an MHP pulse is also first used in data identification and a system in which one type of MHP waveform expresses a plurality of bits is constituted by preparing MHP waveforms of a plurality of orders. Further, user identification is performed by time-shifting that employs a TH sequence of a conventional system.

Here, a UWB multivalued transmission system will be described simply by way of example, whereupon a pulse sequence based on a Hermite coefficient that has been researched as a UWB waveform will be described.

Multivalued transmission will now be described. In the field of wireless communications, multivalued modulation systems have conventionally been used that transmit information of a plurality of bits at the same time, starting with two values (BPSK), then four values (QPSK) and eight values (8PSK) in Phase Shift Keying (PSK) modulation, for example, and sixteen values, sixty-four values and two hundred and fifty-six values and so forth in a QAM (Quadrature Amplitude Modulation) system.

So too with UWB, a multiplicity of information is sent not only by means of binary transmission of 0 or 1 through PPM (pulse position modulation) but also by means of a single symbol, and research for increasing the transmission speed is performed. Here, M-ary UWB systems will be described as an example of the multivalued UWB system.

In M-ary UWB system SS communications, technologies such as M-ary/SSMA are known: Document 18, for example.

This is a system that allocates M (=2k) different PN (pseudo noise) sequences to the respective users, transmits signals by using a PN sequence, which corresponds with data of k bits among the PN sequences that the user wishes to transmit, as a spreading code sequence, prepares a correlator that corresponds with M PN sequences on the reception side and modulates the data corresponding with the maximum correlation output. In this system, in an environment in which Nu users exist, Nu×M PN sequences are required. However, this system can transmit k bits by one symbol, the transmission speed increases.

A system that applies this way of thinking to UWB communications is the M-ary UWB system. In this system, the respective users modulate pulses one by one in accordance with the codeword of the M (=2k) different orthogonal sequences and transmit the modulated pulse with the pulse train by TH (time-hopping) to a conventional system that makes transmissions with the same information for all the plurality of pulses of one symbol, the M-ary UWB system is a system that transmits information with information that is different for the plurality of pulses. As a result, the M-ary UWB system is a system having the favorable frequency usage efficiency of M-ary while retaining the call privacy and secrecy of UWB. In addition, synchronization is with time-hopping (TH) and therefore the difficulty with M-ary synchronization is also resolved. Different sequence are used for multiple access and for information. Hence, one user also occupies the maximum sequence. Thus, the drawbacks of M-ary are resolved.

Thereafter, a transmission/reception system of the M-ary UWB system will be described.

Figure 67:
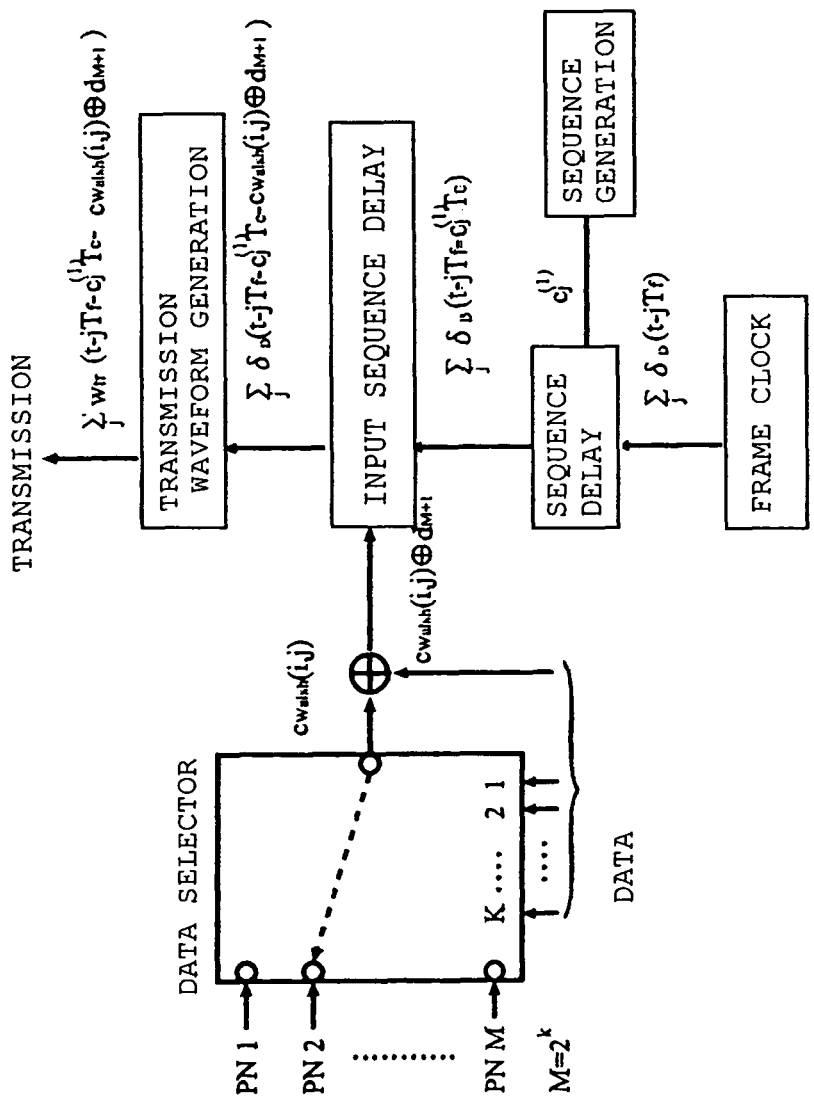
FIG. 67 serves to illustrate the transmission-side system constitution of a M-ary UWB system.

A block diagram of a transmitter of the M-ary UWB system is shown in FIG. 67. In the M-ary UWB system, one of $M=2^k$ Walsh sequences corresponding with the state of $M=2^k$ of k input bits is selected. The selected sequence is the ith sequence among the M sequences and the jth value (1 or 0) of the sequence is $c_{walsh}(i,j)$. In addition, supposing that the input value of the next one bit is $d_{M+1}$, the transmission waveform $S_{tr}^{(1)}(t)$ of the first user that is transmitted by one symbol is expressed by the following Equation (62).

$$s_{tr}^{(1)}(t) = \sum_{j=0}^{N_s-1} w_{tr}(t - jT_f - c_j^{(1)}T_c - \delta c_{Walsh}(i,j) \ominus d_{M+1}) \tag{62}$$

Therefore, the reception signal r(t) is expressed by the following Equation (63).

$$r(t) = \sum_{u=1}^{N_u} A_u \sum_{j=0}^{N_s-1} w_{rec}^{(u)}(t - \tau_u) + n(t) \tag{63}$$

Figure 68:
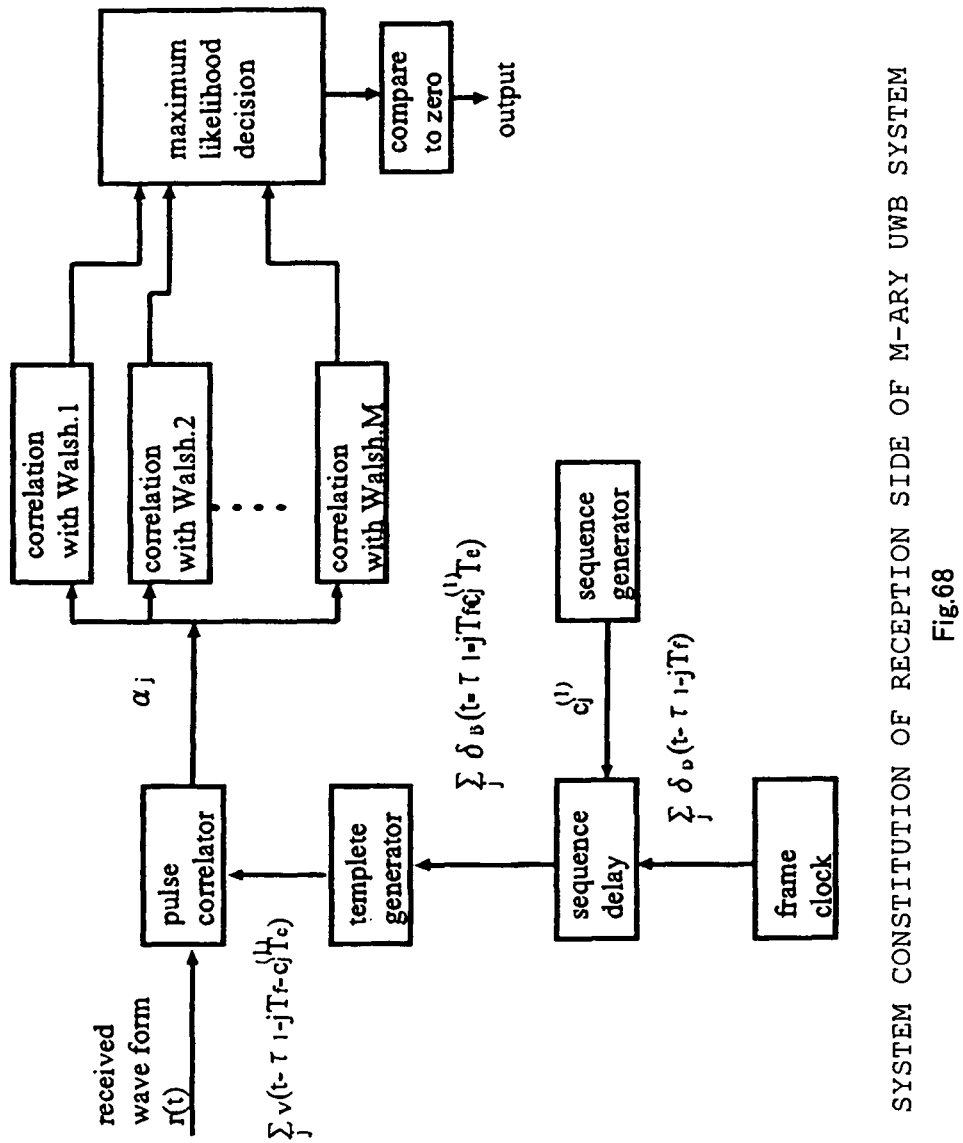
FIG. 68 serves to illustrate the reception-side system constitution of a M-ary UWB system.

A block diagram of a receiver is shown in FIG. 68. On the reception side, Equation (64) is defined as $$\alpha_j \triangleq \int_{\tau_1+jT_f}^{\tau_1+(j+1)T_f} r(t)v(t-\tau_1-jT_f-c_j^{(1)}T_c)dt \qquad (64)$$

and the maximum value of the absolute values is discriminated from among the following Equations (65)

$$\begin{cases} \sum_{j=0}^{N_s-1} C_{Walsh}(0,j)\alpha_j \\ \sum_{j=0}^{N_s-1} C_{Walsh}(1,j)\alpha_j \\ \vdots \\ \sum_{j=0}^{N_s-1} C_{Walsh}(M-1,j)\alpha_j \end{cases} \qquad (65)$$

by using a sequence $c_{walsh}(i, j)$ that changes a 0 in the Walsh sequence used on the transmission side to −1 and the maximum absolute value is thus also discriminated as being positive or negative. Such a system prepares M Walsh sequences of sequence length $M=2^k$, modulates pulses in accordance with the sequence, modulates pulses in accordance with a sequence in which the 0's and 1's of this sequence are switched and, by selecting transmitting one of a total of 2×M sequences, the transmission of (K+1) bits can be performed by means of one symbol.

The Eb/N0 and bit error rate of M-ary will now be described. The SNR of M-ary UWB is expressed as Equation (66) similarly to UWB of a conventional system (binary PPM):

$$SNR_{out}(N_u) = \frac{(N_s A_1 m_p)^2}{\sigma_{rec}^2 + N_s \sigma_a^2 \sum_{k=2}^{N_u} A_k^2} \qquad (66)$$

However, although the output result may be judged as either positive or negative in a conventional system, in the case of a M-ary UWB system, a plurality of bits are transmitted at the same time, and a correlation with all the sequences must be made on the reception side and it must be judged which correlation value is maximum and with which sequence the correlation is made. As a result, because the BER of the M-ary UWB system is naturally poor even in a comparison with the same S/N, the BER at Eb/No must be compared and, supposing that the number of bits transmitted at the same time by means of one symbol is k+1 bits, Eb/No is defined by Equation (67).

$$E_b/N_0(N_u)=SNR_{out}(N_u)[dB]+10 \log_{10}(k+1) \qquad (67)$$

Further, the probability Pe of an erroneous selection of a sequence from among $M=2^m$ sequences during reception of the M-ary UWB system is expressed as Equation (68).

$$P_e = 1-\left(\frac{1}{\sqrt{2\pi}}\right)\int_0^\infty 2\exp\left(\frac{-u^2}{2}\right)\left[1-\frac{1}{2}\left\{\text{erfc}\left(\frac{E_b/N_0-u}{\sqrt{2}}\right)\right\}\right]^{M-1} du \qquad (68)$$

This is shown in Document 18, for example.

The BER of the M-ary UWB system is expressed as per Equation (69) below by using Pe and Eb/No and Equation (15).

$$BER = \frac{m}{m+1}\frac{P_e}{2} + \frac{1}{m+1}\left\{\frac{P_e}{2} + \frac{1-P_e}{2}\text{erfc}\left(\frac{E_b/N_0}{\sqrt{2}}\right)\right\} \qquad (69)$$

Pulse waveforms that are orthogonal based on a modified Hermite polynomial will be described next.

Documents that form UWB communication pulses by using a function that is modified so that Hermite polynomials of different orders are orthogonal include Documents 13 to 15, for example.

A method of generating Modified Hermite Polynomials (MHP) pulse waveforms and the characteristics thereof will now be described.

The generation of modified Hermite polynomials will now be illustrated. Conventionally known Hermite polynomials are expressed by the Equation (70) below.

$$h_{e_0}(t) = 1 \qquad (70)$$
$$h_{e_n}(t) = (-1)^n e^{\frac{t^2}{2}}\frac{d^n}{dt^n}\left(e^{-\frac{t^2}{2}}\right)$$

n=1 to n=8 are shown in Equation (71) by way of example.

$$h_{e1}(t)=t$$
$$h_{e2}(t)=t^2-1$$
$$h_{e3}(t)=t^3-3t$$
$$h_{e4}(t)=t^4-6t^2+3$$
$$h_{e5}(t)=t^5-10t^3+15t$$
$$h_{e6}(t)=t^6-15t^4+45t^2-15$$
$$h_{e7}(t)=t^7-21t^5+105t^3-105t$$
$$h_{e8}(t)=t^8-28t^6+210t^4-420t^2+105 \qquad (71)$$

Because the shape of this equation does not mean that all Hermite functions of different orders are orthogonal, an equation that is modified to afford the Hermite functions orthogonality is Equation (72) below.

$$h_n(t) = e^{-\frac{t^2}{4}} h_{e_n}(t) \qquad (72)$$
$$= (-1)^n e^{\frac{t^2}{4}}\frac{d^n}{dt^n}\left(e^{-\frac{t^2}{2}}\right)$$

Modified Hermite polynomials (MHP) are related by Equation (73) below.

$$\ddot{h}_n(t) + \left(n+\frac{1}{2}-\frac{1}{4}t^2\right)h_n(t) = 0 \qquad (73)$$
$$\dot{h}_n(t) + \frac{t}{2}h_n(t) = nh_{n-1}(t)$$
$$h_{n+1}(t) = \frac{t}{2}h_n(t) - \dot{h}_n(t)$$

Figure 69:
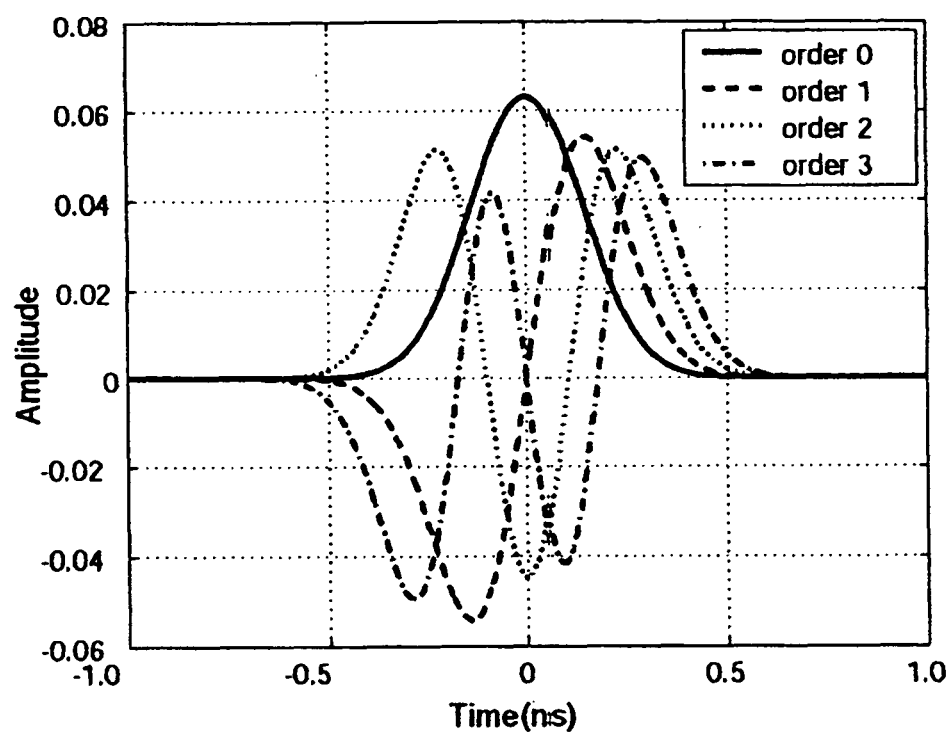
FIG. 69 shows modified Hermite waveforms (orders 0 to 3)
Figure 70:
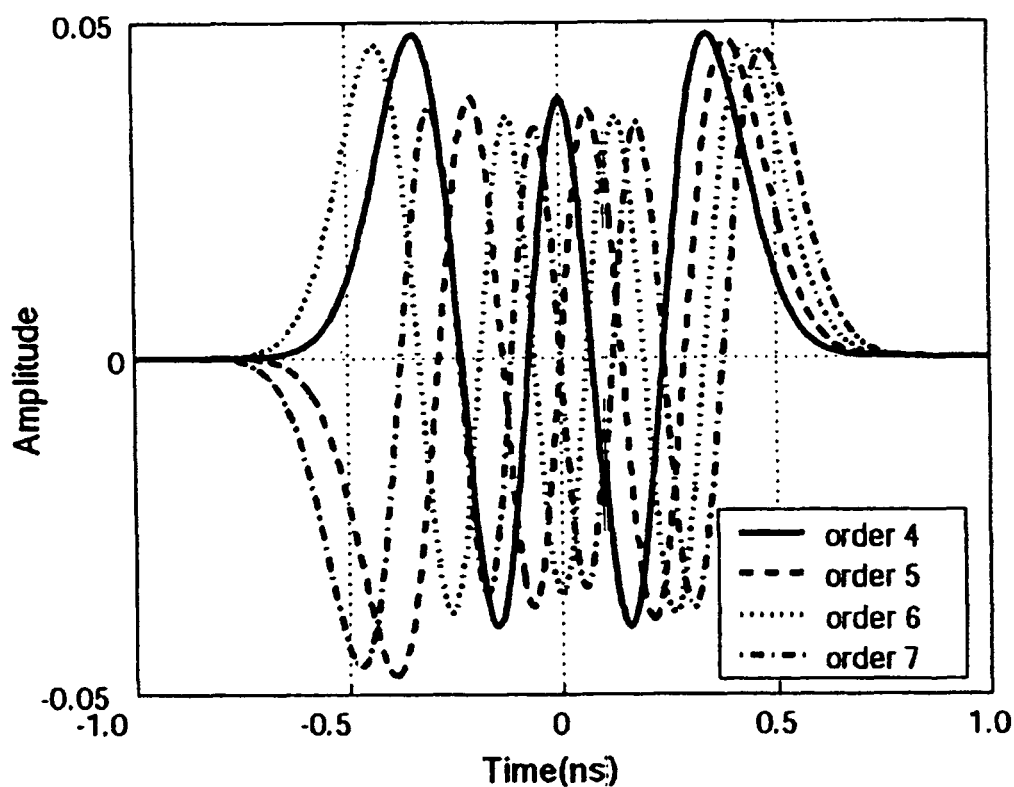
FIG. 70 shows modified Hermite waveforms (orders 4 to 7)

This modified Hermite function is used and, when the generated MHP pulses of a plurality of different orders are viewed on the time axis, the pulse waveforms in FIGS. 69 and 70 result. Further, the frequency characteristics in FIGS. 69 and 70 are as per FIGS. 71 and 72.

Thus, a plurality of pulses of different orders can be generated by using a modified Hermite polynomial.

The characteristic MHP pulse waveforms of MHP pulse waveforms include the characteristics cited below.

These MHP reception waveforms almost retain the MHP characteristics mentioned in the previous paragraph. However, the orthogonality between waveforms of different orders, which is the most important characteristic, changes. A table that is produced by investigating cross-correlation values when MHP waveforms in which the power during reception is actually normalized temporally overlap one another exactly is shown in Table 8 below.

| Correlation values between reception waveforms during MHP waveform transmission | | | | | | | | | | | |
|---|---|---|---|---|---|---|---|---|---|---|---|
| /  | 0 | 1 | 2 | 3 | 4 | 5 | 6 | 7 | 8 | 9 | 10 |
| 0  | 1.0   | 0     | −0.78 | 0     | 0.25  | 0     | 0     | 0     | 0     | 0     | 0     |
| 1  | 0     | 1.0   | 0     | −0.73 | 0     | 0.21  | 0     | 0     | 0     | 0     | 0     |
| 2  | −0.78 | 0     | 1.0   | 0     | −0.70 | 0     | 0.19  | 0     | 0     | 0     | 0     |
| 3  | 0     | −0.73 | 0     | 1.0   | 0     | −0.69 | 0     | 0.18  | 0     | 0     | 0     |
| 4  | 0.25  | 0     | −0.70 | 0     | 1.0   | 0     | −0.68 | 0     | 0.18  | 0     | 0     |
| 5  | 0     | 0.21  | 0     | −0.69 | 0     | 1.0   | 0     | −0.68 | 0     | 0.17  | 0     |
| 6  | 0     | 0     | 0.19  | 0     | −0.68 | 0     | 1.0   | 0     | −0.67 | 0     | 0.17  |
| 7  | 0     | 0     | 0     | 0.18  | 0     | −0.68 | 0     | 1.0   | 0     | −0.67 | 0     |
| 8  | 0     | 0     | 0     | 0     | 0.18  | 0     | −0.67 | 0     | 1.0   | 0     | −0.67 |
| 9  | 0     | 0     | 0     | 0     | 0     | 0.17  | 0     | −0.67 | 0     | 1.0   | 0     |
| 10 | 0     | 0     | 0     | 0     | 0     | 0     | 0.17  | 0     | −0.67 | 0     | 1.0   |

The pulse waveforms of different orders are orthogonal when the centers of the waveforms temporally overlap one another exactly. Even when the orders are different, the duration of the pulse waveform barely changes. As the orders rise, the center frequency of the pulse waveform reaches a high frequency. As the orders rise, the peak of the autocorrelation function of the pulse waveform grows sharp. As the orders of the two MHP pulse waveforms grow apart, the value of the cross-correlation function generally grows small in comparison with the peak of the autocorrelation function.

Based on these characteristics, when the MHP waveform is used in UWB communications, it is thought that the waveforms with higher orders have a high synchronization capture performance and a high ranging performance but it is also thought that such waveforms are sensitive to the effects of a synchronization shift during reception caused by timing jitter.

The waveforms in an MHP pulse waveform receiver and the quality thereof will now be described. The documents mentioned earlier have already proposed a UWB communication system that produces the characteristics of an MHP waveform. However, these documents do not consider modification of the waveform that occurs during inputs and outputs to and from the antenna.

The waveforms in the receiver and the frequency characteristic thereof are shown for a case where an MHP waveform is used as the transmission waveform.

Based on Equations (3) and (12), the waveform in the receiver of the MHP pulse of order n is expressed by the following Equation (74).

$$w_{rxn}(t) = \left(\frac{1}{4}t^2 - \frac{1}{2} - n\right)h_n(t) \quad (74)$$

Figure 71:
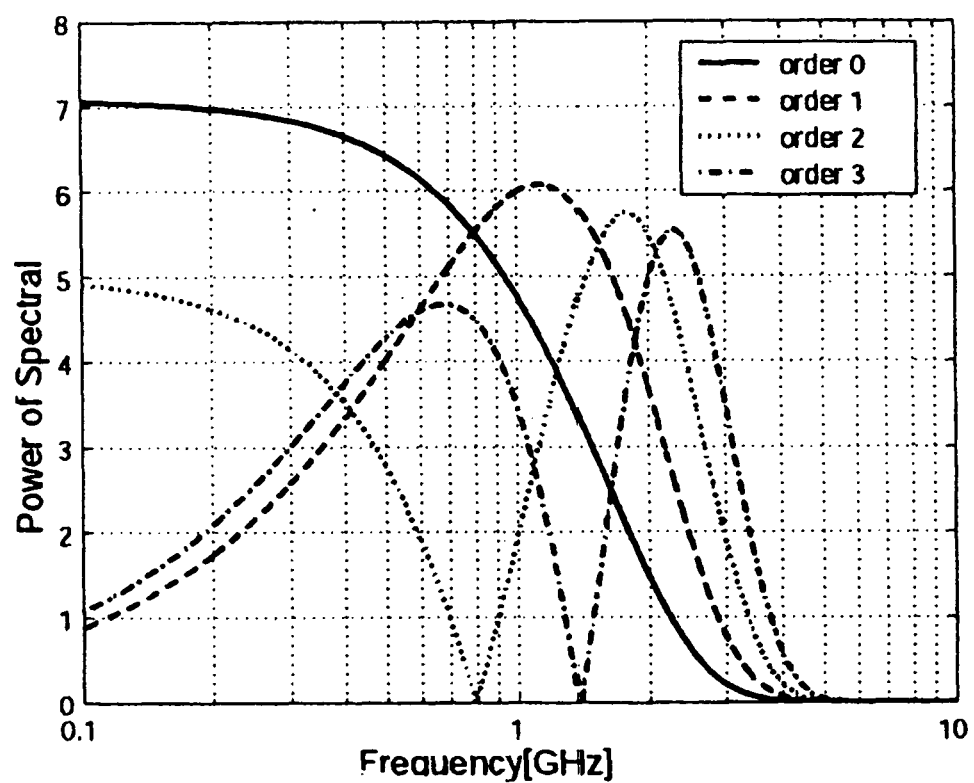
FIG. 71 shows the frequency characteristic of the modified Hermite waveforms (orders 0 to 3)
Figure 72:
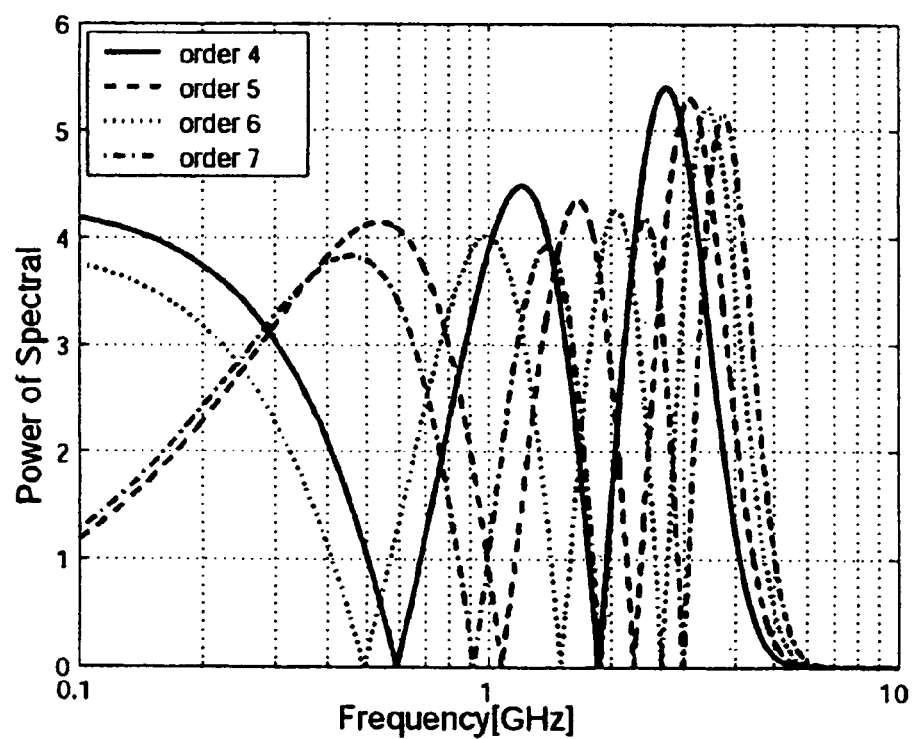
FIG. 72 shows the frequency characteristic of the modified Hermite waveforms (orders 4 to 7)
Figure 73:
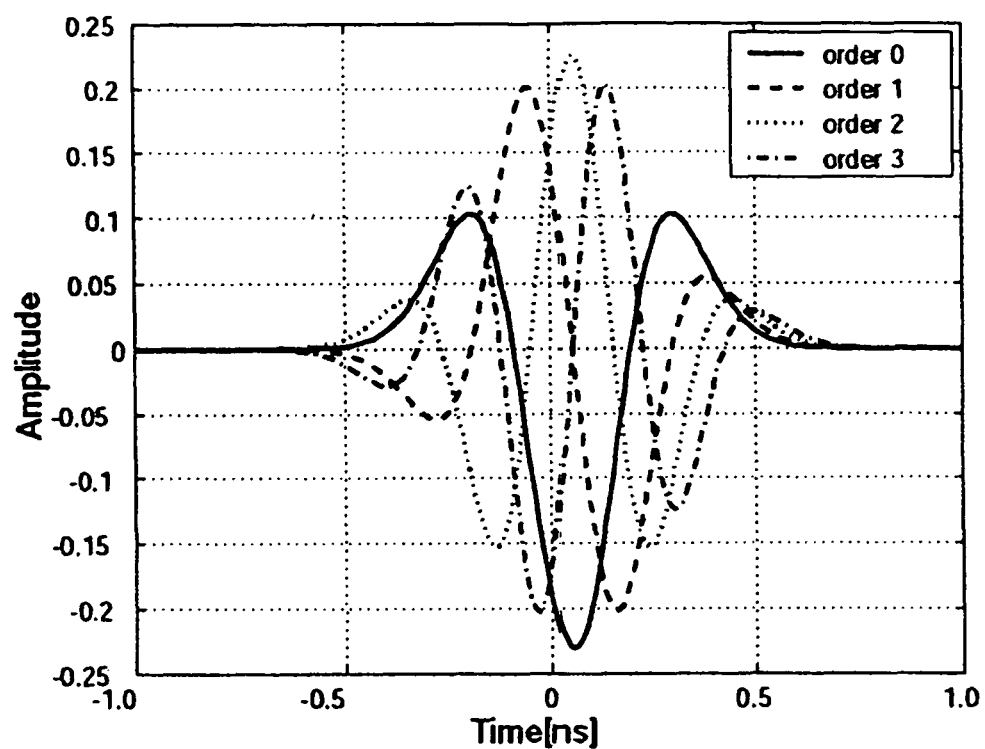
FIG. 73 shows MHP waveforms (orders 0 to 3) during reception.
Figure 74:
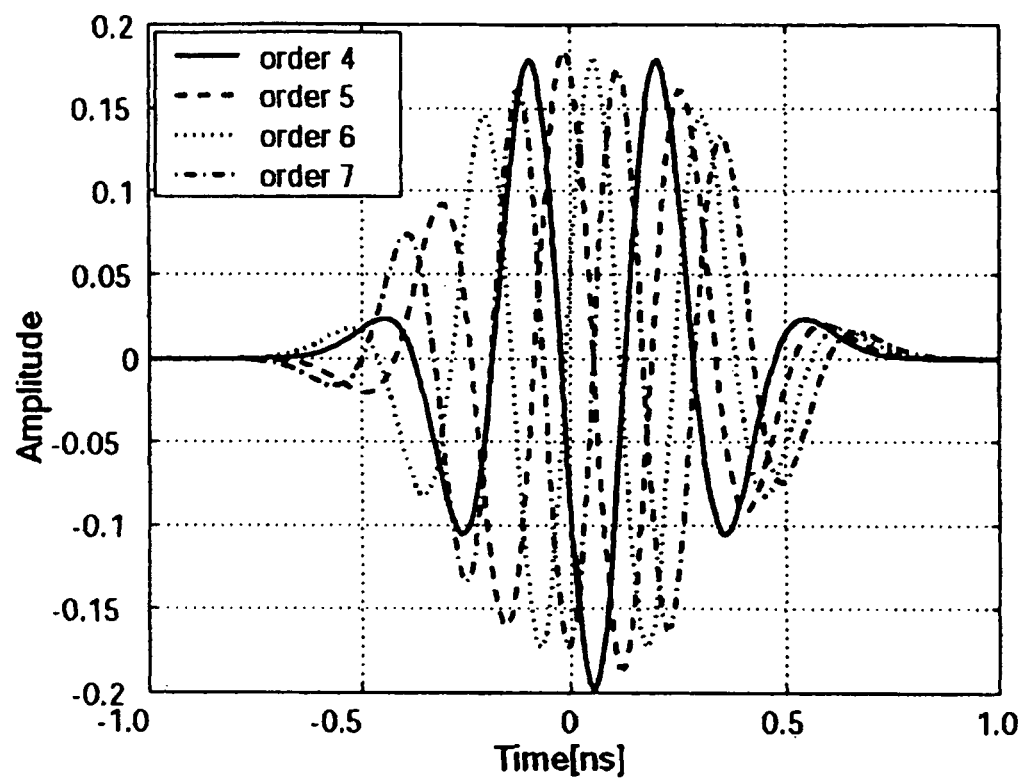
FIG. 74 shows MHP waveforms (orders 4 to 7) during reception.
Figure 75:
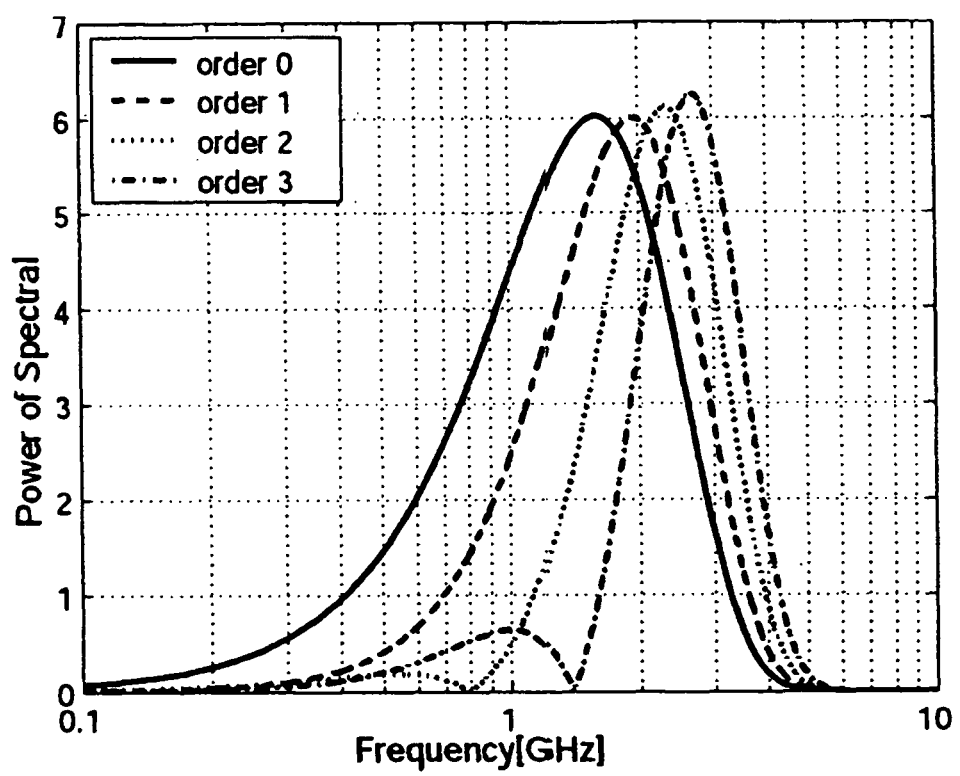
FIG. 75 shows the frequency characteristic of the MHP waveforms (orders 0 to 3) during reception.
Figure 76:
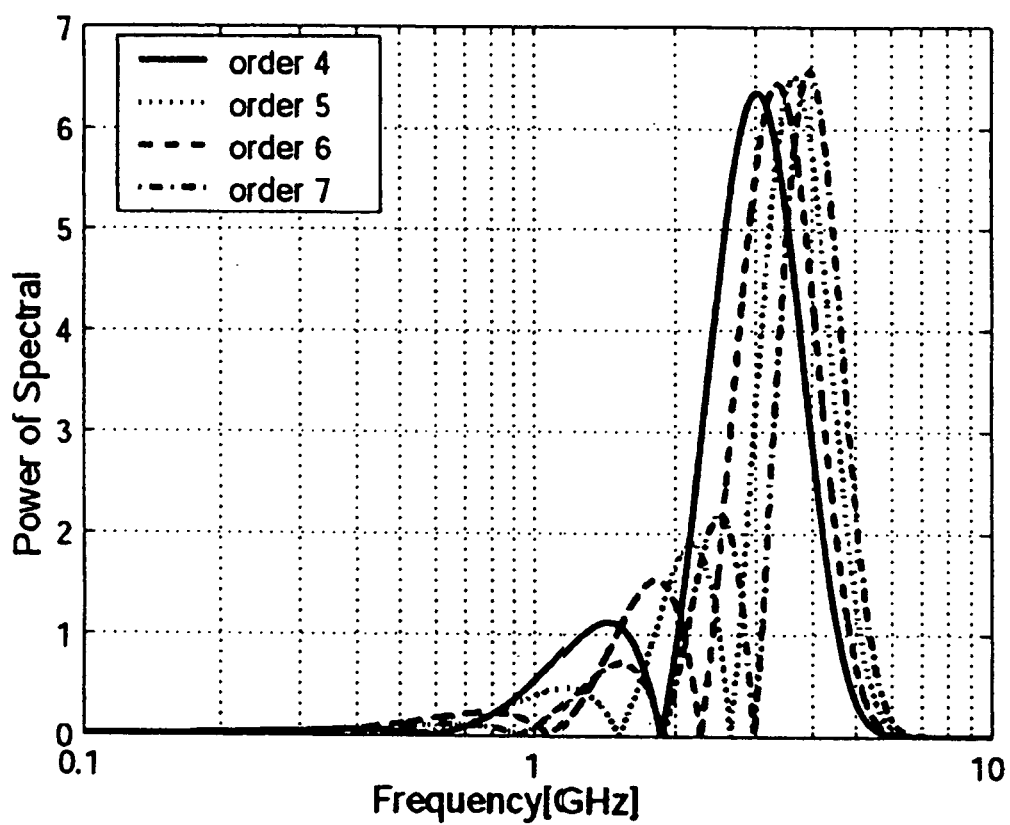
FIG. 76 shows the frequency characteristic of the MHP waveforms (orders 4 to 7) during reception.

The time waveforms at this time (in the receiver) are modified to the pulse waveforms shown in FIGS. 73 and 74. FIG. 73 shows MHP waveforms (orders 0 to 3) in the receiver and FIG. 74 shows MHP waveforms (orders 4 to 7) in the receiver. Further, the frequency characteristics of FIGS. 71 and 72 are changed to those in FIGS. 75 and 76.

When the results are collected, it can be seen that the reception MHP waveforms have the characteristics cited below.

When two reception MHP waveforms of different orders temporally overlap one another exactly, the orders of the two waveforms are orthogonal as long as the orders are not odd-numbered orders or even-numbered orders. Further, even when the orders of two waveforms are odd or even, the orders are orthogonal when the orders are separated by 5 or more.

When the reception MHP waveforms of different orders are odd or even, supposing that the order of the first waveform is η, waveforms of the orders n+2 and n−2 have a large negative correlation. Further, the absolute value of the correlation value increases as η decreases.

When the reception MHP waveforms of different orders are odd-numbered orders or even-numbered orders, supposing that the order of the first waveform is n, there is a small positive correlation with the waveforms of orders n+4 and n−4. Furthermore, as the correlation value decreases, the absolute value increases and the absolute value is smaller than the correlation value with the waveform of order n+2 (or n−2) for the waveform of order n.

The DC component of the spectrum power disappears and the slowly varying component is also kept small.

Even when the orders are different, the duration of the reception MHP waveform barely changes.

As the order increases, the center frequency of the reception MHP waveform rises.

As the order increases, the peak of the autocorrelation function of the reception MHP waveform grows sharp.

As the orders of the two reception MHP waveforms grow apart, the value of the cross-correlation function generally decreases in comparison with that of the peak of the autocorrelation.

As mentioned hereinabove, although there is a change in the orthogonality in the reception MHP waveform, the other material qualities are substantially the same as those of the original MHP waveform. Accordingly, when UWB communications by using orthogonality is considered, it is very important to consider the quality mentioned here.

A multivalued UWB-CDMA transmission system that employs a modified Hermite waveform will be described.

Here, in the case of systems that use an MHP waveform as the transmission waveform of UWB communications, a few systems that are able to reduce the bit error rate in an asynchronous environment to a level below that of a conventional system are shown depending on the environment (number of users in the same channel) and such systems are described and compared.

A multivalued transmission system that employs MHP will now be described. In the abovementioned Document 15, MHP waveforms are used for user identification and the removal of interference during user synchronization from the orthogonality of the waveforms may be considered. However, as detailed earlier, after the waveform (quality) are actually changed during reception, the characteristics worsen during asynchronization between users. Therefore, a system that also considers quality during reception is shown as a method that employs an MHP waveform as the transmission waveform.

One object of the system of the present invention will now be described. The MHP waveform has a quality according to which different orders are orthogonal. Furthermore, the reception MHP waveforms are not only orthogonal but are also related by a negative correlation or a positive correlation. Accordingly, a system that removes interference with other users by allocating different waveforms to each of the users and performing simultaneous communication is thought to have no validity in asynchronous multiple access communication because the characteristic deteriorates when there is no user synchronization.

Therefore, a case where a multivalued transmission system is used as an MHP waveform usage method is illustrated. The user selects and transmits one type of MHP waveform corresponding with K-bit data that is to be transmitted from among waveforms of different orders $M=2^k$. On the reception side, a correlator that has a template waveform corresponding with the reception MHP waveform of M different orders is prepared and the maximum output is chosen from among the outputs of the respective correlators and the data corresponding with the correlator is demodulated. The system has a system constitution that is very similar to that of M-ary UWB.

Further, user identification is made by time shifting corresponding with a user-specific TH sequence for each pulse which used in a conventional system.

By allocating a plurality of bits to a pulse train in this manner, interference with other users when the transmission speed is arranged to be the same as that of the M-ary UWB system is reduced and the bit error rate can be reduced.

Figure 77:
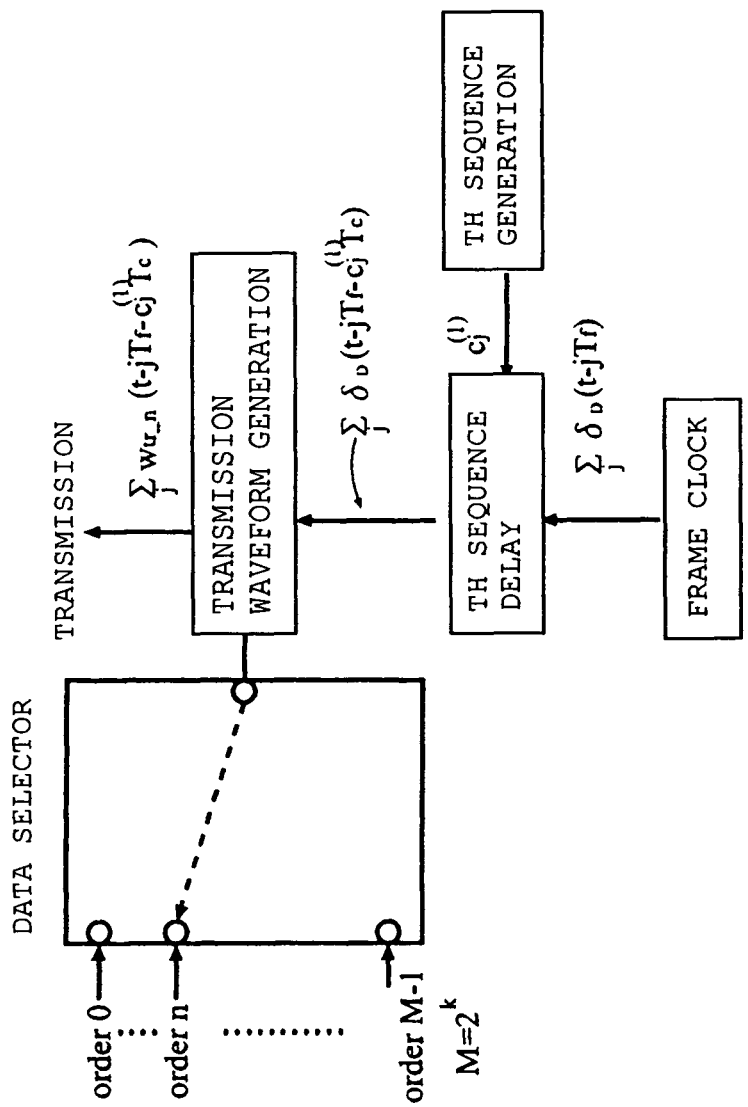
FIG. 77 serves to illustrate the transmission-side system constitution of a multivalued transmission system using a MHP waveform.

A constitution of the transmission/reception system will now be described. A transmission block diagram of the multivalued UWB transmission system is shown in FIG. 77. FIG. 77 shows the system constitution on the transmission side of a multivalued transmission system that employs MHP waveforms.

This system first determines the order of a waveform that is transmitted in accordance with transmission data and transmits an MHP pulse of an order that is determined with timing that conforms with the TH sequence of the user. Therefore, the transmission signal $S_{tr}^{(1)}(t^{(1)})$ of the first user is expressed by the following Equation (75).

$$s_{tr}^{(1)}(t(1)) = \sum_{j=-\infty}^{\infty} w_{tr_n}(t^{(1)} - jT_f - c_j^{(1)}T_c) \quad (75)$$

However, $t^{(1)}$ is the clock time of the transmitter, $T_f$ is the pulse repetition time, Tc is the time-hopping (TH) chip length, $c_j^{(1)}$ is the jth TH sequence of the kth user, and wtrn (t) is the MHP pulse waveform of the transmitted order n (=0, 1, ... M−1).

Further, the reception signal at this time is expressed by the following Equation (76).

$$r(t) = A_1 \sum_{j=0}^{N_s-1} w_{rec_n}(t - \tau_1 - jT_f - c_j^{(1)}T_c) + n_{tot}(t) \quad (76)$$

Here, A1 denotes a value indicating to what extent the signal $S_{rec_n}^{(1)}(t-\tau 1)$ from the transmitter of the 1th user is attenuated in the receiver. Further, τ1 denotes the value of asynchronization of the clock of the receiver and the transmitter clock of the first user, and $n_{tot}(t)$ represents a component that is rendered by combining the interference with other users and reception White Gaussian noise. Further, during reception, the waveform changes to a second-order differential MHP waveform $w_{rec_n}(t)$ of order n due to the relationship of the time differential during inputs to and outputs from the antenna.

Figure 78:
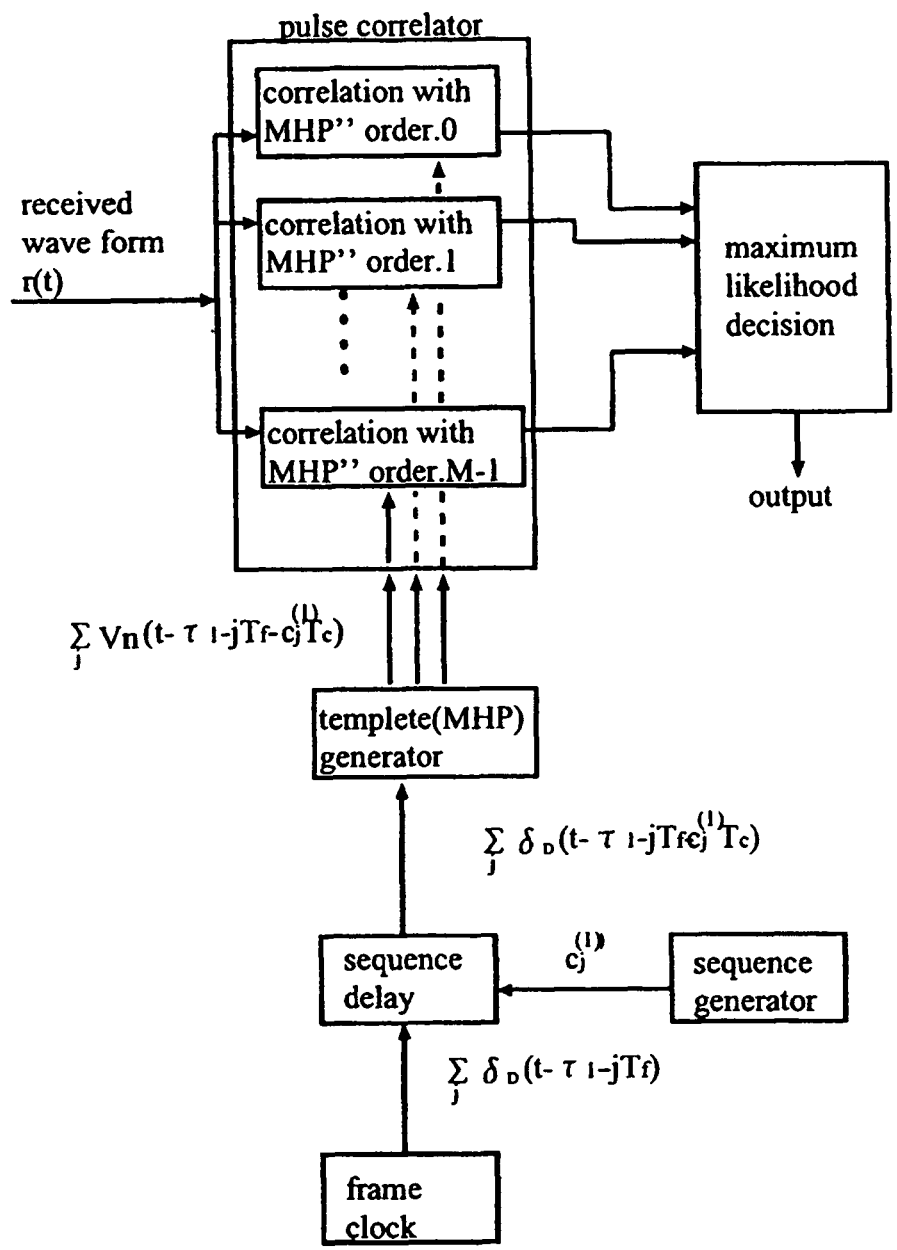
FIG. 78 serves to illustrate the reception-side system constitution of a multivalued transmission system using a MHP waveform.

Supposing that synchronization of the receiver is complete, the demodulation of data transmitted by the (k=1)th user may be considered for the sake of a description. A receiver block diagram is shown in FIG. 78.

Second-order differential waveforms for MHP waveforms of orders 0 to M−1 that are used on the transmission side are all prepared (M thereof) as template waveforms and then subjected to a time shift that corresponds with the TH sequence of the receiving user. A correlation is made between the time-shifted template waveforms and the reception signal and the data corresponding with the correlator constituting the maximum correlation output among the M correlator outputs is demodulated as reception data.

A system for reducing interference with other users that employs MHP will be described next. A system for reducing interference with other users during user synchronization that employs an MHP waveform was proposed by Document 15. However, the fact that interference with other users cannot be removed by this system during asynchronous communications was mentioned earlier. Here, in order to remove interference with other users in asynchronous communication, the focus is on the low level of the absolute value of the cross-correlation due to the difference in order rather than the orthogonality of the MHP waveforms and a new system for removing interference with other users is shown.

A further object of this system will now be described. A method that also allocates different waveforms to users may also be considered as a separate method from the multivalued transmission system that produces the quality of the MHP waveform (reception MHP waveform). However, because the object is to reduce the BER of asynchronous multiple access, a system that not only allocates orthogonal waveforms to the respective users but also combines a time shift using a TH sequence is illustrated.

In addition, this system has the object of reducing the interference during pulse collisions below that of conventional systems by allocating a waveform with a relatively low correlation with all the pulse time shift collisions to each user in order to produce a favorable BER characteristic during user asynchronization. Further, data modulation is performed by means of PSM (pulse waveform modulation) by allocating a plurality of pulses to the users.

A transmission and reception system that corresponds with the above object of the system will now be described.

This system reduces the interference with other users during pulse collisions by allocating waveforms with a small cross-correlation with every time shift to the respective users. Because reception MHP waveforms have the quality of having a cross-correlation that grows smaller as the orders grow further apart, interference with other users in an asynchronous multiple access environment is rendered by allocating MHP waveforms with separate orders to the users.

The transmission/reception system of this system is substantially the same as the transmission/reception system (FIGS. 77 and 78). The difference is that, as different waveform are allocated for each user, the orders of the waveforms that are selected upon transmission differ according to the user.

Further, although performing communications by means of PSM by allocating a plurality of waveforms to each of the users and matching data with the waveforms may be considered, only the quality when the time shift is 0 of the waveforms allocated to one user may be considered and there is no need to allocate a waveform with a small cross-correlation with every time shift. This is because, supposing that synchronization of the signal of a certain user is implemented upon reception, synchronization of the template waveform of the user can be performed without a time shift.

Therefore, a standard (rule) when determining a waveform that is allocated to one user is established as follows.

(1) A minimum of two MHP waveforms are allocated to one user. The two waveforms are a set of waveforms in which when the first order is η, the order of the other waveform is expressed by η+2.

(2) Different users must be allocated (a set of) separate MHP waveforms. A plurality of users do not use MHP waveforms of the same order.

(3) Different users use (a set of) waveforms of separate orders wherever possible. When the number of users has grown large, as long as the same waveform is not used, orders may be somewhat close to one another.

Figure 79:
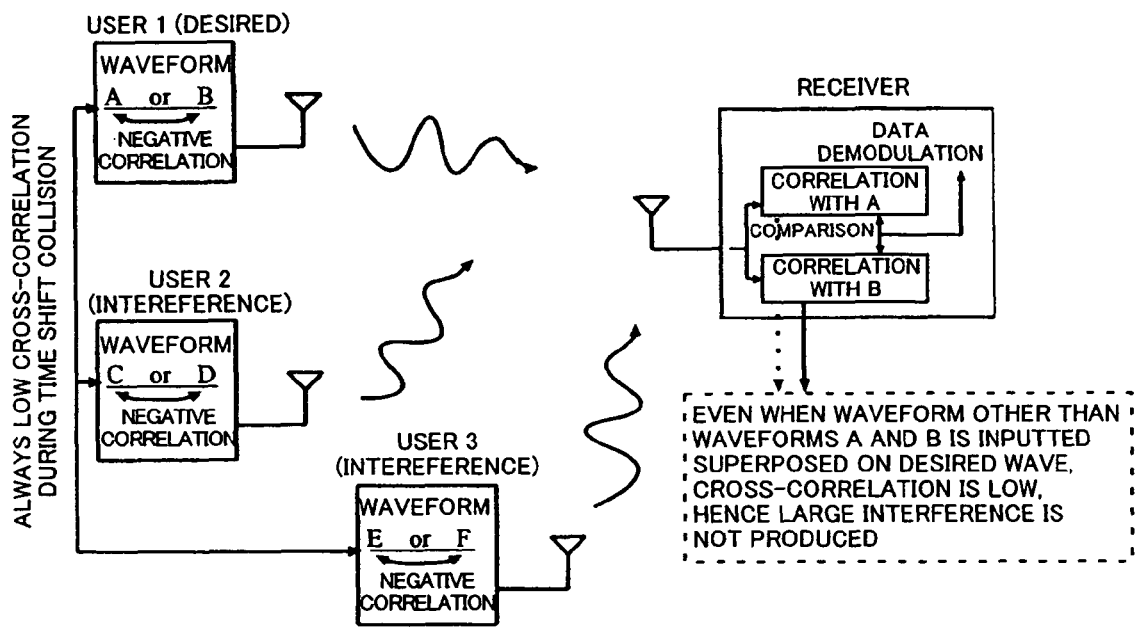
FIG. 79 serves to illustrate an interference reduction system of a system for reducing interference with other users that uses an MHP waveform.

An image of the interference reduction of this system is shown in FIG. 79.

A performance evaluation by means of a processor simulation will be described next. An evaluation of the system of the present invention is performed by means of a processor simulation. When the receiver performs a simulation by assuming that synchronization with the signal of the desired user is established, the results are as follows.

A comparison of proposed systems for every environment will now be described. First, the orders of usable MHP waveforms are fixed (orders 0 to 15) and a comparison by means of a processor simulation is performed in order to investigate the optimum system (with the lowest BER) when the transmission power per bit rate and bit is fixed in an asynchronous multiple access environment in which the number of users is changed.

The systems of the present invention that are compared here are described for all numbers of users. However, in the multivalued UWB transmission system (system a), the orders and number of multiple values and so forth used by one user do not change as a result of the number of users. A specific description for a case where a system for reducing interference with other users (system b) is applied is provided below.

First, a case with two users will be described. Waveforms of orders 0 and 2 are allocated to user 1 and waveforms of orders 13 and 15 are allocated to user 2. The users match data 0 and 1 with two allocated waveforms and transmit the data. On the reception side, reception MHP waveforms of orders 0 and 2 are prepared as template waveforms for use by user 1 and the orders of the reception waveforms are determined by comparing the correlation outputs and the data are demodulated. The same is also true of user 2.

A case with four users will be described next. MHP wave forms of orders 0 and 2 are allocated to user 1, orders 4 and 6 to user 2, orders 9 and 11 to user 3, and orders 13 and 15 to user 4 respectively. Thereafter, data 0 and 1 are matched with the allocated waveforms and transmitted in the same way as detailed above and the receiver discriminates transmission data by means of a correlation with the template waveforms corresponding with the reception waveforms.

A case with eight users will be described next. MHP waveforms of orders 0 and 2 are allocated to user 1, orders 1 and 3 to user 2, orders 4 and 6 to user 3, orders 5 and 7 to user 4, orders 8 and 10 to user 5, orders 9 and 11 to user 6, orders 12 and 14 to user 7, and orders 13 and 15 to user 8 respectively. The modulation and demodulation systems are executed in the same way as detailed above.

Simulation conditions are shown in Table 9 below.

| Proposed system comparison simulation parameters | |
|---|---|
| Number of users | 2, 4, 8 |
| Pulse width | 1.0 ns |
| Used MHP orders | Orders 1 to 15 |
| Frame length | 10 ns |
| Bit rate | 100 Mbps |
| Transmission ratio | K = 1 to 4 bits/symbol |
| Number of pulse repetitions($N_s$) | k |
| Sampling duration | 0.01 ns |
| Number of tests | 50000 bit |
| Propagation path | AWGN |
| $E_b/N_o$ | 0 to 20 dB |

Figure 80:
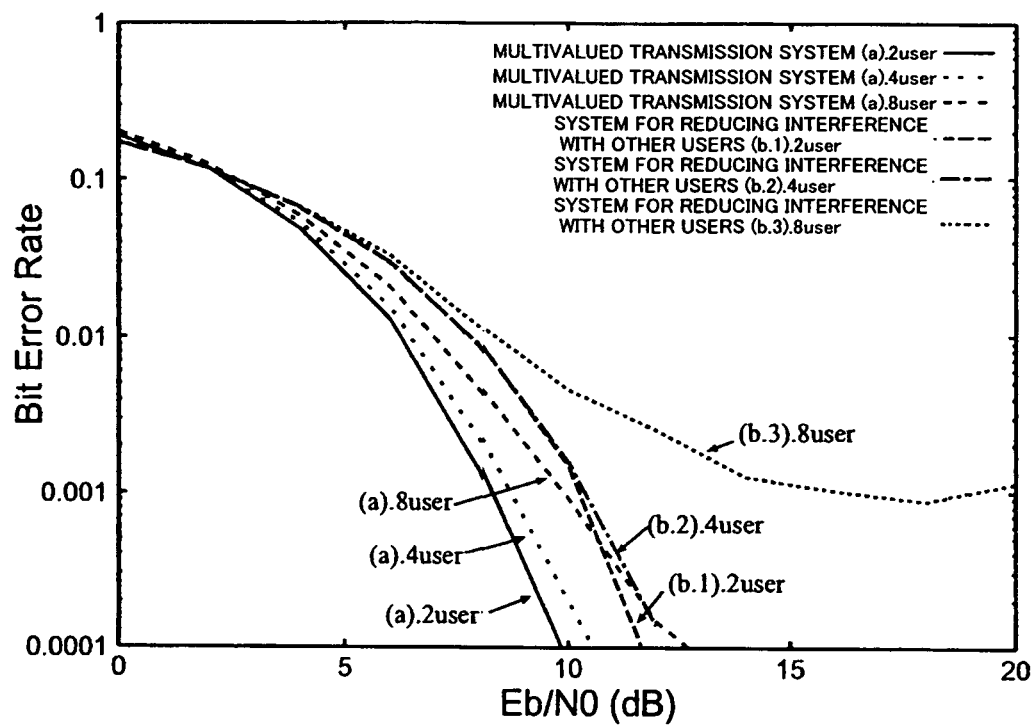
FIG. 80 shows the results of the comparison simulation of the present invention.

As per the comparison simulation results shown in FIG. 80, a multivalued transmission system (a) in all cases when there are 2, 4, and 8 users has a lower BER than that of a system (b) for reducing interference with other users or multiuser interference. This is thought to be because it is possible to extend the time frame length and the number of pulse repetitions without changing the transmission speed by performing multivalued transmission, and, therefore, a multivalued transmission system that makes it possible to lower the probability of pulse collisions has greater results than a system for reducing interference with other users that keeps interference low when a hit occurs.

According to the results above, the multivalued transmission system of (a) is more effective as a UWB communication system that employs an MHP waveform in asynchronous multiple access and a multivalued UWB-CDMA system. The results of a comparison simulation comparing a conventional system and the system of the present invention will be shown next.

Here, a comparison of the Eb/No versus BER characteristic between a conventional system and a multivalued UWB-CDMA transmission system that employs the MHP waveform constituting the system of the present invention is made. As conventional systems, binary PPM systems and M-ary/UWB systems are used. A comparison is made under the condition that the number of users, bit rate, and pulse width are made uniform in all the systems and that the number of multiple values is made uniform in the M-ary/UWB systems.

The simulation condition parameters are shown in Tables 10(1), and 11(2) below.

| Comparison simulation parameters (1) with conventional system | |
| --- | --- |
| Number of users | 1, 10 |
| Used Pulse width | 1.0 ns |
| Used multivalued sequence (M-ary/UWB) | Walsh sequence |
| Used orders (proposed system) | Orders 0 to 15 |
| Bit rate | 33.3 Mbps |
| Sampling duration | 0.01 ns |
| Number of tests | 50000 bit |
| Propagation path | AWGN |
| $E_b/N_0$ | 0 to 20 dB |

| Comparison simulation parameters (2) with conventional system | | | |
| --- | --- | --- | --- |
| | Proposed system | M-ary/UWB | Binary PPM (BPPM) |
| Transmission ratio k (bit/symbol) | 4 | 4 | 1 |
| Number of pulse repetitions $N_s$ (times) | 4(=k) | $8(=2^{k-1})$ | 1(=k) |
| Time frame length $T_f$ (ns) | 30 | 15 | 30 |

Figure 81:
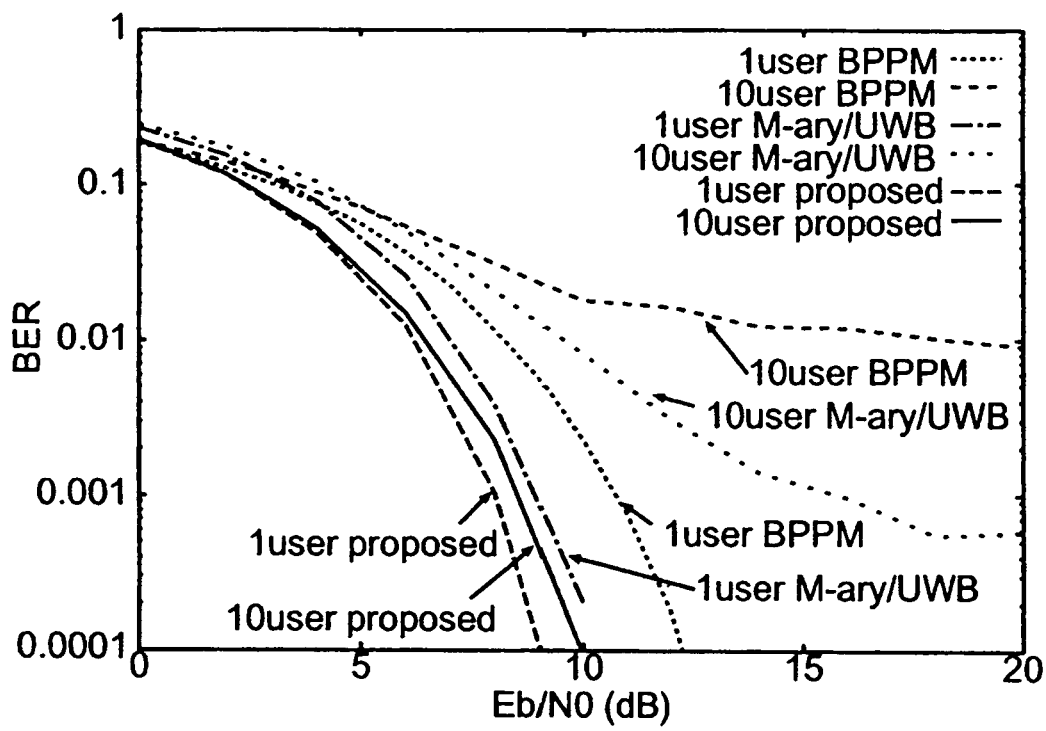
FIG. 81 shows the results of a comparison simulation with a conventional M-ary UWB system.

As shown by the results of the comparison simulation between a conventional system and a M-ary/UWB system shown in FIG. 81, the proposed system is compared with a binary PPM system and M-ary/UWB system and a BER characteristic that is favorable when there is one user and ten users is shown.

When there is one user, the BER characteristic becomes favorable as the number of multiple values exceeds BPPM that sends one bit by means of one symbol as per the M-ary/UWB system. This is because the correlator output corresponding with data other than the transmission data is 0 or a negative correlation during reception and, therefore, as the number of multiple values is increased, the probability of a one-bit error when the Eb/No is high is low. Further, although a difference of approximately 1 dB is apparent between the system of the present invention and M-ary/UWB, this is because, with the M-ary/UWB system that PPM-modulates each repeated pulse, the SNR of a correlation output equivalent to one correlator that corresponds with the transmission data is 1 dB lower than the SNR during reception (prior to the correlator input). With the system of the present invention, the SNR of a correlation output equivalent to one correlator corresponding with transmission data is the same as the SNR during reception (prior to the correlator input) and is therefore a 1 dB more favorable characteristic than the M-ary/UWB system.

Further, differences in the characteristics when there are ten users arise due to the number of pulse repetitions and the time frame length. With the system of the present invention, the frame length is the same as that of the BPPM system and the number of repetitions is increased by the same measure as the number of multiple values. On the other hand, with the M-ary UWB system, because the number of repetitions must be $2^{k-1}$ times the number of multiple values k, the time frame is narrower than those of the two systems above. Accordingly, although an adequate frame length may have been secured for the number of users, when there is a desire to increase the transmission speed, the pulse collision probability is higher than that of the other systems as per the simulation results and the characteristic when there are multiple users deteriorates greatly.

Because there are no limitations on the number of repetitions, the system of the present invention makes it possible to suppress deterioration of the characteristic in a multi-user environment by preparing a frame length that corresponds with the number of users.

The resistance to a synchronization shift of the system of the present invention will be described next.

Here, the effects of Timing Jitter during signal reception will be described.

First, autocorrelation of modified Hermite waveforms will be described. In the previous simulation comparisons, it has been assumed that the receiver was synchronized with the desired signal. However, the phenomenon that actually occurs is that the desired signal is received with a slight temporal shift from the original desired timing even after synchronization. In such a case, deterioration of the bit error rate in comparison with a case where reception takes place at the original desired timing may be considered. With the system of the present invention, several types of MHP waveforms are used and the reception waveform is a more complex waveform than a conventionally used monocycle waveform. Therefore, it is thought that, even when a synchronization shift of the same magnitude occurs, a difference in the deteriorated condition of the characteristic can be seen between the conventional system and the system of the present invention. The difference in the deteriorated condition of the characteristic between the conventional system and the system of the present invention is described hereinbelow.

Figure 82:
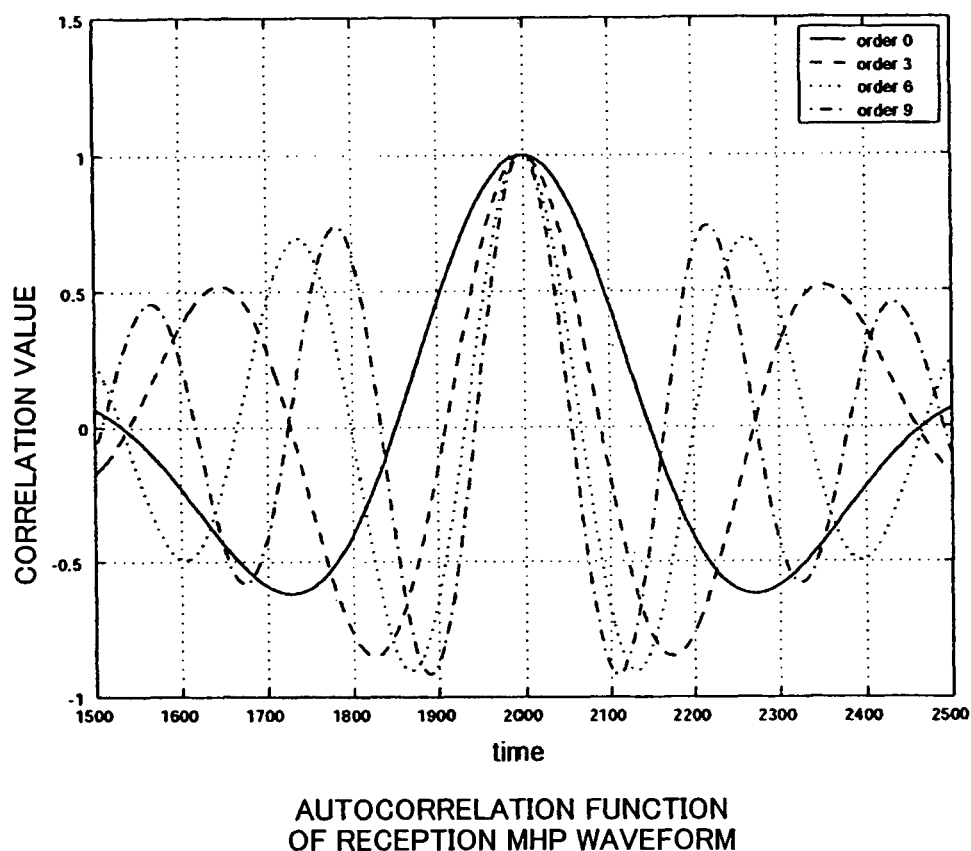
FIG. 82 shows an autocorrelation of a reception MHP waveform.

First, an autocorrelation function for reception MHP waveforms is shown in FIG. 82.

As mentioned earlier, the reception MHP waveform has the quality of getting sharper close to the peak of the autocorrelation function for waveforms with increasingly higher orders.

Therefore, the deteriorated condition of the characteristics relative to a synchronization shift with a conventional system and the proposed system will be described by means of a processor simulation. On this occasion, the BER deterioration when the width of the synchronization shift is changed to [−0.01 ns:0.01 ns], [−0.02 ns:0.02 ns], [−0.05 ns:0.05 ns], and [−0.1 ns:0.1 ns] is found by means of simulation.

The simulation condition parameters are shown in Table 12 below.

| Synchronization shift resistance comparison simulation parameters | |
| --- | --- |
| Number of users | 1 |
| Pulse width | 0.7 ns |
| Used multivalued sequence (M-ary/UWB) | Walsh sequence |
| Used orders (proposed system) | Orders 0 to 7 |
| Bit rate | 62.5 Mbps |
| Transmission ratio | 3 bit/symbol |
| Sampling duration | 0.01 ns |
| Shift time | 0.01, 0.02, 0.05, 0.1 ns |
| Number of tests | 20000 bit |
| $E_b/N_o$ | 0 to 10 dB |

Figure 83:
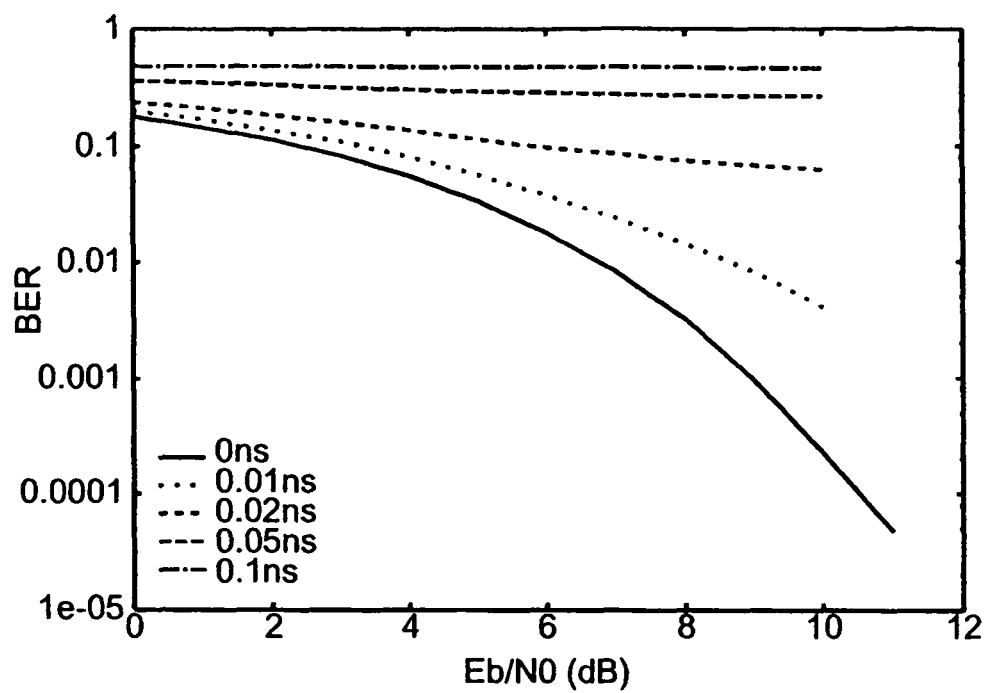
FIG. 83 serves to illustrate the change in the BER that is caused by the effects of a synchronization shift of the system of the present invention.
Figure 84:
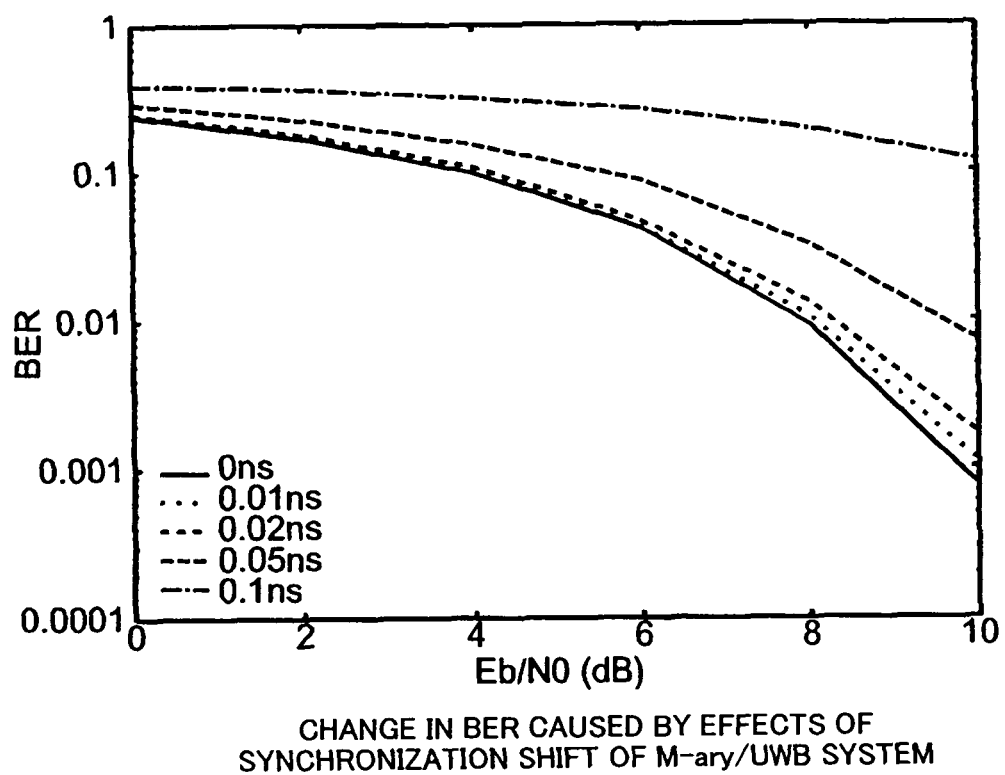
FIG. 84 serves to illustrate the change in the BER that is caused by the effects of a synchronization shift of a M-ary UWB system.

As shown in the simulation results of a variation n in BER caused by the effects of a synchronization shift of the present invention in FIG. 83 and in the change in BER due to the effects of a synchronization shift in the M-ary UWB system in FIG. 84, with the M-ary UWB system that employs only a monocycle waveform there is no large variation in the BER even when a synchronization shift on the order of 0.01 and 0.02 ns occurs and the BER deteriorates greatly when a synchronization shift on the order of 0.05 and 0.1 ns occurs.

Meanwhile, with the system of the present invention that employs an MHP waveform, the BER deteriorates greatly in comparison with a case where there is no synchronization shift even when a synchronization shift of 0.01 ns occurs and, when the duration of the synchronization shift is enlarged, the BER barely drops even when the transmission power is raised.

Therefore, of the two approaches to a UWB-CDMA transmission system that employs a modified Hermite waveform, the multivalued UWB transmission system employing MHP waveforms have a more favorable characteristic in the event of asynchronous multiple access. The system of the present invention also considers modification of the waveform during reception and, by performing multivalued transmission that uses this characteristic when an MHP waveform is used, a characteristic having a superior bit rate characteristic with respect to Eb/No to that of M-ary UWB system, which is an existing multivalued system, can be obtained.

However, the condition that the pulse durations be made uniform in a comparison is thought to be part of the reason for the favorable characteristic even when the usage bands are different and the system of the present invention uses a wider band than that of a conventional system.

Further, when the synchronization shift caused by the effects of Timing Jitter is considered, this system also includes the problem that the deterioration of the characteristic is severe, and so forth.

The third aspect of the present invention will be described next. The third aspect expands the desired frequency characteristic in a frequency region in UWB communications in which pulses of short duration are transmitted and, by combining a plurality of time pulses selected from among time pulses that form a component of the expanded frequency region, a time pulse shape satisfying the desired frequency characteristic is generated.

As mentioned earlier, a variety of wireless communication systems currently exist and each of these systems allocate different frequency bandwidths to eradicate interference with other systems. However, the premise is that, in order to also afford the UWB usage frequency bandwidth a few GHz, the UWB system shares the frequency bandwidth with an existing wireless system. Accordingly, whether interference with conventional narrow bandwidth wireless communications is held down is cited as a problem of UWB. For example, in February of 2002, the U.S. Federal Communications Commission (FCC) published transmission power restrictions in order to suppress interference with other systems caused by UWB. Accordingly, UWB is limited to two bandwidths [0 to 0.96 GHz] and [3.1 to 10.6 GHz] and the maximum output is limited to −41 dBm/MHz and an output on the order of 1/100 is only allowed in the other bands. Currently, in the case of a wireless LAN of a spectrum spreading system that uses the 2.4 GHz band frequency, the transmission restriction for radio waves is 10 dBm/MHz.

That is, it can be seen that the UWB output per MHz is on the order of a maximum of 10 to 5 in comparison with a LAN that uses the 2.4 GHz band and the spectrum power density is very small. This is one characteristic of UWB that arises for the sake of impulse communications without UWB using a carrier wave. Further, even with the allowed transmission power, the FCC's approval of usage as a commercial UWB device is currently only in the band [3.1 to 10.6 GHz]. This is because the FCC has placed strict restrictions on UWB devices that use frequencies of 960 MHz and below that are used by AM/FM radio, television users, and old-type cellular phone networks.

A spectrum mask that is different from that used in conventional communications is prepared for UWB systems. That is, how to design signals, that is, waveforms, in the spectrum mask has been cited as a new problem faced by UWB communications. Prerequisites upon considering a new UWB waveform design include the usage of a system that performs modulation by means of PPM (Pulse Position Modulation), that is, by means of pulse positions and TH (Time Hopping) of a pulse by means of a TH sequence for each user.

Further, when a waveform design is considered for UWB communications, in a broad classification, the following three points should be considered. First, a UWB pulse is an ultrashort pulse. This is because a temporally extended pulse consists of a parameter for increasing the effects of interference with other users in the event of a multi-user environment. Second, a UWB pulse is a pulse that achieves maximum power in a spectrum mask. This makes it possible to reduce the number of pulses for transmitting one bit and, as a result, is a primary factor that makes it possible to attempt an increase in the capacity of the UWB communication path. Third, the differential characteristic of the pulse is considered. According to FCC restrictions, the UWB output restrictions are not regulations on the power during transmission but instead power regulations during reception of a UWB signal such as the gain and loss of the communication path and the gain of the transmission antenna and so forth. Normally, pulses are related through differentiation during transmission and during reception from an antenna. In the case of communications using a carrier wave, a reception waveform that has been differentiated twice does not change as a result of only a difference in phase from the transmission waveform but in a UWB case, the waveform and frequency characteristic change greatly. For this reason, the transmission waveform must be determined by considering a characteristic that has been differentiated twice.

In the case of currently investigated UWB systems that employ an impulse, it is not easy to say that a pulse is a pulse with favorable frequency usage efficiency under output restrictions. Therefore, a pulse for which the three points above have been considered under the transmission power restrictions are shown here.

Although this repeats the above, the principles and characteristics of UWB and the output restrictions imposed by the FCC will be described. This is because, here, the third aspect expands the desired frequency characteristic in a frequency region and performs signal rendering using Fourier expansion in order to generate a time pulse shape that satisfies the desired frequency characteristic by combining a plurality of time pulses selected from among time pulses that form a component of the expanded frequency region.

Subsequently, a pulse design procedure that maximizes the output under transmission power restrictions, a system, and a pulse generator will be described, and an analysis and performance evaluation of a UWB system that employs impulses under transmission power restrictions and the UWB system that employs pulses of the present invention will be described.

First, a UWB transmission signal and modulation system according to UWB principles will be described. The UWB system illustrated here will be shown in Document 3, for example.

In the case of the UWB system, the transmission signal $s_{tr}^{(k)}(t^{(k)})$ of the kth user is expressed as per the following Equation (77):

$$s_{tr}^{(k)}(t^{(k)}) = \sum_{j=-\infty}^{\infty} w_{tr}(t^{(k)} - jT_f - c_j^{(k)}T_c - d_j^{(k)}\delta) \quad (77)$$

where $t^{(k)}$ is the clock time, Tf is the pulse repetition time, Tc is the TH (Time Hopping) chip length, $c_j^{(k)}$ is the jth TH sequence of the kth user, $d_j^{(k)}$ is the information sequence of the jth hop of the kth user, and $W_{tr}(t)$ is the transmitted Gaussian waveform. A plurality of pulses that have each been shifted by different times are transmitted by the transmitter of the kth user. The respective parameters are described here.

(1) In the pulse repetition time, each user transmits one pulse in a frame of a fixed duration known as a time frame.

(2) With regard to the TH chip length, the time frame is divided into a plurality of slots and each user determines according to the TH sequence in which slot of the time frame to transmit their pulse.

(3) With regard to the TH sequence, when the number of users increases, user pulses collide and this produces interference with other users. Therefore, a shift pattern that is different for each user is constituted by using a random sequence of 1's and 0's known as a TH sequence. Each user determines a slot that is transmitted in a time frame according to the TH sequence.

(4) The information sequence is a sequence of 0's and 1's. In UWB, transmission data is judged according to the pulse position. That is, in order to transmit a 1, $W_{tr}(t^{(k)}-_jT_f-c^{(k)}T_c-\delta)$ is transmitted and, in order to transmit a 0, $W_{tr}(t^{(k)}-_jT_f-c^{(k)}T_c)$ is transmitted.

That is, in this case, the UWB modification system may be said to be PPM (Pulse Position Modulation), which delays the transmission time of the pulse according to the transmission data.

Figure 85:
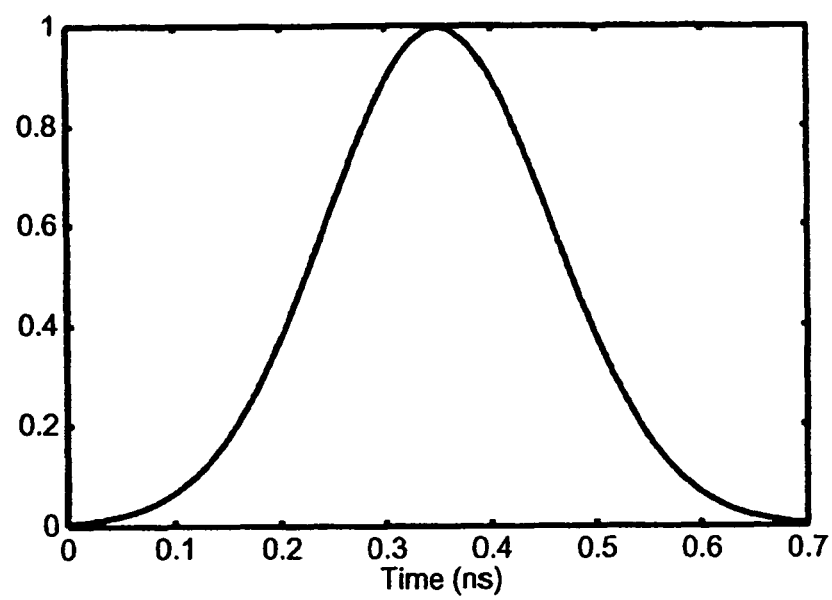
FIG. 85 shows a UWB transmission waveform.
Figure 86:
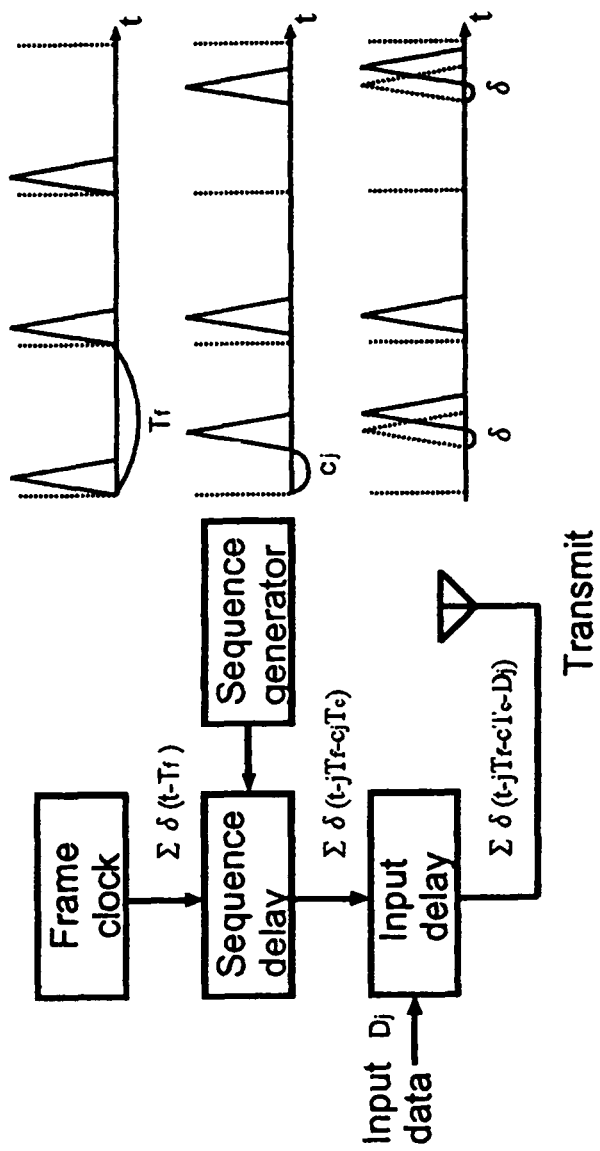
FIG. 86 serves to illustrate the constitution of a UWB transmitter.

(5) Where the Gaussian waveform is concerned, a Gaussian waveform constituting the transmission waveform is shown in FIG. 85. Further, FIG. 86 shows a constitutional example of the UWB transmitter.

Figure 87:
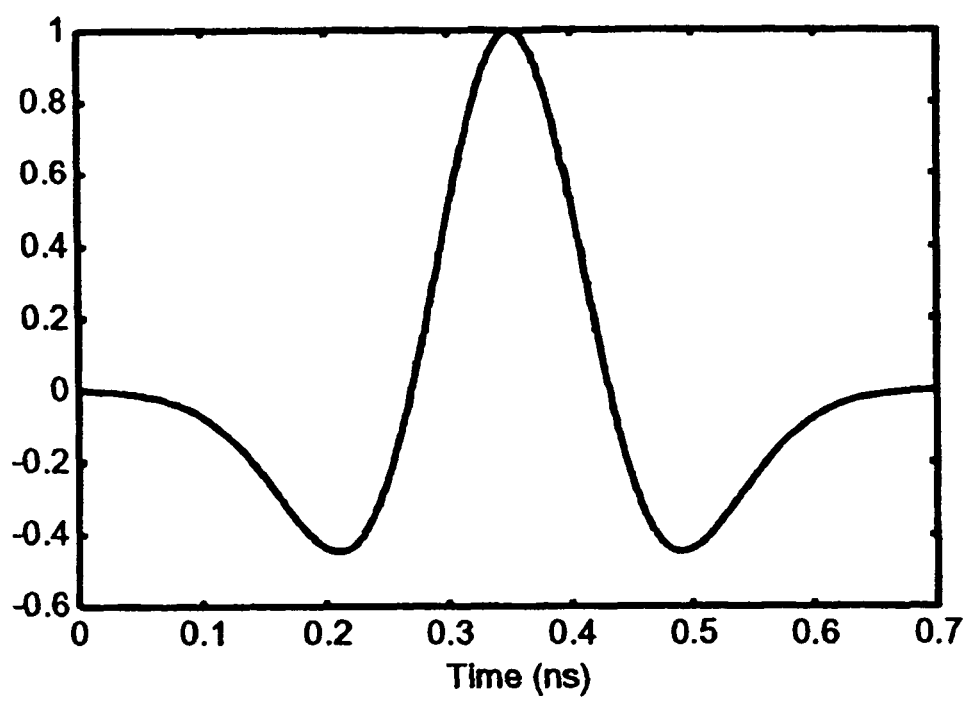
FIG. 87 shows a UWB reception waveform.
Figure 88:
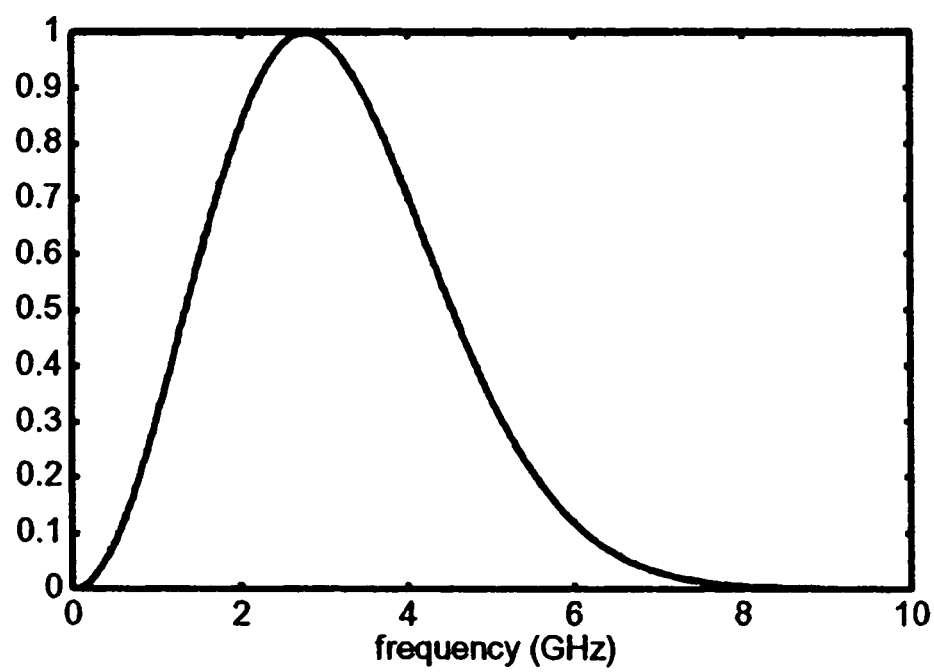
FIG. 88 is a frequency characteristic diagram of the UWB reception waveform.

The processing by the UWB receiver will be described next. The transmission waveform shown in FIG. 85 is transmitted and the waveform undergoes second-order differentiation until being inputted to the receiving antenna. That is, supposing that the ideal reception waveform is $W_{rec}(t)$, Equation (78) is $$w_{rec}(t) = \frac{d^2 w_{tr}(t)}{dt^2} \quad (78)$$

and the reception waveform is shown in FIG. 87 and the frequency characteristic of the reception waveform is shown in FIG. 87.

Figure 89:
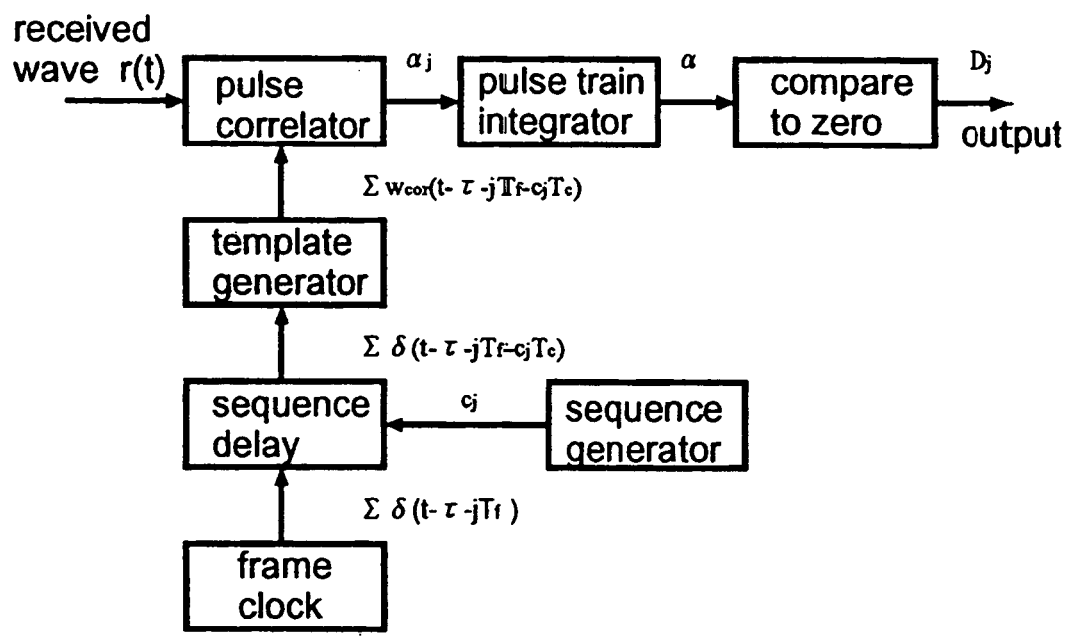
FIG. 89 serves to illustrate the constitution of a UWB receiver.

The UWB receiver decodes data from the received waveform. That is, the UWB receiver processes the received waveform and judges whether information is 0 or 1. Processing in the UWB receiver is shown in the block diagram of FIG. 89. However, suppose that the number of repetitions (number of pulses required to transmit one bit) is Ns. The processing in the receiver will now be described.

Figure 90:
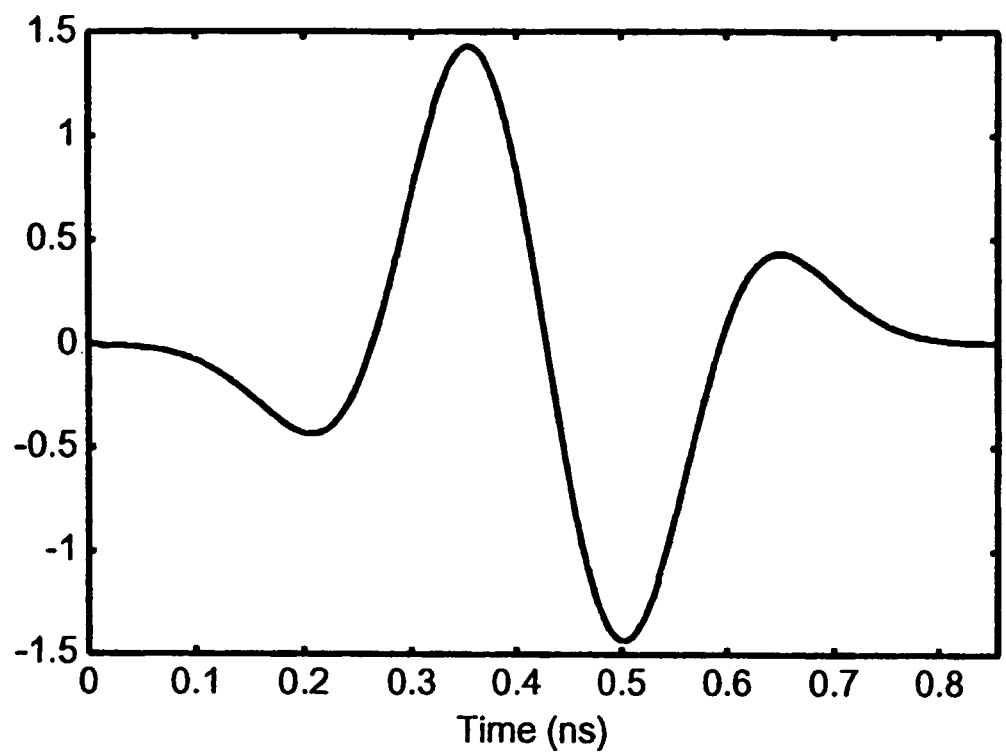
FIG. 90 shows a correlation waveform.

(1) On the UWB transmission side, a correlation waveform $W_{cor}(t)$ in FIG. 90 is prepared by matching the timing with the respective transmission pulses by using the TH sequences that are allocated to each user. However, this completes synchronization. Supposing that the reception waveform is r(t), same is expressed by Equation (79).

$$r_1(t) = A_1 w_{rec}(t - \tau_1 - jT_f - c_{j1}T_c - D_{j1}) + n_{itf} \quad (79)$$

The interference component $n_{itf}$ is the addition of noise and interference with other users (number of users Nu), that is, Equation (80):

$$n_{itf} = \sum_{k=2}^{N_u} A_k w_{rec}(t - \tau_k - jT_f - c_{jk}T_c - D_{jk}\delta) + n(t) \quad (80)$$

and $A_k$ is a constant representing attenuation of the communication path. Thereupon, the correlation waveform of user 1 is prepared with Equation (81)

$$w_{cor}(t) = w_{rec}(t-\tau_1-jT_f-c_{j1}T_c) - w_{rec}(t-\tau_1-jT_f-c_{j1}T_c-\delta) \quad (81)$$

serving as the filter on the reception side.

(2) The correlation value between the reception waveform and correlation waveform is found for each pulse.

(3) The decoding of data is such that, if the total of the correlation values of pulses corresponding to the number of repetitions is greater than 0, the transmission information is judged to be 0 and, if the total is smaller than 0, the transmission information is judged to be 1. When the number of users and transmission data $D_{j1}$ are independent random numbers, the optimum receiver is a correlation receiver, which produces Equations (82) and (83)

$$\sum_{j=1}^{N_s} \int_{\tau_1+jT_f}^{\tau_1+(j+1)T_f} r(t)w_{cor}(t)\,dt \geq 0 \Rightarrow D_{j1} = 0 \quad (82)$$

$$\sum_{j=1}^{N_s} \int_{\tau_1+jT_f}^{\tau_1+(j+1)T_f} r(t)w_{cor}(t)\,dt \leq 0 \Rightarrow D_{j1} = 1 \quad (83)$$

The frequency characteristic of the UWB reception signal will be described next.

Characteristics are analyzed by using a shift theorem of a Fourier transform for the frequency characteristic of a single UWB pulse and the frequency characteristic of a plurality of TH (Time Hopping) UWB pulses. Suppose that the Fourier transform of a single pulse f(t) is F(jw), the following Equation (84) is produced.

$$F(j\omega) = \int_{\infty}^{\infty} f(t)e^{-j\omega t}\,dt \quad (84)$$

When the same pulse is received delayed by time τ, the Fourier transform of f(t−τ) is Equation (85).

$$F'(jw) = \int_{\infty}^{\infty} f(t-\tau)e^{-jw(t-\tau)}e^{-jw\tau}\,dt \quad (85)$$
$$= e^{-jw\tau}\int_{\infty}^{\infty} f(t-\tau)e^{-jw(t-\tau)}\,dt$$
$$= e^{-jw\tau}\int_{\infty}^{\infty} f(t')e^{-jw(t')}\,dt'$$
$$= e^{-jw\tau}F(jw)$$

Therefore, when these two pulses f(t) and F(t−τ) constitute one set and are a Fourier transform, the result is Equation (86).

$$F(jw) + F'(jw) = (1 + e^{jw\tau})F(jw) \qquad (86)$$
$$= [(1 + \cos w\tau) - j\sin w\tau]F(jw)$$

A Fourier transform is shown by the sum of the second powers of the real part and false part, and, therefore, the resulting output is Equation (87).

$$abs[F(jw) + F'(jw)] = (1 + \cos w\tau)^2 + (\sin w\tau)^2 \qquad (87)$$
$$= 2 + 2\cos w\tau$$

Accordingly, the sum of two pulses can be determined as a function that oscillates cyclically upon undergoing a Fourier Transform. This is extended to N pulses. Supposing that the kth pulse is received delayed by $\tau_k$, the Fourier transform becomes Equation (88) as mentioned earlier.

$$F_k(jw) = e^{-jw\tau_k} F(jw) \qquad (88)$$

Consequently, the Fourier transform for N reception pulses that has undergone TH is Equation (89).

$$\sum_{k=1}^{N} F_k(jw) = abs\left[1 + \sum_{k=2}^{N} e^{-jw\tau_k}\right] F(jw) \qquad (89)$$

This is a frequency characteristic during reception of the UWB pulse. It can thus be seen that the envelope of the pulse frequency characteristic does not change as much as it does for one pulse. However, a frequency bandwidth in which peaks occurs depending on the number of pulses and the delay time exists. That is, the frequency characteristic of N UWB pulses depends on the frequency characteristic of one pulse. Therefore, the generation of one pulse and the frequency characteristic are evaluated and analyzed here.

A spectrum mask will be described next. Further, an FCC spectrum mask will be subsequently described.

UWB was originally researched as a U.S. military radar technology in the 1950's and there is an organization in the U.S. that acts to limit wireless and wired communications from the 1930's known as the U.S. FCC (Federal Communications Commission). Because frequency is a finite resource, the object is to establish communications without interference.

In addition, in the case of UWB, the output restrictions are very small in order to share the frequency bandwidth with existing narrow band communications. The following output restrictions on UWB were published by the FCC on Feb. 14, 2002. The FCC actually approves usage for commercial UWB devices in the band [3.1 to 10.6 GHz]. Further, this does not mean that, under these power restrictions, the transmission power may satisfy the UWB restrictions of the FCC in FIG. 91. That is, the output restrictions consider attenuation in the communication path and the transmission antenna gain. This is where a large difference between UWB and existing narrowband communications exists. This is a difference in bandwidth. This difference will be described by using equations. Supposing that the Fourier transform for a certain transmission pulse f(t) is Equation (90), $$F(j\omega) = \int_{\infty}^{\infty} f(t)e^{-j\omega t} dw \qquad (90)$$

the Fourier transform $F^{(1)}(jw)$ of a first-order differential of f(t) is Equation (91)

$$F^{(1)}(jw) = iwF(jw) \qquad (91)$$

Consequently, a second-order differential, that is, a Fourier transform $F^{(2)}(jw)$ of the reception waveform is Equation (92).

$$F^{(2)}(jw) = |i^2 w^2 F(jw)| \qquad (92)$$
$$= w^2 F(jw)$$

That is, it can be seen that the Fourier transform of the reception waveform is expressed by (Fourier transform of transmission waveform)$\times(\omega^2)$.

Here, because the bandwidth is narrow in the case of narrowband communications, there is no disintegration of the general shape of the frequency characteristic of the reception waveform even when same is differentiated twice but this is not true in the case of UWB. That is, due to the ultrawide band, the reception waveform is attenuated and amplified according to frequency. In other words, the UWB pulse must be determined by considering the second-order differentiated characteristic.

The pulse and system that permit the maximum output under the transmission power restrictions (spectrum mask) of the FCC and so forth will be described next. Here, the explanation will be divided into three design standards.

First, the pulse that maximizes the output under the power restrictions, which constitutes the first design standard, will be described. One design standard is under the restrictions of a spectrum mask of the FCC or the like (FCC spectrum mask is described below) and therefore the UWB pulse yielding the maximum output is determined.

Figure 91:
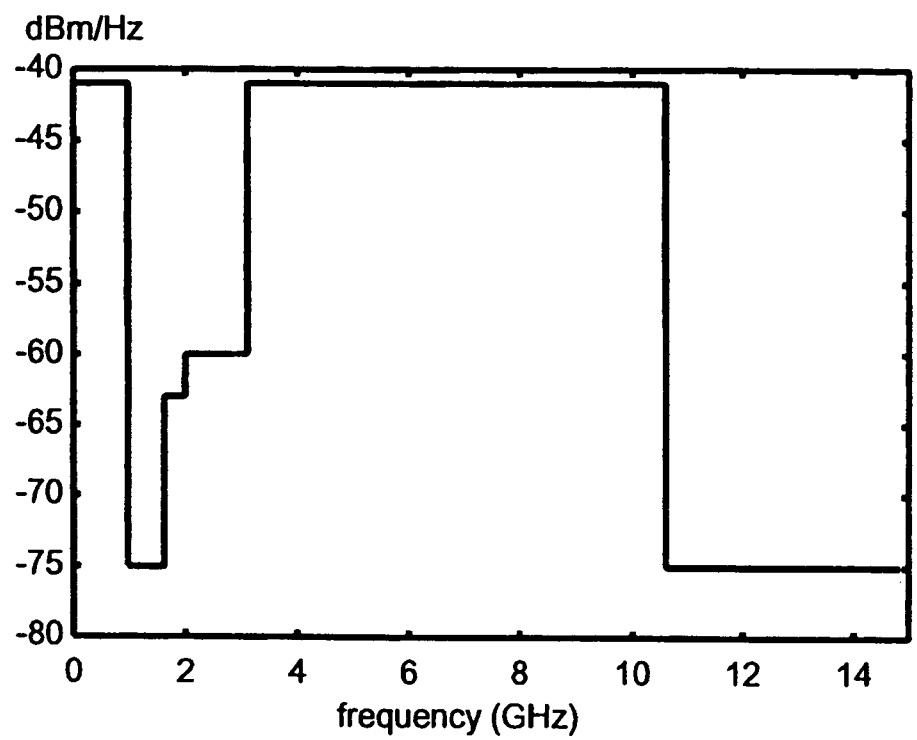
FIG. 91 is a frequency characteristic diagram that serves to illustrate UWB output restrictions imposed by the FCC.

First, the FCC spectrum mask undergoes an inverse Fourier transform and the time waveform is subjected to an inverse Fourier transform to confirm its nature. The spectrum mask shown in FIG. 91 is expressed by the addition of a rectangular wave. Therefore, the spectrum mask undergoes an inverse Fourier transform and viewing the time waveform is considered. This relationship is expressed by Equation (93).

$$F(jw) = \int_{\infty}^{\infty} [FCCmask] dw \qquad (93)$$
$$= \sum_{N=}^{N} a_n \cos(w_n t) \cdot \frac{\sin(w'_n t)}{t}$$

Therefore, the FCC transmission power restrictions can be rendered by a set of sinc functions on a time line. The segments [0 to 0.96 GHz] and [3.1 to 10.6 GHz] of the FCC output restrictions in FIG. 91 allow an output that is 100 times to 1000 times that of other segments. Further, Document 19 makes it evident that, with a GPS (Global Positioning System), UWB interference cannot be ignored even when such interference is below FCC transmission power restrictions. Therefore, these two segments are mainly considered and a Fourier transform of the other segments is not considered. That is, Equation (94) is produced.

$$F(jw) = \int_{\infty}^{\infty} [FCCmask] dw \qquad (94)$$

$$= A\left[\cos(0.048 \times 10^{-2}\pi t) \times \frac{\sin(1.10 \times 10^{-2}\pi t)}{\pi t}\right] +$$

$$B\left[\cos(13.7 \times 10^{-2}\pi t) \times \frac{\sin(6.5 \times 10^{-2}\pi t)}{\pi t}\right]$$

This is a pulse with a frequency characteristic in which the former segment is [0 to 0.96 GHz] and the latter segment is [3.1 to 10.6 GHz].

Further, a sinc function requires an infinite time in order to render the frequency characteristic a rectangular wave. When a sinc function is expressed in a finite time as a UWB pulse, a sidelobe is produced in the case of a rectangular wave that cannot be plotted on a frequency axis. As means for solving this problem, a sidelobe is reduced by a bandpass filter. That is, the desired frequency characteristic accuracy is improved by subjecting the time waveform f(t) having a certain frequency characteristic F(jw) to convolution integration by f(t) itself. Expressing this by means of an equation yields Equation (95).

$$f'(t) = \int_{\infty}^{\infty} f(\tau) f(t-\tau) dt \qquad (95)$$

$$= f(\tau) * f(t-\tau)$$

The frequency characteristic F'(jw) of f(t)' at this time is Equation (96)

$$F'(jw) = F(jw)^2 \qquad (96)$$

That is, the fact that the convolution integral of the time region is a product of the frequency region is used to render a shape that is closer to the desired frequency characteristic. As a result, even when the sidelobe is $1/100^{th}$ of the main lobe, the sidelobe can be restrained to $1/10000^{th}$ of the main lobe.

Further, when the desired frequency characteristic or approximate frequency characteristic is subjected to an inverse Fourier transform, the frequency characteristic is expressed through the addition of a plurality of time waveforms. A time pulse shape satisfying the desired frequency characteristic can also be generated by combining a plurality of time waveforms selected from among the plurality of time waveforms. A time pulse that satisfies the desired frequency characteristic is generated by adjusting a combination of time waveforms selected from among time waveforms that are obtained by the inverse Fourier transform. Further, the original frequency characteristic that is used in the inverse Fourier transform is not limited to the desired frequency characteristic and may be the desired frequency characteristic or an approximate frequency characteristic.

A transmission waveform that considers the frequency characteristic of the reception waveform will be described next.

Hereinabove, the UWB output restrictions imposed by the FCC undergo an inverse Fourier waveform and the time waveform thereof is determined. Here, the process from transmission to reception is considered. That is, a pulse is determined by considering the change in the frequency characteristic during transmission and reception of the pulse, which is the second design standard.

Supposing that the time waveform determined by Equation (94) is the reception waveform and the transmission waveform is the result of twice integrating Equation (94). However, when the integral is considered, same is not generally a pulse and it is also necessary to think about the integral constant. Therefore, the time waveform of Equation (94) is the transmission waveform and a reception waveform that is closer to the spectrum mask is considered.

As mentioned earlier, (frequency characteristic of the reception waveform)=(frequency characteristic of the transmission waveform)×($\omega^2$) and attenuation or amplification takes place for each frequency.

Figure 92:
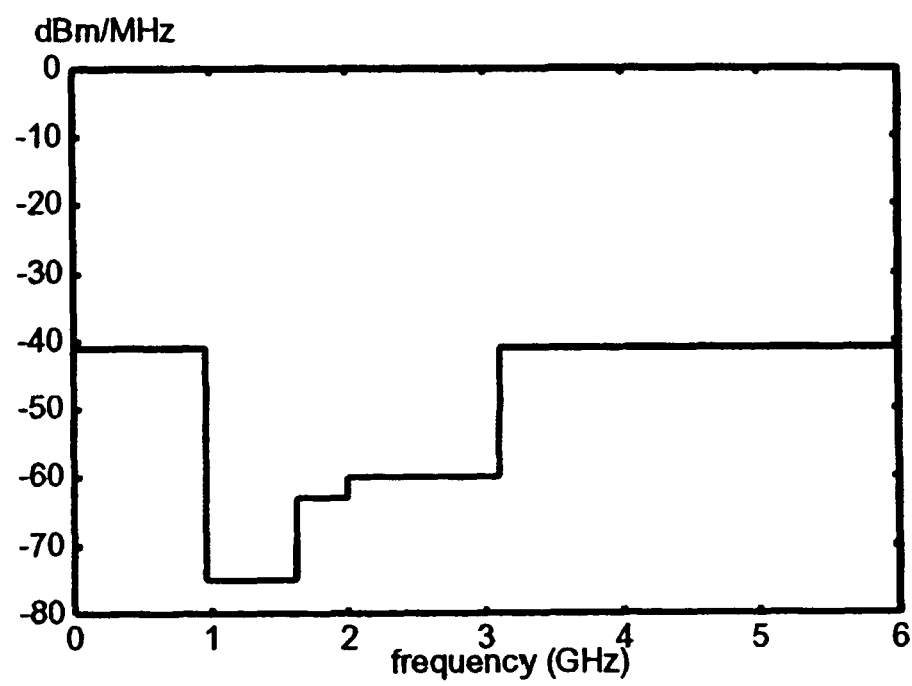
FIG. 92 serves illustrate an FCC spectrum mask.
Figure 93:
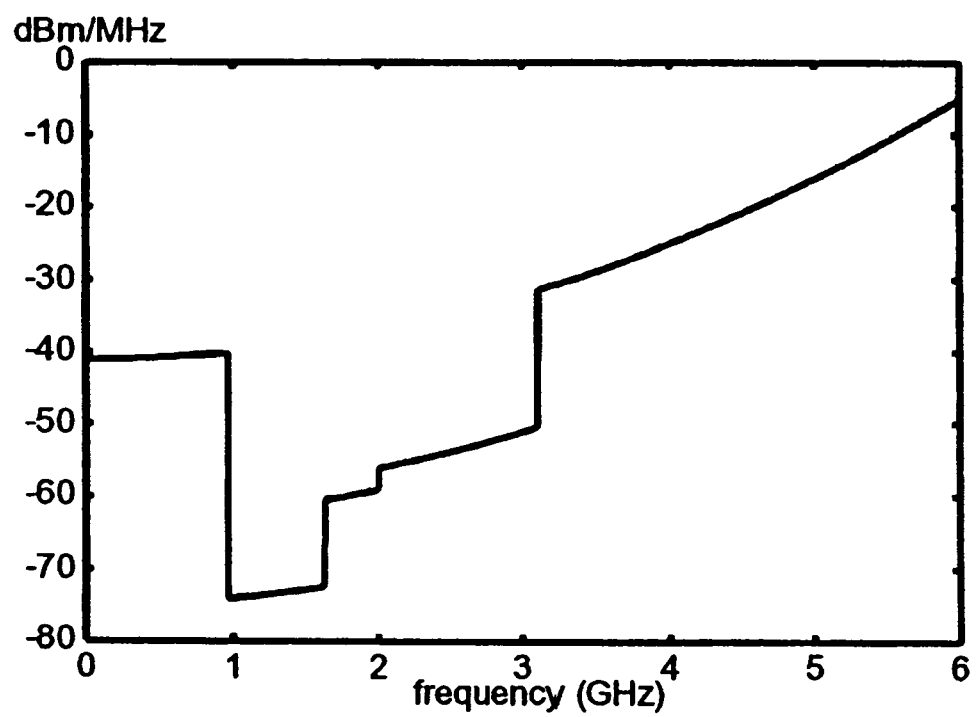
FIG. 93 shows a reception waveform for the transmission waveform in FIG. 92.

A reception waveform frequency characteristic is shown for a case where the FCC spectrum mask shown in FIG. 92 is transmitted as a pulse that matches the FCC spectrum mask shown in FIG. 93.

FIG. 93 shows that the reception waveform greatly exceeds the restrictions in the part where the frequency is high even when the transmission waveform matches the spectrum mask. Therefore, in order to satisfy the second design standard, the frequency bandwidth is divided into a plurality of bands and a plurality of pulses are combined to match FCC restrictions.

Figure 94:
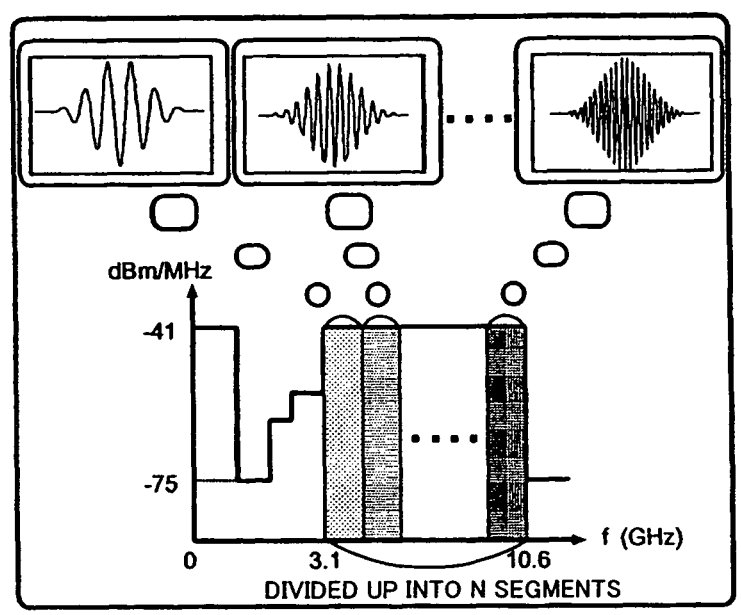
FIG. 94 is a conceptual view in which a pulse waveform satisfying the desired spectrum mask is formed by adding the pulses of N frequency segments.

Currently, usage approval by the FCC for commercial UWB devices is in frequency bandwidths of 3.1 GHz or more. Therefore, the frequency bandwidth used for UWB pulses here is [3.1 to 10.6 GHz]. Because the frequency bandwidth is wide even in this segment, the characteristic variation for each frequency is considerable. Therefore, consideration is paid to satisfying the FCC output restrictions by dividing the segment into N frequency segments of equal bandwidth and adding N pulses the transmission power of which is changed. FIG. 94 shows a conceptual view in which a pulse waveform satisfying the desired spectrum mask is formed by adding pulses of N frequency segments.

Further, when the differential characteristic is considered, the sidelobe increases as the frequency rises and, based on this fact, only the [3.1 to 9.85 GHz] band is considered. Based on the foregoing, the transmission waveform f(t) can be expressed by the following Equation (97).

$$f(t) = \sum_{k=1}^{N} f_k(t) \qquad (97)$$

Function f(t) is a function for determining a pulse time waveform and can be constituted by selecting a suitable kernel function and performing expansion or synthesis based on the kernel function. In addition to a constitution that employs a carrier wave, function f(t) can also have a constitution that does not uses a carrier wave known as Impulse Radio.

When the constitution employs a carrier wave, a triangular function, for example, is selected as the kernel function. By using a triangular function as the carrier wave and overlapping sin(2πft) of a different frequency f, a multi-band system that occupies the respective bands can be implemented.

When a case where the bandwidth [fL to fH] is assumed, the general equation of waveform f(t) of Equation (97) can be expressed by Equations (98) and (99) below.

$$f_k(t) = a_k \times \cos\left[2\pi\left(f_L + \frac{(1+2k)(f_H - f_L)}{2N}\right)\right] \times \frac{\sin((f_H - f_L)\pi t)}{N\pi t} \qquad (98)$$

$$a_k = \frac{C}{\left(f_L + k \times \frac{f_H - f_L}{N}\right)^2} \qquad (99)$$

where C is a constant that is dependent on N. The division of the bandwidth into a plurality of equal segments helps to simplify the pulse production apparatus.

FIG. 94 shows a conceptual view of a case where a triangular function is the carrier wave. For example, a frequency segment in which the frequency f is from 3.1 GHz to 10.6 GHz is divided into N segments and each segment can be constituted by superposing sin waves the frequency of which is expressed by Equation (98) and the crest value is expressed by Equation (99).

Further, in the case of the Impulse Radio constitution that does not employ a carrier wave, a Gaussian function or Hermite function or the like can be used as the kernel function. As a result, a notch is created in the desired band of the frequency spectrum and pulse waveforms that provide maximum satisfaction of a spectrum mask that expresses transmission output restrictions of the Radio Law and so forth can be synthesized.

Here, as mentioned earlier, a system that changes the spectrum characteristic to avoid interference with a frequency-sharing system and to adapt to regulations (spectrum mask) on various frequencies of the Radio Law of the country or region by means of software is termed Soft Spectrum Adaptation (SSA).

Figure 95:
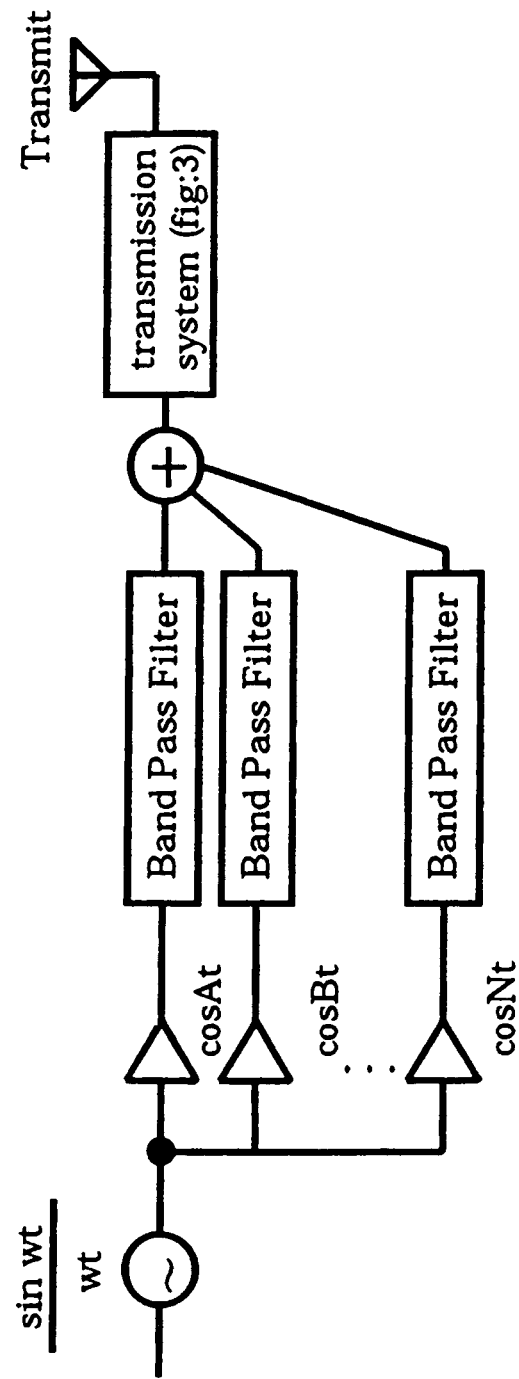
FIG. 95 serves to illustrate the overall constitution of a pulse production apparatus of an aspect of the present invention.
Figure 96:
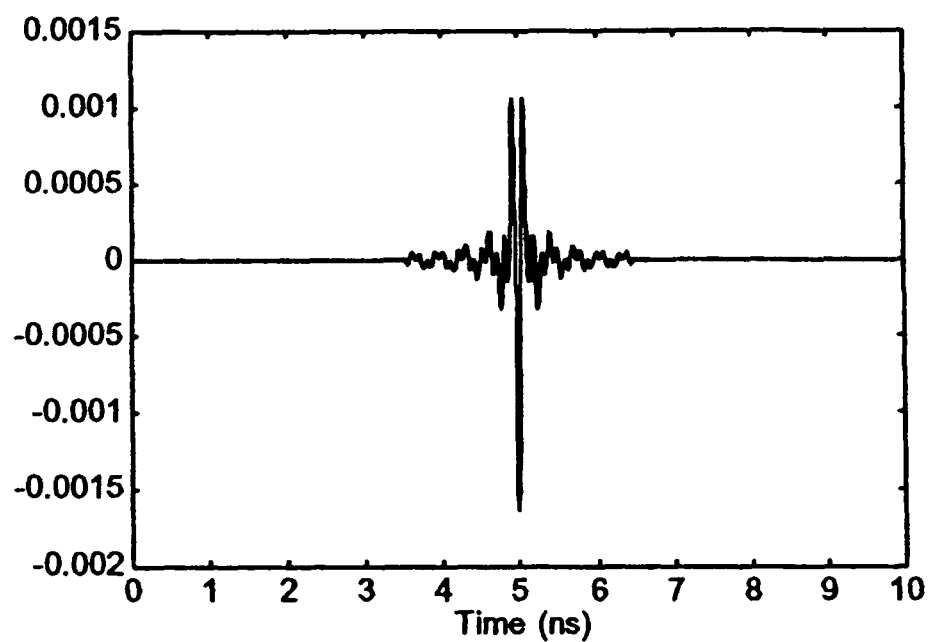
FIG. 96 is a pulse waveform (width 3 ns) of an aspect of the present invention.
Figure 97:
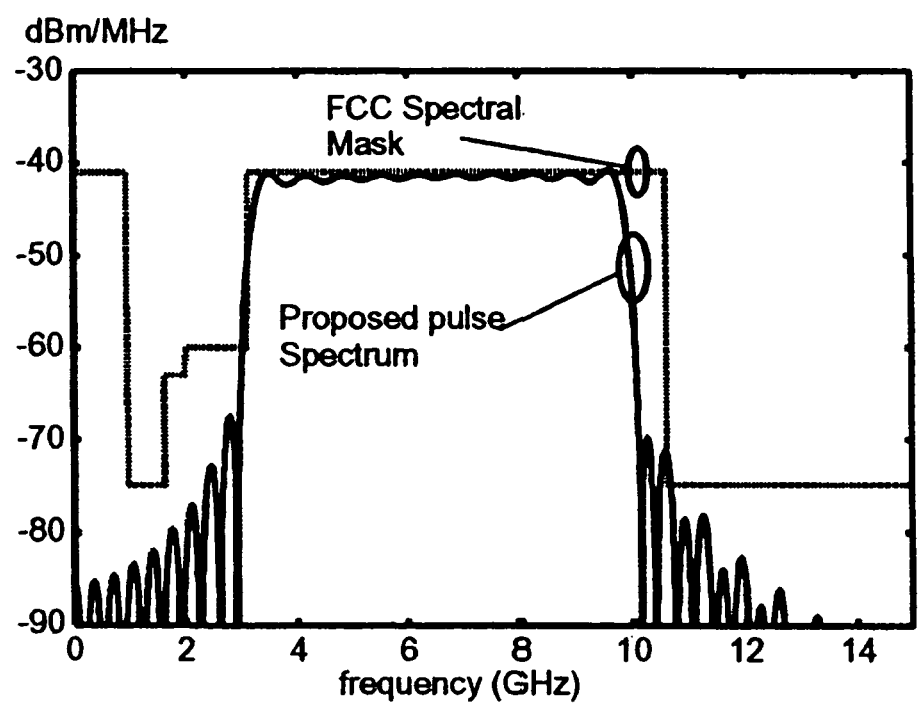
FIG. 97 is a frequency characteristic diagram of a pulse waveform (width 3 ns) of an aspect of the present invention.
Figure 98:
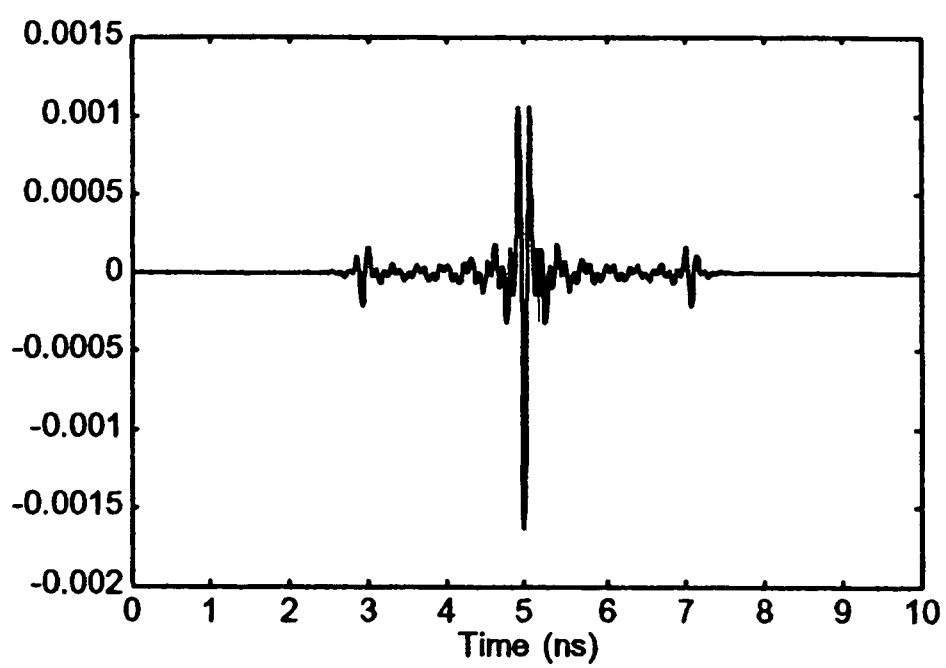
FIG. 98 is a pulse waveform (width 10 ns) of an aspect of the present invention.
Figure 99:
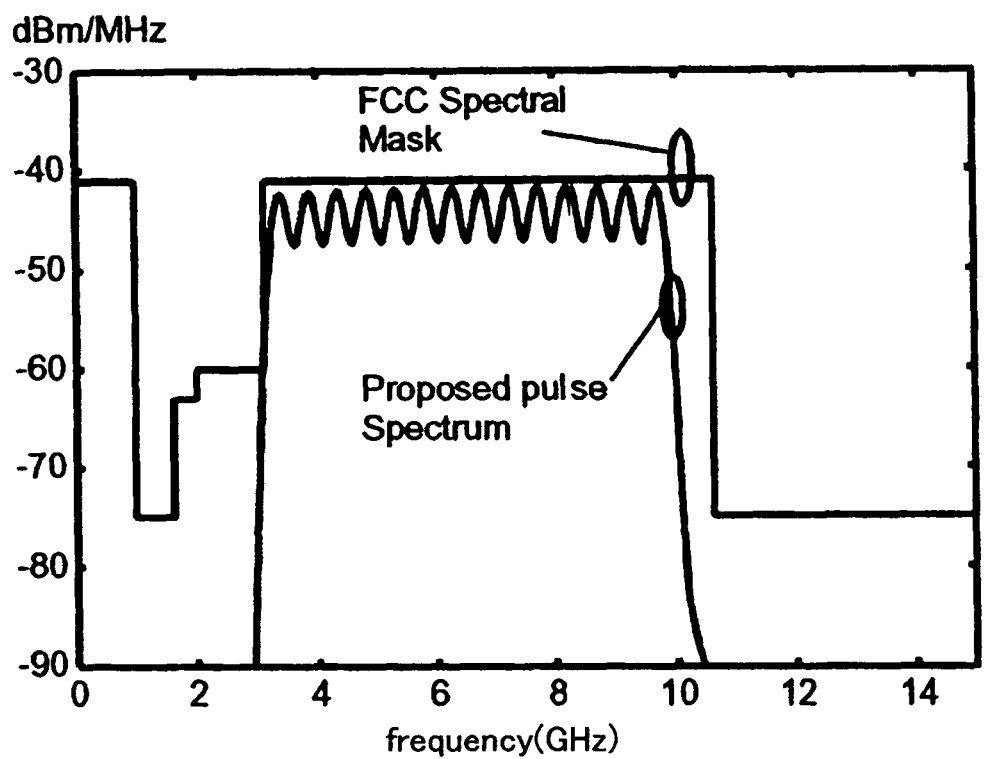
FIG. 99 is a frequency characteristic diagram of a pulse waveform (width 10 ns) of an aspect of the present invention.

FIG. 95 shows a basic constitutional example of a pulse generation circuit. Further, the pulses and frequency characteristic used by the present invention are shown in FIGS. 96 to 99. As an example, pulses are generated by dividing the bandwidth [3.1 GHz to 9.85 GHz] into fifteen.

When FIGS. 96 to 99 are viewed, when the duration is 10 ns, a state where there is no sidelobe in the usage band exists. Further, when the duration is 3 ns, the frequency characteristic is the minimum duration that matches the spectrum mask. The relationship shown in FIGS. 96 to 99 shows a trade-off relationship in which if the duration is extended, the frequency characteristic matches the spectrum mask but is not suitable as a UWB pulse. Therefore, the pulse of the present invention is shown by a performance evaluation with a 3 ns pulse serving as the UWB pulse.

UWB output bandwidth restrictions using a conventional system will be described here. A UWB signal that fulfills the FCC UWB output restrictions is used by using a bandpass filter that is currently used in a variety of communication systems and it is confirmed in a processor simulation to what extent it is possible to generate power when a bandpass filter is used by one monocycle waveform as the target of a comparison with the pulse of the present invention.

Here, the design of a BPF (BandPass Filter) of a FIR filter is described. A UWB transceiver is analog but constitutes a BPF with a filter coefficient h(n) that is expressed by the following Equation (100) based on the convenience of a simulation program.

$$h(n) = 2\cos(w_o n) \times \frac{\sin(w_c n)}{\pi n}. \tag{100}$$

Here, assuming that the sampling frequency is fsamp and the communication bandwidth is the segment [fL:fH] on the frequency axis, the parameters are Equations (101) to (104) below.

$$w_L = 2\pi \frac{f_L}{f_{samp}} \tag{101}$$

$$w_H = 2\pi \frac{f_H}{f_{samp}} \tag{102}$$

$$w_o = \frac{w_H + w_L}{2} \tag{103}$$

$$w_c = \frac{w_H - w_L}{2} \tag{104}$$

Figure 100:
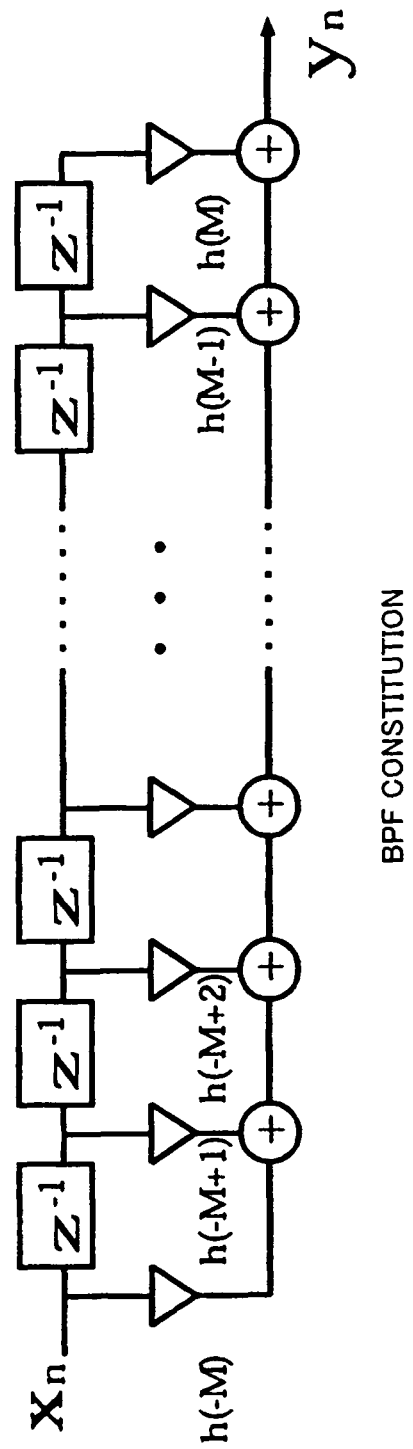
FIG. 100 is a constitutional example of a BPF.
Figure 101:
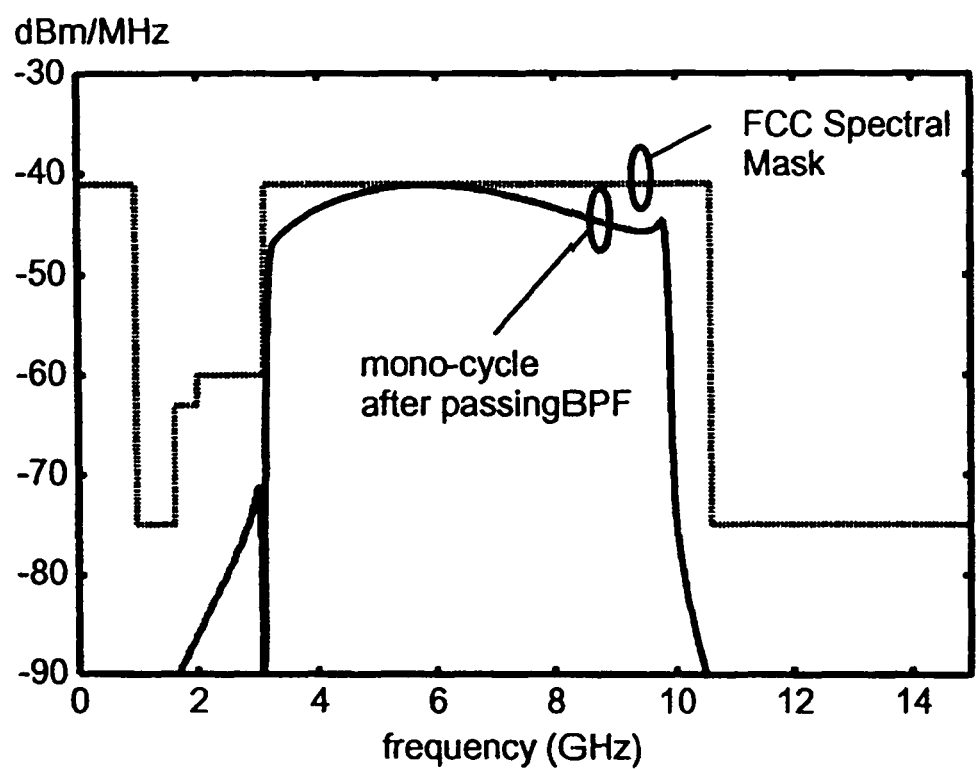
FIG. 101 shows the frequency characteristic of a monocycle waveform after same has passed through the BPF.

The constitution of the BPF is as per FIG. 100. In order to make the bandwidth uniform, a BPF with a [3.1 to 9.85 GHz] characteristic is designed. The output waveform has a shape that is very similar to that of the proposed pulse in order to be expressed by a sinc function. The envelope of the frequency characteristic is an unchanged monocycle waveform in segment [3.1 to 10.6 GHz]. FIG. 101 shows the monocycle waveform frequency characteristic after same has passed through the BPF. When the frequency characteristic is compared with the frequency characteristic of FIG. 97, it can be confirmed that the frequency usage efficiency of the waveform of the monocycle waveform after passing through the BPF is worse than that of the pulse of the present invention.

The modulation system of the system of the present invention will be described next. Here, for the sake of a comparison with a UWB system that uses a monocycle waveform and a modulation system PPM, the parameters and correlation waveform for using PPM on the pulse of the present invention are shown.

A modulation system with an optimum d design for using PPM that employs the pulse thus found will now be described. For the sake of a comparison with a UWB system that employs the described monocycle waveform, the pulse of the present invention also employs PPM (Pulse Position Modulation) as the modulation system. Here, PPM is described. First, modulation that uses PPM has the following characteristics.

(1) The position of the pulse is shifted by d in accordance with data (0 or 1 here);

(2) The shift width d affects the data transmission speed. That is, if the width of d is small, the transmission speed is high. Further, because the width is small, the interference with other users can be reduced.

Figure 102:
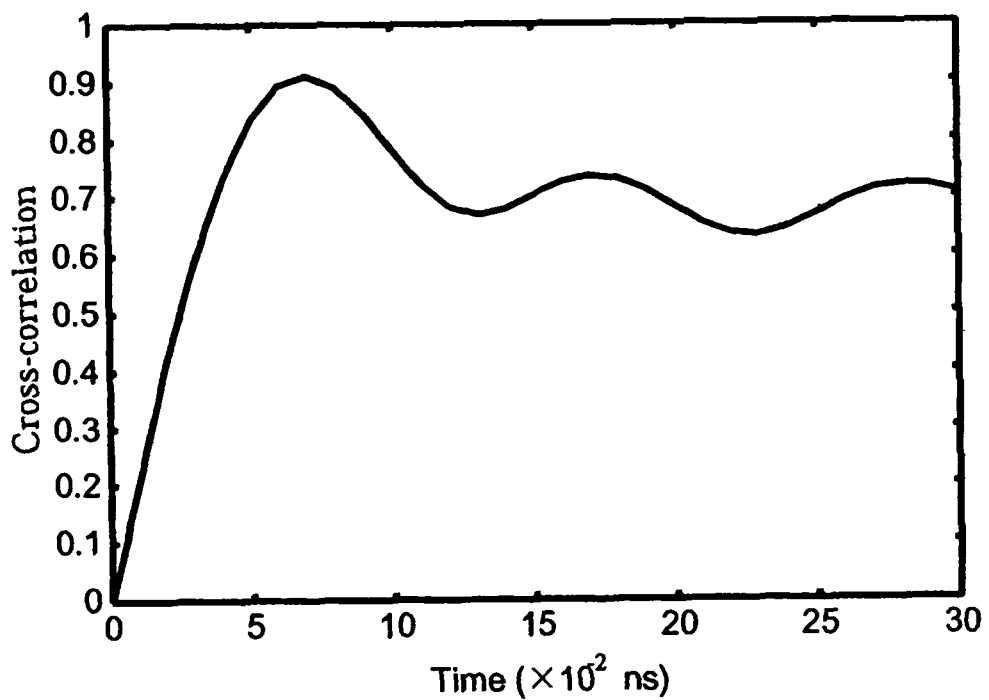
FIG. 102 is a cross-correlation characteristic of a reception signal when d is changed and a correlation waveform.

(3) d is designed so that the filter output is large. Here, for (3), a processor simulation is performed in order to determine the optimum d of the present invention and the simulation results are shown in FIG. 102.

First, supposing that the UWB pulse and filter on the time axis are f(t) and Filter(t) respectively, this is expressed by $$\text{Filter}(t) = f(t) - f(t-d) \tag{105}.$$

Further, an optimum d is supposed to be d at which the autocorrelation of Equation (106) has the largest value.

$$\int_{\infty}^{\infty} f(t)\text{Filter}(t)\,dt \tag{106}$$

Based on the above, in PPM, which employs the pulse of the present invention, $$d=0.07 \text{ ns} \tag{107}.$$

A cross-correlation characteristic with the correlation waveform will be described next. For the sake of a comparison with the monocycle waveform, the pulse autocorrelation is 1.00 and the filter output and pulse duration are compared means of Table 13. Table 13 below shows filter correlation outputs for the PPM pulse of the present invention and monocycle waveforms with durations 0.7 ns and 0.39 ns.

Comparison of PPM correlation and duration of pulse

| Pulse type | tm | Filter correlation output | Duration |
|---|---|---|---|
| Monocycle waveform | 0.2877 | 0.899 | 0.7 ns |
| Monocycle waveform | 0.15 | 0.899 | 0.39 ns |
| Proposed pulse | — | 0.911 | 3 ns, 10 ns |

Based on Table 13, the filter correlation output of the pulse of the present invention is 0.991 and is higher than those of the monocycle waveforms. In observing this fact, although the pulse of the present invention may be considered superior in the case of a single user, the pulse of the present invention has a larger duration and it may be considered that the probability of collision between pulses increases in comparison with that of the monocycle waveforms when there are multiple users. However, in the case of the pulse of the present invention, the majority of the power per wave is concentrated on the pulse center.

Based on the above, according to the system of the present invention, there is no large difference even when a correlation of the same duration is taken with UWB that employs monocycle waveforms. Therefore, for BER performance of which pulses are compared next, the time slot and time frame length are both assumed to be equal.

In the above example, the waveform is improved by virtue of increasing the accuracy of the frequency characteristic by using a convolution integral, dividing the segment [3.1 to 9.85 GHz] into a plurality segments of equal bandwidth by considering the differential characteristic, and creating an optimum d design when the modulation system is PPM.

An evaluation of the performance of the system of the present invention will be described next.

First, a comparison of the effects of interference with other users is made. The pulse waveform of the present invention is a waveform shape with an extended duration in comparison with a monocycle waveform. UWB has the characteristic of being resistant to interference from multiple paths and other users.

Figure 103:
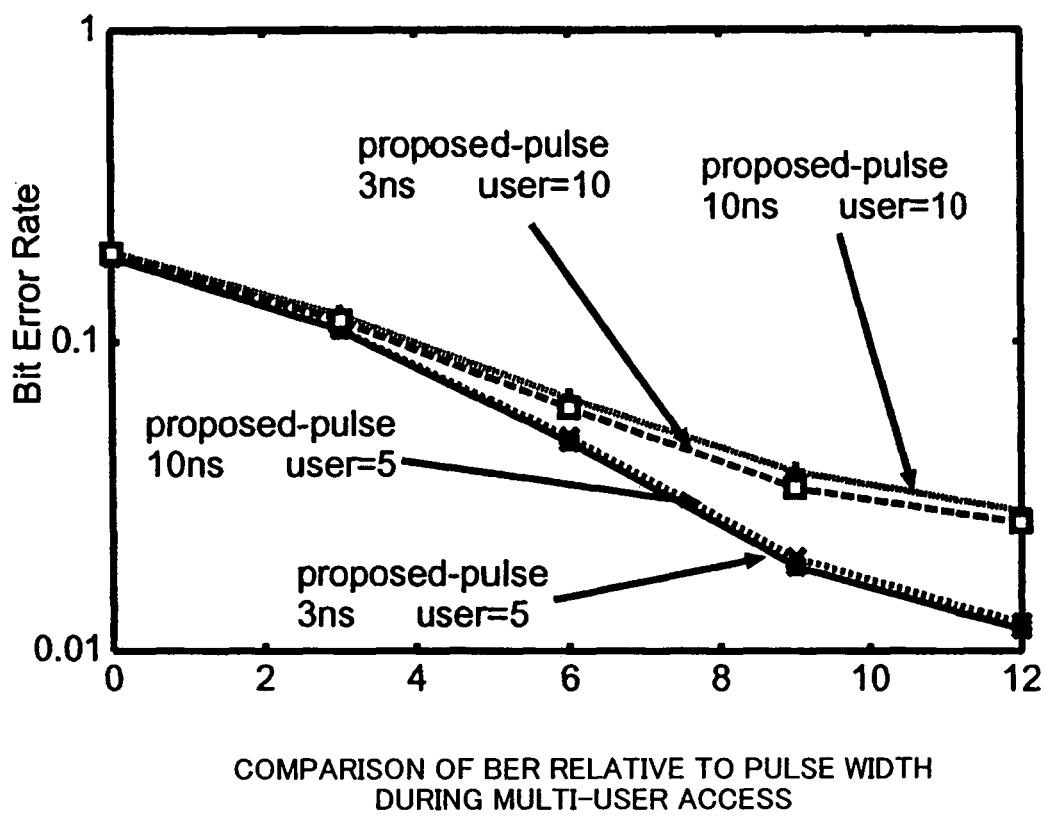
FIG. 103 is a comparison diagram of the BER resulting from the pulse width during multi-user access.

By extending the pulse of the present invention over the time axis, it is evaluated how the characteristic changes in comparison with that of a conventional system. The pulse of the present invention is studied. The pulses expressed by the Equations (97) and (99) are the targets of the comparison. A simulation is performed in order to confirm the effects of interference with other users or multiuser interference in a multi-user environment for the 3 ns and 10 ns pulses respectively. FIG. 103 is a comparative view of BER according to pulse width of a multiple user access time. It is possible to confirm from the results that favorable results are obtained for pulses of narrow pulse width.

The pulse of the present invention will be treated as a 3 ns pulse hereinafter. Because, with the system of the present invention, the pulse width is as much as four times longer than that of a conventional monocycle waveform system, collisions between pulses are expected to be more numerous for the system of the present invention. By equalizing the bandwidths of the monocycle waveforms and the pulse waveforms of the present invention, the effects of interference with other users are compared. Because the bandwidth originally widens to infinity, a reference indicating how far a bandwidth extends is required. Here, this is defined by a 99% bandwidth. This means a bandwidth that contains 99% of the total power. A simulation is performed in a form in which the defined bandwidth is made uniform according to the monocycle waveform, the monocycle waveform after the bandpass filter output, and the pulse waveform of the present invention.

Figure 104:
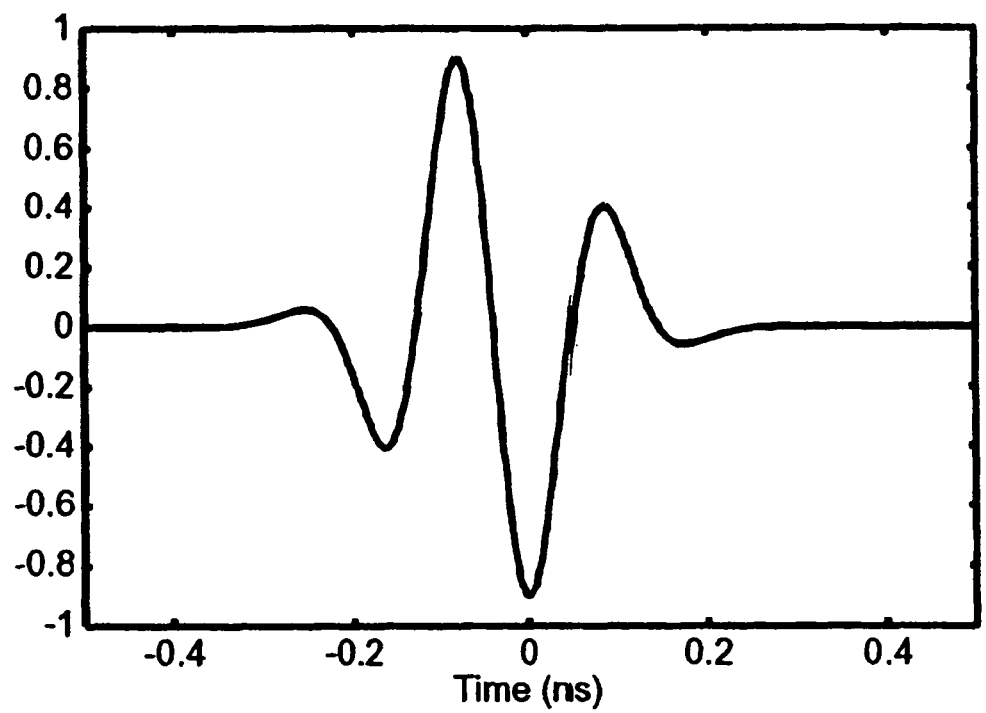
FIG. 104 is a cross-correlation characteristic of a monocycle waveform and correlation waveform.
Figure 105:
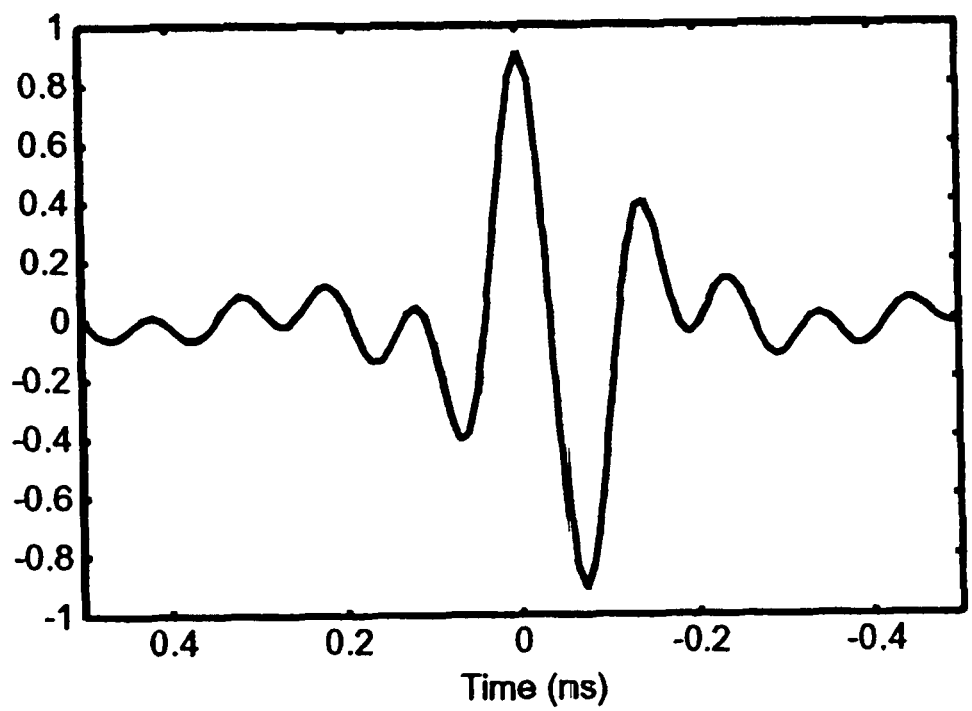
FIG. 105 is a cross-correlation characteristic of a pulse of the present invention and a correlation waveform.

The effect of interference with other users is a parameter determined by a cross-correlation characteristic between a correlation waveform and reception waveform. Therefore, cross-correlation characteristics between a correlation waveform and reception waveform are shown in FIGS. 104 and 105. Based on the diagram of the cross-correlation characteristic between a monocycle waveform and correlation waveform shown in FIG. 104 and the diagram of the cross-correlation characteristic between the pulse waveform of the present invention and the correlation waveform of time 105, the monocycle waveform and pulse waveform of the present invention show cross-correlation characteristics that are the same at the pulse center but the pulse waveform of the present invention has a long duration with a correlation. Therefore, it is noted that the monocycle waveform has a BER characteristic that is favorable in a multi-user environment.

A computer simulation is performed to confirm this. A BER comparison is shown by means of a proposed pulse and monocycle waveform during multi-user access in FIG. 106.

Further, simulation condition parameters are shown in Table 14 below.

Simulation parameters (1)

| | |
|---|---|
| 99% bandwidth | 6.75 GHz |
| Modulation system | Asynchronous PPM |
| Transmission bits | 100000 bits |
| Number of users | 5, 10 |
| Frame length | 10 ns |
| Number of slots | 8 |
| Proposed system | Duration 3 ns |
| Monocycle waveform | Duration 0.39 ns |
| TH sequence | Gold sequence |
| Power per wave | Equal |
| Communication path | AWGN |

Figure 106:
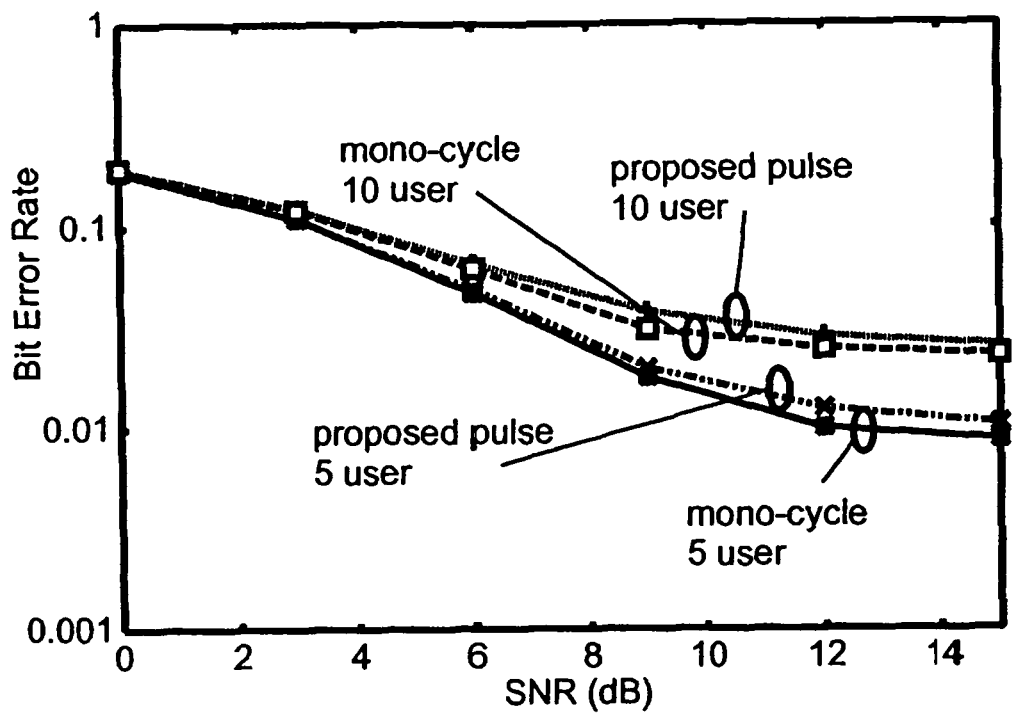
FIG. 106 shows a comparison between the present invention and the prior art during multi-user access.

According to FIG. 106, the monocycle waveform shows a favorable value in comparison with the pulse waveform of the present invention. However, it is thought that the value of the pulse waveform of the present invention is worse because the BER characteristic is viewed after normalizing the pulse power.

Therefore, the BER characteristic of the pulse waveform of the present invention will be evaluated next by matching the power per pulse with the spectrum mask. The pulse waveform of the present invention and a conventional monocycle waveform are compared in accordance with the FCC's UWB transmission power restrictions. In the case of a monocycle waveform, the frequency characteristic also varies greatly with the pulse width serving as the parameter. Therefore, a monocycle waveform that makes it possible to produce the most power under the transmission power restrictions is determined and then compared with the pulse waveform of the present invention.

Here, for the power distinction due to the monocycle waveform width, a pulse that follows the spectrum mask may be considered in the monocycle waveform. The relationship is such that, as the temporal pulse width narrows, the frequency characteristic is enlarged. Therefore, monocycle waveforms that maximize the output at or below a spectrum mask are studied.

First, the reception signal (monocycle waveform) in a case where a Gaussian waveform is transmitted is found by means of the following Equation (108):

$$w_r(t) = \left[1 - 4\pi\left(\frac{t}{t_m}\right)^2\right] \times \exp\left[-2\pi\left(\frac{t}{t_m}\right)^2\right] \quad (108)$$

Figure 107:
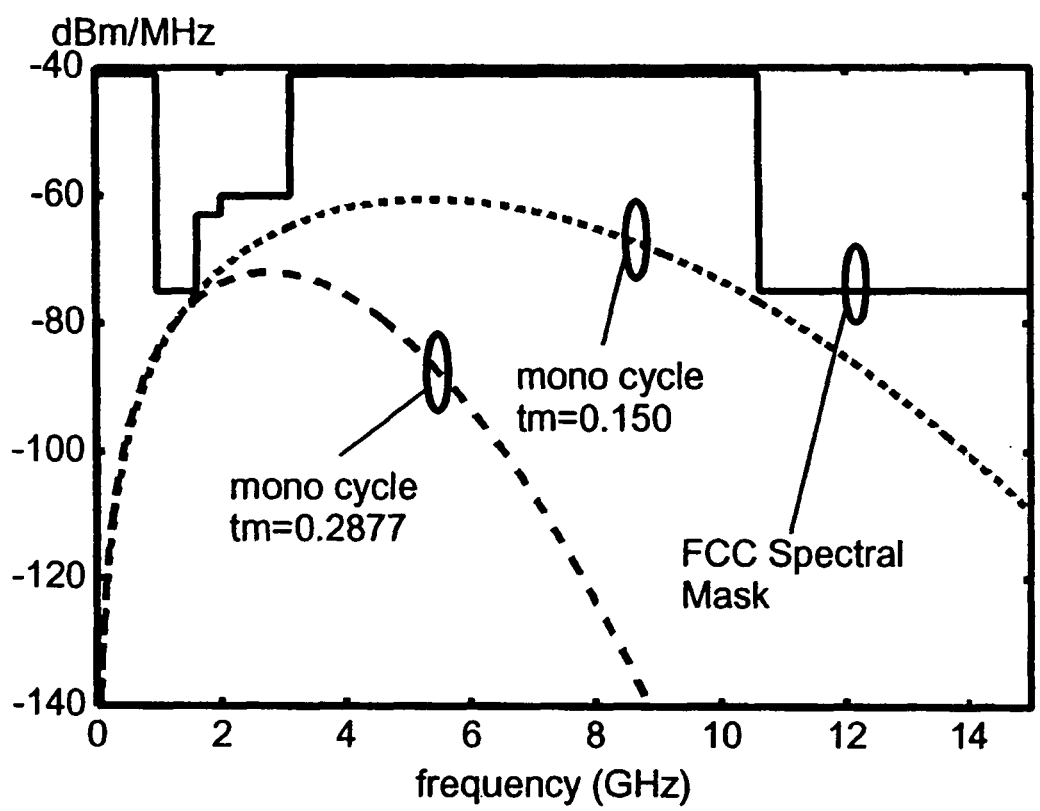
FIG. 107 is a comparative view of frequency characteristics of monocycle waveforms with duration parameter tm.

The parameter of temporal width is tm. As tm grows smaller, the waveform width narrows. UWB possesses the characteristics of being robustness against multipaths and of having a high resolution. This is the advantage of UWB as the pulse width narrows. However, here, the determination is made from a perspective such as a spectrum. FIG. 107 shows the difference in the frequency characteristic when the value of tm changes. FIG. 107 shows cases where $t_m=0.2877$ and 0.15, the former being a numerical value from Document 7 and the latter being a monocycle waveform with which the maximum output is large in a mask. It can be seen from FIG. 107 that the maximum power that can be transmitted changes greatly as a result of changing the value of $t_m$.

Based on the foregoing, in the case of UWB communications that employ monocycle waveforms, the UWB pulse permitting the maximum output occurs when $t_m$ is 0.15. In Document 7, $t_m=0.2877$. The two pulses are compared in Table 15 below.

| Comparison of power with $t_m$ of monocycle waveforms | | |
|---|---|---|
| tm | Waveform width (ns) | Power ratio |
| 0.15 | 0.39 | 1.000 |
| 0.2877 | 0.7 | 0.053 |

The table shows that the power changes close to a 20 times in accordance with the duration even with the same monocycle waveforms.

An evaluation of the pulse formation of the present invention according to transmission power restrictions will now be described. It is clear from the foregoing that the pulse waveform of the present invention is resistant to interference with other users even with the same power. The pulse waveform of the present invention and conventional monocycle waveforms are compared in accordance with the FCC's UWB transmission power restrictions.

The simulation condition parameters are shown in Table 16 below.

| Simulation parameters (2) | |
|---|---|
| Proposed system | Duration 3 ns |
| Monocycle waveform | Durations 0.7 ns, 0.39 ns |
| Transmission bits | 100000 bits |
| Number of users | 1 |
| Frame length | 10 ns |
| Number of slots | 8 |
| TH sequence | Gold sequence |
| Number of users | 1, 5, 10 (proposed system) |
| Power ratio | Proposed system 1.00 |
| | Monocycle after passing through BPF 0.76 |
| | Monocycle (Document) $8.18 \times 10^{-5}$ |
| | Monocycle (maximum) $1.53 \times 10^{-3}$ |
| Communication path | AWGN |

Figure 108:
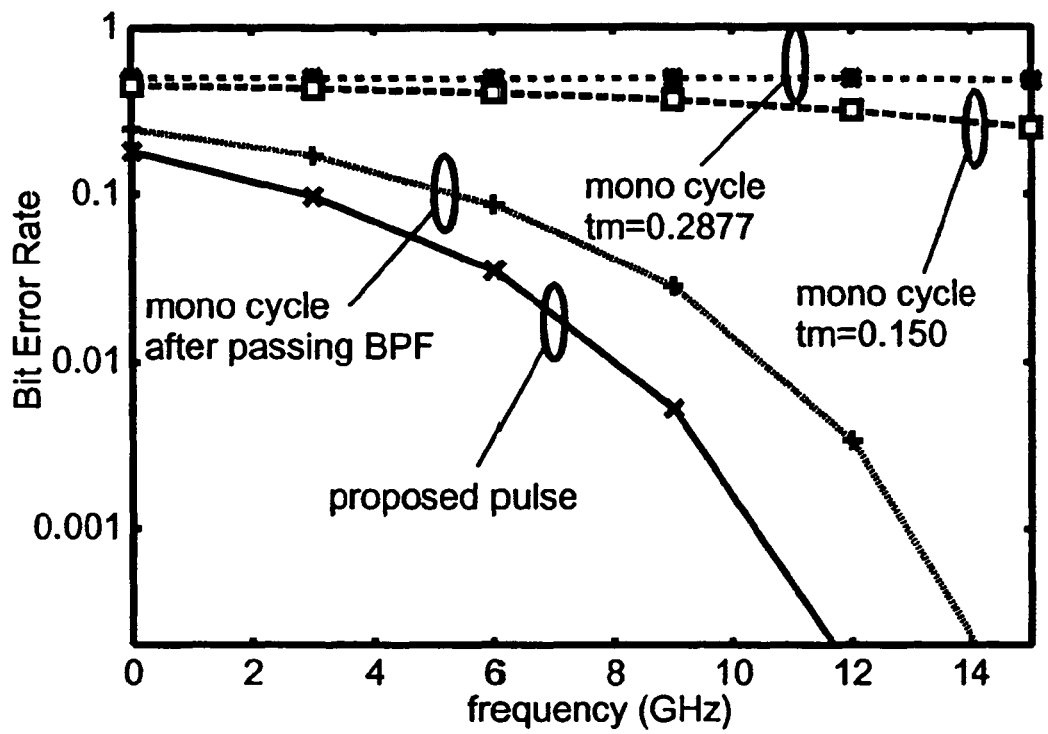
FIG. 108 is a comparative view of the present invention and prior art in which the power is arranged within UWB power limits.

FIG. 108 shows a comparison between the pulse waveform of the present invention and a conventional monocycle waveform in a case where power is arranged according to UWB power restrictions. It can be seen from FIG. 108 that, when there is a single user, the proposed pulse has gain of approximately 2 dB more than a monocycle waveform that has passed through the bandpass filter. Further, when there is an equal number of users, although having a BER characteristic that is the same as that of the present invention also depends on the value of tm, the number of repetitions of the monocycle waveform is from 500 times to 2000 times. That is, when the number of users is fixed, it can be seen that, according to the present invention, the transmission speed is also from 500 to 2000 times in comparison with existing monocycle waveforms.

According to the third aspect of the present invention, the focus is on a pulse that is used in UWB and on FCC transmission power restrictions, and the pulse waveform of the present invention is able to increase the transmission power above that of a monocycle waveform or a monocycle waveform that has passed through a BPF. Further, in a multi-user environment that normalizes the power, the pulse waveform of the present invention has little resistance to interference with other users in comparison with a monocycle waveform but the pulse waveform of the present invention is superior under FCC restrictions.

An example of the constitution of a transceiver based on Soft Spectrum Adaptation (SSA), which is a system for changing a spectrum in correspondence with a spectrum mask by means of the software of the present invention, will be described next by using FIG. 109. Further, the circuit shown in FIG. 109 performs transmission and reception by switching a multi-use transceiver antenna.

First, transmission will be described. In FIG. 109, transmission is performed by switching digital data of a base band that is generated by a base band processor (shown on the right-hand side of FIG. 109) to send the data to a multi-used transceiver antenna via a switch (T/RSW) (shown on the left-hand side of FIG. 109).

The base band processor can be constituted by a DSP, FPGA, CPU, and so forth, for example and the digital data generated by the base band processor is a plurality of signals, therefore consisting of an I component (real part) and a Q component (imaginary part).

In a case where a pulse time waveform is generated by using a carrier wave, a rectangular envelope is shaped by using the carrier wave (triangular function sin). In FIG. 109, a rectangular wave from a Lo Sin Demodulator (Local Sin generator) is multiplied by the I component and Q component from the base band processor, balanced and modulated before being added, amplified by an amplifier (Output Driver), and then transmitted by the multi-use transceiver antenna via the switch (T/RSW).

Further, when the pulse time waveform is generated without using a carrier wave (Impulse Radio System), the waveform is shaped as a pulse shape in accordance with the base band digital data in a free-verse generator, amplified by an amplifier (output driver) and then transmitted by the multi-use transceiver antenna via the switch (T/RSW).

Reception will be described next. In FIG. 109, reception is such that the signal received by the multi-use transceiver antenna (shown on the left-hand side of FIG. 109) is amplified by a low noise amplifier (LNA) via the switch (T/RSW), demodulated, and then sent to the base band processor (shown on the right-hand side of FIG. 109).

When modulation is performed by using a carrier wave, demodulation is performed by multiplying the output of the location Sin generator, converting the signal to the base band, amplifying same by means of a gain control amplifier (GCA) and then converting the amplified signal to a digital signal by means of an A/D converter.

Figure 109:
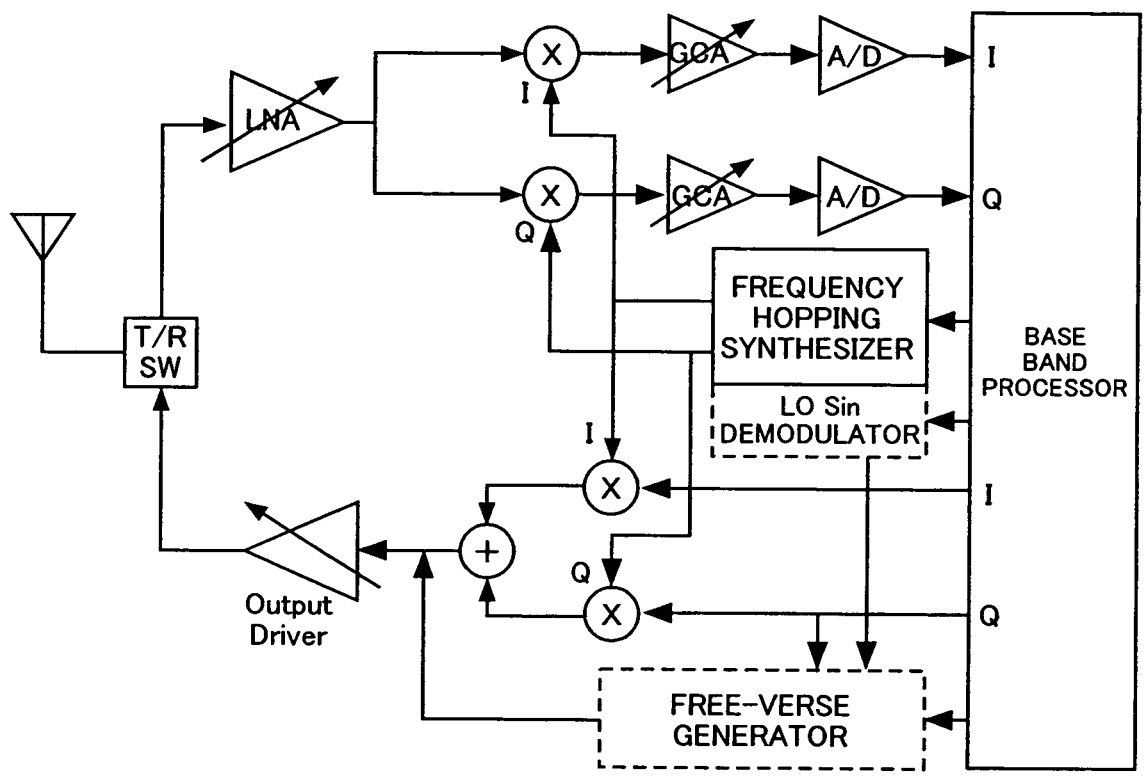
FIG. 109 is a schematic diagram of a constitutional example of the transmitter and receiver of the present invention.

Further, when modulation is performed without using a carrier wave (Impulse Radio system), demodulation is performed without multiplying the output of the Lo Sin Demodulator (the constitution of the demodulation part is not shown in FIG. 109).

Further, in FIG. 109, the frequency hopping circuit (frequency hopping synthesizer) is a circuit that performs hopping to switch a center frequency for each fixed time slot. When switching of the center frequency is not performed, the frequency hopping circuit can be dispensed with.

Figure 110:
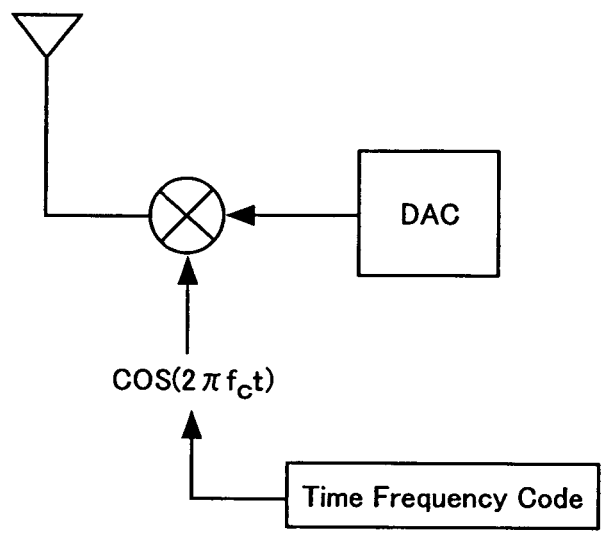
FIG. 110 is a schematic diagram of another constitutional example of the transmitter and receiver of the present invention.

Furthermore, the circuit constitution in FIG. 110 is a circuit example in a case where transmission is performed by means of multiband OFDM (Orthogonal Frequency Division Multiplexing) and transmission is performed by converting transmission data to an analog signal by means of a D/A converter, multiplying the analog signal by $\cos(2\pi f_c t)$, which is established by the frequency code fc.

The abovementioned appendices A, B, and C will be described hereinbelow.

Appendix A: Evaluation of correlator output m of desired local signal in receiver Equation (15) is rewritten as Equation (110) below:

$$m = \sum_{j=1}^{N_s-1} \int_{-c_j^{(1)} T_c}^{-c_j^{(1)} T_c + T_f} \left[ A_1 \sum_{i=0}^{N_s-1} w_{rec}(x + (j-i)T_f + [c_j^{(1)} - c_i^{(1)}]T_c - \delta) \right] v(x) dx \quad (110)$$

Here, the term relating to $W_{rec}$ in Equation (110) and the term $v(x)$ are important only when i=j. For this reason, $m = N_s A_1 m_p$ and $m_p$ is expressed as Equation (111) below:

$$m_p \triangleq \int_{-\infty}^{\infty} w_{rec}(x - \delta) v(x) dx \quad (111)$$

Appendix B: Evaluation of correlation output $n_d$ of interference component in receiver.

When $n_{tot}$ in Equation (14) is substituted with Equation (9), Equation (112) is expressed as $$n_d = \sum_{k=2}^{N_u} A_k n^{(k)} + n_{rec} \quad (112)$$

$n^{(k)}$ in Equation (112) signifies the interference with other users from the kth user and Equation (113) is expressed as $$n^{(k)} = \sum_{j=0}^{N_s-1} \int_{\tau_1 + jT_f}^{\tau_1 + (j+1)T_f} s_{rec}^{(k)}(t - \tau_k) v(t - \tau_1 - jT_f - c_j^{(1)} T_c) dt \quad (113)$$

Further, $n_{rec}$ signifies reception noise with an origin other than a monocycle and Equation (114) below is expressed as $$n_{rec} = \sum_{j=0}^{N_s-1} \int_{\tau_1 + jT_f}^{\tau_1 + (j+1)T_f} n(t) v(t - \tau_1 - jT_f - c_j^{(1)} T_c) dt \quad (114)$$

It is assumed that the average of $n_{rec}$ is 0 and variance is $\sigma_{rec}^2$.

$n^{(k)}$ is also expressed as Equation (115) below $$n^{(k)} = \sum_{j=0}^{N_s-1} \int_{-\infty}^{\infty} \left[ \sum_{i=-\infty}^{\infty} w_{rec}(x - \tau_k + \tau_1 + jT_f + [c_j^{(1)} - c_i^{(k)}]T_c - iT_f - \delta d_{\lfloor i/N_s \rfloor}^{(k)}) \right] v(x) dx \quad (115)$$

In addition, $i=j+j_{1,k}$ is expressed by using the difference in the relative time shift of $w_{rec}(t)$ and $v(t)$ and $n^{(k)}$ is expressed as Equation (116).

$$n^{(k)} = \sum_{j=0}^{N_s-1} \underbrace{\int_{-\infty}^{\infty} w_{rec}(x + \alpha_{1,k} + [c_j^{(1)} - c_{j+j_{1,k}}^{(k)}]T_c - \delta d_{\lfloor j+j_{1,k}/N_s \rfloor}^{(k)}) v(x) dx}_{\triangleq n_{kj}} \quad (116)$$

Appendix C: Evaluation of correlation output n(k) of component of interference with other users in receiver $\int_{-\infty}^{\infty} w_{rec}(x - s) v(x) ds = 0$ is expressed, $\mathbb{E}\{n_{kj}\} = 0$ Therefore, $$IE\{n^{(k)}\} = \sum_{j=0}^{N_s-1} IE\{n_{kj}\} = 0, \text{ for } k = 2, 3, \cdots, N_u \quad (117)$$

is established. Further, the variance of $n^{(k)}$ is expressed as $$IE\{|n^{(k)}|^2\} = \sum_{i=0}^{N_s-1} \sum_{j=0}^{N_s-1} IE\{n_{ki}^* n_{kj}\} \quad (118)$$

-continued $$= \sum_{i=0}^{N_s-1} I\!E\{|n_{ki}|^2\} + \sum_{i \neq j} \underbrace{I\!E\{n_{ki}^* n_{kj}\}}_{\triangleq \sigma_c^2}$$

The first term in this equation is also expressed as $$I\!E\{|n_{ki}|^2\} = T_j^{-1} \int_{-\infty}^{\infty} \left[ \int_{-\infty}^{\infty} w_{rec}(x-s)v(x)dx \right]^2 ds \triangleq \sigma_a^2 \quad (119)$$

Here, because $\sigma a^2 \gg (Ns-1)\sigma c^2$ is established, $\sigma c^2 \cong 0$, and $$I\!E\{|n^{(k)}|^2\} = N_s \sigma_\alpha^2$$

is established.

According to the first aspect of the present invention, a pulse signal having the desired frequency characteristic can be generated by adjusting the shape of a single pulse itself.

According to the second aspect of the present invention, a pulse signal having the desired frequency characteristic can be generated by combining a plurality of pulses.

According to the third aspect of the present invention, a combination of pulse signals can be determined from the frequency characteristic of an object transmission signal.

As described hereinabove, the present invention makes it possible to reduce radio interference with other wireless systems in UWB communications and allows a transmission signal with a desired frequency characteristic to be formed.

INDUSTRIAL APPLICABILITY

In addition to UWB wireless communications, the present invention can be applied to distance measurement and traffic systems.

The invention claimed is:

1. A method of generating a pulse waveform, comprising: generating a pulse by an Ultra Wide Band (UWB) transmitter with a desired frequency characteristic by adjusting a temporal shape of a single pulse in UWB communications in which a single pulse of short duration is transmitted, wherein adjusting the temporal shape includes dividing a desired frequency characteristic of the pulse in a frequency region, obtaining a plurality of pulses according to components of the divided frequency characteristic, selecting pulses from the obtained pulses and adding the selected pulses to generate the pulse which satisfies the desired frequency characteristic, said selected pulses are each formed by means of a waveform represented by a predetermined function, said predetermined function is constituted by selecting a suitable Kernel function and performing expansion or synthesis based on said Kernel function.

2. A method of generating a pulse waveform, comprising: generating a pulse by an Ultra Wide Band (UWB) transmitter with a desired frequency characteristic by adjusting a temporal shape of a single pulse in UWB communications in which a single pulse of short duration is transmitted, wherein adjusting the temporal shape includes subjecting a desired frequency characteristic or an approximate frequency characteristic of the pulse to an inverse Fourier transform, obtaining a plurality of waveforms on a time axis in accordance with divided components of the frequency characteristic in a frequency region, selecting waveforms from the obtained plurality of waveforms and adding the selected waveforms to generate the pulse which satisfies the desired frequency characteristic, said selected waveforms are each formed by means of a waveform represented by a predetermined function, said predetermined function is constituted by selecting a suitable Kernel function and performing expansion or synthesis based on said Kernel function.

* * * * *